(12) United States Patent
Andreev et al.

(10) Patent No.: US 7,937,462 B2
(45) Date of Patent: May 3, 2011

(54) VERIFICATION OF CORRECTNESS OF NETWORKING ASPECTS OF AN INFORMATION TECHNOLOGY SYSTEM

(75) Inventors: Dmitry Andreev, Syracuse, NY (US); Paul G. Greenstein, Croton-on-Hudson, NY (US); Galina Grunin, Briarcliff Manor, NY (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 11/741,885

(22) Filed: Apr. 30, 2007

(65) Prior Publication Data

US 2007/0289008 A1    Dec. 13, 2007

Related U.S. Application Data

(63) Continuation-in-part of application No. 11/060,007, filed on Feb. 17, 2005, now Pat. No. 7,568,022, which is a continuation-in-part of application No. 11/011,449, filed on Dec. 14, 2004.

(51) Int. Cl.
*G06F 15/173* (2006.01)
(52) U.S. Cl. .......... 709/224; 709/217; 709/218; 709/219
(58) Field of Classification Search .......... 709/217–219, 709/224
See application file for complete search history.

(56) References Cited

U.S. PATENT DOCUMENTS

| | | | |
|---|---|---|---|
| 5,960,200 A | 9/1999 | Eager et al. | |
| 6,031,984 A | 2/2000 | Walser | |
| 6,041,041 A * | 3/2000 | Ramanathan et al. | 370/241 |
| 6,151,582 A | 11/2000 | Huang et al. | |
| 6,161,101 A | 12/2000 | Guinta | |
| 6,167,564 A | 12/2000 | Fontana et al. | |
| 6,249,769 B1 | 6/2001 | Ruffin et al. | |
| 6,256,773 B1 | 7/2001 | Bowman-Amuah | |
| 6,260,065 B1 | 7/2001 | Leiba et al. | |
| 6,621,505 B1 | 9/2003 | Beauchamp et al. | |
| 6,983,449 B2 | 1/2006 | Newman | |
| 7,143,420 B2 | 11/2006 | Radhakrishnan | |
| 7,162,427 B1 | 1/2007 | Myrick et al. | |

(Continued)

OTHER PUBLICATIONS

Office Action (Mail Date Feb. 20, 2009) for U.S. Appl. No. 11/135,599, filed May 23, 2005; Confirmation No. 4050.

(Continued)

*Primary Examiner* — Nathan Flynn
*Assistant Examiner* — Mohamed Wasel
(74) *Attorney, Agent, or Firm* — Schmeiser, Olsen & Watts; William E. Schiesser

(57) ABSTRACT

Method and system for verifying correctness of networking aspects of an Information Technology (IT) system that includes a host network of hosts. The hosts include servers and firewalls. A firewall connectivity indication of whether the host network includes an isolated firewall or a cross-zone connected firewall is determined. Determining for each host whether the host is isolated from a communication network to which the IT system is connected determines whether isolated network segments exit within the host network. For each host determined to be isolated from the communication network, the method identifies all network segments of the host network to which each host is connected, determines the unique network segments of the identified network segments, and designates the unique network segments as a set of isolated network segments. The firewall connectivity indication and the set of isolated network segments are stored in a storage medium of a computer system.

32 Claims, 72 Drawing Sheets

IT ENTITIES

U.S. PATENT DOCUMENTS

| | | | |
|---|---|---|---|
| 7,222,255 B1* | 5/2007 | Claessens et al. | 714/4 |
| 7,224,968 B2* | 5/2007 | Dobson et al. | 455/423 |
| 7,313,568 B2 | 12/2007 | Cutlip et al. | |
| 7,437,675 B2 | 10/2008 | Casati et al. | |
| 7,523,092 B2 | 4/2009 | Andreev et al. | |
| 7,523,190 B1* | 4/2009 | Bickerstaff et al. | 709/224 |
| 7,568,022 B2 | 7/2009 | Andreev et al. | |
| 7,594,016 B1 | 9/2009 | Zhou et al. | |
| 2002/0069102 A1 | 6/2002 | Vellante et al. | |
| 2002/0104071 A1 | 8/2002 | Charisius et al. | |
| 2002/0129001 A1 | 9/2002 | Levkoff et al. | |
| 2002/0129345 A1 | 9/2002 | Tilden | |
| 2002/0194147 A1 | 12/2002 | Ricke | |
| 2002/0198727 A1 | 12/2002 | Ann et al. | |
| 2003/0140128 A1 | 7/2003 | Cox et al. | |
| 2003/0149685 A1 | 8/2003 | Trossman et al. | |
| 2003/0158842 A1 | 8/2003 | Levy et al. | |
| 2003/0172145 A1 | 9/2003 | Nguyen | |
| 2003/0197743 A1 | 10/2003 | Hill et al. | |
| 2004/0049295 A1 | 3/2004 | Wojsznis et al. | |
| 2004/0230464 A1 | 11/2004 | Bliss, Jr. et al. | |
| 2004/0267679 A1 | 12/2004 | Fromherz et al. | |
| 2005/0002380 A1 | 1/2005 | Miller et al. | |
| 2005/0027858 A1 | 2/2005 | Sloth et al. | |
| 2005/0049910 A1 | 3/2005 | Lancaster et al. | |
| 2005/0066015 A1 | 3/2005 | Dandekar et al. | |
| 2005/0198486 A1 | 9/2005 | Desmond et al. | |
| 2006/0041935 A1 | 2/2006 | Conley et al. | |
| 2006/0129419 A1 | 6/2006 | Flaxer et al. | |
| 2006/0171538 A1 | 8/2006 | Larson et al. | |
| 2006/0271390 A1 | 11/2006 | Rich et al. | |
| 2006/0283938 A1 | 12/2006 | Kumar et al. | |
| 2007/0136676 A1 | 6/2007 | Kruempelmann et al. | |
| 2008/0077873 A1 | 3/2008 | Peterson | |
| 2008/0204452 A1 | 8/2008 | Lau | |
| 2009/0031234 A1 | 1/2009 | McKay | |

OTHER PUBLICATIONS

Office Action (Mail Date Mar. 10, 2010) for U.S. Appl. No. 11/120,678, filed May 3, 2005; Confirmation No. 3799.

Office Action (Mail Date Mar. 31, 2010) for U.S. Appl. No. 11/159,918, filed Jun. 23, 2005; Confirmation No. 4650.

Notice of Allowance (Mail Date May 18, 2010) for U.S. Appl. No. 11/135,599, filed May 23, 2005; Confirmation No. 4050.

Office Action (Mail Date Aug. 19, 2009) for U.S. Appl. No. 11/159,918, filed Jun. 23, 2005, Confirmation No. 4650.

U.S. Appl. No. 11/452,181, filed Jun. 13, 2006; Confirmation No. 2623.

U.S. Appl. No. 12/424,698, filed Apr. 16, 2009; Confirmation No. 1059.

U.S. Appl. No. 12/508,048, filed Jul. 23, 2009; Confirmation No. 7228.

Office Action (Mail Date Jul. 2, 2009) for U.S. Appl. No. 11/135,599, filed May 23, 2005, Confirmation No. 4050.

Notice of Allowance (Mail Date Dec. 19, 2008) for U.S. Appl. No. 11/263,498, filed Oct. 31, 2005; Confirmation No. 2739.

Final Office Action (Mail Date Dec. 3, 2008) for U.S. Appl. No. 11/011,449, filed Dec. 14, 2004; Confirmation No. 6365.

U.S. Appl. No. 11/135,599, filed May 23, 2005; Confirmation No. 4050.

U.S. Appl. No. 11/120,678, filed May 3, 2005; Confirmation No. 3799.

U.S. Appl. No. 11/159,918, filed Jun. 23, 2005; Confirmation No. 4650.

U.S. Appl. No. 11/060,007, filed Feb. 17, 2005; Confirmation No. 2527.

Chou et al.; Guied simulated annealing method for optimization problems; The American Physical Society; Physical Review E 67, 066704 (2003); pp. 1-6.

What is Optimization?, http://www-fp.mcs.anl.gov/OTC/Guide/OptWeb/opt.html, Mar. 28, 1996, pp. 1-3.

Reliability and Availability Basics, Apr. 1, 2002, EventHelix, http://web/archive.org/web/20020401235342/www.eventhelix.com/RealtimeMantra/FaultHandling/reliability_availability_basics.htm.

System Reliability and Availability, Apr. 1, 2002, EventHelix, http://www.eventhelix.com/RealtimeMantra/FaultHandling/system_reliability_availability.htm.

Office Action (Mail Date May 27, 2010) for U.S. Appl. No. 12/508,048, filed Jul. 23, 2009; Confirmation No. 7228.

Office Action (Mail Date Sep. 9, 2010) for U.S. Appl. No. 11/120,678, filed May 3, 2005; Confirmation No. 3799.

Office Action (Mail Date Sep. 15, 2010) for U.S. Appl. No. 12/424,698, filed Apr. 16, 2009; Confirmation No. 1059.

* cited by examiner

IT ENTITIES setRelationship() Method deleteElement() Method setAvailable() Method ensureDependencies() METHOD

IT STRUCTURE COMPOSITION

IT DEVELOPMENT PROCESS

TRANSLATION OF IT STRUCTURE INSTANCE

ADJUSTING CHARACTERISTICS
OF IT STRUCTURE INSTANCE

SELECTION OF SUBCLASS OF IT STRUCTURE

REVERSE SPECIFICATION

CLASS HIERARCHY EXAMPLE

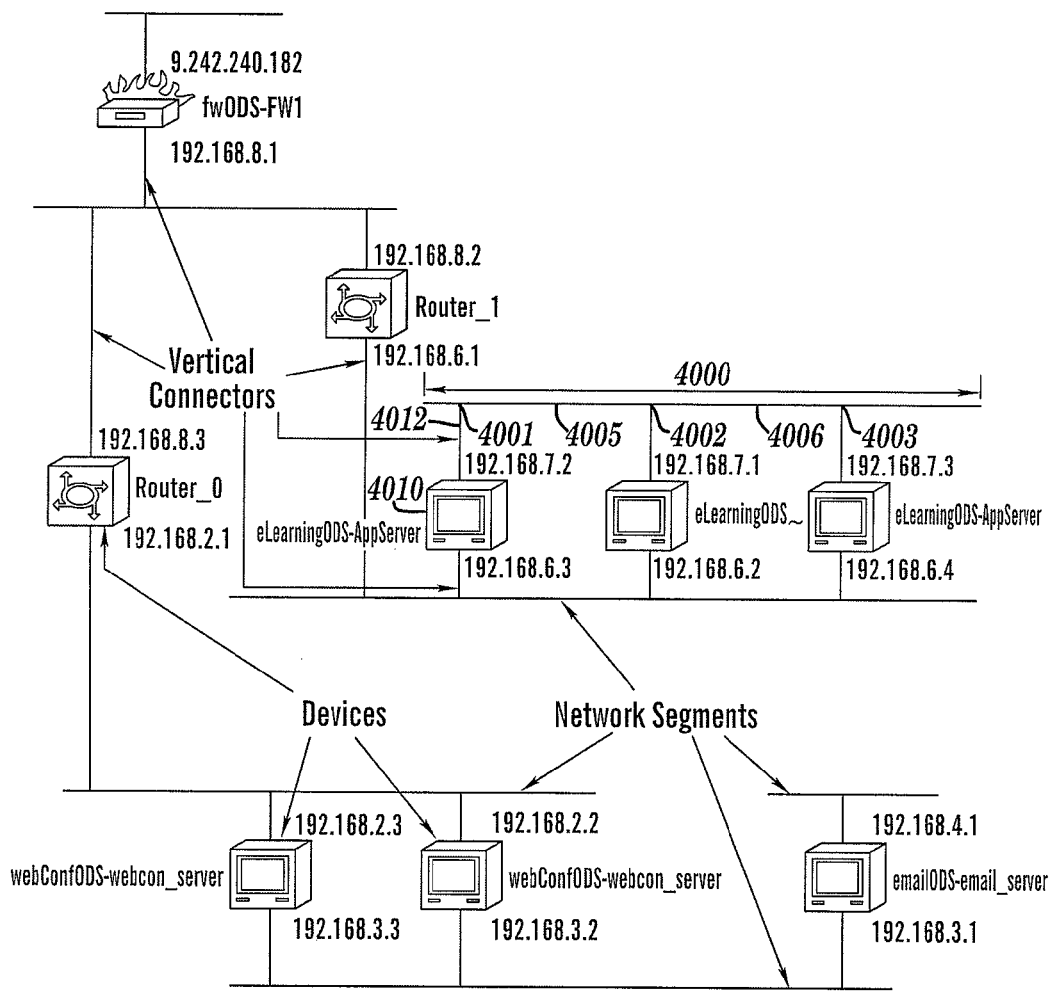
FIG. 21A  Sample Network Display

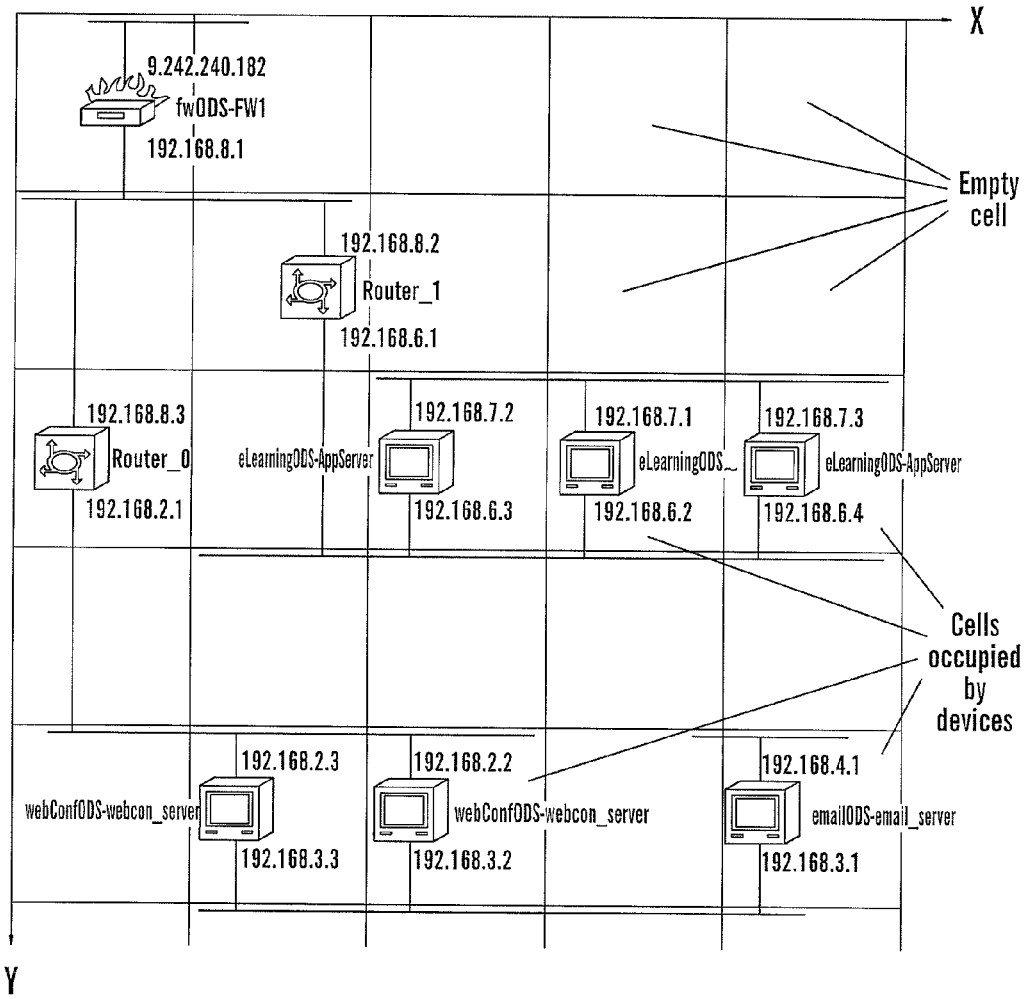
FIG. 21B  Relationship Between Display Matrix and Network Elements

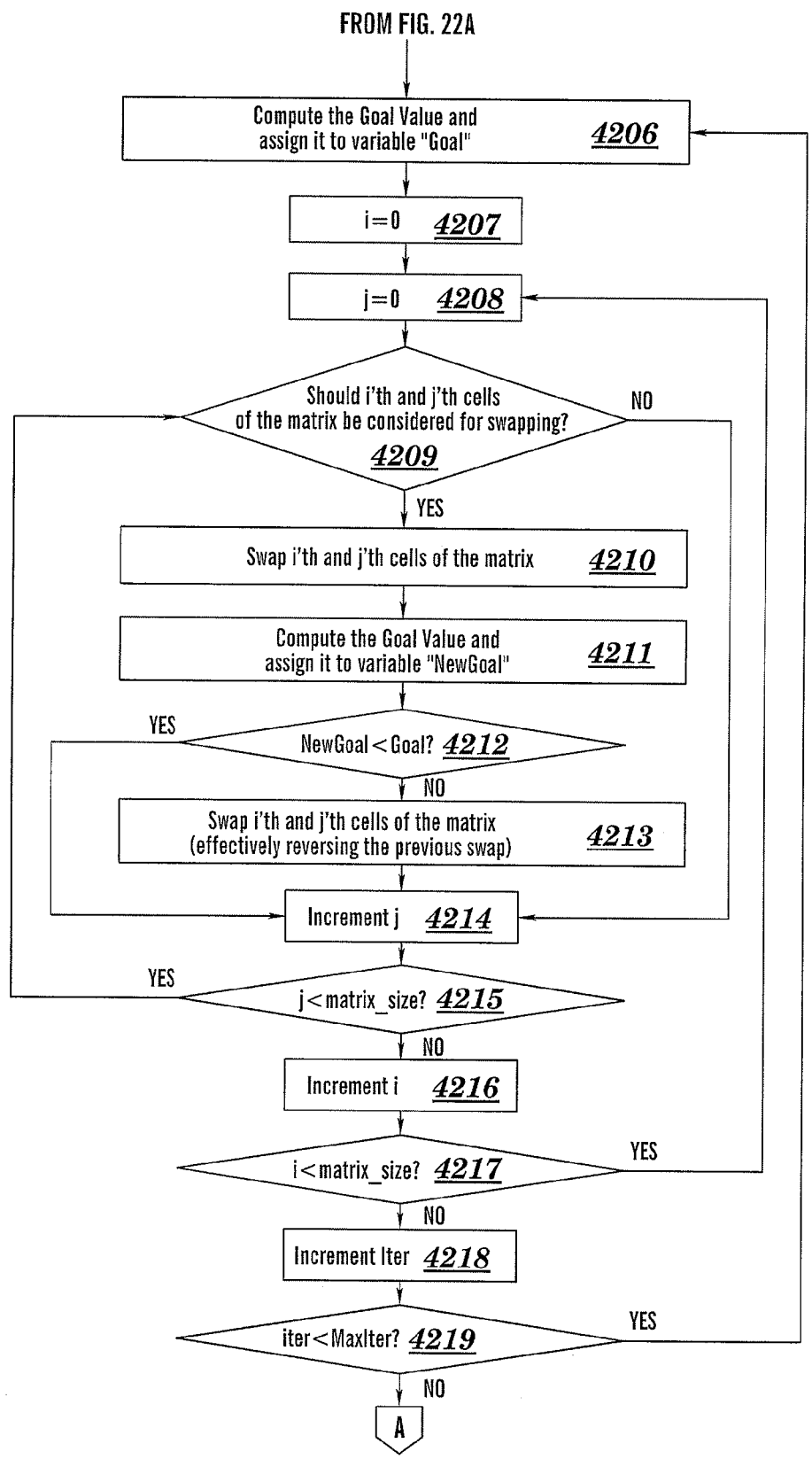
FIG. 22B Matrix Generation and Matrix Cell Swapping

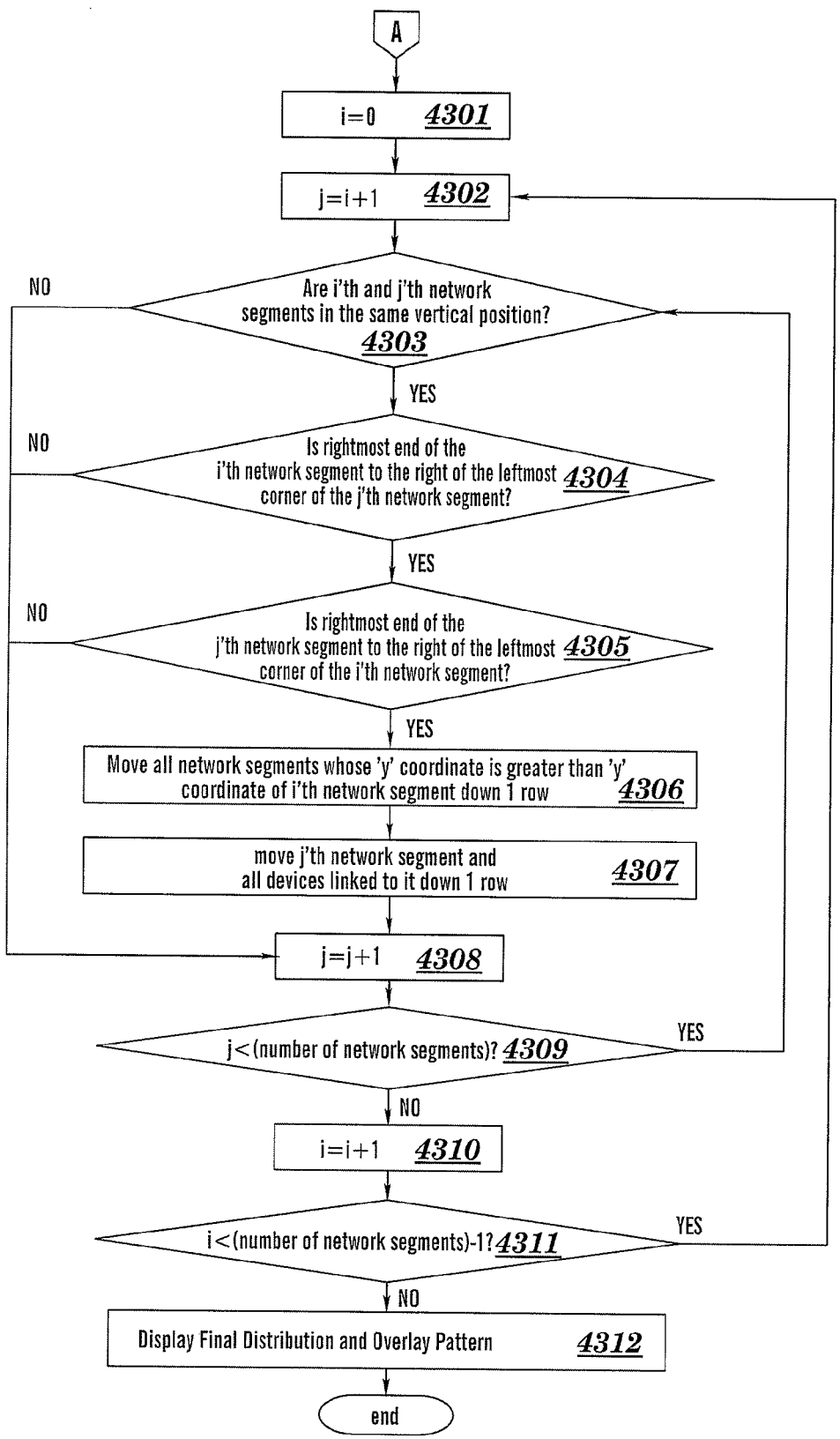
*FIG. 23* Rearrangement of Network Segments

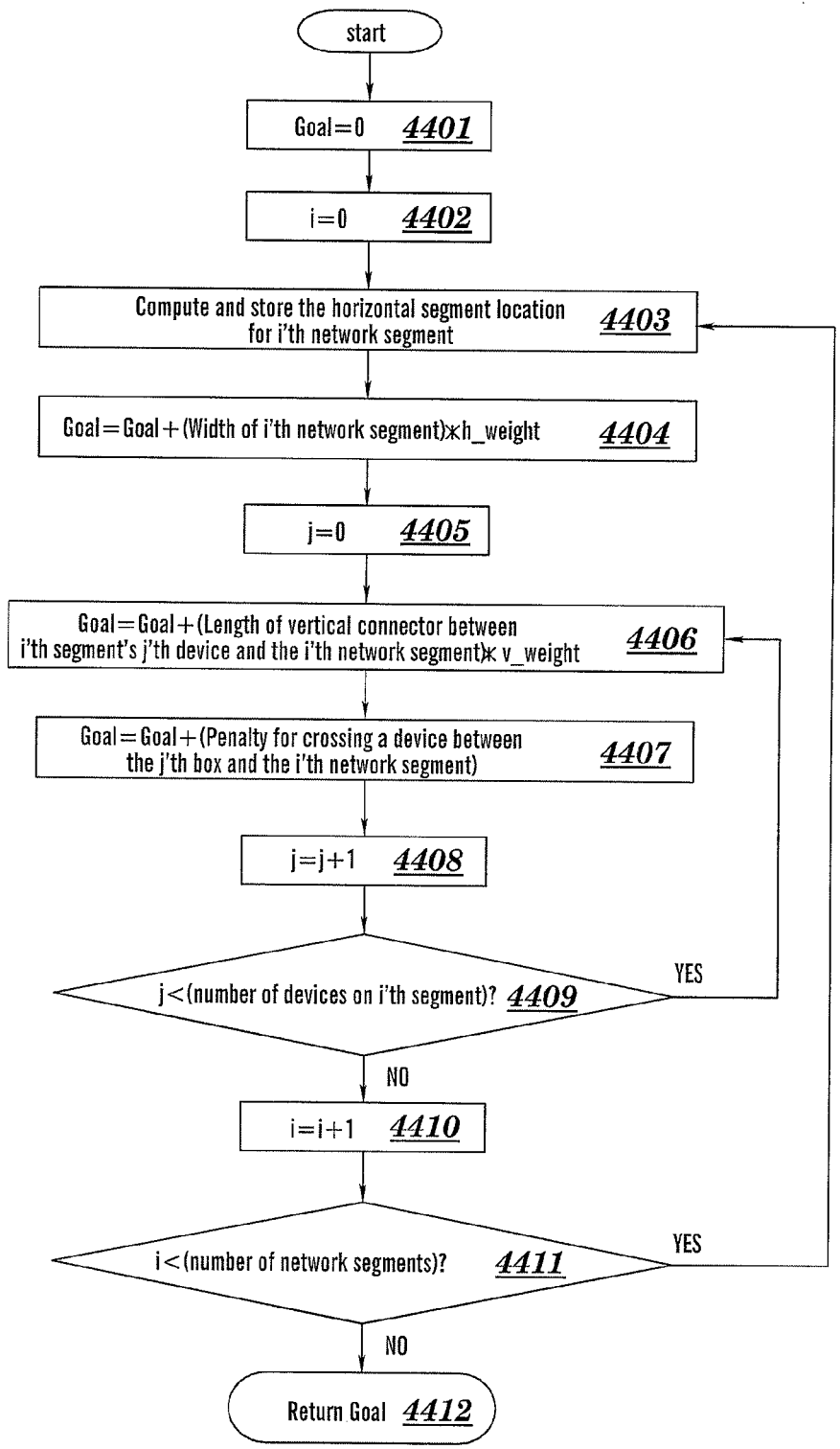
*FIG. 24* Goal Function Method

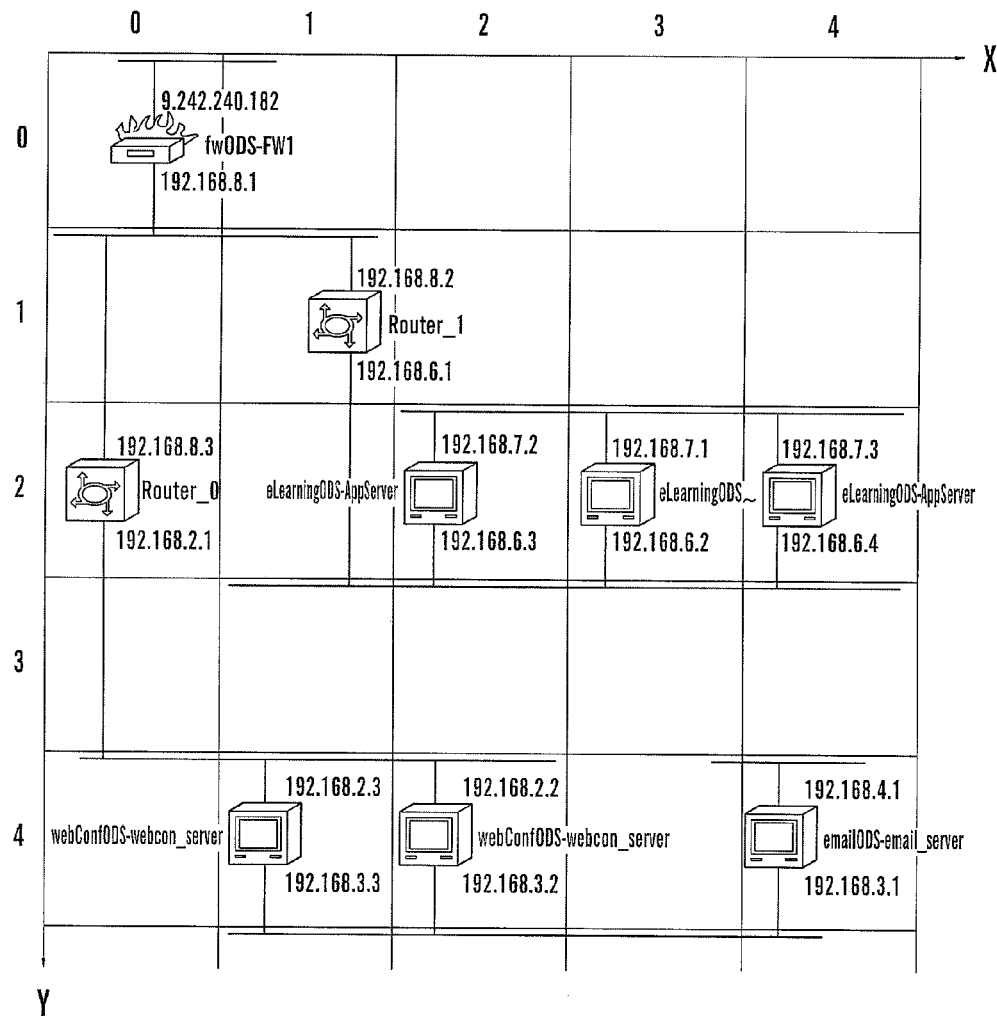
FIG. 25 Network Diagram Before Swapping

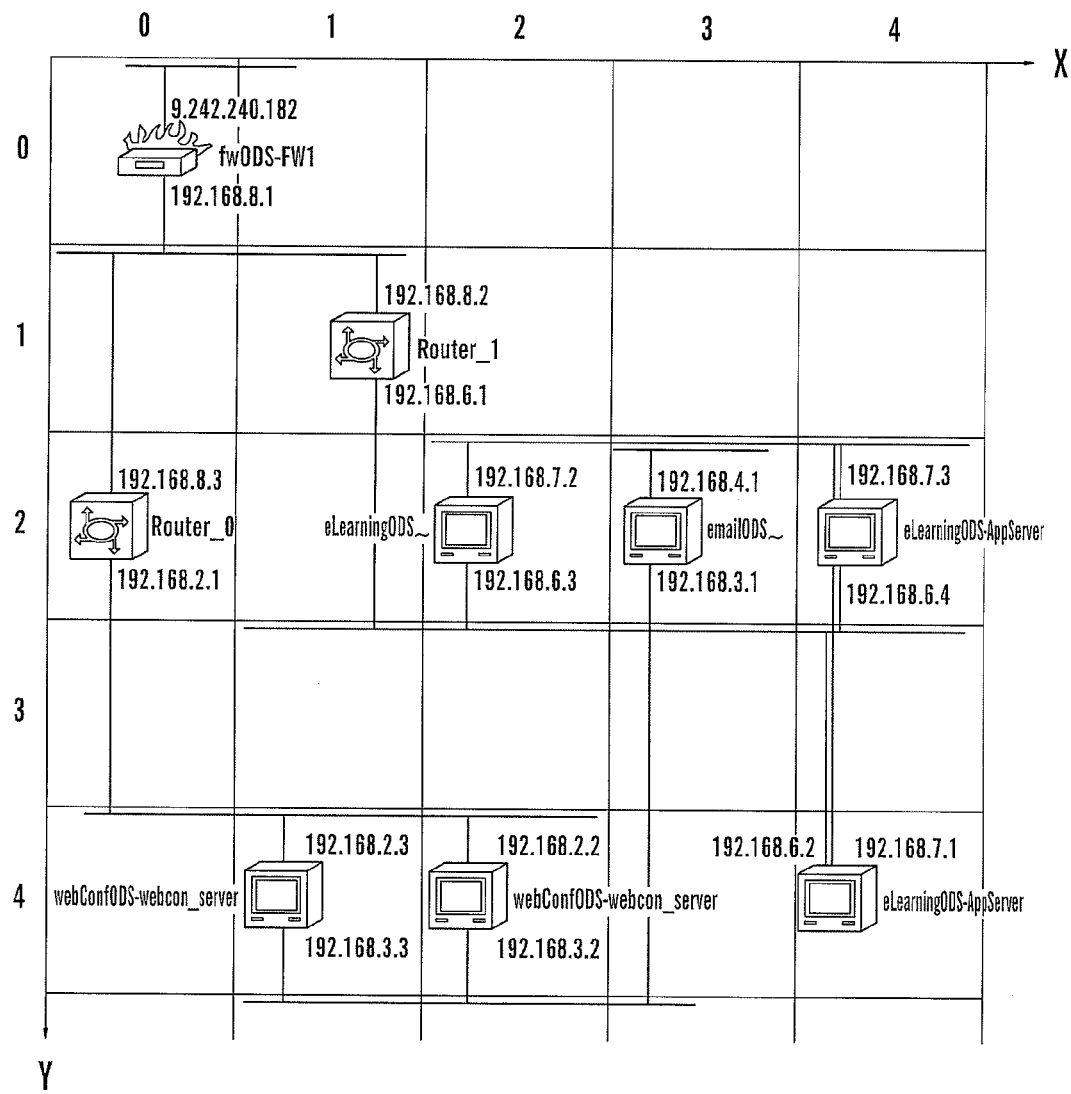
FIG. 26  Network Diagram After Swapping

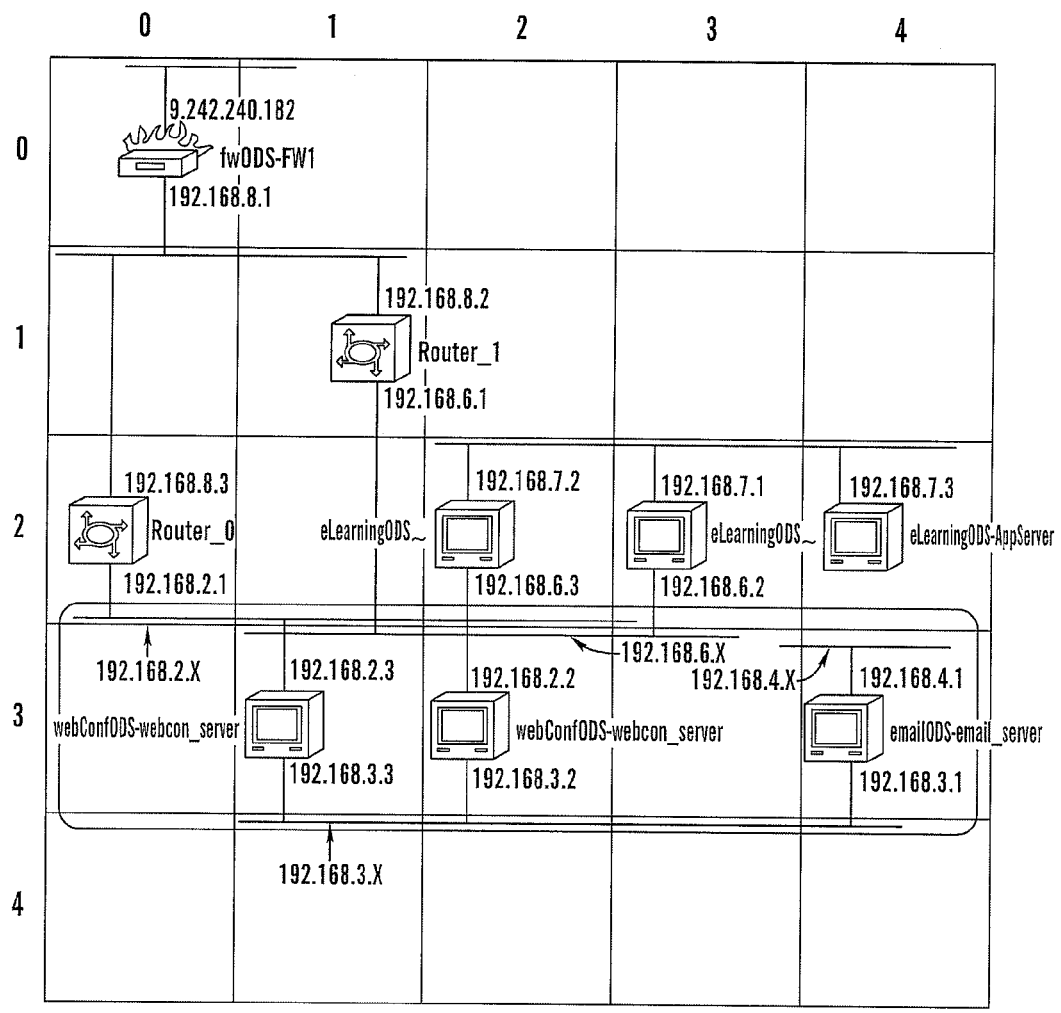
FIG. 27  Separating Overlapping Segments - Before Separation

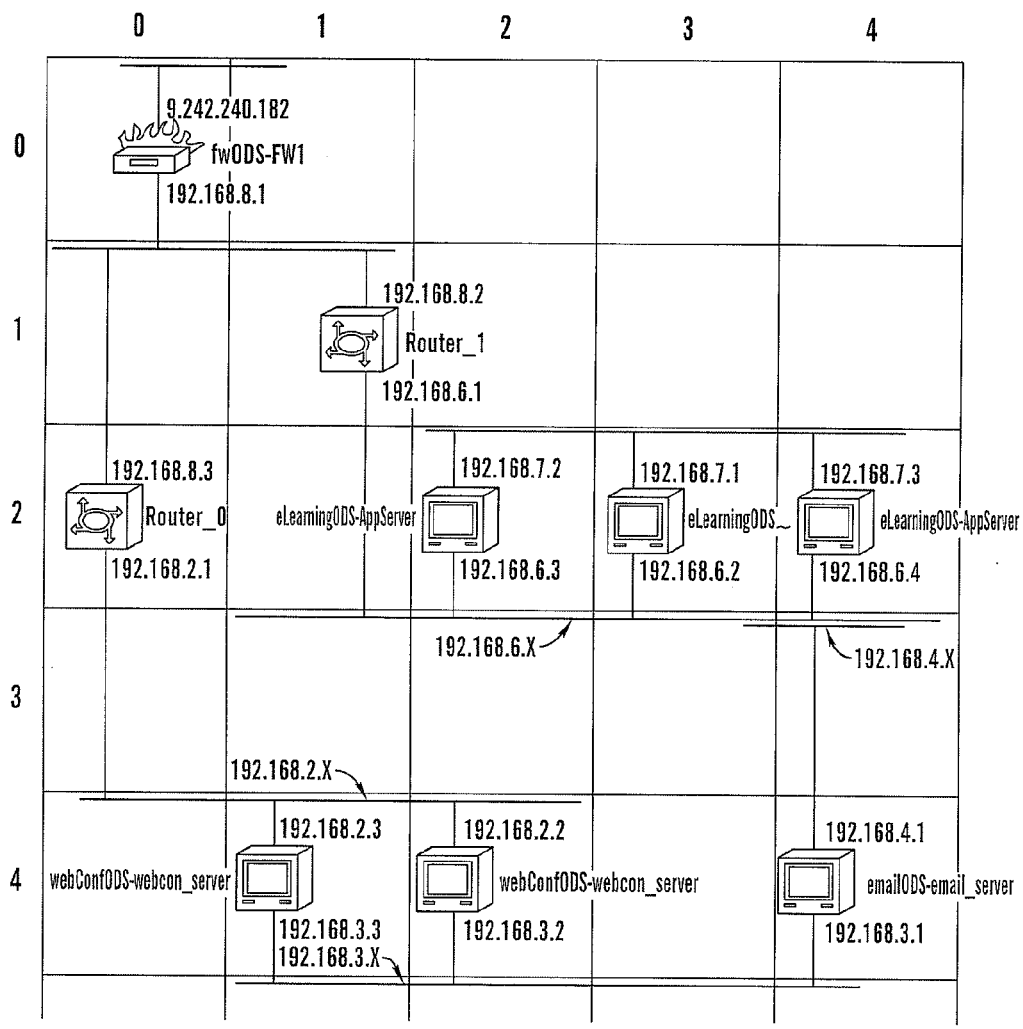
*FIG. 28* Separating Overlapping Segments - After Separation

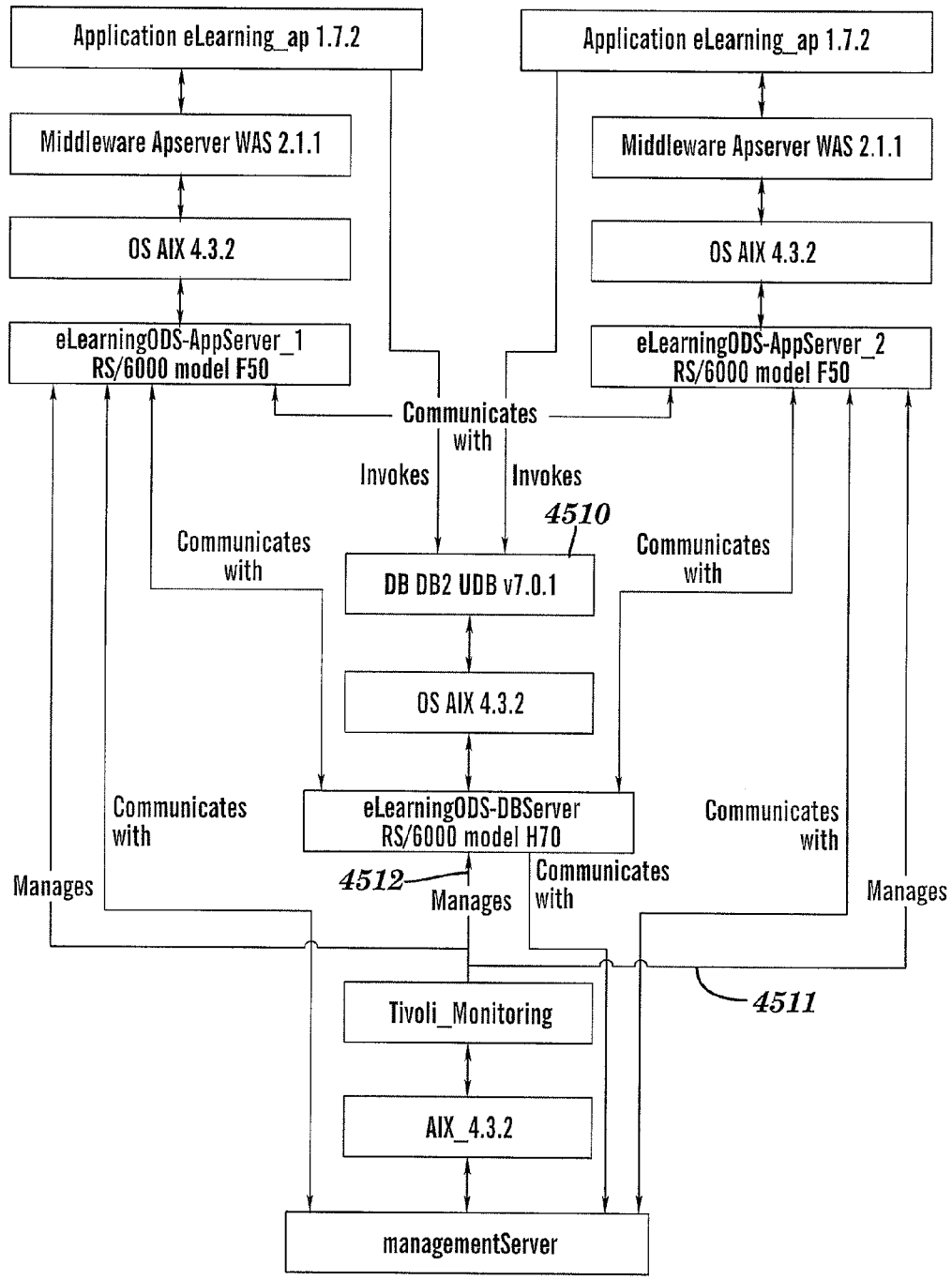
FIG. 29  Display of IT Relationships

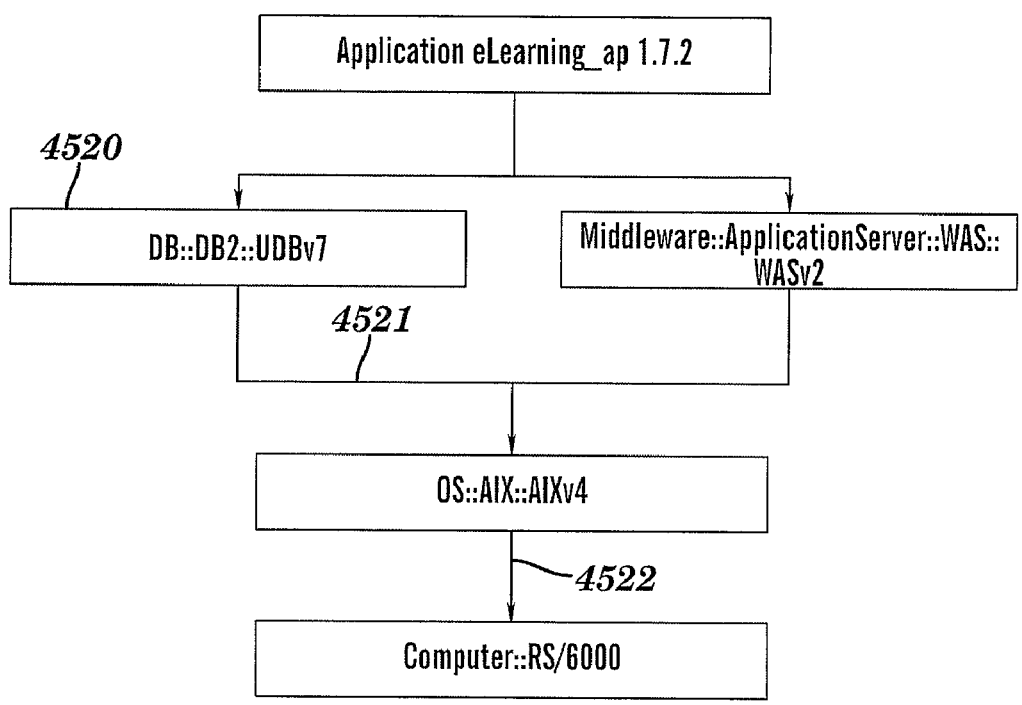
FIG. 30 Display of IT Dependencies

US 7,937,462 B2

VERIFICATION OF CORRECTNESS OF NETWORKING ASPECTS OF AN INFORMATION TECHNOLOGY SYSTEM

RELATED APPLICATIONS

The present patent application is a continuation-in-part of U.S. patent application Ser. No. 11/060,007, filed Feb. 17, 2005 now U.S. Pat. No. 7,568,022 and entitled "Automated Display of an Information Technology System Configuration", which is a continuation-in-part of copending U.S. patent application Ser. No. 11/011,449, filed Dec. 14, 2004 and entitled "Automation of Information Technology System Development".

BACKGROUND OF THE INVENTION

1. Technical Field

The present invention relates generally to automation of Information Technology system development and more particularly to verification of correctness of networking aspects of an Information Technology system.

2. Related Art

A number of activities are associated with use of a computer. These activities may be grouped into several categories: development, deployment, operations and maintenance, and productive use. The category of development comprises determination of specific hardware, software, and networking required to satisfy the specific usage needs; planning of a production system.

The category of deployment comprises implementation of the developed production system, ranging from acquisition of the appropriate hardware and software to installation, configuration, and customization of acquired software, hardware and network devices, to verification of correctness of the built system.

The category of operations and maintenance comprises operation of the deployed production system and introduction of changes to it.

The category of productive use comprises application of the deployed production system to activities for which it is intended.

The preceding categories of activities are common to computing systems, be it a stand-alone personal computer, or a geographically dispersed collection of highly complex systems supporting an international corporation. The first three of the preceding categories of activities (i.e., development, deployment, operations) are a liability required in support of the last activity category of productive use of a computer system. While for a single stand-alone personal computer, development, deployment and operations may involve miniscule investment of time and/or money (with the exception of the acquisition of the necessary hardware and software), in large institutions, these preceding three activities occupy armies of technical and administrative personnel and entail high costs, primarily due to complexity of computer systems, exacerbated by constantly evolving technology and business requirements.

Thus, there is a need for a method and system to reduce costs and user effort pertaining to Information Technology (IT) development.

SUMMARY OF THE INVENTION

The present invention provides a method for determining a firewall connectivity indication for a host network of an Information Technology (IT) structure of an IT system, said host network comprising a plurality of hosts including at least one server and at least one firewall, said hosts configured to be interconnected within the host network via interfaces comprised by said hosts, each server being a hardware server having at least one interface, each firewall being a hardware firewall having at least two interfaces, said host network connected to at least one interface of a communication network, said method comprising:

determining whether the at least one firewall comprises at least one malconnected firewall, wherein a malconnected firewall is an isolated firewall or a cross-zone connected firewall, wherein an isolated firewall is a firewall that is not connected to the communication network, and wherein a cross-zone connected firewall is a firewall that is connected to the communication network by a first continuous path and a second continuous path such that the first and second continuous paths do not each comprise a same number of firewalls; and determining the firewall connectivity indication from said determining whether the at least one firewall comprises at least one malconnected firewall, wherein the firewall connectivity indication indicates that the host network comprises at least one malconnected firewall or that the host network does not comprise at least one malconnected firewall; and storing the firewall connectivity indication in a computer readable storage medium of a computer system.

The present invention provides a process for supporting computer infrastructure, said process comprising providing at least one support service for at least one of creating, integrating, hosting, maintaining, and deploying computer-readable code in a computing system, wherein the code in combination with the computing system is configured to perform a method for determining a firewall connectivity indication for a host network of an Information Technology (IT) structure of an IT system, said host network comprising a plurality of hosts including at least one server and at least one firewall, said hosts configured to be interconnected within the host network via interfaces comprised by said hosts, each server being a hardware server having at least one interface, each firewall being a hardware firewall having at least two interfaces, said host network connected to at least one interface of a communication network, said method comprising:

determining whether the at least one firewall comprises at least one malconnected firewall, wherein a malconnected firewall is an isolated firewall or a cross-zone connected firewall, wherein an isolated firewall is a firewall that is not connected to the communication network, and wherein a cross-zone connected firewall is a firewall that is connected to the communication network by a first continuous path and a second continuous path such that the first and second continuous paths do not each comprise a same number of firewalls; and determining the firewall connectivity indication from said determining whether the at least one firewall comprises at least one malconnected firewall, wherein the firewall connectivity indication indicates that the host network comprises at least one malconnected firewall or that the host network does not comprise at least one malconnected firewall; and storing the firewall connectivity indication in a computer readable storage medium of a computer system.

The present invention provides a method for determining whether one or more isolated network segments exit within a host network comprised by an Information Technology (IT) structure of an IT system, said host network comprising a plurality of hosts, said hosts configured to be interconnected within the host network via interfaces comprised by the hosts, each host having at least one interface, said host network configured to be connected to at least one interface of a communication network, said method comprising:

determining that at least one host of the plurality of hosts is isolated from the communication network, including determining for each host whether the host is isolated from the communication network;

for each host determined to be isolated from the communication network: identifying all network segments of the host network to which said each host is connected, determining the unique network segments of the identified network segments, designating the unique network segments as a set of isolated network segments; and storing the set of isolated network segments in a computer readable storage medium of a computer system.

The present invention advantageously reduces costs and user effort pertaining to Information Technology (IT) system development, including reducing costs and user effort associated with verifying correctness of networking aspects of an IT system.

BRIEF DESCRIPTION OF THE DRAWINGS

FIG. 21A depicts a network display comprising devices, network segments, and vertical connectors, in accordance with embodiments of the present invention.

FIG. 21B depicts relationships between the network display of FIG. 21A and a two-dimensional matrix representing the screen layout, in accordance with embodiments of the present invention.

FIGS. 22A and 22B is a flow chart describing matrix generation and matrix cell swapping, in accordance with embodiments of the present invention.

FIG. 23 is a flow chart describing rearrangement of network segments, in accordance with embodiments of the present invention.

FIG. 24 is a flow chart of describing the goal function method for computing a goal value, in accordance with embodiments of the present invention.

FIGS. 25-26 illustrate how the swapping of two non-empty cells of the matrix can affect the goal value, in accordance with embodiments of the present invention.

FIGS. 27-28 illustrate movement of overlapping network segments, in accordance with embodiments of the present invention.

FIG. 29 illustrates a display for visualizing IT relationships, in accordance with embodiments of the present invention.

FIG. 30 illustrates a display for visualizing IT dependencies, in accordance with embodiments of the present invention.

DETAILED DESCRIPTION OF THE INVENTION

The detailed description of the present invention is organized into the following sections:
1. Nomenclature;
2. Information Technology (IT) Entity Model (defines basic IT entities and describes their properties and associated processes);
3. IT Structure Visualization (generates a display of an IT structure configuration);
4. Verification of Correctness of Networking Aspects of an IT System,
5. Computer System (describes computer system used to implement an IT Entity Model and associated processes)
1. Nomenclature
1.1 Flow Charts
The flow charts in the Figures comprise, inter alia, the following block shapes:
1) Rectangular: represents execution of code as described (e.g., FIG. 3, block 2202); and
2) Diamond: represents a decision block (e.g., FIG. 3, block 2203).

1.2 Abbreviations
The following abbreviations are utilized herein.
CASE—computer-aided software engineering
CD—compact disk
CICS—Customer Information Control System
CPU—central processor unit
DASD—direct access storage device
DB—database
DNS—domain name server
DRAM—dynamic random access memory
DVD—digital video disk
GB—gigabyte
GUI—graphical user interface
HTTP—HyperText Transfer Protocol
HTTPS—HTTP Secure
IDE—integrated development environment
IP—internet protocol
IT—information technology
KB—kilobyte
KW—kilowatt
LAN—local-area network
LOC—lines of code
Mbps—megabits per second
MHz—mega-Hertz
MP—multi-processor
NIC—network interface card
NOOP—no operation (moot)
OS—operating system
PM—person/month
POTS—"plain old telephone service"
RAM—random-access memory
RISC—reduced instruction set computer
ROM—read-only memory
SL—service level
SMTP—Simple Mail Transfer Protocol
S/N—serial number
TCO—total cost of ownership
TCP/IP—transmission control protocol/internet protocol
UI—user interface
UML—universal modeling language
UP—uni-processor
UPS—uninterruptible power supply
2. Information Technology (IT) Entity Model
IT systems and environments may be described in terms of IT entities. The term "entity" is understood to denote "IT entity" herein.

The base entity model comprises IT entities, relationships among the IT entities, and interfaces and methods provided by these IT entities.

Figure 1:
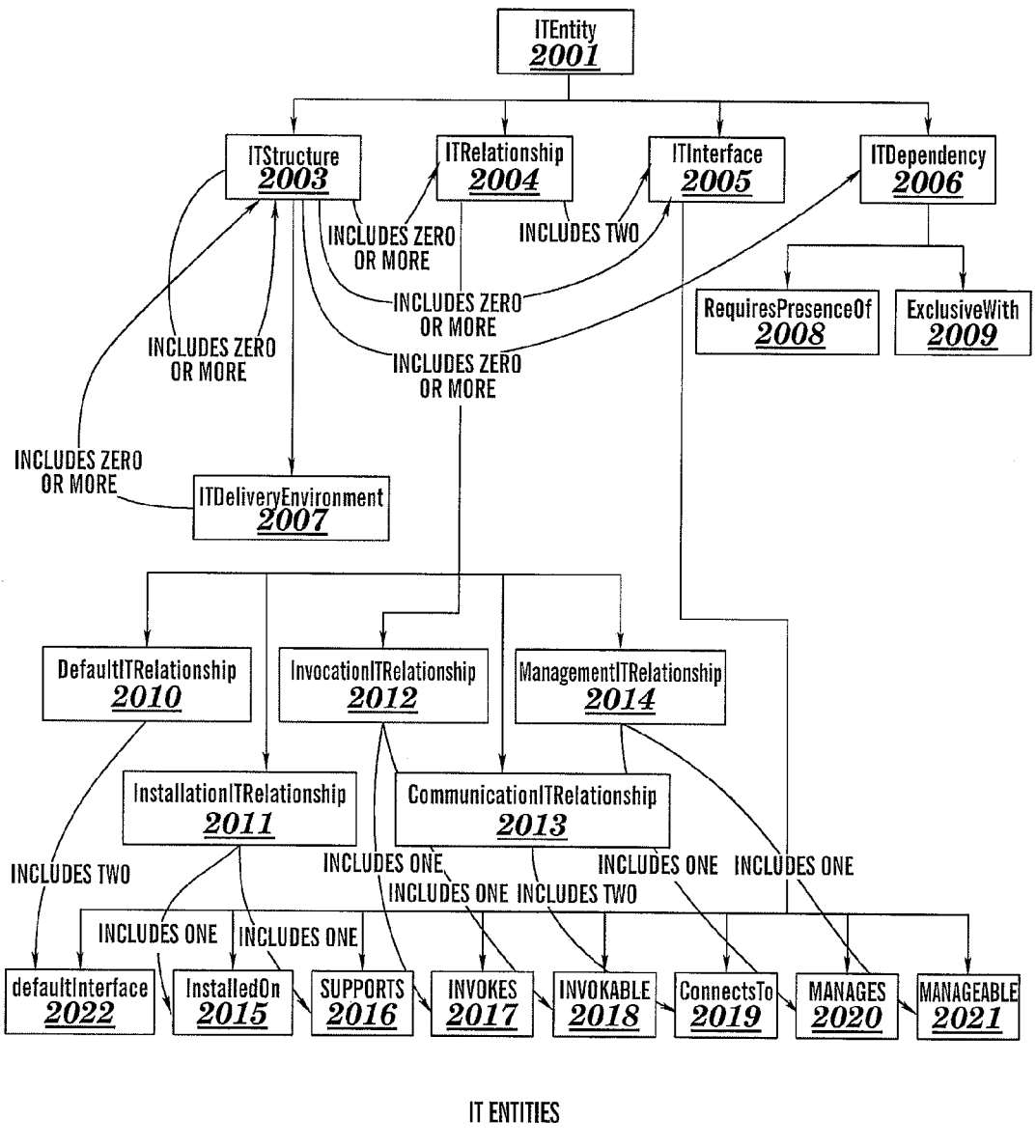
FIG. 1 is a diagram illustrating Information Technology (IT) entities included in the base entity model, and organized in a class hierarchy, in accordance with embodiments of the present invention.

For illustrative purposes, Java-like syntax is used herein as a specification language for IT structures. An IT structure is a set of IT entities. Generally, another programming language (e.g., object oriented, procedural, high- or low-level) may be used instead of Java a modeling language (e.g., UML) may be used instead of Java; and a specialized language could be defined and implemented solely for the purpose of definition of IT structures.
2.1 IT Entities
FIG. 1 is a diagram illustrating IT entities included in the base entity model, and organized in a class hierarchy as shown in Table 1, in accordance with embodiments of the present invention.

TABLE 1

```
ITEntity 2001
    ITStructure 2003
        ITDeliveryEnvironment 2007
    ITInterface 2005
        defaultInterface 2022
        InstalledOn 2015
        Supports 2016
        Invokes 2017
        Invokable 2018
        ConnectsTo 2019
        Manages 2020
        Mangeable 2021
    ITRelationship 2004
        DefaultITRelationship 2010
        InstallationITRelationship 2011
        InvocationITRelationship 2012
        CommunicationITRelationship 2013
        ManagementITRelationship 2014
    ITDependency 2006
        RequiresPresenceOf 2008
        ExclusiveWith 2009
```

IT entities may be qualified as real, virtual, or abstract. A real IT entity has no undefined characteristic and may therefore be represented physically. A virtual IT entity has exactly one undefined characteristic and thus cannot have more than one undefined characteristic. An abstract IT entity has at least two undefined characteristics. Examples of real entities, virtual entities, and abstract entities will be presented infra. For convenience, class Type is introduced as follows:

Enumeration Type:=(abstract, virtual, real)

2.1.1 ITEntity Class

TEntity class is introduced for convenience as a root class for the other IT entity classes listed above. ITEntity has the following methods:

1) constructor(String name [, Type type])—creates an instance of ITEntity with the specified name and of optionally specified type 2) boolean isAbstract( ), returns true if ITEntity is abstract, false otherwise 3) boolean isvirtual( ), returns true if ITEntity is virtual, false otherwise 4) boolean isReal( ), returns true if ITEntity is real, false otherwise 5) getName( )—returns ITEntity name 6) setType(Type type)—changes IT entity type as specified 2.2 IT Structures An IT structure is either a primitive IT structure or a complex IT structure.

A primitive IT structure is an IT entity representing materials or labor, indivisible within a particular view to a structural model, and a set of method associated with characteristics of the represented materials or labor.

A real primitive IT structure represents a specific single physical object or a specific unit of labor. Examples of real primitive IT structure include:

1) RS/6000 model F50 S/N 123456-AB. There is one and only one RS/6000 model F50 with this particular S/N.

2) Software product Ppppp version vvvvv license key 12345678-AB-9ABCD-XYZ.

A virtual primitive IT structure represents a class of specific physical objects. Examples of virtual primitive IT structure include:

1) RS/6000 model F50. Since no s/n is specified, there is a class of RS/6000 model F50 this virtual primitive IT structure corresponds to, and RS/6000 model F50 with any s/n belongs to this class.

2) Software product Ppppp version vvvvv.

An abstract primitive IT structure represents an abstract view of materials or labor. In this embodiment, abstract primitive IT structures include the same out-of-model IT entity, called abstractPrimitive. Other embodiment may have a multiplicity of abstract primitive out-of-model entities. Examples of abstract primitive IT structure include:

1) RS/6000. Since no model is specified, any RS/6000, including model F50, as well as any other models, belongs to this class.

2) Computer. Since no architecture, type, or any other characteristics are specified, any computer, including any model of RS/6000, belongs to this class.

3) Software product Ppppp.

4) Software product.

Primitive IT structures are indivisible only within a particular model. For example, a computer may be viewed as indivisible in the context of the model used in this embodiment. In a different embodiment, however, a different model may exist in which a computer may be represented as an IT structure (see discussion infra of a complex IT structure), comprising several primitive IT structures; e.g., the following collection of primitive IT structures: processor, memory, DASD, and network interface.

A complex IT structure is a non-empty collection of IT structures, a defined set of relationships (see below) among these IT structures, and a description of this IT structure's characteristics. Examples of a complex primitive IT structure include:

1) a personal computer
2) a network of Lotus Domino servers
3) a zSeries sysplex
4) a collection of programs running on a particular computer
5) a collection of software and hardware required to run Ariba Buyer application
6) a hosted application service (e.g., a service including a service provider hosting an application; Ariba Buyer, in its data center, and providing service customers access to the application through a network; Internet)
7) a professional service (e.g., a service including a service provider perform installation and configuration of an application; Ariba Buyer, at a service customer data center)
8) a network service (e.g., a service providing access to Internet at a specified guaranteed minimum bandwidth)
9) a combined network/hosted application services (e.g., a service providing access to Internet at a specified bandwidth and optionally including web hosting such as hosting of customer's web pages accessed through Internet; and a hosted application service for e-mail).

In the process of formation of an IT structure, values of properties of elements of this IT structure's composition (see below) may change; e.g., assignment of a name to a computer may be required to include that computer in an IT structure.

The set of relationships is imposed by a particular IT structure, rather than being intrinsic for the primitive IT structures comprising the IT structure. Thus, multiple complex IT structures may be created from the same set of primitive IT structures, and uniqueness of the assigned name (i.e., its inequality to any other computer name) may be imposed on a primitive IT structure representing a computer, included in a complex IT structure.

An IT structure composition is the list of IT structures included in a complex IT structure, or an out-of-model entity describing the entity represented by a primitive IT structure (e.g., a String, or a reference to a DB record).

An IT structure composition element is an IT entity included in an IT structure composition.

An IT structure primitive composition is the list of primitive IT structures included in an IT structure, where all complex IT structures are replaced with their respective primitive compositions.

Figure 8:
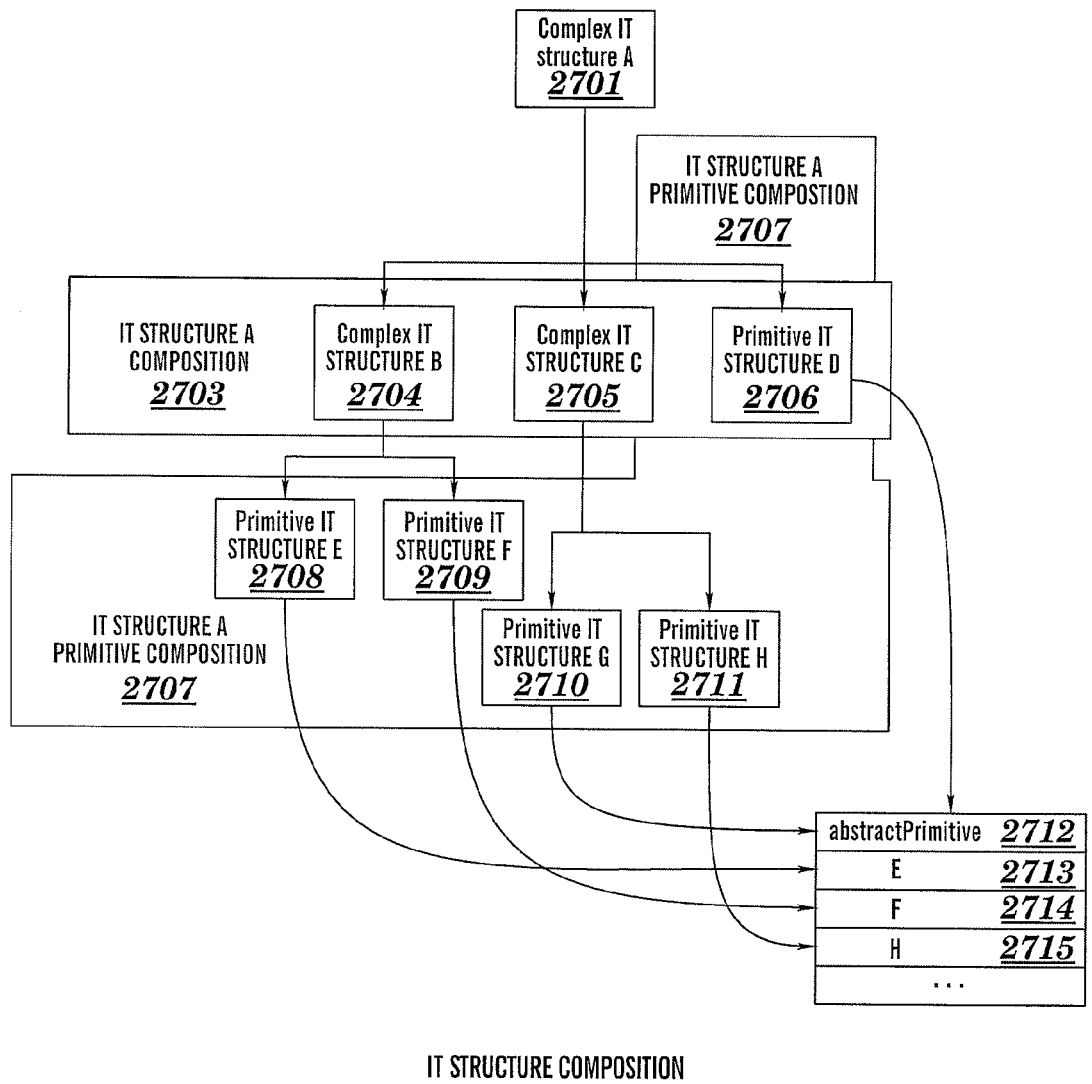
FIG. 8 is a diagram illustrating the concept of IT structure composition, in accordance with embodiments of the present invention.

FIG. 8 is a diagram illustrating the concept of IT structure composition, in accordance with embodiments of the present invention. A complex IT structure A 2701 includes in its composition 2703 two other complex IT structures B 2704 and C 2705, and one abstract primitive IT structure D 2706. Complex IT structure B includes in its composition two primitive IT structures E 2708 and F 2709, and complex IT structure C includes in its composition two primitive IT structures, an abstract primitive IT structure G 2710, and a primitive IT structure H 2711. Both abstract primitive IT structures, D and H, represent the abstractPrimitive out-of-model entity 2712, while all other primitive IT structures represent respective non-abstract out-of-model entities 2713, 2714, 2715. The IT structure A primitive composition 2707 includes all primitive IT structures shown (and no complex IT structures), namely primitive IT structures E 2708, F 2709, G 2710, H 2711, and D 2706.

An abstract IT structure is an IT structure whose composition includes at least one abstract IT entity. Examples of an abstract IT structure include:

1) An abstract IT structure may include an Intel computer with a single 400 MHz Pentium processor, 1024 MB of main memory, 10 GB of DASD, and an Ethernet network interface; however, since no particular model of computer is specified, this IT structure would be abstract.

2) At a different (higher) level of abstraction, the same IT structure may include just a computer, without specification of its technology or characteristics.

A virtual IT structure is a non-abstract IT structure whose composition includes at least one virtual IT entity.

A real IT structure is a non-abstract and non-virtual IT structure.

From the above definitions, it follows that a real IT structure only includes real IT entities in its composition. From the above definitions, it also follows that in a real IT structure, each IT entity in its composition uniquely corresponds to a physical IT entity.

Table 2 infra provides examples of IT structure composition.

TABLE 2

Examples of IT structure composition

| IT structure | Networking | Computers | Software | Labor |
|---|---|---|---|---|
| Abstract IT structure with high degree of abstraction | network | computer | Ariba Buyer application | |
| Abstract IT structure with low degree of abstraction | TCP/IP network | platform | Ariba Buyer Application v7 | |

TABLE 2-continued

Examples of IT structure composition

| IT structure | Networking | Computers | Software | Labor |
|---|---|---|---|---|
| Virtual IT structure | connectivity requirements | platform and associated parameters (memory, processor power, DASD space) | Ariba Buyer v7 for AIX on RS/6000 | installation and management |
| Delivery-bound IT structure | LAN segments with symbolic IP addresses | model | Ariba Buyer v7.02 for AIX on RS/6000 | specific installation activities; specific management activities |
| Real IT structure | LAN segments with real IP addresses | computer s/n specified | Ariba Buyer v7.02 for AIX on RS/6000, license # <lic. #> | skill level and quantity of labor by activity specified |

An abstract IT structure with a high level of abstraction may be "an Ariba Buyer application running on a computer, connected to a network". The degree of abstraction can be lowered by restating the previous clause in more specific terms—"an Ariba Buyer application running on an RS/6000 computer, connected to a TCP/IP network".

The corresponding virtual IT structure may be "an Ariba Buyer version 7.0 for AIX on RS/6000 application, running on an AIX v5.0 operating system and RS/6000 model F50 computer with one 320 MHz CPU, 640 KB of main memory, and 128 GB of DASD in a single disk, connected through a 10 Gbps Ethernet LAN to a TCP/IP network—and—labor associated with installation and management of the above".

Once resolved into a delivery-bound IT structure, the previous IT structure may turn into something like "an Ariba Buyer version 7.0 path level 17.2 for AIX on RS/6000 application, running on an AIX v5.0 patch level 5.0.3.2 operating system and RS/6000 model F50-3745 computer with one 320 MHz CPU, 640 KB of main memory, 128 GB of DASD in a single disk, and a NIC (network interface card), connected through a 10 Gbps Ethernet LAN to a TCP/IP network on a single segment with a symbolic IP address of a.b.c.d and specific installation and management activities associated with the above.

Once deployed in a data center, the corresponding real IT structure would be "an Ariba Buyer version 7.0 path level 17.2 for AIX on RS/6000 application, license # 178215-04, running on an AIX v5.0 patch level 5.0.3.2 operating system, license #514ABC-AE, and RS/6000 model F50-3745 computer, s/n 6734-FWU, with one 320 MHz CPU, 640 KB of main memory, 128 GB of DASD in a single disk, and a NIC (network interface card), connected through a 10 Gbps Ethernet LAN to a TCP/IP network on a single segment with a symbolic IP address of a.b.c.d and specific installation and management activities associated with the above, including quantity of labor and level of skills for each.

A delivery-bound IT structure is a virtual IT structure ready for provisioning in a particular delivery environment (see below) with no additional input/sources of information. "In a particular delivery environment" means "at the level of detail required by the provisioning process of the delivery environment". For example, a delivery-bound IT structure may include a specification of 10/100 Mbps Ethernet card, without regard to the manufacturer of that card.

An operating IT structure instance is a collection of physical hardware, software, networking, and labor, resulting from deployment of a real IT structure.

2.2.1 ITStructure Class n IT Structure is represented by a class ITStructure, which inherits from ITEntity class and has the following methods:

1) ITStructure(String name, String function, Vector functions, Vector operationalCharacteristics)—constructor Note: Type is not specified for an ITStructure class—it is always derived based on ITStructure composition using the type definition as a rule.

2) Vector getFunctions( )—returns a list of functions (String) supported by ITStructure (always non-null)

3) Vector setFunctions(Vector V)—adjusts IT structure for support of one or more functions whose names were previously returned by getFunction( ) method; the list V is a list of pairs (<function>,<value>), where <function> is one of the list returned by getFunction( ) method and <value> is the associated setting. The method returns an empty Vector if the method execution was successful, and a list of error messages otherwise. If an error occurs, the method has not altered the IT structure.

4) Vector getOperationalCharacteristics( )—returns a list of pairs of names (String) and values (String) of operational characteristics of this IT structure 5) Vector setOperationalCharacteristics(Vector V)—adjusts IT structure operational characteristics as specified by the input parameters. The input parameter is a list of pairs of (operational characteristic name (String), characteristic value), where operational characteristic name is one of the values returned by the getOperaitonalCharacteristics( ) method, and characteristic value is specific to the operational characteristic being modified. The list V corresponds to all of or a subset of the list returned by getOperationalCharacteristics( ) method. The method returns an empty Vector if the method execution was successful, and a list of error messages otherwise. If an error occurs, the method has not altered the IT structure.

6) Vector getResolutionValues( )—returns a list of pairs of names (String) and values (String) of abstraction resolution parameters of this IT structure 7) JavaClass resolve(Vector V), where V is Vector of pairs (String resolution_parameter, value)—returns a less abstract ITStructure instance, instantiated with the specified resolution parameters if execution was successful; returns a Vector of error messages if no resolution was possible (in which case the IT structure is left unmodified)

8) boolean isPrimitive( )—returns true if this IT structure is primitive 9) boolean isComplex( )—returns true if this IT structure is complex 10) Vector getComposition([String C1 [, C2 ... [, Cn]]])—for a complex IT structure, returns list of other IT structures comprising this IT structure; for a primitive IT structure, returns the list including the IT structure itself. The optional list of parameters C1 ... Cn specify names of ITStructure subclasses to be returned by the getComposition( ) method. If C1 ... Cn are specified, only IT structures of subclasses with names C1 ... Cn will be returned by the getComposition( ) method.

11) Vector getPrimitiveComposition([String C1 [, C2 ... [, Cn]]])—returns primitive composition of an IT; returns the IT structure itself if invoked for a primitive IT structure. The optional list of parameters C1 ... Cn specify names of ITStructure subclasses to be returned by the getPrimitiveComposition( ) method. If C1 ... Cn are specified, only IT structures of subclasses with names C1 ... Cn will be returned by the getPrimitiveComposition( ) method.

12) Vector getInterfaces([String I1[, I2 ... [, In]]])—returns the list of IT interfaces this IT structure possesses. The optional list of parameters I1 ... In specify names of ITInterface subclasses to be returned by the getInterfaces( ) method. If I1 ... In are specified, only IT interfaces of subclasses with names I1 ... In will be returned by the getInterfaces( ) method.

13) Vector getRelationships([String R1 [, R2 ... [, Rn]]])—returns a list of IT relationships elements of this IT structure's composition are involved in; returns an empty Vector if no IT relationships exist among elements of this IT structure's composition. The optional list of parameters R1 ... Rn specify names of ITRelationship subclasses to be returned by the getRelationships( ) method. If R1 ... Rn are specified, only IT relationships of subclasses with names R1 ... Rn will be returned by the getRelationships( ) method.

14) Vector getPrimitiveRelationships([String R1 [, R2 ... [, Rn]]])—returns a list of IT relationships elements of this IT structure's primitive composition are involved in; returns an empty Vector if no IT relationships exist among elements of primitive composition of this IT structure. The optional list of parameters R1 ... Rn specify names of ITRelationship subclasses to be returned by the getPrimitiveRelationships( ) method. If R1 ... Rn are specified, only IT relationships of subclasses with names R1 ... Rn will be returned by the getPrimitiveRelationships( ) method.

15) ITRelationship getRelationship(ITStructure A, ITStructure B)—returns the ITRelationship instance for relationship of IT structures A and B within the composition of this IT structure or null if IT structures A and B are not involved in an IT relationship 16) Vector setRelationship(ITStructure x, ITInterface xi, ITStructure y, ITInterface yi, Relationship r)—establishes the relationship r between IT structures x and y within the composition of this IT structure. Returns a null Vector if relationship was established successfully, and a Vector of error messages if relationship could not be established.

17) Vector setDependency({<add>|<remove>}, ITDependency x)—adds or removes the specified IT dependency to or from this IT structure. Returns a null Vector if dependency was added or removed successfully, and a Vector of error messages if dependency could not be added. Removal of an IT dependency is always successful. Addition of an IT dependency may fail if x contradicts an existing dependency—e.g., x indicates mutual exclusivity with IT structure Y and a dependency on presence of Y is already stated.

18) Vector getDependencies([String D1 [, D2 ... [, Dn]]])—returns a list of IT dependencies of this IT structure. The optional list of parameters D1 ... Dn specify names of ITDependency subclasses to be returned by the getDependencies( ) method. If D1 ... Dn are specified, only IT dependencies of subclasses with names D1 ... Dn will be returned by the getDependencies( ) method.

18a) Vector getPrimitiveDependencies([String D1 [, D2 ... [, Dn]]])—returns a list of IT dependencies among the elements of the IT structure primitive composition. The optional list of parameters D1 ... Dn specify names of ITDependency subclasses to be returned by the getPrimitiveDependencies( ) method. If D1 ... Dn are specified, only IT dependencies of subclasses with names D1 ... Dn will be returned by the getPrimitiveDependencies( ) method.

19) Vector addElement(ITStructure A)—adds IT structure A to the composition of this IT structure. Returns a null Vector if addition was successful, and a Vector of error messages if addition failed. In order to ensure uniqueness of identifiers (computer names, network addresses) within IT structures, each identifier within IT structure A being added is prefixed with string A.getName( )+".". As a part of the addition process, addElement( ) method verifies that:

a. addition of IT structure A to the composition of this IT structure does not violate any IT dependencies for any IT structure already included in the composition of this IT structure b. addition of IT structure A to the composition of this IT structure does not violate any IT dependencies for IT structure A and ensures that IT dependencies of the IT structure being added are satisfied. Each added IT structure composition element's name is prefixed with the IT structure name to ensure uniqueness.

20) Vector ensureDependencies(ITStructure A)—ensures that IT dependencies of the class requiresPresenceOf of ITStructure A in the composition of this IT structure are satisfied. If processing is unsuccessful, a Vector of error message(s) is returned, otherwise, a null Vector is returned.

21) Vector deleteElement(ITStructure A [, <force>])—removes IT structure A from the composition of this IT structure. Returns a null Vector if removal was successful, and a Vector of error messages if removal failed. <force> indicates that A should be removed regardless of relationships with or dependencies on it by other elements of this IT structure's composition.

22) Vector setOptimizationFunctions(Vector F)—specifies a prioritized list (starting with the highest priority and ending with the lowest) of optimization classes (see Optimization) to be applied to this IT structure. Returns a null Vector if processing is successful, and a Vector of error messages otherwise.

23) Vector getOptimizationFunctions( )—returns the prioritized list of optimization classes to be applied to this IT structure.

24) Vector optimizes( )—performs optimization of the IT structure using the specified prioritized list of optimization classes and applying each optimization function to the IT structure in turn, starting with the highest and ending with the lowest priority of optimization classes. Returns a Vector, containing the optimized IT structure as its first element if optimization was successful, and a list of error messages otherwise.

25) Vector setTargetITDeliveryEnvironments(Vector D)—specifies a list of target IT delivery environments (see below) for this IT structure. Returns a list of error messages if an error occurs (e.g., invalid specification of a target IT delivery environment), and a null Vector otherwise.

26) Vector getTargetITDeliveryEnvironments( )—returns the list of target IT delivery environments for this IT structure.

27) getID( )—returns a real IT structure's unique identifier; returns null if invoked for a non-real IT structure.

28) setID( )—sets real IT structure unique identifier; NOOP for a non-real IT structure.

29) Vector SLmaintenance(Vector V)—optional, supported for Autonomic IT System Improvement Cycle (see below); obtains a list of pairs of operational characteristics and associated values provided by monitoring facilities, and performs adjustment of the operational characteristics to sustain the SL. Returns a null Vector if processing is successful and a list of error messages if processing is unsuccessful.

2.2.2 Detailed Description of Non-Trivial Methods
2.2.2.1 setFunctions

A composition of an IT structure instance and relationships among elements of its composition may depend on particular function(s) this IT structure instance is intended to perform. The purpose of this method is to perform the necessary adjustments within IT structure instance that tailor IT structure composition and relationships among composition's elements as appropriate. This method also performs enforcement of function-specific rules.

The setFunctions( ) method is subclass-specific. Class ITStructure includes a placeholder that does nothing other than store the specified business function. ITStructure examples include:

1) IT structure X has three functions—A, B, C. However, these functions cannot be fulfilled indiscriminately (by their nature)—either A, or B and/or C, but not A and B, A and C, or A, B, and C can be supported by any instance of IT structure X. The setFunctions( ) method, when invoked, would ensure proper combination of functions requested from the instance of X, and prohibit improper modifications in the future.

2) Composition of instance of X may depend on the functions it performs. To perform function A, X may need to include an Intel server running Windows OS, an Oracle DB and a specific program package supporting function A. To perform functions B or C, X may need to include an RS/6000 server (whose power depends on whether only one of functions B and C, or both of these functions are supported), with a DB2 DB and specific program packages supporting functions B or C. So, the composition of X will be altered by the setFunctions( ) method appropriately, based on specification of functions.

2.2.2.2 setOperationalCharacteristics

A composition of an IT structure instance and relationships among elements of its composition, given a particular set of functions supported by the IT structure instance, may depend on operational characteristics associated with support of particular functions. The purpose of this method is to perform the necessary adjustments within IT structure instance that tailor IT structure composition and relationships among composition's elements as appropriate. This method also performs enforcement of operational-characteristic-specific rules.

The setOperationalCharacteristics( ) method is subclass-specific. Class ITStructure includes a placeholder that does nothing other than store the specified operational characteristic values.

EXAMPLES

1) IT structure X function A potentially supports up to 500 users. Its response time depends on the power and amount of memory of the processor that runs function A and an increment in the number of supported users can be translated into a processor power and memory increments. An instance of X is created, whose requirement is to support up to 200 users. setOperationalCharacteristics(new Vector("users", 200)) can be used to specify that number and adjust the configuration of the Intel server supporting function A in the composition of instance of X to ensure it supports the required number of users.

2) Availability of IT structure X instance supporting function A may be 80% or 99.8%, depending on configuration of processors and software supporting function A. If a single set of hardware and software elements support function A, availability is 80%; if supporting hardware and software are duplicated and appropriate monitoring software is added to permit takeover between the two sets of hardware and software, availability is 99.8%. setOperationalCharacteristics(new Vector("availability", "high")) can be used to indicate that instance of X when supporting function A must provide 99.8% availability.

3) The above operational characteristics settings may be combined: setOperationalCharacteristics(new Vector(("users", 200), ("availability", "high")))

2.2.2.3 Resolve

A composition of an IT structure instance and relationships among elements of its composition, given a particular set of functions supported by the IT structure instance and given a particular set of operational characteristics associated with support of the particular set of functions, may depend on additional factors. A purpose of this method is to perform the necessary adjustments within IT structure instance that tailor IT structure composition and relationships among composition's elements as appropriate.

The resolve( ) method is subclass-specific. Class ITStructure includes a placeholder that does nothing other than store the specified resolution values.

Example

Two hardware and operating systems platforms exist that provide equivalent (both in terms of scale and cost) performance, permitting an instance of IT structure X to support the required number of users with equivalent operational characteristics for its function A. For example, the choice of either of the two hardware and operating system platforms for the composition of an instance of IT structure X providing function A will produce an equivalent result. Further, the delivery environment in which the instance of X will operate, support both combinations of hardware and operating system with equivalent costs and service levels. The resolve( ) method may be used to specify which of the two combinations of hardware and operating system platforms to use based on other factors. For example, IT developer's preference or similarity with hardware and operating system platforms of other IT structures involved in a solution.

Assume the two combinations of hardware and operating system platforms are (a) AIX on RS/6000 and (b) Linux on Intel. So, IT structure X may provide a resolution characteristic "platform preference" which may be specified as "AIX" or "Linux", resulting in the choice of (a) or (b) for the instance of IT structure X.

2.2.2.4 setRelationship

Once an IT structure is added to the composition of the IT structure being developed, the developer may specify IT relationships between the added IT structure and other elements of the composition or primitive composition of the IT structure being developed.

Figure 2:
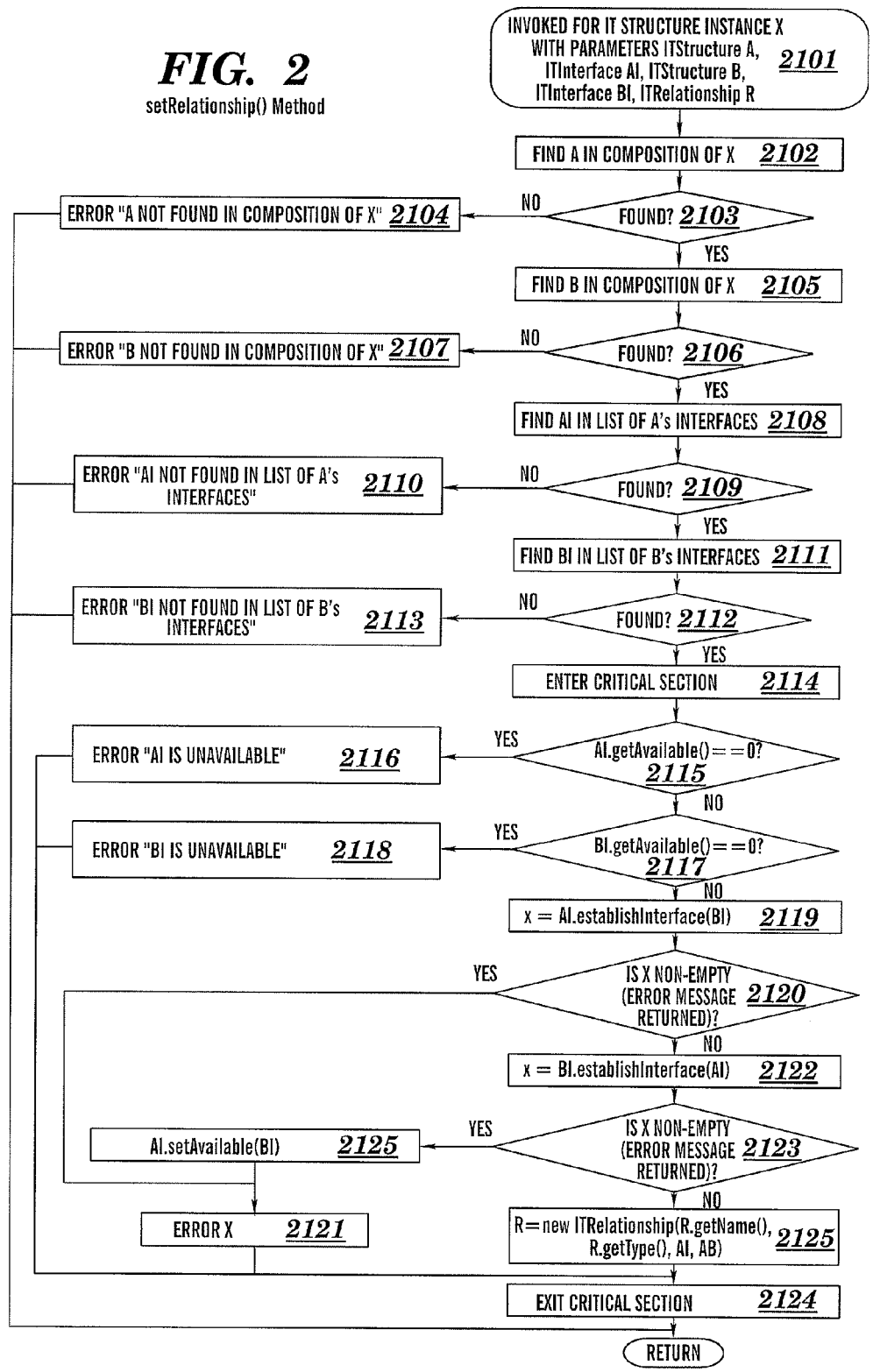
FIG. 2 is a flow chart depicting the logic of set Relationship( ) method, in accordance with embodiments of the present invention.

FIG. 2 is a flow chart depicting the logic of setRelationship( ) method, in accordance with embodiments of the present invention. The Vector setRelationship(ITStructure x, ITInterface xi, ITStructure y, ITInterface yi, Relationship r) establishes the relationship r between IT structures x and y within the composition of this IT structure. The setRelationship( ) method returns a null Vector if relationship was established successfully, and a Vector of error messages if relationship could not be established. The setRelationship( ) method for ITStructure instance X is invoked with parameters ITStructure A, ITInterface AI, ITStructure B, ITInterface BI, ITRelationship R 2101. The method attempts to find IT structure A in the composition of X 2102. If IT structure A is not found in the composition of X 2103, an error message is returned 2104 and processing terminates. The method then attempts to find IT structure B in the composition of X 2105. If IT structure B is not found in the composition of X 2106, an error message is returned 2107 and processing terminates. The method then proceeds to finding IT interface AI in the list of IT interfaces of IT structure instance A 2108. If AI is not found 2109, an error message is returned 2110 and processing terminates.

The method then attempts to find IT interface BI in the list of IT interfaces of IT structure instance B 2111. If BI is not found 2112, an error message is returned 2113 and processing terminates.

Upon ascertaining presence of both specified IT structure instances A and B and IT interfaces AI and BI within A and B, the method execution enters a critical section 2114 which is used to serialize updates to the IT interface states. A critical section is a portion of the method which cannot be executed concurrently in a multi-threaded fashion, and entry to which must be serialized. No particular method of serialization for critical sections of programs is prescribed by this embodiment—known methods include (but are not limited to) semaphores, process queues, process locks, TS (Test and Set) instruction, CS (Compare and Swap) instruction.

The method then checks availability of IT interface AI by invoking the getAvailable( ) method of IT interface AI; if AI is unavailable 2115, an error message is returned 2116, previously entered critical section is exited 2124, and processing terminates. The method proceeds to checking availability of IT interface BI by invoking the getAvailable( ) method of IT interface BI; if BI is unavailable 2117, an error message is returned 2118, previously entered critical section is exited 2124, and processing terminates.

Upon ascertaining availability of both AI and BI interfaces, the method attempts to relate IT interfaces AI and BI. Vector x is allocated (not shown in the figure) to contain error message strings from attempts to establish the interface between AI and BI. The method attempts to update IT interface AI as interfacing with IT interface BI by invoking AI method establishInterface(BI), passing it BI as the parameter 2119. If an error occurs during the establishInterface(BI) method of AI invocation 2120, Vector x contains error messages, which are returned to the invoker of setRelationship( ) method of IT structure instance X 2121 upon exiting the critical section 2124. The method then attempts to update IT interface BI as interfacing with IT interface AI by invoking BI method establishInterface(AI), passing it AI as the parameter 2122. If an error occurs during the establishInterface(BI) method of AI invocation 2123, Vector x contains error messages, which are returned to the invoker of setRelationship( ) method of IT structure instance X 2121 upon exiting the critical section 2124, but only after the error cleanup is performed and the previously established update of IT interface AI is reversed by invoking its method setAvailable(BI) 2125.

If interface establishment was successful, IT relationship R is updated to contain the interface AI and BI 2125 prior to completion of method execution.

2.2.2.5 addElement

Figure 3:
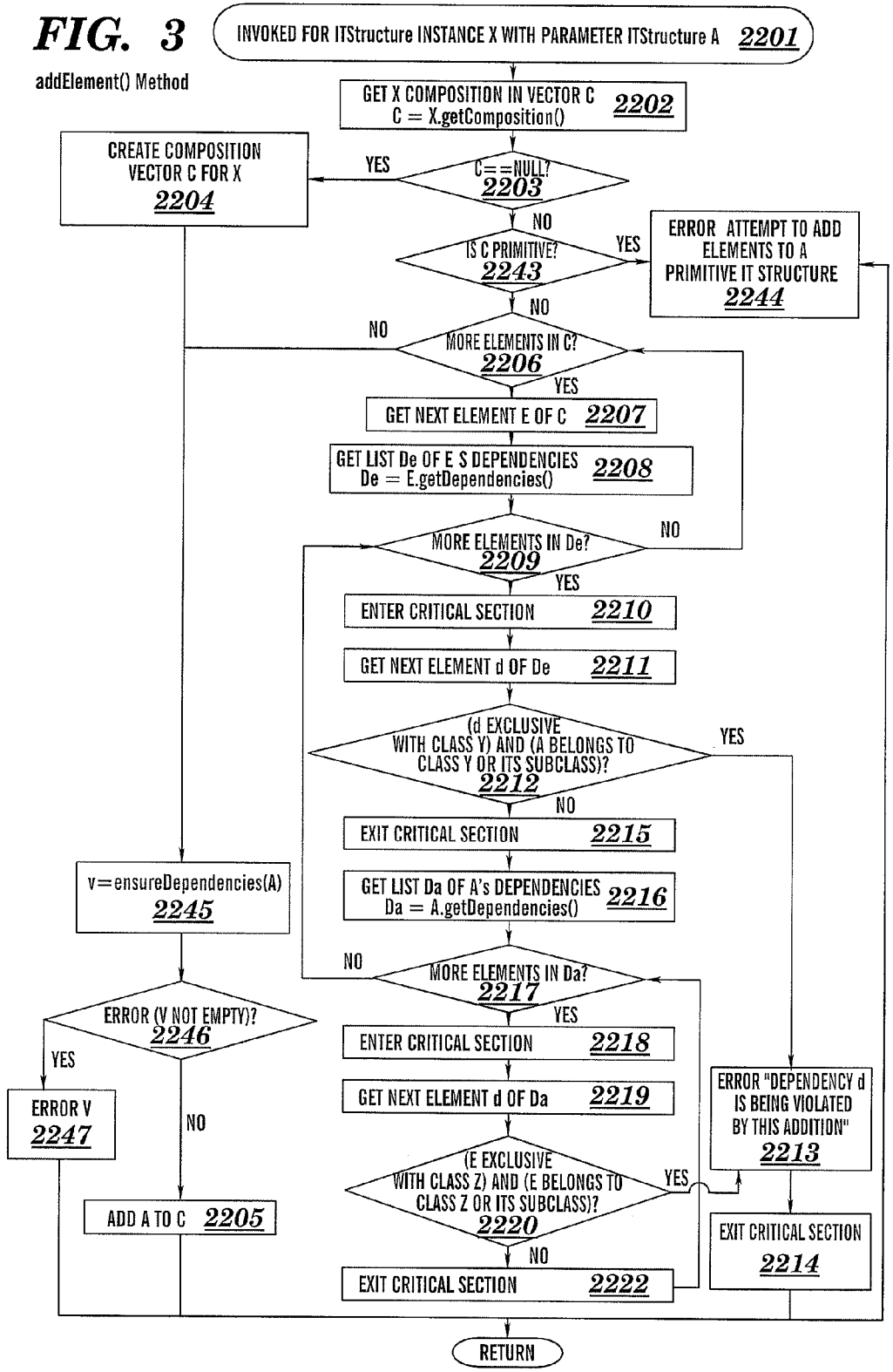
FIG. 3 is a flow chart depicting the logic of addElement( ) method, in accordance with embodiments of the present invention.

FIG. 3 is a flow chart depicting the logic of addElement( ) method, in accordance with embodiments of the present invention. The Vector addElement(ITStructure A) method adds IT structure A to the composition of IT structure X. The IT structures A and X may each independently be an abstract IT structure, a virtual IT structure, or a real IT structure. However, the resulting IT structure will have the highest degree of abstraction of that of X and A. For example, if X is abstract the result will be abstract even if A is not abstract, and if A is abstract the result will be abstract even if X is not abstract. As another example, if either X or A is virtual, and both X and A are not abstract, the result will be virtual.

The addElement( ) method returns a null Vector if addition was successful, and a Vector of error messages if addition failed. The addElement( ) method of ITStructure instance X is invoked with parameter ITStructure A, referencing the ITStructure instance to be added to X's composition 2201.

The method retrieves composition of X as a Vector C 2202. If C is null (there are no composition elements for X) 2203, this is the addition of the first element, and no additional checks are necessary. The method creates a composition Vector C for X 2204, adds ITStructure A to C 2205, and returns.

If ITStructure X is a primitive IT structure (X.is Primitive( )=true) 2243, an error message is stored 2244 and processing terminates.

If ITStructure X already has non-empty composition 2203, the method iterates through X's composition elements making sure no IT dependencies of either X or A are violated by the addition of A to X. While there are elements in C 2206, the next unprocessed element E of C is obtained 2207, and its list of IT dependencies De is extracted using the getDependencies( ) method of E 2208.

While there are unprocessed elements in De (list of IT dependencies of ITStructure E) 2209, the following is performed. A critical section is entered 2210. The next element d of De is obtained 2211. If d (which belongs to the class ITDependency) indicates exclusion with class Y and IT structure A belongs to class Y or its subclass 2212, an error message is stored 2213, and upon exiting from the critical section 2214, processing terminates. Otherwise, critical section is exited 2215.

The method execution then proceeds to obtaining the list Da of IT dependencies of A using the getDependencies( ) method of A 2216. While there are unprocessed elements in Da (list of IT dependencies of ITStructure A) 2217, the following is performed. A critical section is entered 2218. The next element d of Da is obtained 2219. If d (which belongs to the class ITDependency) indicates exclusion with class Z and IT structure E belongs to class Z or its subclass 2220, an error message is stored 2213, and upon exiting from the critical section 2214, processing terminates. Otherwise, critical section is exited 2222.

When all possible combinations of potential dependencies of IT structure A and all elements of the composition of X are exhausted, and no violation has been found, the add Element( ) method invokes method ensureDependencies(A) 2245 to ensure that any of A's IT dependencies of the class requiresPresenceOf are satisfied. If ensureDependencies( ) method's processing was not successful 2246, any error messages returned by the ensureDependencies( ) method's invocation are returned, otherwise, A is added to the composition A is added to the composition C of IT structure X 2205.

2.2.2.6 ensureDependencies

Figure 7:
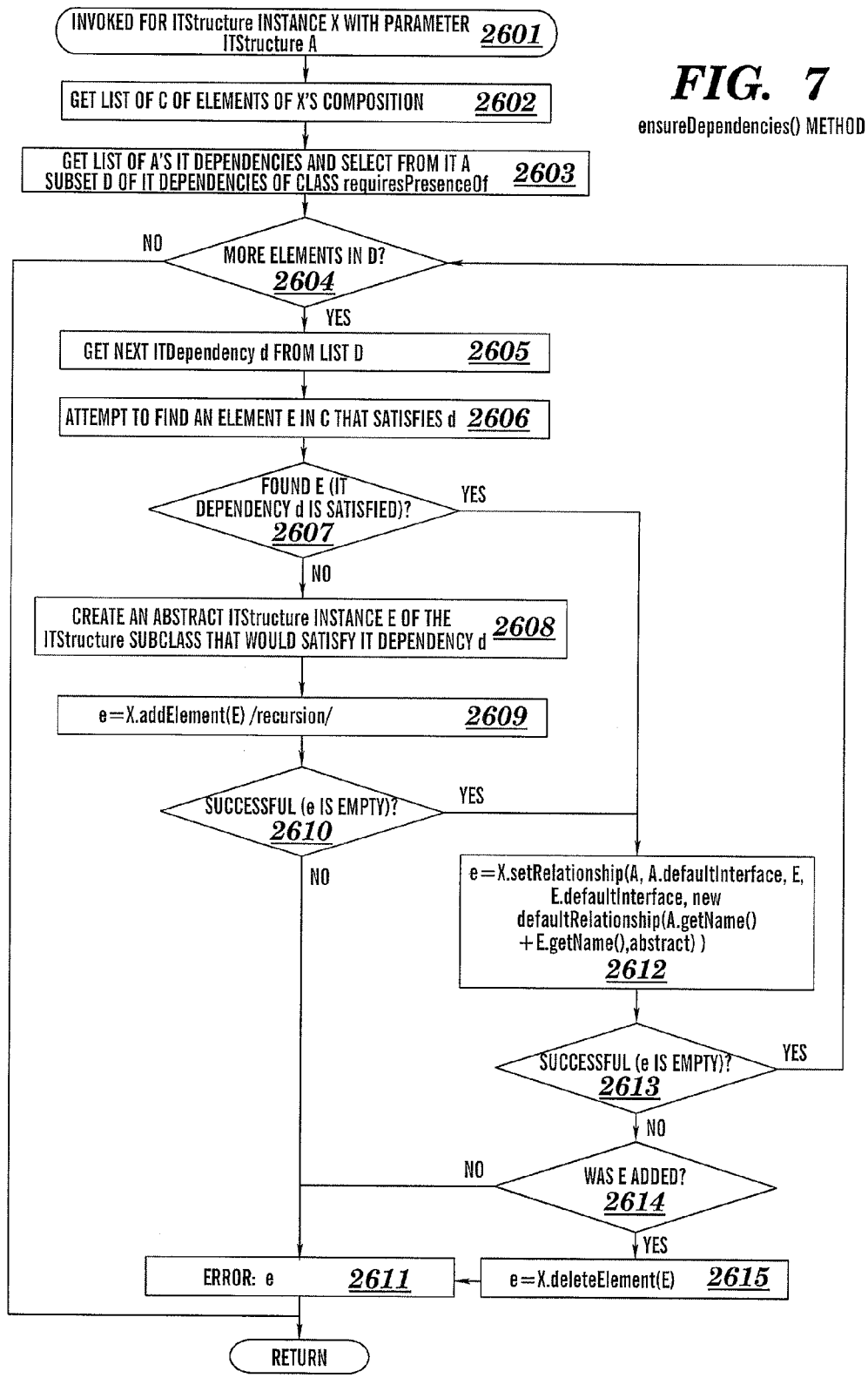
FIG. 7 is a flow chart depicting the logic of ensureDependencies( ) method, in accordance with embodiments of the present invention.

FIG. 7 is a flow chart depicting the logic of ensureDependencies( ) method, in accordance with embodiments of the present invention. The ensureDependencies(ITStructure A) method ensures that IT dependencies of the class requiresPresenceOf of ITStructure A in the composition of this IT structure are satisfied. If processing is unsuccessful, a Vector of error message(s) is returned, otherwise, a null Vector is returned. The ensureDependencies( ) method is invoked for IT structure instance X with parameter ITStructure A 2601. The method retrieves composition of X as Vector C 2602 and the list of A's IT dependencies, from which it selects a subset (list D) of IT dependencies of class requiresPresenceOf 2603. The method then iterates through list D of IT dependencies of class requiresPresenceOf of IT structure A, until the end of the list is reached 2604. Each element d of list D is an IT dependency d of class requiresPresenceOf. The method retrieves the next element d from the list 2605 and attempts to find an element of C (IT structure X composition) that satisfies the IT dependency d 2606. If an element E of C satisfying IT dependency d is found 2607, IT dependency d is considered to be satisfied.

ensureDependencies( ) method then creates an abstract IT structure E of ITStructure subclass that satisfies IT dependency d 2608 and attempts to add E to the composition of IT structure X using a recursive invocation of X.addElement(E) 2609. If execution of X.addElement(E) failed (i.e., E could not be added to X's composition—e.g., because it is exclusive with some element of X's composition) 2610, any error messages returned by X.addElement(E) are returned 2611 and processing terminates. Otherwise, addition of E to X's composition was successful, IT dependency d is now considered to be satisfied.

An abstract IT relationship (defaultRelationship) between E (either found in the composition C of IT structure X, or newly created) and A using defaultInterface of both is created and added to IT structure X) 2612. If establishment of the IT relationship was unsuccessful 2613, error message(s) are returned to the invoker 2611. If E was newly added 2614, it is removed 2615 to maintain the composition of IT structure X unchanged.

If establishment of the new IT relationship was successful 2613, the next element d of A's dependencies is considered.

2.2.2.7 deleteElement

Figure 4:
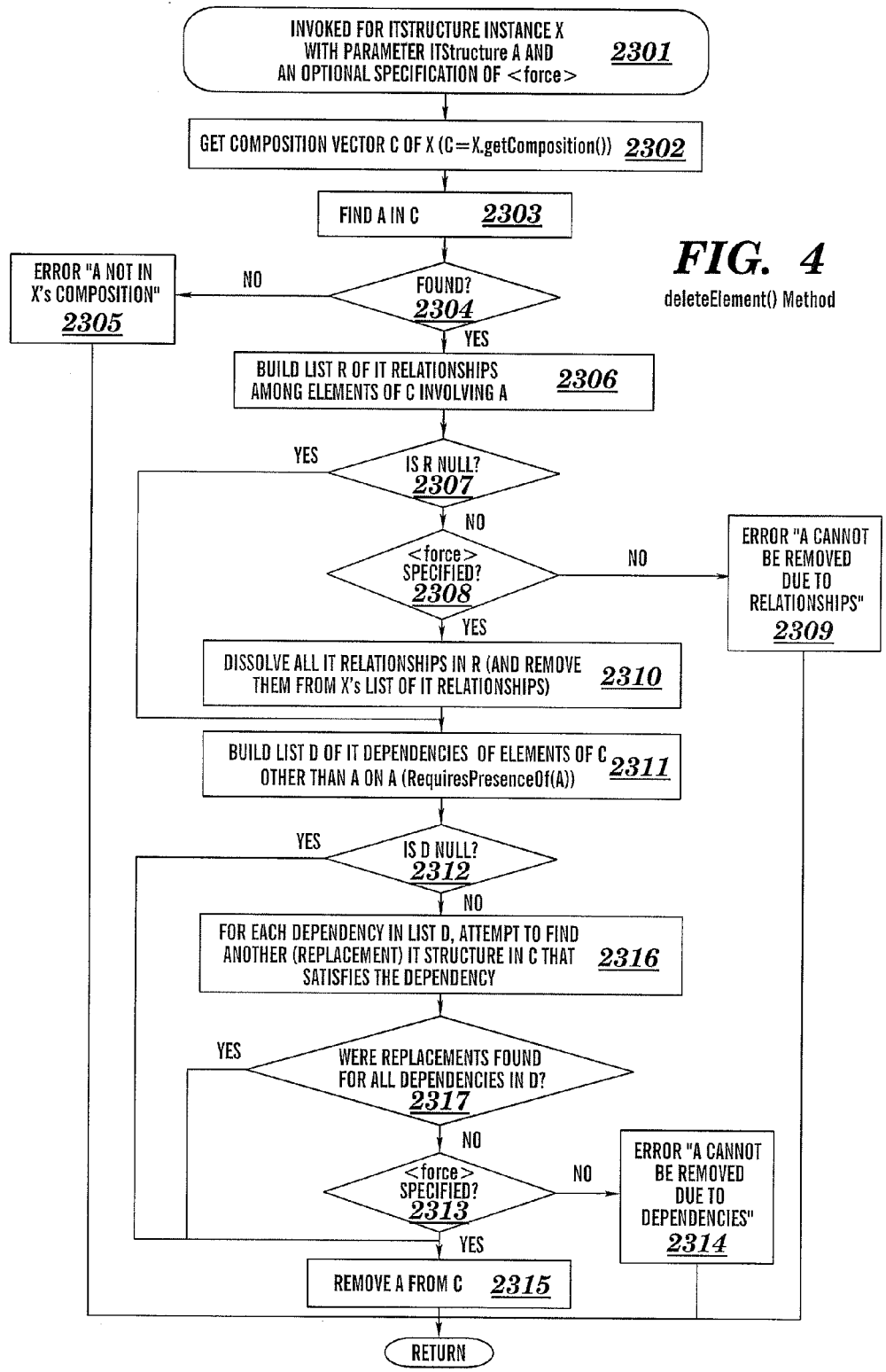
FIG. 4 is a flow chart depicting the logic of delete Element( ) method, in accordance with embodiments of the present invention.

FIG. 4 is a flow chart depicting the logic of delete Element( ) method, in accordance with embodiments of the present invention. The deleteElement(ITStructure A [, <force>]) method removes IT structure A from the composition of this IT structure. Returns a null Vector if removal was successful, and a Vector of error messages if removal failed. <force> indicates that A should be removed regardless of relationships with or dependencies on it by other elements of this IT structure's composition. In a first embodiment the <force> option is available for being selected, and in a second embodiment the <force> option is not available for being selected. Thus, the <force> option may not be specified because: (1) the <force> option is not available for being selected or (2) the <force> option is available for being selected but was not selected. The deleteElement( ) method is invoked for IT structure instance X with parameter ITStructure A and an optional specification of <force> 2301. The method retrieves composition of X as Vector C 2302 and attempts to find IT structure A in C 2303. If A is not found in C 2304, an error message is stored 2305 and processing terminates. Otherwise, the method proceeds through the attempt to remove A from C.

The method builds the list R of IT relationships of elements of C that involve A 2306. If R is not null (i.e., A is involved in IT relationships with at least one other element of composition of X) 2307, the method checks whether the <force> option was specified 2308, and if not, A cannot be removed from the composition of X, an error message is stored 2309, and processing terminates. If, however, <force> was specified, the method removes all IT relationships in the list R and removes them from the list of IT relationships of elements of C 2310.

The method then proceeds to check IT dependencies involving A. The method builds a list D of all dependencies of elements of C other than A itself on A 2311. If the list D is not null 2312, for each dependency in list D, the method attempts to find an element in C other than A that would satisfy the dependency 2316. If replacements were not found for any dependencies in list D 2317, the method checks whether the <force> option was specified 2313, and if not, A cannot be removed from the composition of X, an error message is stored 2314, and processing terminates.

Otherwise, if all previous checks indicate that removal of A will not damage IT structure X, or if the <force> option specification overrides the possible damage, the method removes A from C 2315.

2.3 IT Interfaces

An IT Interface is a characteristic of an IT structure, specifying a type of relationship this IT structure can engage in relative to other IT structures.

An abstract IT interface instance is an IT interface instance involving at least one abstract IT structure.

A virtual IT interface instance is a non-abstract IT interface instance involving at least one virtual IT structure.

A real IT interface instance is an IT interface instance involving only real IT structures.

A multi-connection IT interface is an IT interface to which multiple IT structures can relate (connect). For example, multiple invokers can call a single program—sometimes, concurrently.

A single-connection IT interface is an IT interface to which a single IT structure can relate (connect). For example, only a single cable can be plugged into a single printer port of a personal computer.

An available IT interface is an IT interface to which one or more IT structures can relate (connect).

A busy or Unavailable IT interface is an IT interface which has exhausted its ability to relate, and cannot be involved in any additional relationships (i.e., the maximum number of relationships have already been established). For example, a printer port of a personal computer is available if nothing is connected to it, and busy/unavailable if a printer cable is plugged into it.

2.3.1 ITInterface Class

An ITInterface class inherits from ITEntity class and has the following methods:

1) ITInterface(String name, Type type)—constructor, creates an ITInterface instance with specified name and type 2) boolean is SingleConnection( )—returns true if this ITInterface is a single-connection IT interface, and false otherwise 3) boolean is Available([int p])—returns true if ITInterface is available, false otherwise; optional parameter p indicates the specific connection for a multi-connection interface 4) setAvailable([ITInterface i])—makes ITInterface available; an ITInterface parameter i may be specified for multi-connection IT interfaces to indicate which of the multiple connections is to be made available 5) Vector establishInterface(ITInterface i [, int p])—establishes an interface with the parameter IT interface; returns an empty Vector if interface was established successfully, and a list of error messages otherwise. For a multiple-connection IT interface, may be optionally provided with the second parameter p specifying the connection.

6) int getAvailable( )—for multi-connection IT interfaces returns the number of available connections; always returns zero (unavailable) or one (available) for single-connection IT interfaces; always returns "high integer" for multi-connection IT interfaces with unlimited number of connections 7) int getRelated( )—returns the number of ITInterface instances related to this ITInterface 8) Vector getRelatedITInterfaces( )—returns a list of zero or more ITInterface instances related to this ITInterface 9) Vector verifyValidity(ITInterface Y)—returns null Vector if a connection between this IT interface instance and IT interface instance Y would be valid—i.e., the ITInterface subclass of this instance correlates with the ITInterface subclass of ITInterface instance Y; returns a Vector containing error message(s) if subclasses of X and Y do not correlate.

Note that the verifyValidity( ) method is a NOOP in the ITInterface class—each subclass of ITInterface, with the exception of DefaultInterface, overrides this method with the appropriate logic. Also note that an ITInterface cannot be instantiated—only ITInterface subclasses have practical uses.

2.3.2 ITInterface Subclasses

A number of different interfaces may exist among IT structures. Each IT structure, by definition, includes the DefaultInterface, which is used to establish relationships not involving real interfaces, such as "requires presence of . . . to install". DefaultInterface supports any relationships.

Other ITInterface subclasses are ("correlates" in this context means "can only be related to"):

InstalledOn(<single>)—IT structure is installed using this interface (correlates with Supports)

Supports({<single>|<multiple>})—IT structure(s) can be installed on this interface (correlates with InstallsOn)

ConnectsTo(<connection type>, {<single>|<multiple>})—can connect to IT structure(s) using <connection type>, correlates with ConnectsTo where:

<connection type>::={<direct>|<network>|<messaging>|<other>}

Invokes(<invocation type>, <single>)—can invoke IT structure using <invocation type>, correlates with Invokable Invocable(<invocation type>, {<single>|<multiple>})—can be invoked by IT structure(s) using <invocation type>, correlates with Invokes where:

<invocation type>::={<direct>|<interrupt>|<other>}

Manages({<single>|<multiple>})—is managing IT structure(s), correlates with Manageable Manageable(<single>)—is managed by IT structure, correlates with Manages Table 3 shows valid ITInterface subclass correlations, wherein "yes" denotes a pair of correlated IT interfaces.

TABLE 3

Interface correlations

|  | Default Interface | Installed On | Supports | Connects To | Invokes | Invocable | Manages | Manageable |
|---|---|---|---|---|---|---|---|---|
| DefaultInterface | yes | yes | yes | yes | yes | yes | yes | yes |
| InstalledOn | yes |  | yes |  |  |  |  |  |
| Supports | yes | yes |  |  |  |  |  |  |
| ConnectsTo | yes |  |  | yes |  |  |  |  |
| Invokes | yes |  |  |  |  | yes |  |  |
| Invocable | yes |  |  |  | yes |  |  |  |
| Manages | yes |  |  |  |  |  |  | yes |
| Manageable | yes |  |  |  |  |  | yes |  |

The IT interface subclasses are summarized as follows in terms of IT1, IT2, IF1, and IF2:
IT1: IT structure 1
IT2: IT structure 2
IF1: interface of IT structure 1
IF2: interface of IT structure 2
1) Installed On: a characteristic of IF1 permitting IT1 to be installed on IT2
2) Supports: a characteristic of IF2 permitting IT1 to be installed on IT2
3) ConnectsTo: a characteristic of IF1 permitting IT1 to connect to IT2
4) Invokes: a characteristic of IF1 permitting IT1 to invoke IT2
5) Invocable: a characteristic of IF2 permitting IT2 to be invoked by IT1
6) Manages: a characteristic of IF1 permitting IT1 to manage IT2
7) Manageable: a characteristic of IF2 permitting IT2 to be managed by IT1

Examples of IT interfaces are as follows:
A program is installed on a computer
A computer supports one or more programs to be installed on the computer
Computer A connects to computer B through a network
Program A invokes program B
Program B is Invocable by program A
Program A manages system B
    System B is manageable by program A In this embodiment, labor entities are associated with other entities by means of defaultInterface and defaultITRelationship. In another embodiment, a special ITInterface, laborInterface, may be defined, and used to comprise a laborRelationship to relate a labor entity to another entity.

2.3.3 Detailed Description of Non-Trivial Methods
2.3.3.1 setAvailable

Figure 5:
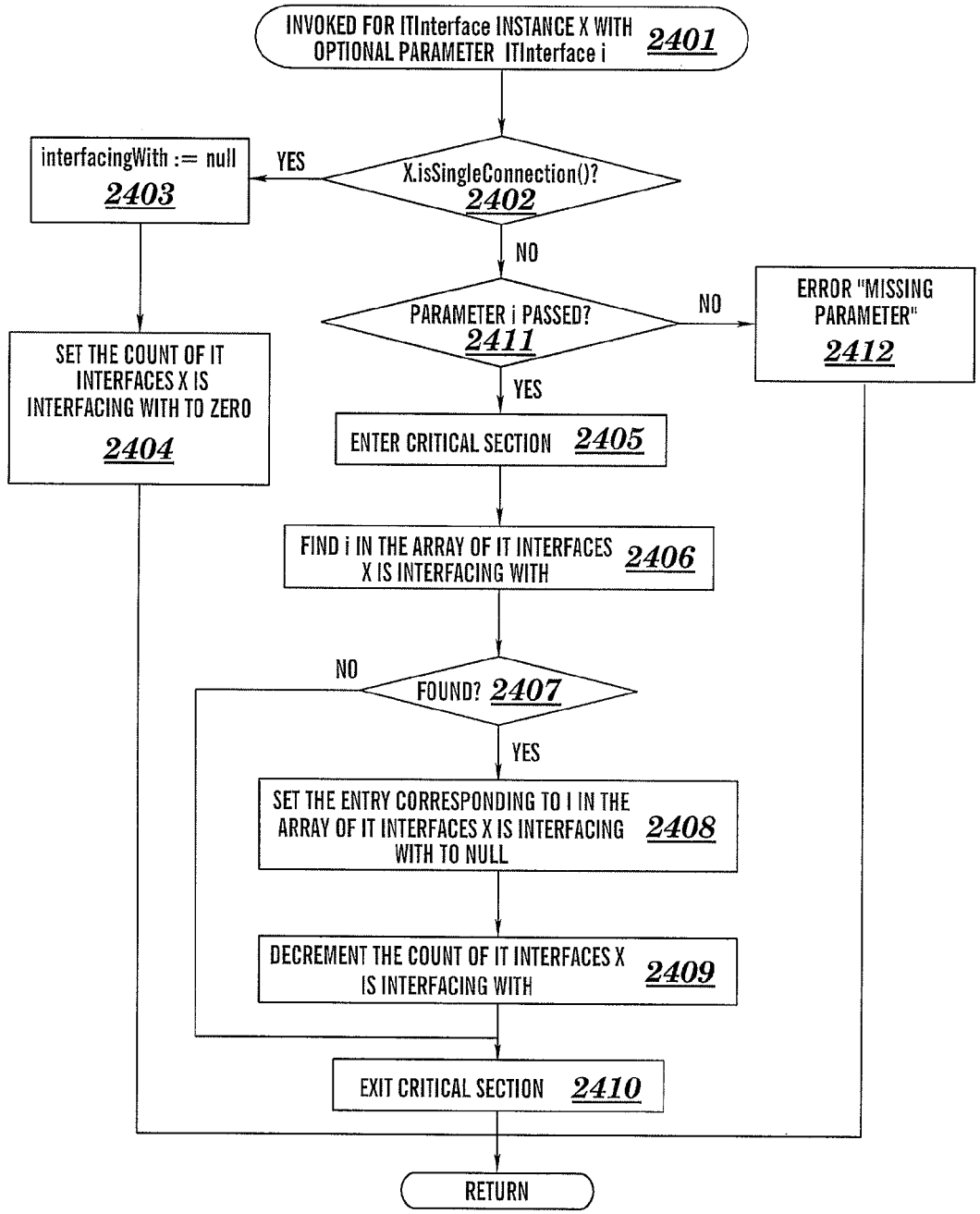
FIG. 5 is a flow chart, depicting the logic of setAvailable( ) method, in accordance with embodiments of the present invention.

FIG. 5 is a flow chart, depicting the logic of setAvailable( ) method, in accordance with embodiments of the present invention. The setAvailable([ITInterface i]) method makes ITInterface available; an ITInterface parameter i may be specified for multi-connection IT interfaces to indicate which of the multiple connections is to be made available. The setAvailable( ) method is invoked for ITInterface instance X with an optional parameter ITInterface i 2401. If IT interface instance X is a single-connection IT interface (X.isSingleConnection( ) returns true) 2402, the field interfacingWith in ITInterface X is set to null 2403, and the count of IT interfaces X is interfacing with is set to zero 2404. Note that it is the responsibility of the invoker to ensure that the corresponding IT interface that was interfacing with X (if any) also becomes available.

If ITInterface X is a multiple-connection IT interface 2402, processing ensures that a parameter i is passed, indicating which connection out of the multitude to make available. If parameter i is not passed 2411, and an error is signaled 2412, and processing terminates. The mechanism of signaling an error may vary, depending on implementation, and may include, but is not limited to, an error message, an exception, an ABEND, a log and/or a trace entry.

Upon ascertaining availability of parameter i 2311, processing enters a critical section 2405. ITInterface i passed as the parameter to method setAvailable( ) is located in the array of IT interfaces ITInterface X is interfacing with 2406. If i is not found 2407, processing terminates after exiting a critical section 2410. If i is found 2407, the method sets the entry in the array of IT interfaces ITInterface X is interfacing with that corresponds to i to null 2408, decrements the count of IT interfaces X is interfacing with 2409, and exits the critical section 2410.

2.3.3.2 establishInterface

Figure 6:
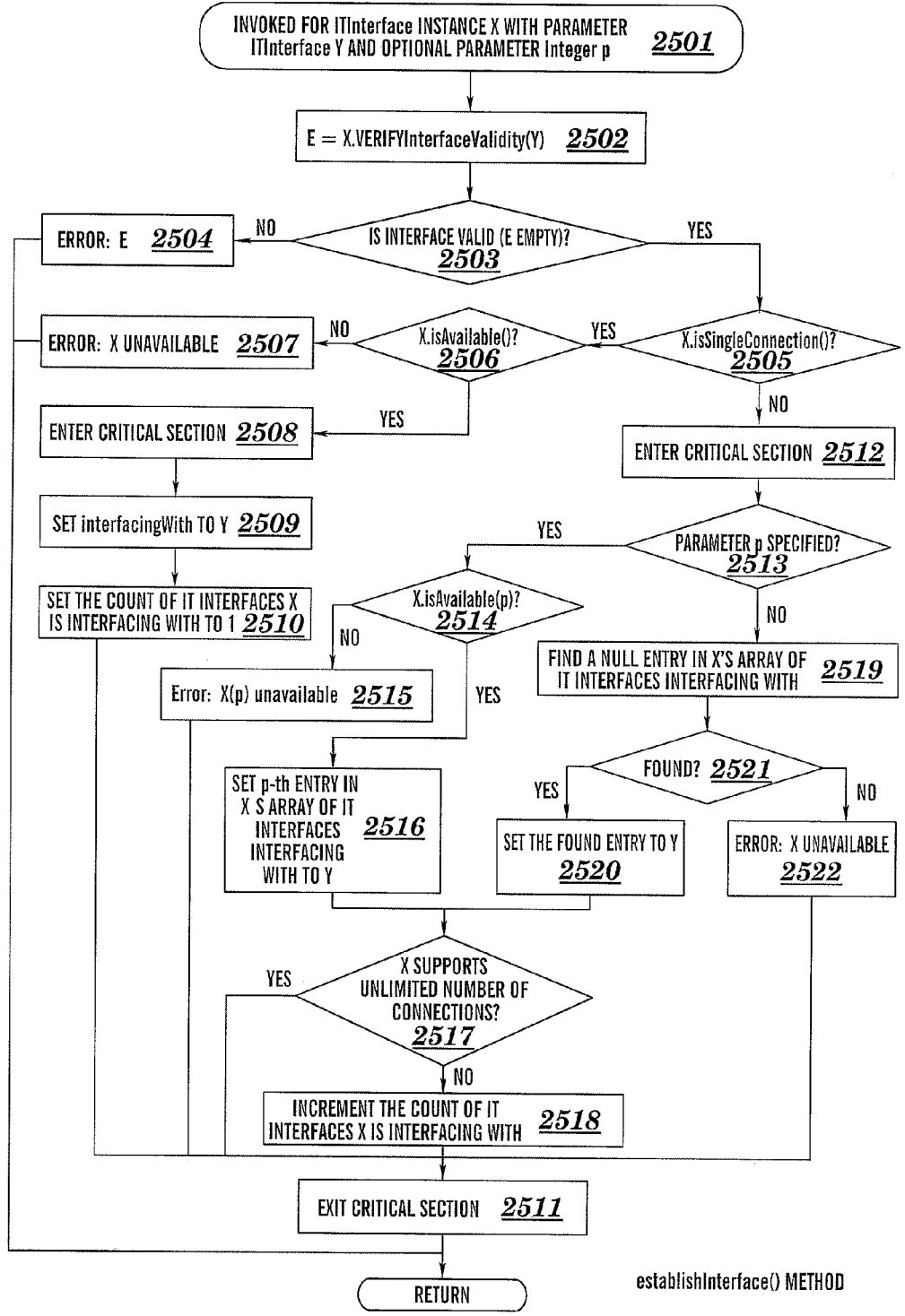
FIG. 6 is a flow chart depicting the logic of establishInterface( ) method, in accordance with embodiments of the present invention.

FIG. 6 is a flow chart depicting the logic of establishInterface( ) method, in accordance with embodiments of the present invention. The establishInterface(ITInterface i [, int p]) method establishes an interface with the parameter IT interface; returns an empty Vector if interface was established successfully, and a list of error messages otherwise. The establishInterface( ) method is invoked for ITInterface instance X with a parameter ITInterface Y and an optional parameter integer p 2501.

The method starts by verifying validity of establishment of connection between X and Y (by invoking method X.verifyValidity(Y)) 2502. If establishment of connection between X and Y is invalid (X.verifyValidity(Y) returns error message(s)) 2503, method establishInterface( ) returns the error message(s) returned by X.verifyValidity(Y) invocation 2504 and terminates processing.

If ITInterface X is a single-connection interface 2505, but X is available 2506, method establishInterface( ) returns and error message 2507 and terminates processing. Otherwise, if X is a single-connection interface 2505 and X is available 2506, a critical section is entered 2508 the interfacingWith reference of ITInterface X is set to Y 2509, the count of IT interfaces X is connected with is set to one 2510, the critical section is exited 2511, and processing completes successfully.

For a multiple-connection ITInterface X 2505, critical section is entered 2512. If the optional parameter p was specified on invocation of method establishInterface( ) 2513, but p-th entry of X's array of connections is not null (X.isAvailable (p)=false), indicating that the p-th connection of X is unavailable 2514, an error message is stored 2515, the critical section is exited 2511, and processing terminates. If, on the other hand, the p-th connection of X is available 2514, the p-th entry in X's array of connections is set to Y 2516.

If the optional parameter p was not specified on invocation of method establishInterface( ) 2513, an attempt is made to find an available (null) entry in X's array of connections 2519. If an available entry is found 2521, the found entry is set to Y 2520, otherwise an error message is stored 2522, and processing terminates after exiting the critical section 2511.

If a connection was established 2516 2520, if ITInterface X does not support an unlimited number of connections 2517, the count of connections of X is incremented 2518. The method establishInterface( ) then exits the critical section 2511 and completes its processing.

2.4 IT Relationships

An IT Relationship is a pair of associated (established) IT interfaces belonging to two different IT structure instances. Note that the notion of IT relationship is introduced for convenience. This notion is not absolutely necessary for the model, since a pair of established IT interfaces can always be considered in and of itself, but IT relationships represent a convenient way of tracking interfacing IT structure pairs.

A symmetric IT relationship is an IT relationship, involving IT interfaces of identical class. Examples of a symmetric IT relationship include:
   1) IT structure A uses ConnectsTo interface to relate to IT structure B, and IT structure B uses ConnectsTo interface to relate to IT structure A.
   2) IT structure A uses DefaultInterface to relate to IT structure B, and IT structure B uses DefaultInterface to relate to IT structure A.

An asymmetric IT relationship is an IT relationship, involving IT interfaces of different classes. As an example, IT structure A InstallsOn IT structure B, while IT structure B Supports IT structure A.

An abstract IT relationship instance is an IT relationship interface instance involving at least one abstract IT interface instance.

A virtual IT relationship instance is a non-abstract IT relationship instance involving at least one virtual IT interface.

A real IT relationship instance is an IT relationship instance involving only real IT interface instances.

2.4.1 ITRelationship Class

ITRelationship class inherits from ITEntity class and has the following methods:

1) ITRelationship(String name, Type type[, ITInterface A, B])—constructor, establishes a relationship <name> of type <type> using IT interfaces A and B, or defaultInterface if A and B are not specified.

2) boolean isSymmetric( )—returns true if relationship is symmetric, false otherwise 3) [ ] ITInterface getRelatedITInterfaces( )—returns the pair of ITInterface instances involved in a relationship ITRelationship cannot be instantiated—only ITRelationship subclasses have practical uses.

2.4.2 ITRelationship Subclasses

Subclasses of the ITRelationship class are predicated by the types of IT interfaces included in the model. The following IT relationships may exist given the types of IT interfaces defined above:

DefaultITRelationship—two IT structures are related in an unidentified way

InstallationITRelationship—IT structure 1 is installed on IT structure 2

CommunicationITRelationship(<connection type>)—IT structure 1 communicates to IT structure 2 using <connection type>

InvocationITRelationship(<invocation type>)—IT structure 1 invokes IT structure 2

ManagementITRelationship—IT structure 1 manages IT structure 2

2.5 IT Dependencies

An IT dependency is a characteristic of an ITStructure class, indicating requirements of this ITStructure class instances for presence or absence of this or other ITStructure class instances.

A symmetric IT dependency is an IT dependency which can be applied to ITStructure subclasses involved, regardless of the order of ITStructure subclasses in the IT dependency predicate. For example, IT structure A depends on IT structure B, and IT structure B depends on IT structure A in the same way. The order of A and B in the previous sentence may be reversed without a change in meaning of the sentence.

An asymmetric IT dependency is a non-symmetric IT dependency (i.e., it cannot be applied to ITStructure subclasses involved regardless of their order in the IT dependency predicate). For example: IT structure A depends on IT structure B, but IT structure B does not depend on IT structure A.

2.5.1 ITDependency Class

ITDependency class inherits from ITEntity class and has the following methods:

1) ITDependency(String name, String A, B)—constructor, establishes a dependency of ITStructure subclass A on ITStructure subclass B, where A and B are names of subclasses.

2) boolean isSymmetric( )—returns true if relationship is symmetric, false otherwise 3) [ ] String getDependentClasses( )—returns the pair of names of ITStructure subclasses involved in an IT dependency.

ITDepdendency cannot be instantiated—only ITDependency subclasses have practical uses.

2.5.2 ITDependency Subclasses

A number of different dependencies may exist among IT structures comprising (i.e., included in a complex IT structure's composition) or potentially comprising an IT structure (i.e., having a potential of being included in a complex IT structure's composition). For the purposes of this definition, the following dependencies (ITDependency subclasses) are considered (i.e., other dependencies may be defined as appropriate for the structural model):

1) RequiresPresenceOf—as in "IT structure 1 requires presence of IT structure 2"

2) ExclusiveWith—Negation of 1—as in "IT structure 1 is exclusive with IT structure 2", IT structure 1 cannot be installed or operate in the presence of IT structure 2

In this embodiment, no difference is made between requirement of presence for installation and requirement of presence for operation, and the corresponding exclusivity. In another embodiment, such distinction could be made.

2.6 IT Delivery Environment

An IT delivery environment (or delivery environment) is a collection of rules, policies, practices, and associated support functions, including labor, physical space, power supply, hardware, software, networking, and management facilities involved in operating a data center, as well as means of provisioning and deployment of the aforementioned support functions. IT delivery environment also includes a collection of all delivery-bound real IT structures operating in it or in process of being deployed.

IT delivery environment may be null if every IT structure in it operates independently, does not use any data center services, no data center infrastructure exist, and no rules or standards are imposed on IT structures by the delivery environment. For example: a stand-alone personal computer is operated in a null IT delivery environment.

A delivery-bound IT structure is a virtual IT structure that can be provisioned and deployed in a particular IT delivery environment.

2.6.1 ITDeliveryEnvironment Class

ITDeliveryEnvironment class inherits from ITStructure and is always a complex IT structure. ITDeliveryEnvironment composition includes all IT structures deployed in the delivery environment. ITDeliveryEnvironment composition may (and normally would) also include one or more IT structures representing data center infrastructure.

Unlike ITStructure, ITDeliveryEnvironment permits an empty composition—empty composition is valid for the null IT delivery environment.

In addition to the standard ITStructure methods, ITDeliveryEnvironment includes the following methods:

1) Vector verifyConformance(ITStructure A)—verifies conformance of an IT structure to the rules of the IT delivery environments. Returns an empty Vector if the parameter IT structure conforms to the IT delivery environment rules, and a Vector containing a list of error message strings if the parameter IT structure does not conform to the IT delivery environment rules. This method is a NOOP for the null IT delivery environment.

Example

A set of product standards may be established by a data center, such that for certain types of products only products included in the standard set may be used—e.g., operating systems may be restricted to UNIX, and Windows; e.g., UNIX hardware platforms may be restricted to RS/6000 model F50 or H50 and no other computer may be used to run UNIX. verifyConformance( ) method in this case would examine the composition of its parameter IT structure (recursively, if the parameter IT structure is complex) and ensure that it only includes products for operating systems and hardware platform for UNIX that are either within the established set of standards or have higher level of abstraction than specific operating system and specific type of hardware.

2) Vector addElement({<new>|<update>}, ITStructure A)—overrides the parent class addElement( ) method; performs delivery binding of a virtual IT structure. Returns a Vector containing a delivery-bound IT structure as the first element if delivery binding is successful, and a list of error messages otherwise. This method is a NOOP (i.e., returns the input virtual IT structure as the first element of the returned Vector) for the null IT delivery environment. <new> or <update> input parameter may be specified to indicate whether this is a binding of a newly added IT structure, or an update of an existing IT structure.

3) Vector deploy({<new>|<update>}, ITStructure A)—initiates deployment of a delivery-bound IT structure. Returns a Vector containing error messages if processing is unsuccessful, and a null Vector otherwise. <new> or <update> input parameter may be specified to indicate whether this is a deployment of a new IT structure, or a change to an existing IT structure.

Note that all methods of ITDeliveryEnvironment class are subclass-specific. Class ITDeliveryEnvironment includes NOOP placeholders.

2.7 Extending Entity Model

The above model provides a foundation for building an IT class library. However, it is highly abstract and insufficient for effective modeling of IT. A set of general extensions, with its classes inheriting from the appropriate base IT classes, defining basic IT constructs, such as computers or network devices, is required as further foundation. Such extended class libraries exist—e.g., Common Information Model (CIM).

Figure 18:
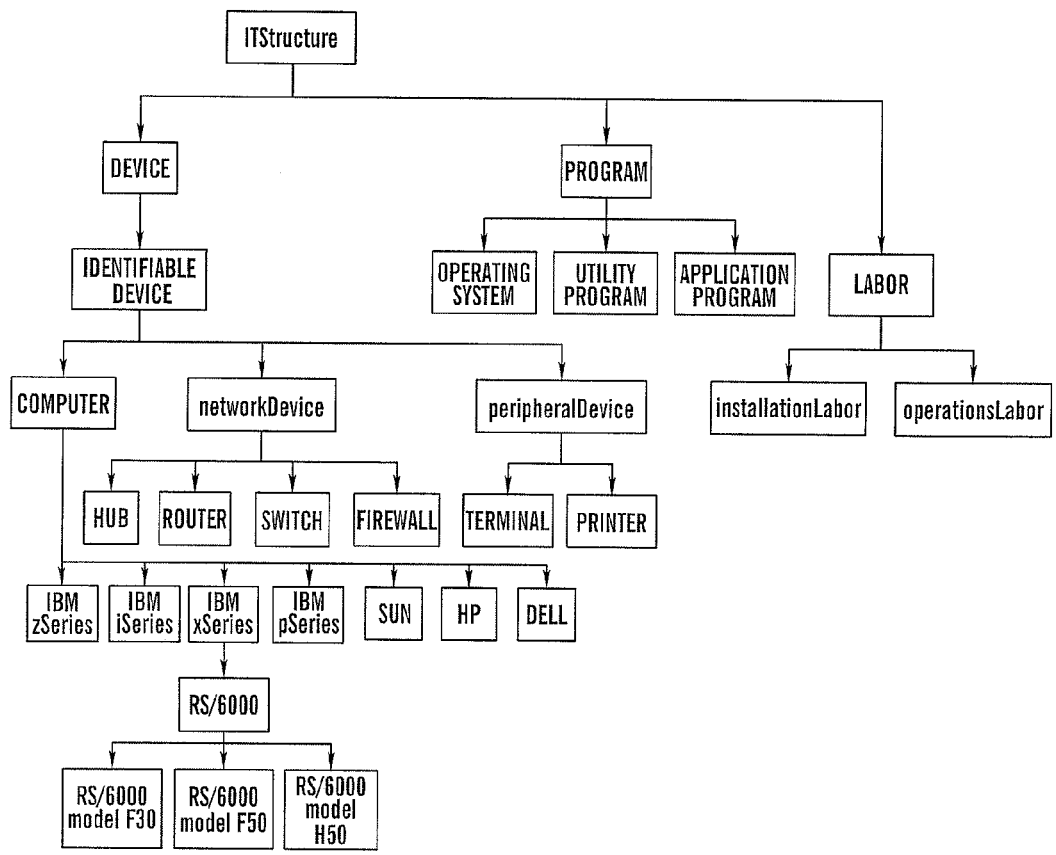
FIG. 18 is an extended class hierarchy example, in accordance with embodiments of the present invention.

Another example of such class hierarchy is described in FIG. 18, in accordance with embodiments of the present invention. FIG. 18 is an example of a set of extensions going from the class hierarchy origin (ITEntity) down to a set of specific computer models shown at a lowest hierarchical level as the virtual IT structures RS/6000 model F30, RS/6000 model F50, and RS/6000 model H50. FIG. 18 also shows intermediate hierarchical levels having successively lower degrees of abstraction. For example, consider the following example path through the hierarchical representation shown in FIG. 18: ITStructure, device, Identifiable Device, computer, IBM xSeries, RS/6000, RS/6000 model F50. In the preceding example, device is less abstract than ITstructure, IdentifiableDevice is less abstract than device, computer is less abstract than IBMxSeries, IBMxSeries is less abstract than RS/6000, and RS/6000 is less abstract than RS/6000 model F50. The lowest level IT structure of RS/6000 model F50 is a virtual IT structural, though not delivery bound.

The present invention discloses a translator (see Section 2.10 infra) to translate the abstract IT structure at the highest level (denoted as ITStructure) to the virtual IT structures RS/6000 model F30, RS/6000 model F50, and RS/6000 model H50. To effectuate such translation, all of the intermediate IT structures shown in FIG. 18 may be stepped through in order to arrive at the final virtual IT structures (e.g., RS/6000 model F30, RS/6000 model F50, RS/6000 model H50, etc.). In some embodiments, however, the designer may provide sufficient input description (typically stored in libraries) so that the translator may not have to step through all of the intermediate IT structures shown in FIG. 18 to arrive at the final virtual IT structures. For example, a requirement that a particular IT structure can store and execute software may imply that the particular IT structure is a computer, so that the intermediate levels of device and IdentifiableDevice in the preceding example path could be skipped by the translator.

Figure 15:
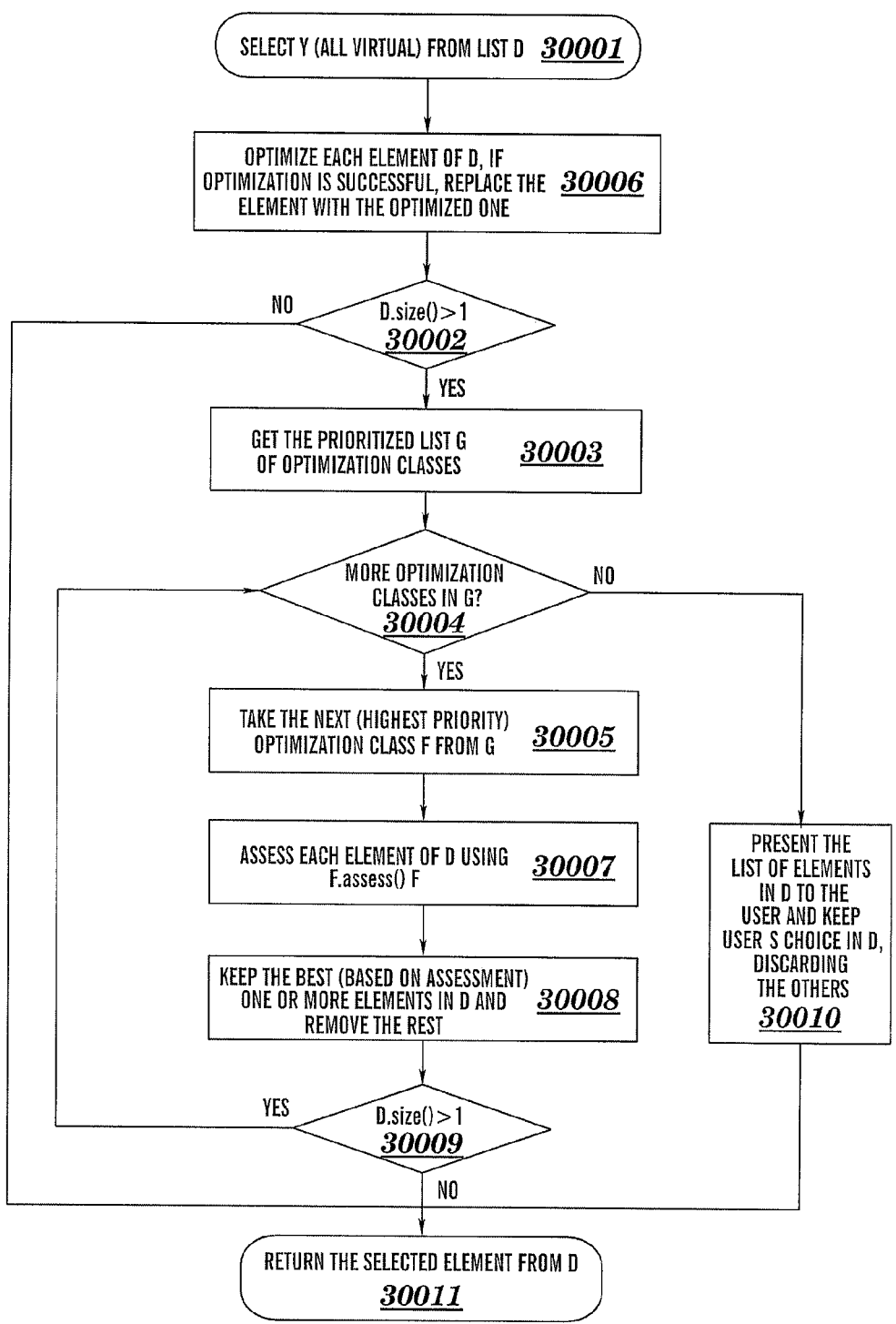
FIG. 15 is a flow chart depicting the process of selecting the best translation candidate from a list of translation candidates, in accordance with embodiments of the present invention.

Although each IT structure box in FIG. 18 is a primitive IT structure, a box appearing in the hierarchy of FIG. 15 could alternatively be a complex IT structure. For example, a box in the hierarchy could represent a client-server architecture as a complex IT structure having primitive elements of server and client.

1.7 Extended IT Delivery Environment

Similar to ITStructure subclasses, the ITDeliveryEnvironment class can have subclasses, used to define various delivery environments. All of ITDeliveryEnvironment subclasses must override two methods: verifyConformance( ) and addElement( ). The verifyConformance( ) method verifies whether a particular IT structure can be deployed and can operate within a given instance of an ITDeliveryEnvironment subclass. The addElement( ) method performs delivery binding of an IT structure to the IT delivery environment subclass instance if the IT structure has been previously verified via verifyConformance( ) to be deployable and operable within the IT delivery environment defined by the given instance of an ITDeliveryEnvironment subclass.

While this embodiment does not attempt to enumerate all possible delivery environments, an example ITDeliveryEnvironment subclass, called StandardizedITEnvironment is described. The key characteristic of the StandardizedITEnvironment is that it imposes product standards and restricts IT structures deployed and operated within it only to the allowable product set. So, the verifyConformance( ) method of StandardizedITEnvironment checks primitive composition of its argument target IT structure and indicates conformance only if every element of the primitive composition of the target IT structure belongs to the set of primitive IT structures permitted by the ITDeliveryEnvironment subclass. For example, the ITDeliveryEnvironment subclass may restrict a computer to be an IBM xSeries computer or an IBMzSeries computer.

Another embodiment for using the verifyConformance( ) method is a situation in which an IT structure is currently deployed in IT delivery environment A, but it is desired that this IT structure migrate to IT delivery environment B. Accordingly, this IT structure would be checked against the verifyConformance( ) method of delivery environment B to determine if this IT structure could be deployed in delivery environment B.

Figure 19:
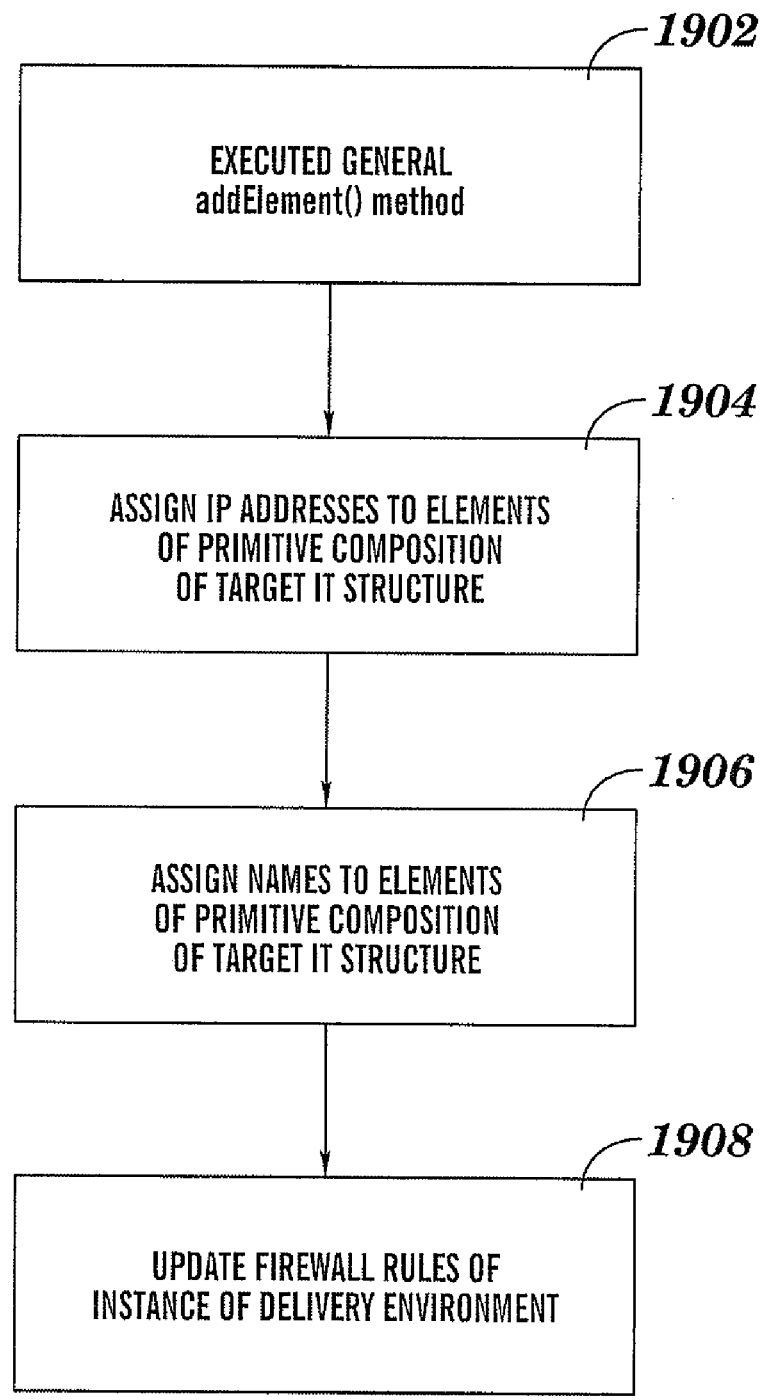
FIG. 19 is a flow chart for implementing delivery binding of an IT structure to a delivery environment, in accordance with embodiments of the present invention.

FIG. 18 is a flow chart depicting a modified addElement( ) method of StandardizedITEnvironment to perform delivery binding of the argument target IT structure to the instance of StandardizedITEnvironment, in accordance with embodiments of the present invention. The modified addElement( ) method effectuates IT delivery binding by invoking the general addElement( ) method of FIG. 3 with an addition of elements required to delivery bind the IT structure to a given IT delivery environment. As a part of this process, the modified addElement( ) method of FIG. 19 includes the general addElement( ) method 1902 of FIG. 3. If at least one element of the primitive composition of the delivery-bound IT structure requires access to the Internet, then the modified addElement( ) method assigns 1904 IP addresses to the elements of primitive composition of the target IT structure requiring IP addresses, these IP addresses being unique relative to the current primitive composition of the instance of StandardizedITEnvironment and adhering to the IP addressing policy of the instance of StandardizedITEnvironment. Similarly, the addElement( ) method assigns names 1906 to the elements of primitive composition of the target IT structure requiring names, and ensures uniqueness of these names relative to the current primitive composition of the instance of StandardizedITEnvironment and adherence of these names to the naming policies of the instance of StandardizedITEnvironment. If target IT structure requires access to the Internet through the firewall(s) provided by the instance of StandardizedITEnvironment, the firewall rules of the instance of StandardizedITEnvironment are updated 1908 to permit the appropriate communications.

2.8.1 Verifying Conformance of an ITStructure to an Exemplary Delivery Environment The exemplary delivery environment is a data center and is aimed at providing the highly-available branded infrastructure for Internet-accessible IT applications.

The data center is a new, state-of-the-art facility. It is built on today's technology and practices a philosophy of being a security-focused operation. Activities and services are monitored by an experienced technical staff 24×7 from the Network Operations Center (NOC). The facilities include 3,000 square feet of raised floor, a network operations monitoring center, conference rooms, administrative space and coffee room.

The physical space of the data center has a secure co-location in a 3,000 square foot room with 18" raised floor and is ADA (Americans with Disabilities Act)-compliant. The physical space includes 27"×39"×84" cabinets with internal vertical cable management and vented front and back doors. All hardware must fit into cabinets. No space other than cabinets is provided.

The electrical power to the data center from NYSEG (New York State Electric and Gas Company) is delivered by dual redundant feeds. The electric service in the building is connected to a parallel redundant UPS. There is a backup 1000 KW diesel generator with 7-day fuel reserve.

Primary internet access of the data center is via AT&T Gigabit Ethernet over multi-mode fiber to their national fiber network node located in adjacent building. This network node has eight connections to the AT&T network. Alternate internet access is via 100 Mbps Ethernet over single-mode fiber connection to the Cable & Wireless Network.

Security for the data center includes access control by Smart Card system issued by NOC personnel staffed 24×7× 365 (24 hours, 7 days a week, 365 days a year). Data center floor access is controlled by access card and biometric scan. Visitors are granted access by duly authorized representatives of the data center clients. A biometric scan and surrender of the visitor's driver's license for a proxy card is required for visitors to gain access from the lobby to the administrative area. Another biometric scan and use of the access card is required to enter the raised floor area.

Figure 9:
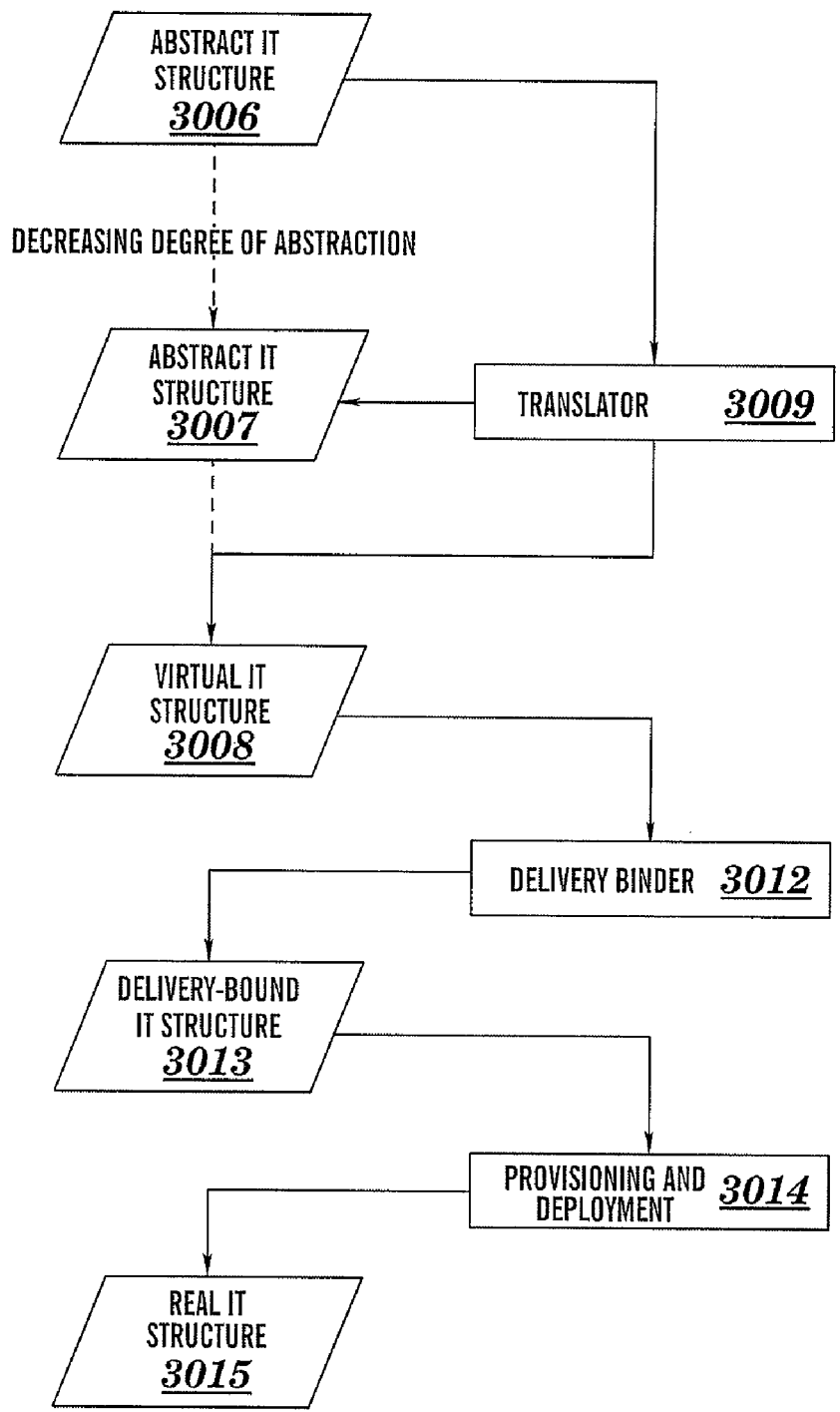
FIG. 9 is a chart depicting the IT development process, in accordance with embodiments of the present invention.
Figure 10:
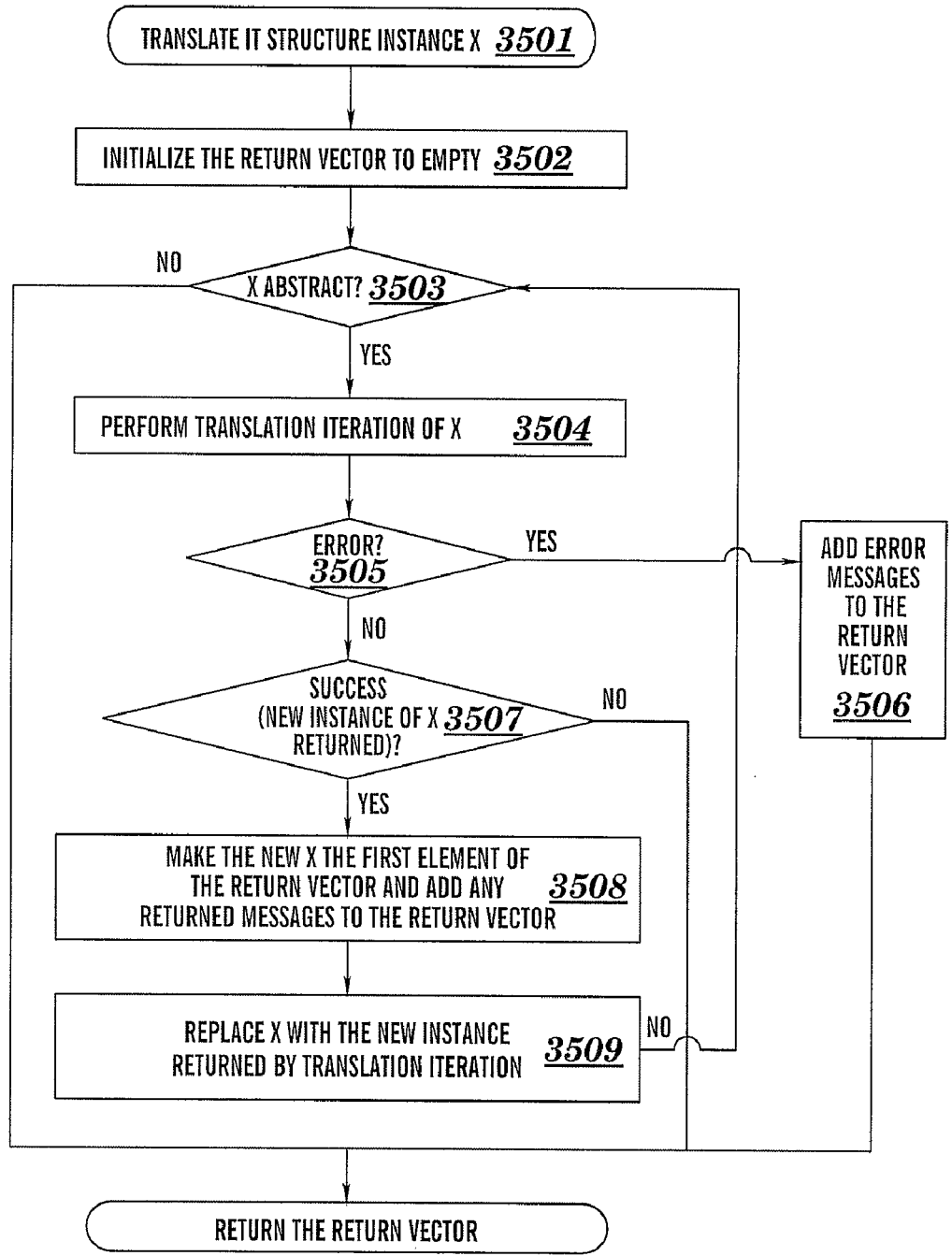
FIG. 10 is a flow chart depicting the process of translation of an IT structure instance, in accordance with embodiments of the present invention.

Conformance factors for the IT structure to the above IT delivery environment (i.e., data center) include:

Electric power availability, reliability (and possibly voltage)
Ability to introduce devices out of the list of "supported" devices
Ability to use specific software, or requirement to run specific software (e.g., for monitoring or virus defense)
Availability of specific rack sizes/space
Ability to use geometrically non-standard devices
Compliance to physical network layer (jack types; switches/hubs; network speed)
Compliance to monitoring/admin access (e.g., there may be a requirement to have an extra network interface per physical box for admin access)
Possible conflict of application availability requirements to DE service window
Network bandwidth requirements
Internet availability requirements (dual-ISP, etc. . . . )
Architectural requirements with respect to network (layering, firewalls, IP addressing schema, network isolation requirements)
Network traffic requirements (e.g., "This IT Delivery Environment will allow only HTTP/HTTPS traffic from the Internet to your hosts"; "We do not allow outgoing traffic on port 25 directly, you must use one of our SMTP servers if you want to send email")
Application type limitations ("We do not allow mass-mailing applications")
Security level provided by IT Delivery Environment versus IT structure security requirements 2.9 IT Development Process FIG. 9 is a chart depicting the IT development process, in accordance with embodiments of the present invention. Translator 3009 (see Sec. 2.10; FIG. 10) may be used in a translation process to translate an abstract IT structure 3006 into another abstract IT structure 3007 having a lower degree of abstraction than abstract IT structure 3006. This translation process may be recursively repeated until the abstract IT structure 3006/3007 has been translated into a virtual IT structure 3008 or until the translation process aborts due to an unsuccessful translation attempt. Alternatively, a single translation of abstract IT structure 3006 by translator 3009 may produce the virtual IT structure 3008. The virtual IT structure 3008 serves as input to the delivery binder 3012 (see Sec. 2.11; Sec. 2.2.2.5, addElement( ) method, FIG. 3), which translates the virtual IT structure into a delivery-bound IT structure 3013, elements of which are then provisioned and deployed 3014 (see Sec. 2.12; deploy( ) method), resulting in a real IT structure 3015 operating in the appropriate IT delivery environment.

2.10 Translation

Figure 11:
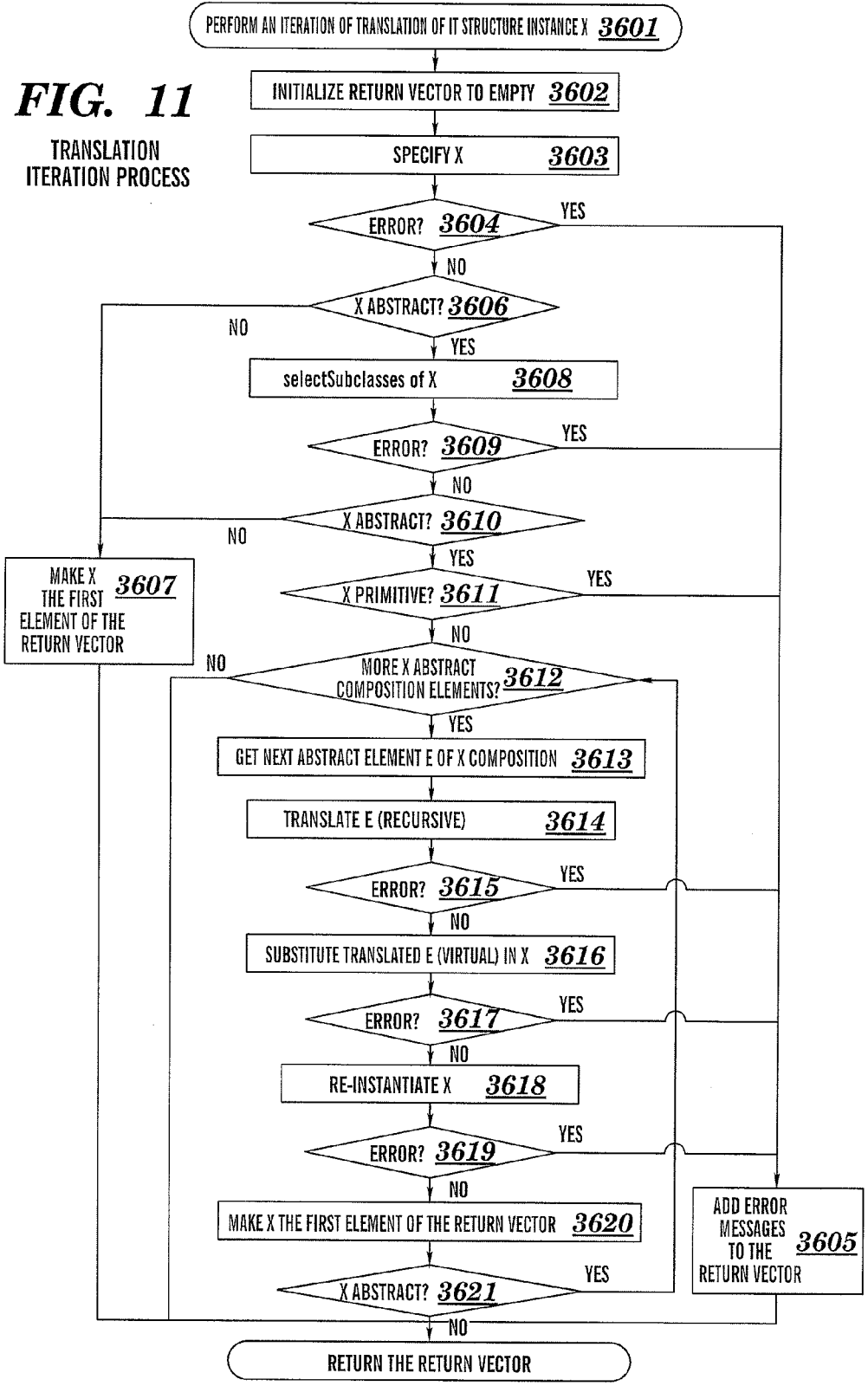
FIG. 11 is a flow chart depicting the translation iteration process, in accordance with embodiments of the present invention.

Translation is performed on an abstract IT structure instance with the intention of obtaining a virtual IT structure, which can then be optimized and bound to one or more IT delivery environment to obtain one or more real IT structure. FIGS. 10 and 11 collectively describe an IT translator (IT-RAN) adapted to translate an abstract IT structure to the virtual IT structure.

FIG. 10 is a flow chart depicting the process of translation of IT structure instance X 3501, in accordance with embodiments of the present invention. The process starts by initializing the return Vector 3508 to an empty Vector 3502. If X is not abstract 3503, no translation is necessary, and a null return Vector is returned to indicate that no action was performed (and no errors occurred).

The process then performs a series of iterations until either an error occurs or a virtual IT structure is obtained. The process invokes the translation iteration process 3504, as described infra in relation to FIG. 11, to iteratively translate the abstract elements of X (i.e., the IT structures in the composition of X) until an instantiation of X following said iterative translation is virtual. If an error is indicated by the translation iteration (by returning error message(s)) 3505, any error messages returned by the translation iteration process are added to the return Vector 3506 and processing terminates. If translation iteration processing did not indicate an error 3505, a check is performed to ascertain whether the translation iteration processing was successful 3507 (i.e., the translation iteration process returned a new instance of IT structure X), and if so, the new instance of IT structure X returned by the translation iteration process is made the first element of the return Vector 3508, and the current instance of IT structure X is replaced with the new instance of IT structure X returned by the translation iteration process 3509. The process then loops back to the check of whether the instance of IT structure X is still abstract 3503.

FIG. 11 is a flow chart depicting the translation iteration process, which is performed for an IT structure instance X 3601, in accordance with embodiments of the present invention. The process iterates through the abstract elements of X's composition to perform a translation of each abstract element of X, wherein the iterations end when a re-instantiation of X results in X being virtual (i.e., being in a virtual state).

The process starts by initializing the return Vector 3620 to an empty Vector 3602. The process then invokes the process of specification for X 3603, which may be a NOOP if X is fully specified, or, if X is not fully specified, will ensure full specification of characteristics of X. If an error occurs during the specification process for X 3604, any error messages returned by the specification process are added to the return Vector 3605 and processing terminates.

The process then checks whether X is abstract 3606, and if X is no longer abstract (i.e., X is now virtual), the process makes X the first element of the return Vector 3607 and returns.

If X is still abstract 3606, the process invokes selection of subclasses for X 3608. If an error occurs during subclass selection 3609, any error messages returned by the subclass selection process are added to the return Vector 3605 and processing terminates.

If subclass selection did not indicate an error 3609, the process checks whether X is still abstract 3610, and if X is no longer abstract (i.e., X is now virtual), the process makes X the first element of the return Vector 3607 and returns.

If X is still abstract 3610, the process checks whether X is primitive 3611, and if so, the process places a translation error message in the return Vector 3607 and processing terminates. The reason for this is that subclass selection process for a primitive IT structure has searched all possible subclasses of X (including any existing virtual IT structures) and has not found one that would represent a satisfactory translation result for X—i.e., no possible virtual IT structure exists that would satisfy functional, operational, and other requirements and/or constraints imposed on X.

If X is complex 3611, the process iterates through abstract elements of X's composition 3612. Because X is still abstract, by definition of abstract IT entities, X's composition includes at least one abstract element. Each iteration through X's composition finds the next abstract element E of X's composition 3613 and recursively invokes the translation process for E 3614. If an error occurs during translation of E 3615, any error messages returned by the recursive invocation of the translation process are added to the return Vector 3605 and processing terminates.

Figure 14:
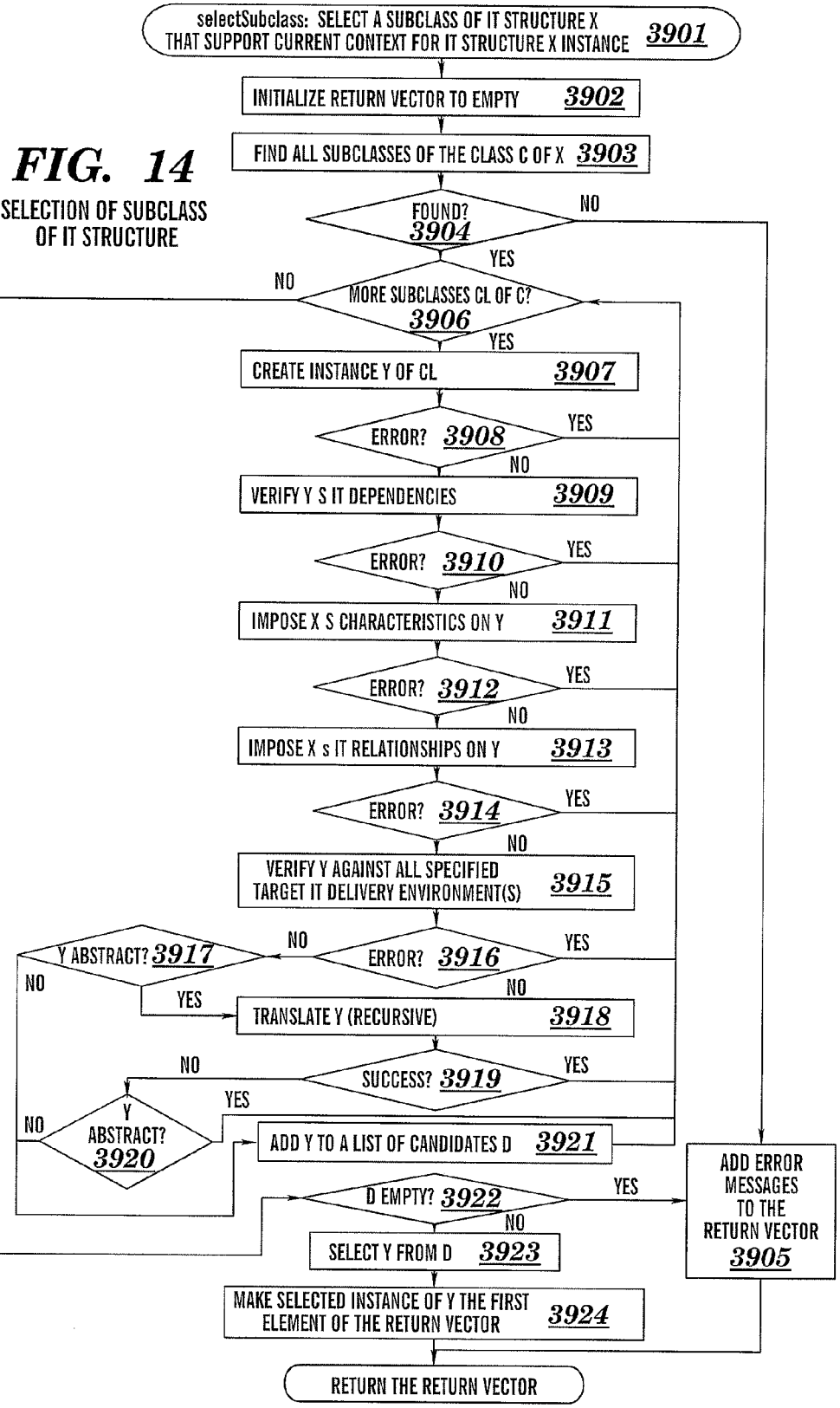
FIG. 14 is a flow chart depicting the process of selection a subclass of an IT structure, in accordance with embodiments of the present invention.

If translation process is successful and returns a new instance of E 3615, the new instance of E (denoted as $E_{NEW}$) is substituted for the current instance of E in the composition of X 3616. The process of substitution (not shown, but an analogous process is shown in FIG. 14) involves ensuring that any IT dependencies in X involving E are still satisfied, any IT relationships in X involving E are still valid and established, any characteristics of X (functional, operational, or other) are still supported, and X is still valid for any IT delivery environment for which it is targeted.

X (with $E_{NEW}$ substituted therein) is then re-instantiated 3618 to form an interim IT structure instance. If an error occurs during re-instantiation of X 3619 (e.g., if the interim IT structure instance is not virtual), error messages are added to the return Vector 3605 and processing terminates.

X (now re-instantiated) is then made the first element of the return Vector 3620. If X is no longer abstract 3621 (i.e., it is virtual), the return Vector (including X as its first element) is returned and processing terminates. If X is still abstract 3621, processing iterates to finding the next abstract composition element of X 3612.

Figure 12:
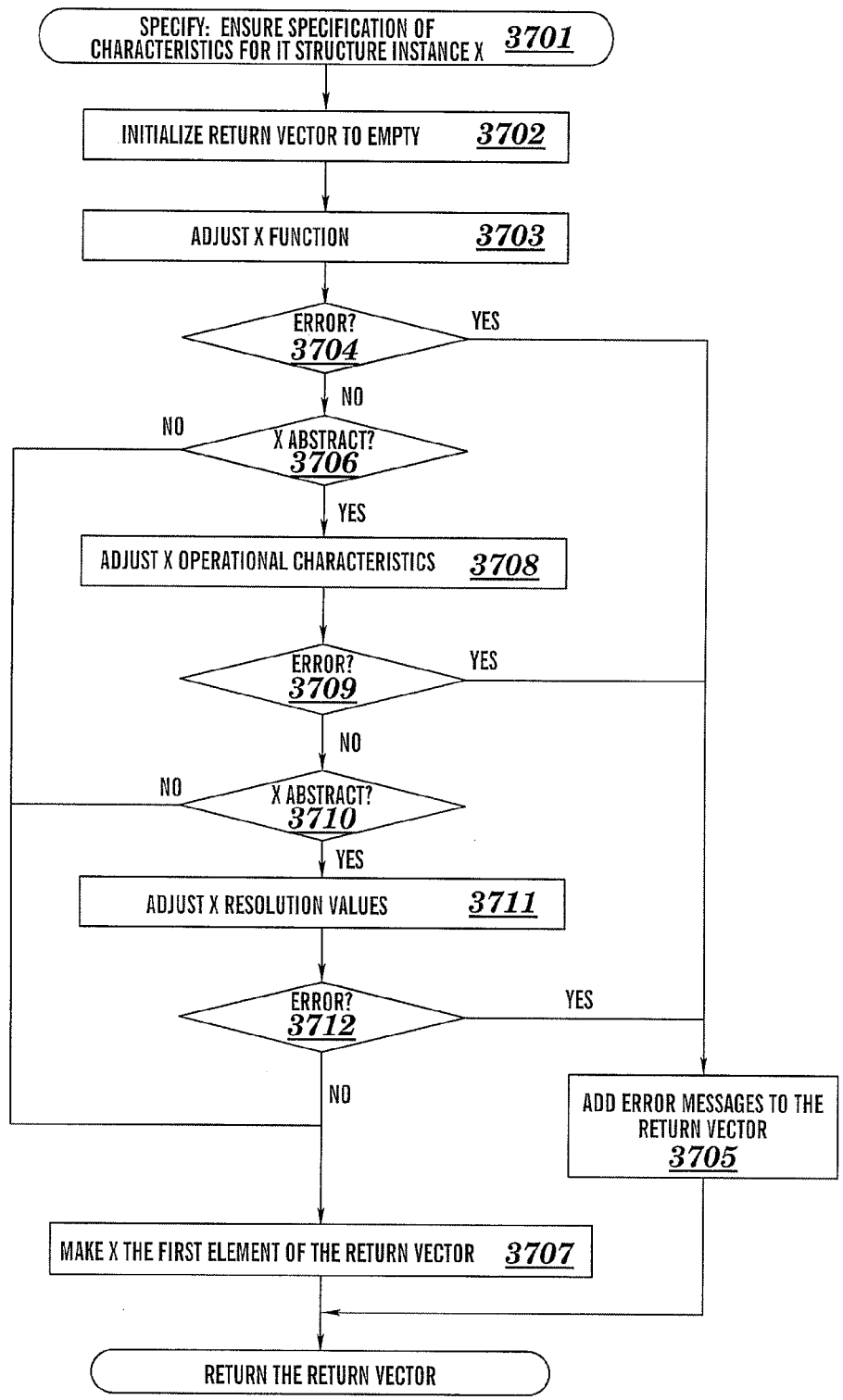
FIG. 12 is a flow chart depicting the process of ensuring specification of characteristics of an abstract IT structure instance, in accordance with embodiments of the present invention.

FIG. 12 is a flow chart depicting the process of ensuring specification of characteristics of abstract IT structure instance X 3701, in accordance with embodiments of the present invention. The process starts by initializing the return Vector 3707 to an empty Vector 3702. The process then invokes the adjustment process for the X's function(s) 3703. The adjustment process for a particular characteristic of an IT structure may be a NOOP if that characteristic is fully specified, or, otherwise, will ensure full specification of that characteristic. If an error occurs during the adjustment of X's function(s) 3704, any returned error messages are added to the return Vector 3705 and processing terminates.

The process then checks whether X is still abstract 3706. It is conceivable that as a result of invocation of setFunctions( ) method of X, X became virtual. If this is the case, X is made the first element of the return Vector 3707 and processing terminates.

If X is still abstract 3706, the process invokes the adjustment process for the X's operational characteristics 3708. If an error occurs during the adjustment of X's operational characteristics 3709, any returned error messages are added to the return Vector 3705 and processing terminates.

The process then once again checks whether X is still abstract 3710. It is conceivable that as a result of invocation of setOperationalCharacteristics( ) method of X, X became virtual. If this is the case, X is made the first element of the return Vector 3707 and processing terminates.

If X is still abstract 3710, the process invokes the adjustment process for the X's resolution values 3711. If an error occurs during the adjustment of X's resolution values 3712, any returned error messages are added to the return Vector 3705 and processing terminates, otherwise, the process makes X the first element of the return Vector 3707 prior to completion.

Figure 13:
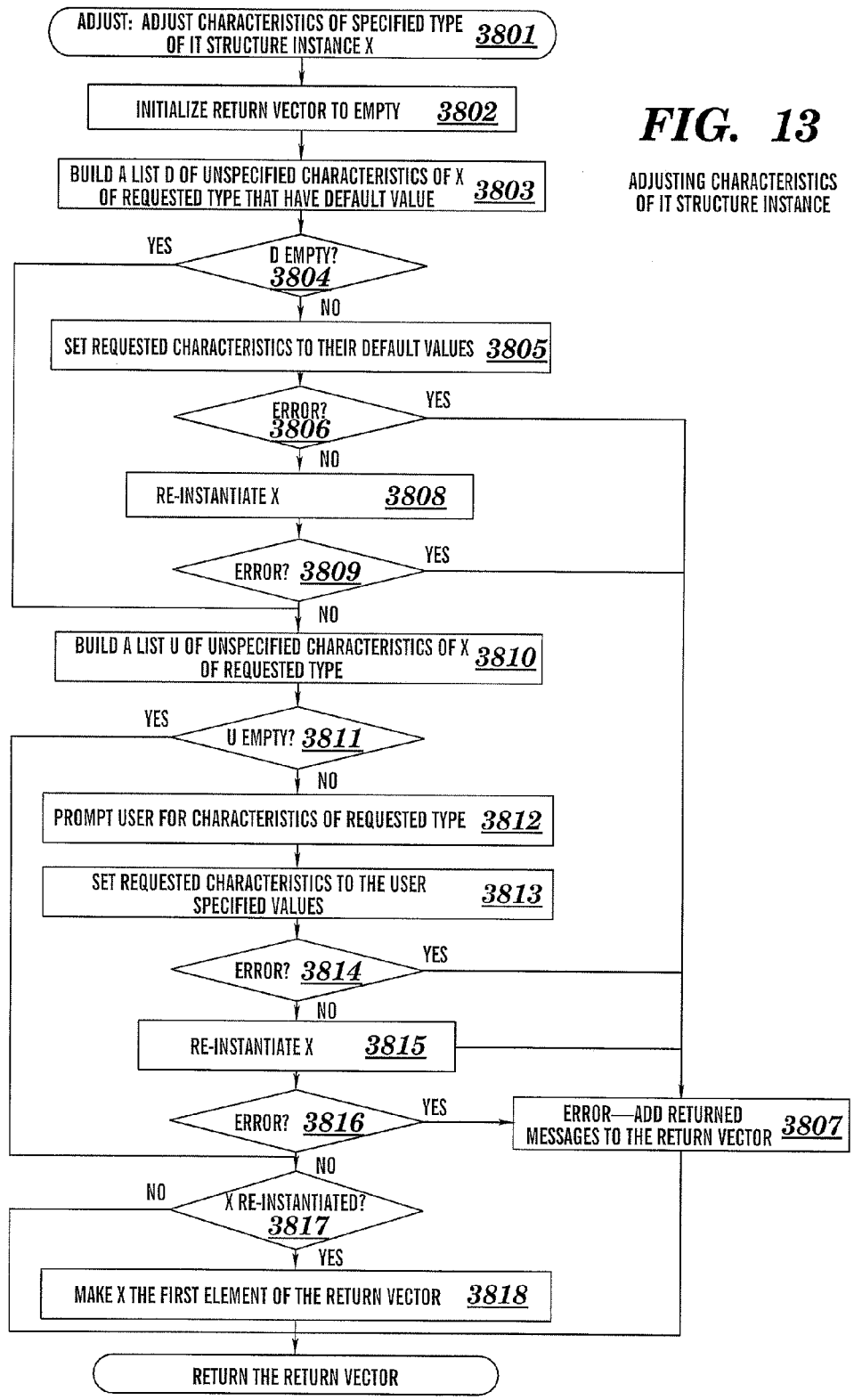
FIG. 13 is a flow chart depicting the process of adjusting a particular set of characteristics of an IT structure instance, in accordance with embodiments of the present invention.

FIG. 13 is a flow chart depicting the process of adjusting a particular set of characteristics of IT structure instance X 3801, in accordance with embodiments of the present invention. The process starts by initializing the return Vector to an empty Vector 3802. The process then builds a list D of unspecified characteristics of the requested type that have default values 3803. If D is not empty 3804 (i.e., at least one unspecified characteristic of the requested type has a default value), the unspecified characteristics are set to their default value 3805 using the appropriate method (i.e., setFunctions( ) for functional characteristics, setOperationalCharacteristics( ) for operational characteristics, and resolve( ) for resolution values). If an error occurs during the appropriate method invocations 3806 (i.e., if the requested characteristics could not be set to their corresponding default values), any error messages are added to the return Vector 3807 and processing terminates.

If default setting for the unspecified characteristics of the requested type was successful 3806, X is re-instantiated 3808. If an error occurs during the attempt to re-instantiate X 3809 (i.e., there is an internal logic error in X—X has accepted the default settings for the unspecified characteristics of the requested type, but now cannot be instantiated using these settings), any error messages are added to the return Vector 3807 and processing terminates.

The process then builds a list U of unspecified characteristics of the requested type 3810 (i.e., those that remain unspecified after any defaults were set). If U is not empty 3811 (i.e., at least one characteristic of the requested type remains unspecified), the process prompts the user for specification of the unspecified characteristics of the requested type 3812 and sets the now specified characteristic values using the appropriate method 3813. If an error occurs during the appropriate method invocations 3814 (i.e., if the requested characteristics could not be set to the values specified for them by the user), any error messages are added to the return Vector 3807 and processing terminates.

A number of possibilities exist as alternatives to addressing the user, comprising:
  consulting an internal policy, possibly, associated with the target IT delivery environment(s),
  generating a value for each unspecified characteristic of the requested type that would not violate internal logic of the class of IT structure X,
  ignoring the fact that a particular characteristic is unspecified,
  requiring the users to always provide a default value for all characteristics of IT structures.

If setting of the user-specified values for the unspecified characteristics of the requested type was successful 3814, X is re-instantiated 3815. If an error occurs during the attempt to re-instantiate X 3816 (i.e., there is an internal logic error in X—X has accepted the user settings for the unspecified characteristics of the requested type, but now cannot be instantiated using these settings), any error messages are added to the return Vector 3807 and processing terminates.

The process then checks whether X was re-instantiated during preceding steps 3817, and if so, makes the new instance of X the first element of the return Vector 3818, otherwise (no error has occurred, but X was not re-instantiated—this is a NOOP processing case), an empty (as originally created) return Vector is returned upon completion of the process.

FIG. 14 shows the process of selection a subclass of IT structure X, in accordance with embodiments of the present invention. The instances of IT structure X would support characteristics of the instance (abstract) of IT structure X, relationships imposed on the instance of IT structure X, dependencies of IT structure X, and be valid for the IT delivery environments to which the instance of IT structure X is targeted 3901. The process starts by initializing the return Vector to an empty Vector 3902. The process then finds all subclasses of the class C of X 3903 (i.e., those classes in the class library that inherit from C directly or indirectly (by inheriting from a class that inherits from C directly or indirectly)). If no subclasses of C are found 3904, an error is indicated 3905 and processing terminates. The reason for indicating an error is that X is abstract, and therefore must have a way to be translated to a virtual IT structure instance. The translation process ensures that X is fully specified, and therefore, no other means of reducing abstraction than finding a less abstract class for X remain—and that just proved to be impossible.

If at least one subclass of C was found 3904, the process iterates through the list of subclasses CL of C 3906. An instance Y of subclass CL is created 3907. If an error occurs when creating an instance of CL 3908, CL is ignored (although an error message may be stored in the return Vector, as inability to create an instance of CL indicates an error in CL definition) and the next value of CL is taken.

If instance Y of class CL was created successfully 3908, Y's IT dependencies are verified 3909. If an error is detected by verification of Y's IT dependencies 3910, CL is discarded and the next value of CL is taken.

The process then attempts to impose all characteristics of IT structure instance X on Y 3911. If any characteristics of X could not be imposed on Y and an error occurred 3912, CL is discarded and the next value of CL is taken.

If transfer of characteristics from X to Y was successful 3912, any IT relationships of X are imposed on Y 3913. If Y cannot support all of X's IT relationships 3914, CL is discarded and the next value of CL is taken.

If transfer of IT relationships from X to Y was successful 3914, Y is now verified against all IT delivery environments to which X is targeted 3915. If an error is indicated 3916, CL is discarded and the next value of CL is taken.

Now that Y supports the context of X, a check is performed to determine whether Y is abstract 3917. It is conceivable that Y was virtual from the beginning, or that one or a combination of the actions performed for the transfer of X's context to Y caused Y to become virtual. The reason this check was not performed before this point is that until it is known that Y can support the context of X, Y's type is irrelevant.

If Y is virtual 3917, it is added to the list of translation candidates D 3921, and the next value of CL is taken.

If Y is abstract 3917, a translation of Y is attempted 3918 (recursive invocation of the translation process). If an error occurs during translation of Y or if no error occurs but Y is not translated anyway (NOOP) 3919, CL is discarded and the next value of CL is taken.

If Y was successfully translated 3919, but the result of the translation is still an abstract IT structure 3920, CL is discarded and the next value of CL is taken.

Discarding a subclass of C that does not translate into a virtual IT structure is not a necessity but a design choice. It would be equally valid to include the abstract IT structure Y in the list of candidates D in hopes of subsequent user intervention and manual modification of class source of the class CL of Y such that translation of Y to a virtual IT structure becomes possible. The design choice may be made for conciseness and minimization of complicated actions by the user.

If Y is now virtual 3920, Y is added to the list of translation candidates D 3921 before the next CL value is taken, Upon completion of iteration through the subclasses CL of C, if the list of translation candidates D is empty 3922 (i.e., no translation candidates were found), an error is indicated 3905 and processing terminates.

If the list of translation candidates D contains at least one translation candidate 3922, the process of translation candidate selection is performed 3923, resulting in selection of a single translation result Y from the list of translation candidates D, which is made the first element of the return Vector 3924 prior to completion of the process.

FIG. 15 is a flow chart depicting the process of selecting the best translation candidate Y from a list of translation candidates D (all virtual) 30001, in accordance with embodiments of the present invention. The process starts by optimizing each element of D (using its optimizes method), and, if optimization is successful, replacing the element of D with the result of its optimization 30006. If the list of candidates D has a single element 30002, no further action is performed and the one element of D is returned.

If the list of translation candidates D has more than one element to choose from 30002, the prioritized list of optimization classes (getOptimizationFunctions( ) method) is retrieved 30003. The process then iterates through the list G of optimization classes 30004, always taking the next (i.e., the highest priority) optimization class F from the list 30005. The process then assesses each element of D using the assessment function A associated with the optimization class F 30007 and only keeps in D the elements for which A produces the best result 30008, discarding all others.

If more than one element remains in D 30009 (i.e., optimization resulted in equally good result for multiple elements of D), the process iterates to the next assessment function.

If after the application of a sequence of assessment functions, D only has a single element 30009, that element is returned as the one selected for translation from the list of candidates D.

If all assessment functions are exhausted before D is reduced to a single element 30004, the list of elements in D is presented to the user and the user's choice acts as the tie-breaker 30010—the user can select a single element from the list and the others will be discarded prior to the process completion.

Prompting the user for a tie-breaker decision is a design choice. Other designs are possible, including those in which other means of breaking the tie are employed (e.g., random choice), and those in which multiple elements of D are returned and, as a result, the user is presented with multiple equally valid translations. The reason for the choice of human intervention as the tie-breaker is the extremely low probability of having multiple applications of assessment functions to multiple different optimized IT structure instances produce identical results.

2.11 Binding

An IT structure instance X can be added to another IT structure Y by inclusion of X into the composition of Y by means of the addElement( ) method of Y. The process of addition of IT structure instance X to Y is called binding.

2.11.1 Deliver Binding

A virtual IT structure targeted to a particular IT delivery environment may be delivery-bound (i.e., translated into a delivery-bound virtual IT structure) by means of invoking the addElement( ) method of the target ITDeliveryEnvironment class instance.

2.12 Initiating Deployment of a Delivery-Bound IT Structure

Deployment of a delivery-bound IT structure is initiated by invoking the method deploy( ) of the particular ITDeliveryEnvironment class instance.

2.13 Fall-Back Policy

In several places above it has been noted that it is not always possible to transition from an abstract IT structure to, eventually, a real IT structure. A trivial cause of this may be unavailability of the appropriate materials in a provisioning system. More complex cases are possibly, in which, although materials are available, the right combination of them cannot be derived, or, worse, a wrong choice was made in a decision tree of one of the steps of translation to make delivery binding impossible. In many of these cases, returning to a previous step in the IT development process may resolve the problem. Therefore, a fall-back policy is implemented throughout the IT development process, such that, should a condition be reached preventing the production of a real IT structure as a result of a step of the IT development process, a return to the appropriate previous step of the IT development process is performed and a different decision is made, resulting hopefully in a positive outcome of the IT development process.

2.14 IT Agents

An IT agent is a program, installed on or embedded within OS of a computer, or embedded within microcode or hardware of a device, which gathers information about hardware configuration of a computer or a device, software installed on a computer, and network connectivity of a computer or a device, and transmits this information to a requester.

IT agents may transmit gathered information to a requester unsolicited or in response to a request. IT agents possess proper OS authorization and proper network connectivity to be able to transmit gathered information.

IT agents are a particular case of software agents in general, and therefore their implementation is OS—and possibly hardware-dependent.

External discovery functions other than agents may be used to obtain some or all of the required information.

Depending on the degree of sophistication of an IT agent, an IT agent may or may not be able to provide certain types of information—e.g., an IT agent may or may not contain logic permitting it to examine customization and configuration parameters of a particular program. For the purposes of this embodiment, it is assumed that an IT agent always possesses the degree of sophistication required to accomplish its task and furnish the information necessary to fulfill a particular function. If this is not the case, and some of the required information may not be provided by an IT agent, a manual completion step may be required in some of the methods described below, enabling the user to provide the missing information.

Depending on a security policy and network connectivity of a particular IT delivery environment, some IT agents may be unable to gain access to some of the information they intend to gather, or to transmit some of the gathered information. For the purposes of this embodiment, it is assumed that an IT agent always possesses the necessary authority to gather the information it needs and is capable of transmitting this information whenever such transmission is required. If this is not the case, and some of the required information may not be provided by an IT agent, a manual completion step may be required in some of the methods described below, enabling the user to provide the missing information.

IT agents are assumed to be present on all computers and smart devices comprising a real IT structure.

2.15 Reverse-Specifying an IT Structure

In order to accomplish some of the functions described below, it may be necessary to perform a process of delivery-binding "in reverse", having an operational configuration as input, and deriving from it a real and a virtual IT structure. The process relies on the information gathered by IT agents and builds a real IT structure first, including all IT entities within an IT structure being examined. Once a real IT structure is built, a corresponding virtual IT structure is produced by discarding the information imposed on an IT structure by the delivery binding process associated with a particular IT delivery environment, and replacing real primitive IT structures in an IT structure composition with their respective virtual primitive counterparts.

While the reverse-specification process will recreate composition and IT relationships of an IT structure, it will not produce IT dependencies or any methods beyond those present in the real or virtual primitive IT structures and IT relationships used to comprise the reverse-specification.

Figure 16:
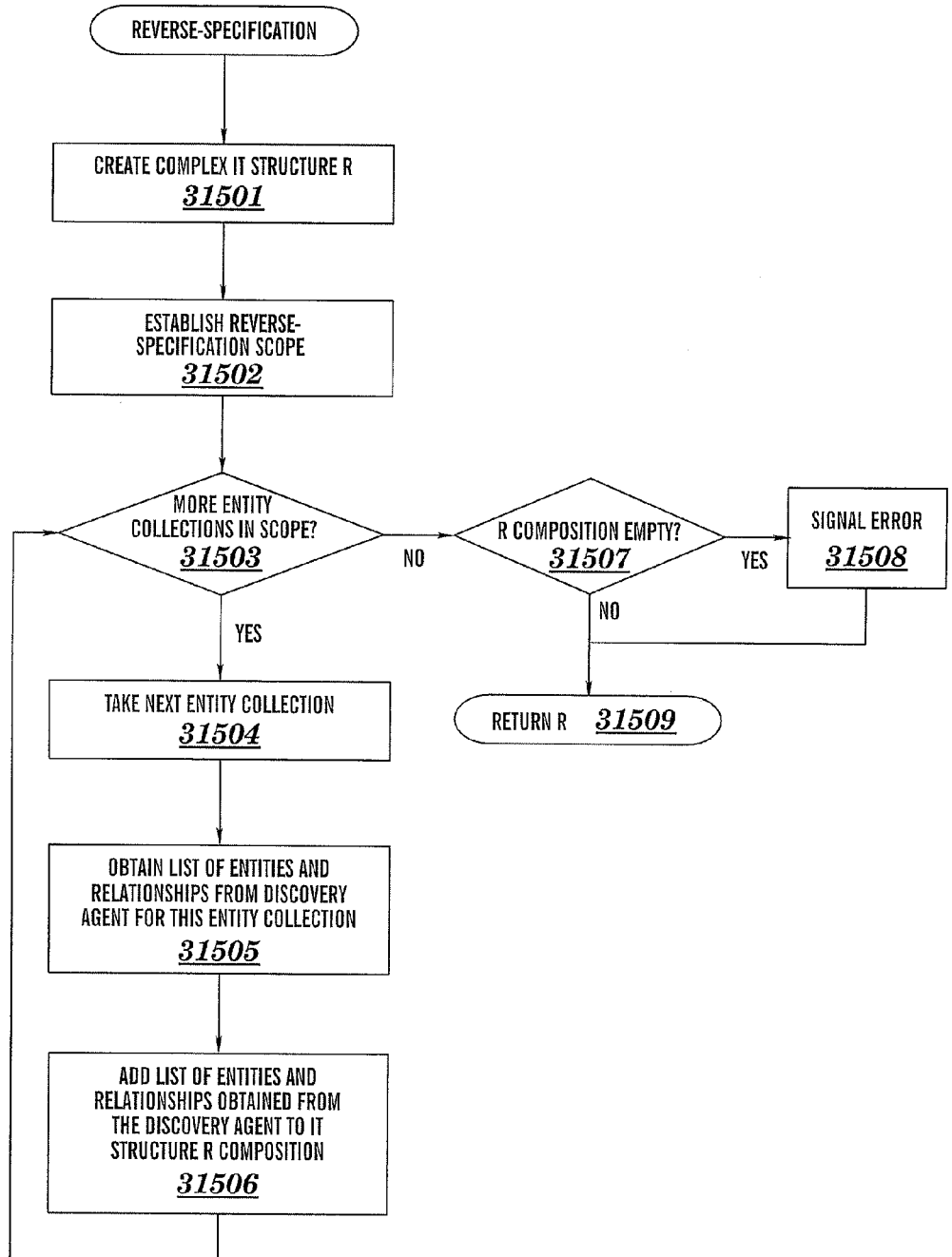
FIG. 16 is a flow chart depicting a reverse specification process, in accordance with embodiments of the present invention.

The process of reverse-specification is illustrated in FIG. 16, in accordance with embodiments of the present invention.

The process starts by creating a complex IT structure R, with empty composition 31501. The process proceeds to establishing reverse-specification scope 31502. This is necessary to bound the reverse-specification process to the necessary subset of the IT delivery environment. The scope of reverse specification is a list of IT entities (most likely, computers) indicated by a user. If the scope is not provided, all IT entities supplied with agents are considered within the scope—e.g., the whole IT delivery environment. While there are unprocessed entity collections in scope (an entity collection is a group of IT entities reachable by a single discovery agent—e.g., a computer with its full software stack) 31503, consider the next unprocessed entity collection 31504. Obtain the list of entities and relationships from the associated discovery agent 31505, and add this list to the composition of IT structure R 31506. When all the entity collections are processed 31503, if composition of R is empty 31507, en error is indicated 31508. The resulting IT structure R is returned to the invoker 31509. The resulting IT structure R may result from either reverse specifying an IT delivery environment or from reverse specifying an IT system instance.

2.16 Comparing IT Structures

In some cases, it may be advantageous to compare two IT structures. IT structure classes can be compared by comparing their source code using conventional means of program comparison (e.g., delta-compare utility). The process of comparing two IT structure instances is described infra.

The process of comparing IT structures assumes one of the two cases, based on the usage of results of a comparison (these are the practical cases when a comparison would be useful—the method of comparison is not restricted to these situations):

1) The IT structure instances being compared are an original and its reverse-specification—for deployment verification and detection of unauthorized modifications.

2) The IT structure instances being compared are instances of the same IT structure subclass—for testing of IT structure methods by the user.

Figure 17:
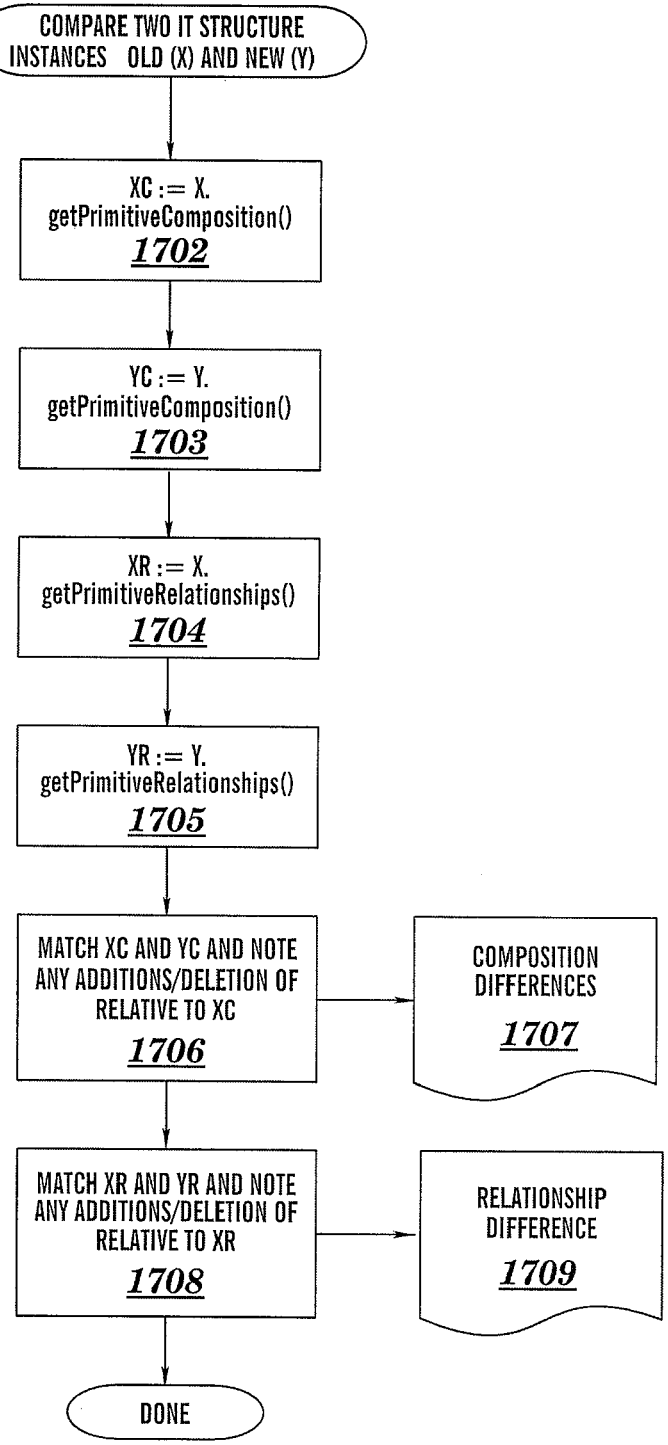
FIG. 17 is a flow chart depicting a process for comparing two IT structure instances, in accordance with embodiments of the present invention.

FIG. 17 describes the process of comparing two IT structure instances. The process obtains as input two IT structure instances, termed "old" (X) and "new" (Y) A1. The process obtains primitive compositions (getPrimitiveComposition( )) of the old 1702 and the new 1703 IT structure instances. The process then obtains primitive relationships list (getPrimitiveRelationships( )) of the old 1704 and the new IT 1705 structures.

The process then matches elements of the old and the new IT structure instances primitive compositions and determines any additions or deletions in (assumed) derivation of the new IT structure from the old 1706, and reports any additions or deletions in the new IT structure relative to the old one 1707.

The process then performs a similar matching for IT relationships of the old and the new IT structure instances 1708 and reports any differences 1709.

The process then produces a report (textual and/or graphical), showing any differences, and marking them as additions or deletions.

3. IT Structure Visualization

Visualization of IT structures supports usability for IT development tools. At different times during a development of an IT structure, an IT developer may desire to view different configurations relating to an IT structure such as, inter alia, a network topology configuration; a systems management configuration; a configuration of IT dependencies among IT structure composition elements; and a configuration of IT Relationships among IT structure composition elements.

3.1 Invocation of Fundamental IT Structure Methods

To visually represent various configurations relating to an IT structure X, method getPrimitiveComposition( ) for X may be invoked. This invocation of getPrimitiveComposition( ) returns the list of primitive IT structures comprising IT structure X. Depending on what information is being visualized, various additional methods operating on X may be invoked, including: getPrimitiveRelationships( ) for visualization of networks (e.g, communications networks) or other types of IT relationships; and getPrimitiveDependencies( ) for visualization of IT dependencies. For visualizing IT dependencies, the present invention may exploit the fact that the ITStructure class is enhanced with method getPrimitiveDependencies( ) which returns a list of IT dependencies among elements of IT structure primitive composition. Thus, to display network topology, the set of IT relationships returned by the getPrimitiveRelationships( ) method may be a specific subset of the set of IT relationships that includes IT relationships of the subclass "communicates with". This specific subset represents network paths among primitive IT structures returned by getPrimitiveComposition( ). Other subsets of IT relationships may be used for various other displays; e.g., "is managed" and "managed by" can be used to generate a visual representation of an IT structure that includes management structure as shown in FIG. 29 described infra.

3.2 Visualization of Networks

IT structures may involve complex networks. An IT developer may review and analyze various aspects of networking involved in the composition of an IT structure. The present invention discloses infra methodology for displaying multiple overlayed and interconnected networks on a screen in a fashion that enables the IT developer to easily comprehend the network.

FIG. 21A depicts a display of a network comprising devices, network segments, and vertical connectors, in accordance with embodiments of the present invention. The devices are hardware devices and/or software devices and are represented by rectangular icons and may comprise, inter alia, computers, routers, firewalls, software packages or modules, etc.

The network segments may represent a hub or VLANS (virtual LANs) implemented in network switches (which could be present as entities within the IT class hierarchy). The network segments may also represent a token ring MAU (media-access unit) or Ethernet 10B2 coaxial cable in a network topology configuration. The network segments are represented in FIG. 21A by horizontal lines, wherein a network segment may comprise subsegments and nodes. For example, network segment 4000 comprises subsegments 4005 and 4006 and nodes 4001-4003.

The vertical connectors are vertical lines that represent physical connectors or circuitry that electrically connects devices to network segments. For example, the vertical connector 4012 is coupled to the device 4010 at IP address 192.168.72 and connects the device 4012 to network segment 4000 at node 4001. The vertical connectors may represent cables connecting devices engaged in communication IT relationships to aforementioned hubs or VLANS. Another way to define a subclass of ITRelationship class—physicallyConnected—would indicate a connection via Ethernet cable or radio.

Devices are electrically and/or logically coupled to each other by paths which are combinations of network segments and/or vertical connectors. The devices names and IP addresses may be generated as a result of delivery binding.

3.2.1 Displaying Network Diagrams

The display method of the present invention places related components close to one another to utilize space efficiently and reduce or minimize the length of connections as well as the number of intersections and interleaves among connections and devices. A "connection" is a network segment, a vertical connector, or a combination thereof. The method of the present invention is performed by executing a goal function method in which goal values are computed. The goal function method assigns weights to the network segments, the vertical connectors, and overlays of devices and network segments. The goal function method also limits or precludes overlay of devices and network segments. An "overlay of devices" overlays (and thus obscures) a first device on the screen by a second device. The goal function method will be described in detail infra in conjunction with FIG. 24

FIG. 21B depicts relationships between the network display of FIG. 21A and a two-dimensional matrix representing the screen layout, in accordance with embodiments of the present invention. Thus, FIG. 21B depicts an overlay pattern of the network segments and the vertical connectors overlayed on the matrix in accordance with the distribution of the devices in the cells of the matrix and in accordance with the description of the configuration of devices, network segments, and vertical connectors provided in step 4200 of FIG. 22 as described infra.

In FIG. 21B, the positive directions associated with the mutually perpendicular X and Y coordinate axes are defined to be the horizontal and vertical directions, respectively. An initial phase of the display method calculates the size of a two-dimensional matrix to be used for representing the screen layout. Each cell of the matrix contains one device or is empty; and each cell may contain no more than one device. Each displayed device is placed in a unique cell of this matrix. The initial size of the matrix may be determined as follows. The initial height (NY) of the matrix in the vertical direction may be a function of the number of network segments in the IT structure. The initial width (NX) of the matrix in the horizontal direction may be a function of the number of devices on a network segment of the IT structure having the highest number of devices attached thereto as compared with all other network segments of the IT structure. The number of cells (N) in the matrix is the product of NX and NY.

Initially, devices may be distributed approximately uniformly in the matrix cells so as to initially form a set of filled matrix cells without regard as to which device fills (i.e., placed in) each such filled matrix cell. The method then performs multiple iterations, each iteration trying to minimize the goal value for the prevailing IT structure. Each iteration considers all possible pairs of matrix cells (such that at least one cell in the pair is non-empty) and swaps the matrix cells of a pair if a swap would reduce the goal value. Pairs of cells, representing devices with identical sets of network segments to which they are connected, may be ignored. The method may terminate when an iteration has not resulted in reduction of the goal value, when the iteration has not reduced the goal value by more than a predetermined tolerance (e.g., absolute tolerance, percent, etc.) relative to the goal value at the end of the immediately preceding iteration, when the goal value does not exceed a predetermined upper limiting goal value, when a maximum predetermined number of iterations has elapsed, etc.

In one embodiment, the display method does not use location of network segments in its decisions, such that the method does not make a decision that depends on where any of the network segments is located. Placement of a network segment may be determined as a function of location of devices connected to the network segment. Network segment placement determination may be performed within the goal function method. However, on every invocation of the goal function method as a side-effect of execution of the goal function method, locations of network segments may be calculated and stored, so that the network segments can be used for post-iteration processing such as for being rendered on the screen.

FIGS. 22-24 describe the display method in detail, in accordance with embodiments of the present invention.

Figure 22A:
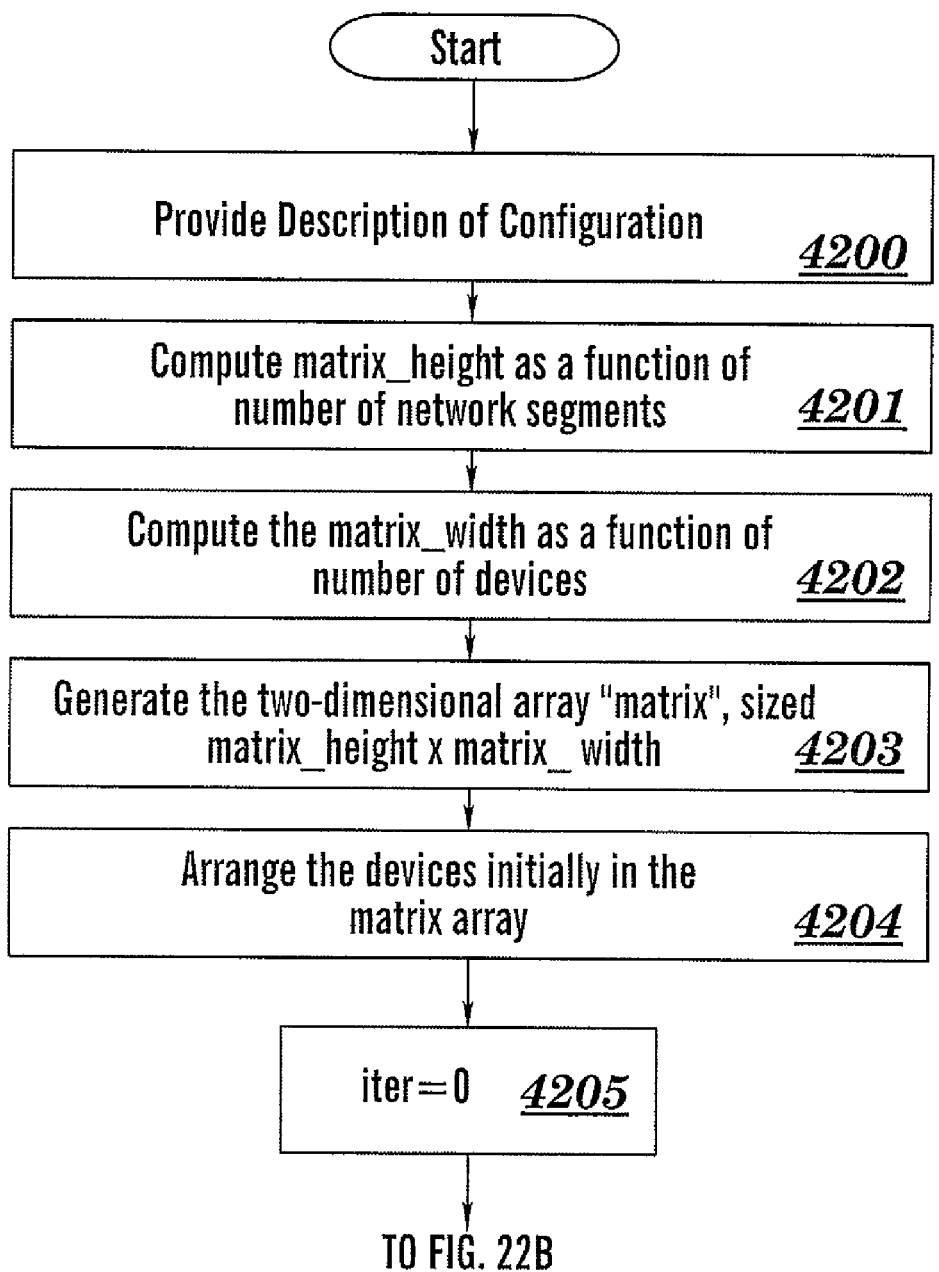

FIGS. 22A and 22B (collectively "FIG. 22") is a flow chart describing matrix generation and matrix cell swapping, in accordance with embodiments of the present invention. FIG. 22 comprises steps 4200-4219.

Step 4200 provides a description of a configuration of devices, network segments, and vertical connectors relating to at least one IT structure. The description describes how the devices, the network segments, and the vertical connectors are mutually coupled. The configuration may be, inter alia, a network topology configuration, a configuration of IT relationships among IT structure composition elements, or a configuration of IT dependencies among IT structure composition elements.

In step 4201, the matrix height (i.e., in the vertical direction and denoted as matrix_height or NY) may be calculated as a function of the number of network segments in the IT structure. In one embodiment, this function relating to step 4201 returns double the number of network segments in the IT structure. Thus the rows may be indexed from 0 to (NY−1).

In step 4202, the matrix width (i.e., in the horizontal direction and denoted as matrix_width or NX) is calculated as a function of the number of devices on a network segment having the highest number of devices attached thereto as compared with all other network segments of the IT structure. In one embodiment (noting that the devices can be connected to network segments by vertical connectors both from both above and below), this function relating to step 4202 returns three quarters of the number of devices on the network segment with the highest number of devices in the IT structure, rounded up to the nearest integer. Thus the rows may be indexed from 0 to (NX−1).

Step 4203 generates the matrix using the dimensions NX and NY determined in steps 4201-4202, Step 4204 initially distributes the devices in the cells of the matrix using the dimensions NX and NY previously calculated in steps 4201-4202. Thus, the devices are initially distributed to form an initial distribution of the devices in the cells of the matrix. The devices in the IT structure may be initially distributed approximately uniformly and in no particular order (e.g., randomly with respect to the devices) among cells of the matrix. In an embodiment, the number of iterations is limited by a predetermined value (MaxIter), and therefore the iteration counter (Iter) is initialized to zero in step 4205. In another embodiment, the maximum number of iterations may be unspecified and the number of iterations may be limited by the approximation to the goal value as described supra (e.g., maximum value of goal value, change in goal value between successive iterations, etc.) In yet another embodiment, the number of iterations may be limited by both the number of iterations and the approximation to the goal value, whichever is achieved sooner. Each iteration comprises execution of steps 4206-4219.

Each cell of the matrix contains content, said content being a device of the network or a null content. A null content is defined as an absence of a device. A cell is said to be empty if the cell contains a null content. A cell is said to be non-empty if the cell contains a device. Thus, swapping two cells of the matrix mean swapping the content of the two cells. Consider two cells of matrix denoted as cell A and cell B. As a first example in which cell A initially contains device X and cell B initially contains device Y, swapping cells A and B means transferring device X from cell A to cell B and transferring device Y from cell B to cell A. As a second example in which cell A initially contains device X and cell B initially contains a null content, swapping cells A and B means transferring device X from cell A to cell B and transferring the null content from cell B to cell A (i.e., making cell A empty). As a third example in which cells A and B each initially contain null content, swapping cells A and B cannot change the content of cells A and B from their initially null content.

In step 4206, the goal value is computed as described infra in conjunction with FIG. 24. Steps 4207 and 4208 respectively initialize internal loop counters i and j to zero. Even though the matrix is two-dimensional, its cells can be examined linearly, without consideration to their position in the two-dimensional matrix. The cells are enumerated, starting from 0 and ending with matrix_size−1 (or N−1), wherein matrix_size is equal to the product of matrix_width and matrix_height (i.e., N=NX*NY). Counters i and j represent cells i and j, respectively, within this linear enumeration.

In FIG. 22, steps 4209-4215 form a first loop over cell i and steps 4206-4217 form a second loop over cell j, wherein the first loop is an inner loop relative to the second loop. Thus cells i and j are processed in (i,j) pairs according to the first and second loops of FIG. 22 in a sequential order described by the notation (j=0, 1, . . . , N−1), i=0, 1, . . . , N−1) subject to i unequal to j.

Step 4209 decides whether the cells i and j should be considered for swapping (i.e., for being swapped), using a criteria such as: at least one cell of cells i and j is non-empty (i.e., said one cell contains a device therein) and cells i and j contain devices that do not have identical sets of network segments to which the devices in cells i and j connect. If the cells i and j should not be considered for swapping, then the process iterates to the next value of j in step 4214. Otherwise, step 4410 is next executed.

If the cells i and j should be considered for swapping in step 4209, the contents of cells i and j are swapped in step 4210, and a new goal value is computed in step 4211 in accordance with the algorithm described in FIG. 24. In step 4212, the new goal value is compared to the previous goal value. If the new goal value is not less than the previous goal value (i.e., goal value has not decreased), cells j and i are swapped in step 4213 to effectively reverse the swapping previously performed in step 4210.

Step 4214 increments j by 1 to its next value. Step 4215 determines whether j is less than matrix_size. If j is less than matrix_size then the process loops to step 4209; otherwise, step 4216 is next executed which increments i by 1 to its next value Step 4217 determines whether i is less than matrix_size. If j is less than matrix_size then the process loops to step 4208; otherwise, step 4218 is next executed which increments Iter to its next value.

Step 4219 determines whether Iter is less than MaxIter. If Iter is less than MaxIter, then the process loops to step 4206 to execute the next iteration comprising steps 4206-4219. The next iteration will initially compute a lower goal value in step 4206 than was computed in the immediately preceding iteration, since each swapping of cells in step 4211 that is not offset by the inverse swapping of step 4213 lowers the computed goal value. Each iteration is characterized by a first distribution of devices in the cells of the matrix at the beginning of each iteration, wherein the first distribution of the first iteration is the initial distribution determined in step 4204, and wherein the first distribution of each iteration after the first iteration is the distribution of devices in the cells of the matrix at the end of the immediately preceding iteration. Therefore each iteration has an improved first distribution of devices in the cells of the matrix as compared with the first distribution of devices in the cells of the matrix for the immediately preceding iteration. Accordingly, each iteration has a potential for lowering the goal value relative to the lowest goal value computed in the immediately preceding iteration.

If Iter is not less than MaxIter in step 4219, then the distribution of the devices in the cells of the matrix is a final distribution of said devices, and the process continues with execution of the algorithm depicted in the flow chart of FIG. 23, described infra. As stated supra, the use of MaxIter is only one of several alternatives for determining when to stop iterating. The goal value relating to the final distribution of devices is lower than the goal value relating to the initial distribution of devices.

FIG. 23 is a flow chart describing rearrangement of network segments, in accordance with embodiments of the present invention. The rearrangement of network segments contributes to formation of an overlay pattern of the network segments and the vertical connectors overlayed on the matrix in accordance with the final distribution of the devices in the cells of the matrix and in accordance with the description of the configuration provided in step 4200 of FIG. 22. As a side effect of execution of the goal function method, a list of network segments and their placement are determined. FIG. 23 verifies this list of network segments and their placement to eliminate any conflicts, i.e., to ensure that network segments drawn on a single horizontal row on a screen will not intersect. FIG. 23 includes steps 4301-4312. The method of FIG. 23 iterates through the list of network segments using counters i and j to represent the network segments.

Step 4301 initializes i to 0, and step 4302 sets j to i+1. In FIG. 23, steps 4303-4309 form a first loop over network segment i and steps 4302-4311 form a second loop over network segment j, wherein the first loop is an inner loop relative to the second loop. Thus i and j are processed in (i,j) pairs according to the first and second loops of FIG. 23 in a sequential order described by the notation ((j=i+1, i+2, . . . , S), i=0, 1, . . . , S−1), wherein S is the total number of network segments.

Step 4303 determines whether network segments i and j have the same vertical position. If network segments i and j do not have the same vertical position, then the method next executes step 4308 which increments j by 1 to j+1. If network segments i and j have the same vertical position in step 4303, then step 4304 is next executed.

Steps 4304-4305 collectively determine whether network segments i and j overlap horizontally. In particular, step 4304 determines whether the rightmost end of network segment i is to the right of the leftmost end of network segment j, and step 4305 determines whether the rightmost end of network segment j is to the right of the leftmost end of network segment i. If steps 4304-4305 collectively determine that network segments i and j do not overlap horizontally, then the method next executes step 4308 which increments j by 1 to j+1.

If steps 4304-4305 collectively determine that network segments i and j overlap horizontally, then the method next executes steps 4306-4307 which are illustrated in FIGS. 27 and 28 in accordance with embodiments of the present invention. In FIG. 27, network segments i and j, respectively represented by network segments 192.168.6.X and 192.168.2.X, overlap horizontally. In step 4306, the method comprises moving down one row all network segments and all devices whose vertical coordinate is greater than the vertical coordinate of network segment i (i.e., network segment 192.168.6.X), resulting in the vertically downward movement of network segment 192.168.3.X, the device disposed between vertical connectors 192.168.4.1 and 192.168.3.1, the device disposed between vertical connectors 192.168.2.2 and 192.168.3.2, and the device disposed between vertical connectors 192.168.2.3 and 192.168.3.3). In step 4307, the method comprises moving down one row the network segment j (i.e., network segment 192.168.2.X), resulting in the vertically downward movement of network segment 192.168.2.X) and all devices connected to network segment j whose vertical coordinate is greater than the vertical coordinate of network segment j and that were not moved in step 4306. Note that there are no such devices in FIG. 27 to be moved in step 4307. FIGS. 27 and 28 represent the rendered network diagram before and after, respectively, the moves of network segments mandated by steps 4306-4307, where network segments i and j are the two network segments superimposed on the network diagram in row 3 of FIG. 27, and are no longer superimposed in FIG. 28.

In step 4308, j is incremented by 1. Step 4309 determines whether j is less than the number of network segments. If j is less than the number of network segments, then the method loops back to step 4303. If j is not less than the number of network segments, then step 4310 is next executed. Step 4310 increments i by 1.

Step 4311 determines whether i is less than the number of network segments minus 1. If i is less than the number of network segments minus 1, then the method loops back to step 4302. If j is not less than the number of network segments minus 1, then in step 4312 the final distribution of device with the overlay pattern of the network segments and vertical connectors are displayed on the display screen and the method of FIG. 23 ends.

FIG. 24 is a flow chart of steps 4401-4412 for describing the goal function method for computing a goal value called "Goal", in accordance with embodiments of the present invention. Counters i and j represent network segments i and devices j, respectively. Step 4401 initializes Goal to zero. Step 4402 initializes i to zero. Step 4403 computes and stores the horizontal position of network segment i, as described by the horizontal matrix coordinates of the leftmost and the rightmost devices connected to the network segment i.

Step 4404 increments Goal by the product of a weight (denoted as h_weight) and the width of network segment i (i.e., the difference of the horizontal matrix coordinates of the rightmost and leftmost devices attached the i-th network segment). Step 4405 sets j equal to zero. Step 4406 increments Goal by the product of: a weight (denoted as v_weight) and the length of the vertical connector between the i-th network segment's j-th device and the i-th network segment.

If the vertical connector between the i-th network segment j-th device and the i-th network segment crosses any device, Goal is incremented by a penalty value in step 4407. Since such device crossings impair the quality of the visual representation of the network on the screen, it may be desirable in some embodiments to assign a penalty value that exceeds the weights of network segments and vertical connectors (e.g., by one or two orders of magnitude).

Step 4408 increments counter j by 1. Step 4409 determines if j is less than the number of devices of the i-th network segment. If j is less than the number of devices of the i-th network segment, then the process loops back to step 4406. If j is not less than the number of devices of the i-th network segment, then step 4410 is next executed.

Step 4410 increments i by 1. Step 4411 determines if i is less than the number of network segments. If i is less than the number of network segments, then the process loops back to step 4403. If i is not less than the number of network segments, then step 4412 returns the value of Goal to the invoker (e.g., step 4206 or 4211 of FIG. 22).

FIGS. 25-26 illustrate how the swapping of two non-empty cells of the matrix can affect the goal value, in accordance with embodiments of the present invention. Denoting C23 and C44 as the cells in (row 2, column 3) and (row 4, column 4), respectively, the device "elearningODS" in cell C23 and the device "emailODS-email_server" in cell C24 in FIG. 25 are shown as having been swapped in FIG. 26. This swapping increases the goal value for this example. Although the length of the Network Segment 192.168.3.X has decreased somewhat, said decrease was more than offset by increasing the length of the Vertical Connectors 192.168.3.1, 192.168.7.1 and 192.168.6.2. Moreover, the goal function method now introduced a penalty for Vertical Connector 192.168.7.1 crossing the Device in row 2, column 4.

The relative values of weights of network segments, vertical connectors and penalties may influence the layout and visual clarity of the rendered network diagram that the algorithm builds. These weights and penalties can be determined experimentally, by assuming initially equal weights for network segments and vertical connectors, and taking the penalty value approximately equal to a multiplier (e.g., 50) on the average value of the weights for the network segments and vertical connectors. Trying different network configurations to vary the balance between h_weight (see step 4404 of FIG. 24) and v_weight (see step 4406 of FIG. 24) provides an empirical technique for determining values of these weights and penalties that result in a desirable visual image on the display screen.

The weight of each network segment may be a same network segment weight for each network segment, and the weight of each vertical connector may be a same vertical connector weight for each vertical connector. Alternatively, the network segment weight, the vertical connector weight, and the penalty may each independently be described by a plurality of values. For example, some network segments may be weighted differently from other network segments, some vertical connectors may be weighted differently that other vertical connectors, and some penalties may be weighted differently than other penalties. To illustrate, some device connections may be more important to the user for visualization purposes than other device connections and the user may accordingly desire a higher quality visual representation in relation to the more important device connections than in relation to the less important device connections, thereby resulting in multiple weights for at least one connector parameter (i.e., network segment weight, vertical connector weight, penalty). Moreover, the weights and penalties may have predetermined numerical values or may be dynamically computed in accordance with an algorithm.

In FIG. 24, the goal value is computed as a linear combination of: a product of the length and weight of each network segment, a product the length and weight of each vertical connector, and the penalty. Generally, the goal value is computed as a function of a length and weight of each network segment, a length and weight of each vertical connector, and a penalty for each crossing of a device by a network segment. The functional dependence of the goal value on any of the relevant parameters (i.e., network segment weight, vertical connector weight, and penalty) may be linear or nonlinear. For example, the goal value may depend nonlinearly on the length of at least one network segment, the length of at least one vertical connector, the penalty, and combinations thereof.

Moreover, the computation of the goal value may comprise computing values of cross-coupling terms involving said parameters (e.g., the product of network segment weight and the square root of the vertical connector weight). In other words, the scope of the present invention includes any functional dependence of the goal value that results in an acceptable display image of a configuration relating to an IT structure.

3.3 Visualization of IT Dependencies, IT Relationships, and Systems Management

FIG. 29 illustrates a display for visualizing IT relationship, in accordance with embodiments of the present invention. In FIG. 29, four computers are present: eLearningODS-AppServer_1, eLearningODS-AppServer_2, eLearningODS-DBServer, and managementServer. Each of the computers communicates with the other computers, as reflected by the bi-directional IT relationship representation "communicates with".

Computers have various types of programs installed on them. For example, OS AIX 4.3.2 is installed on eLearningODS-DBServer, and DB DB2 UDB v7.0.1 is installed on OS AIX 4.3.2.

Both instances of Application eLearning_ap 1.7.2 invoke DB DB2 UDB v7.0.1 (and thus, DB DB2 UDB v7.0.1 is invoked by both instances of eLearning_ap 1.7.2), as shown by the asymmetric IT relationship representation "Invokes".

Tivoli_Monitoring program is managing the two application and one DB servers (and thus, the two application and one DB servers are managed by Tivoli_Monitoring program), as shown by the asymmetric IT relationship representation "Manages".

The computers eLearningODS-AppServer_1 and eLearningODS-DBServer are mutually coupled to each other through the asymmetric IT relationship "Communicates with".

In one embodiment, multiple relationships genres are shown as combined in a single display, (e.g., FIG. 29). In particular, FIG. 29 includes a management genre, a communications genre, and an invocation genre. In another embodiment, the user can select the relationship genres desired for display. For example, the user may select relationships of a single genre for display such as only management relationships, wherein only the management relationship diagram will be displayed. Similarly, the user may select only invocation relationships, wherein only the invocation diagram of programs will be displayed.

The display algorithms described in the flow charts of FIGS. 22-24 are applicable to generating a display of IT relationships as follows, using FIG. 29 for illustrative purposes in comparison with FIG. 21A. The rectangles of FIG. 29 (e.g., rectangle 4510) simulate the devices of FIG. 21A. The horizontal lines of FIG. 29 (e.g., horizontal line 4511) simulate the network segments of FIG. 21A. The vertical lines of FIG. 29 (e.g., vertical line 4512) simulate the vertical connectors of FIG. 21A.

Generally, the present invention discloses a method for generating a display of a configuration of IT relationships among IT structure composition elements such that each displayed device (i.e., displayed rectangle) represents an IT structure composition element. The displayed horizontal segments and vertical connectors form paths such that each path links a first device with a second device and represents an IT relationship between the first device and the second device. Each path has two ends and either end or both ends of the path may have a terminating arrow to denote the asymmetry or symmetry of the relationship. A path is unidirectional if one end, and only one end, of the path has a terminating arrow denoting an asymmetric relationship (e.g., eLearningODS-DBServer "manages" Tivoli_Monitoring). A path is bidirectional if both ends of the path has a terminating arrow denoting a symmetric relationship (e.g., eLearningODS-AppServer_1 "Communicates with" eLearningODS-DBServer, and vice versa). The display algorithm will display the terminating arrows.

FIG. 30 illustrates a display for visualizing IT dependencies, in accordance with embodiments of the present invention. In FIG. 30, an arrow represents an IT dependency. Thus, Application eLearning_ap 1.7.2 requires presence of DB; more specifically, DB2; more specifically, UDBv7. Similarly, eLearning_ap 1.7.2 requires presence of Middleware; more specifically, ApplicationServer; more specifically, WAS (WebSphere Application Server); more specifically, WASv2. Similarly, DBv7 requires presence of an OS; more specifically, AIX; more specifically, AIXv4. Similarly, WASv2 requires presence of an OS; more specifically, AIX; more specifically, AIXv4. Similarly, AIXv4 requires presence of a Computer; more specifically, RS/6000.

The display algorithms described in the flow charts of FIGS. 22-24 are applicable to generating a display of IT dependencies as follows, using FIG. 30 for illustrative purposes in comparison with FIG. 21A. The rectangles of FIG. 30 (e.g., rectangle 4520) simulate the devices of FIG. 21A and more generally represent IT structure composition elements. The horizontal lines of FIG. 30 (e.g., horizontal line 4521) simulate the network segments of FIG. 21A. The vertical lines of FIG. 30 (e.g., vertical line 4522) simulate the vertical connectors of FIG. 21A.

Generally, the present invention discloses a method for generating a display of a configuration of IT dependencies among IT structure composition elements such that each displayed device represent an IT structure composition element (e.g., a hardware element, a software element, a labor or service entity, etc). The displayed horizontal segments and vertical connectors form paths such that each path links a first device with a second device and represents an IT dependency between the first device and the second device. Each path has two ends and either end or both ends of the path may have a terminating arrow to denote the asymmetry or symmetry of the dependency. A path is unidirectional if one end, and only one end, of the path has a terminating arrow denoting an asymmetric dependence (e.g., Application eLearning_ap 1.7.2 requires presence of DB). A path is bidirectional if both ends of the path has a terminating arrow denoting a symmetric dependence. All dependencies shown in FIG. 30 are asymmetric. The display algorithm will display the terminating arrows.

4. Verification of Correctness of Networking Aspects of an IT System

IT structures may involve complex networks and it may be difficult to identify and diagnose some problems associated with the network topology. These problems may relate to security and efficiency of those networks. The present invention discloses infra methodology for diagnosing two typical network topology problems, namely cross-zone connections and isolated (i.e., unreachable) network segments.

4.1 Network Topology

Figure 31:
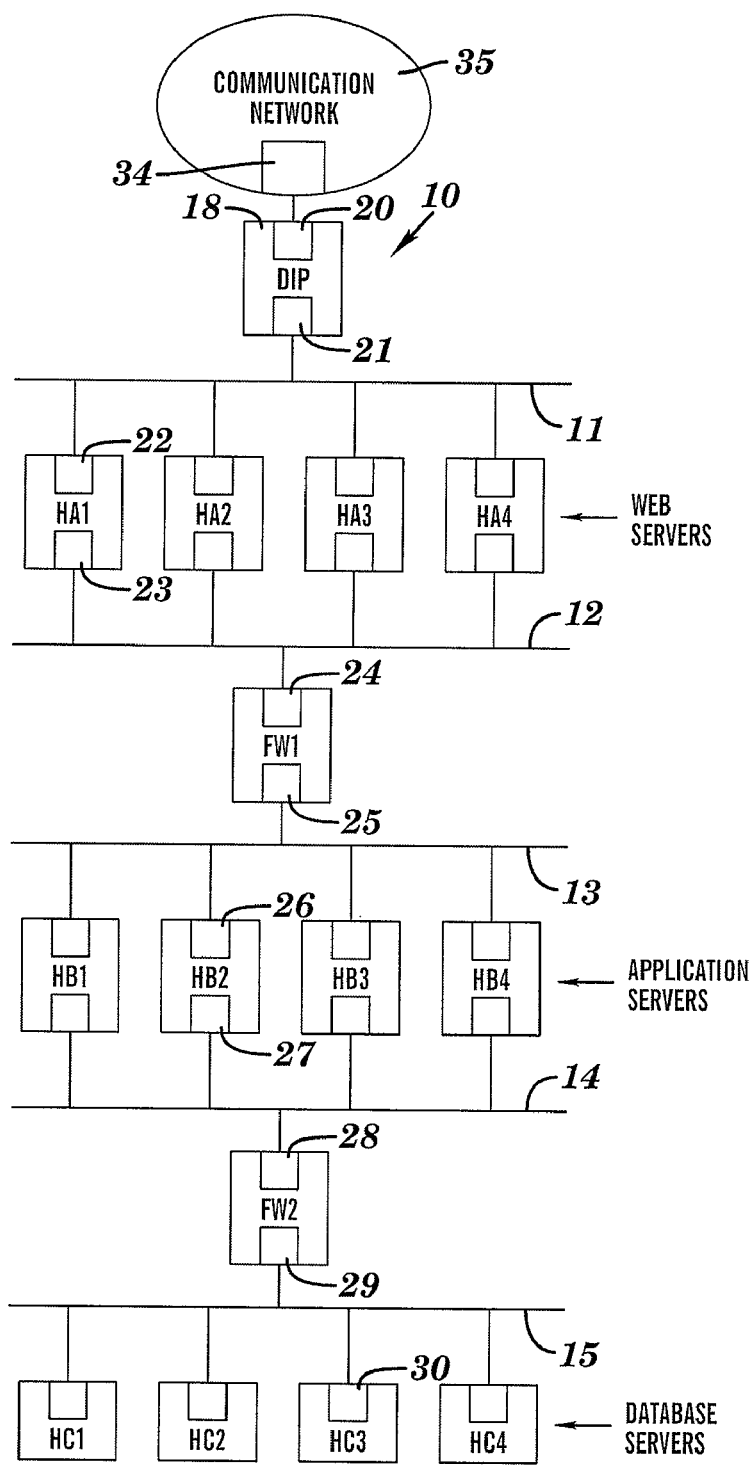
FIG. 31 depicts an IT structure connected to a communication network at one or more interfaces of the communication network, in accordance with embodiments of the present invention.

FIG. 31 depicts an IT structure 10 connected to a communication network 35 at one or more interfaces (e.g., interface 34) of the communication network, in accordance with embodiments of the present invention. The IT structure 10 is comprised by an IT system. The communication network 35 may comprise a local area network (LAN), a wide area network (WAN), a public switched telephone network (PSTN), an intranet, the Internet, a cable network operating in the radio-frequency domain and/or the Internet Protocol (IP) domain, a wired network (e.g., using copper), telephone network, packet network, an optical network (e.g., using optical fiber), a wireless network, etc.

The IT structure 10 comprises a host network that includes devices, network segments and network interfaces. The devices are hardware devices and may comprise, inter alia, servers, computers, routers and firewalls. The present invention also refers to devices as "hosts". The hosts in FIG. 31 are firewalls FW1 and FW2, and non-firewall hosts (e.g., servers). The non-firewall hosts comprise HA1, HA2, HA3, HA4, HB1, HB2, HB3, HB4, HC1, HC2, HC3, and HC4. As an example, HA1, HA2, HA3, HA4 may be web servers, HB1, HB2, HB3, HB4 may be application servers, and HC1, HC2, HC3, HC4 may be database servers, as indicated. The host network further comprises a Designated Interconnection Point (DIP) 18, which is a host that is directly connected to the communication network 35 (e.g., the Internet). The DIP 18 may be a firewall or a non-firewall host.

A host is said to be directly connected to the communication network 35 if a continuous path connecting the host to the communication network 35 does not comprise another host. Similarly, a first host is said to be directly connected to a second host if a continuous path connecting the first host to the second host does not comprise another host.

Network segments 11-15 are depicted in FIG. 31 by horizontal lines may represent a hub or VLANS (virtual LANs) implemented in network switches (which could be present as entities within the IT class hierarchy). The network segments may also represent a token ring MAU (media-access unit) or Ethernet 10B2 coaxial cable in a network topology configuration.

The hosts (i.e., devices) are connected to the network segments 11-15, as well as to the communication network 35, via network interfaces. In FIG. 31, representative network interfaces 20-30 have assigned reference numerals (20-30) for illustrative purposes, while other network interfaces are likewise depicted but are not assigned reference numerals so as to not clutter the Figures with too many reference numerals. These interfaces are electronic units that are either separable physical parts of the hosts, or are an integral part of the hosts. The DIP 18 has interfaces 20 and 21. A host can have more than one network interface, but a host will always have at least one network interface. A router, a firewall, and a DIP have more than one network interface. A computer or server often may have more than one network interface, either for routing or for high availability purposes. An example of a network interface is a Token Ring card, an Ethernet adapter, and a serial line interface.

A network interface is associated with an Internet Protocol (IP) address. When a given network interface has more than one assigned IP address assigned (e.g., in a technique called "IP aliasing"), the present invention views such a given network interface as having multiple network interfaces, the number of such interfaces of the multiple interfaces being the number of IP addresses assigned to said given network interface.

The network interfaces of a firewall have a property indicating the level of their security. A "secure" interface is the one that connects the firewall to the network segment on which the hosts are being protected by the firewall from an external attack (e.g., interfaces 25 and 29 of firewalls FW1 and FW2, respectively). A "non-secure" interface is the interface that connects the firewall to the network segment through which such an external attack is not protected against by the firewall (e.g., interfaces 24 and 28 of firewalls FW1 and FW2, respectively).

The hosts in the host network of the IT structure 10 are either servers or firewalls. A firewall has at least one secure interface and at least one non-secure interface.

A collection of hosts contained within a given IT structure comprises information about the IP addresses assigned to the network interfaces, along with their netmasks; this information is referred to as "the network topology" of the given IT structure. That topology can be represented by a graph whose vertices represent hosts, and whose edges show direct network links (e.g. hosts between which the packet delivery is local in the IP context; in other words, hosts which are connected to the same VLAN).

4.2 Cross-Zone Connections

Figure 32:
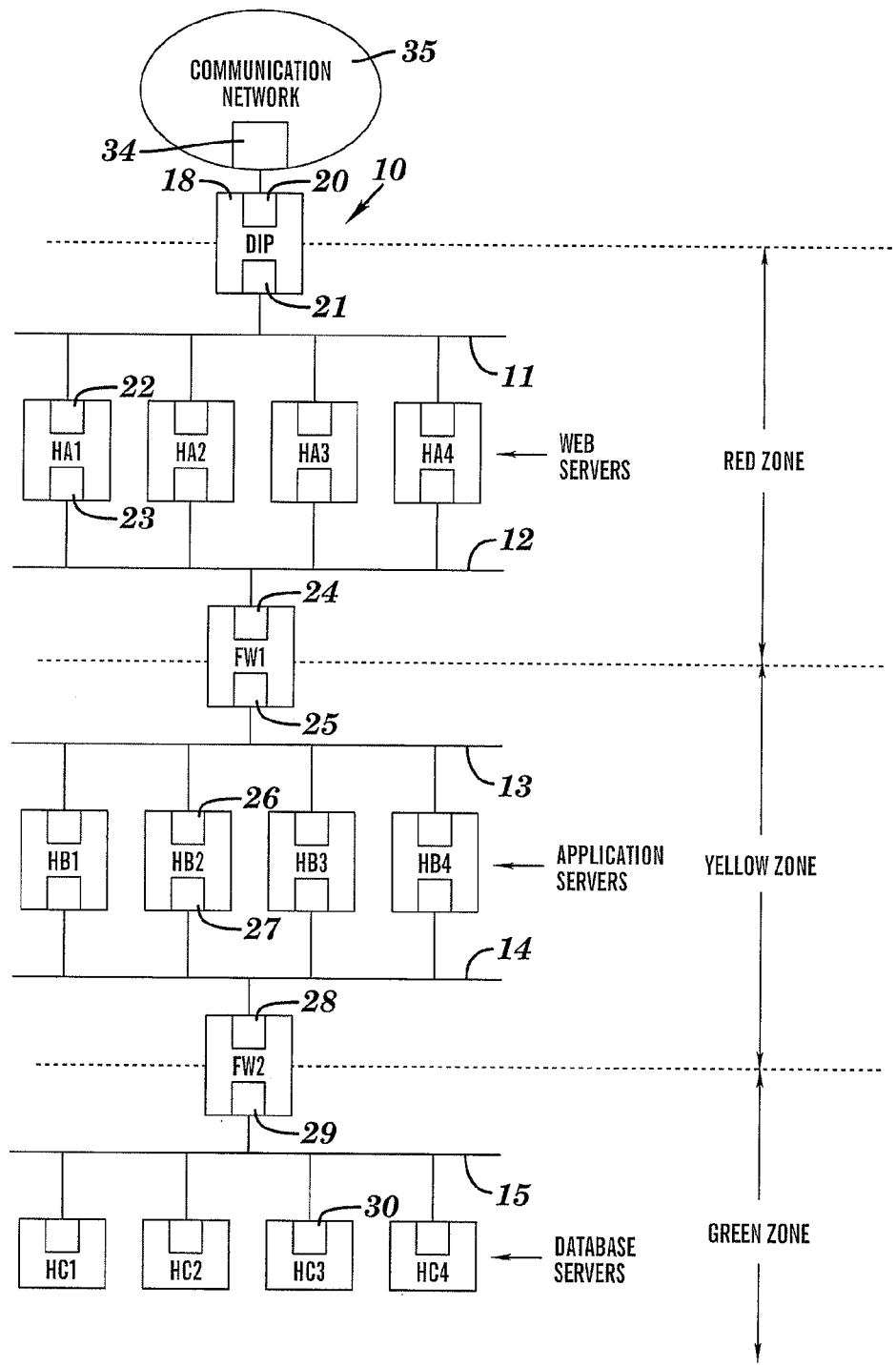
FIG. 32 depicts FIG. 31 with three security zones, in accordance with embodiments of the present invention.

A typical IT delivery environment may comprise a "security zone", which represents a set of devices, access to any of which from the designated front end firewall or other designated interconnection point is performed through an equal number of firewalls. FIG. 32 depicts FIG. 31 with three security zones, in accordance with embodiments of the present invention. The three security zones in FIG. 32 are denoted as RED ZONE, YELLOW ZONE, and GREEN ZONE, reflecting the fact that security zones may be assigned colors according to a security risk that each security zone of the IT structure entails. In the example of FIG. 32, the RED ZONE pertains to devices (HA1, HA2, HA3, HA4) having a highest security exposure by being directly reachable from the Communication Network 35 (e.g., the Internet). The YELLOW ZONE pertains to devices (HB1, HB2, HB3, HB4) separated from the Internet by a firewall FW1 that allows the devices in the YELLOW ZONE to have only verified connections from devices in the RED ZONE. The GREEN ZONE pertains to devices (HC1, HC2, HC3, HC4) separated from the Internet by a firewalls FW1 and FW2, and is a relatively secure zone that allows the devices in the GREEN ZONE to have only verified connections from devices in the YELLOW ZONE. In other cases, and in cases where administrative access from the hosting organization is needed, there may be more security zones.

For a cross-zone connection, the same host has one or more interfaces in one security zone, and one or more interfaces in a different security zone. A cross-zone connected firewall is a firewall that is connected to the communication network 35 by a first continuous path and a second continuous path such that the first and second continuous paths do not each comprise a same number of firewalls. In FIG. 32, for example, there are no cross zone connections or cross-connected firewalls. Assuming that the DIP 18 is a firewall, all continuous paths that connect the firewall FW1 to the communication network 35 have exactly one firewall, namely the DIP 18, and all continuous paths that connect the firewall FW2 to the communication network 35 have exactly two firewalls, namely FW1 and the DIP 18.

Figure 33:
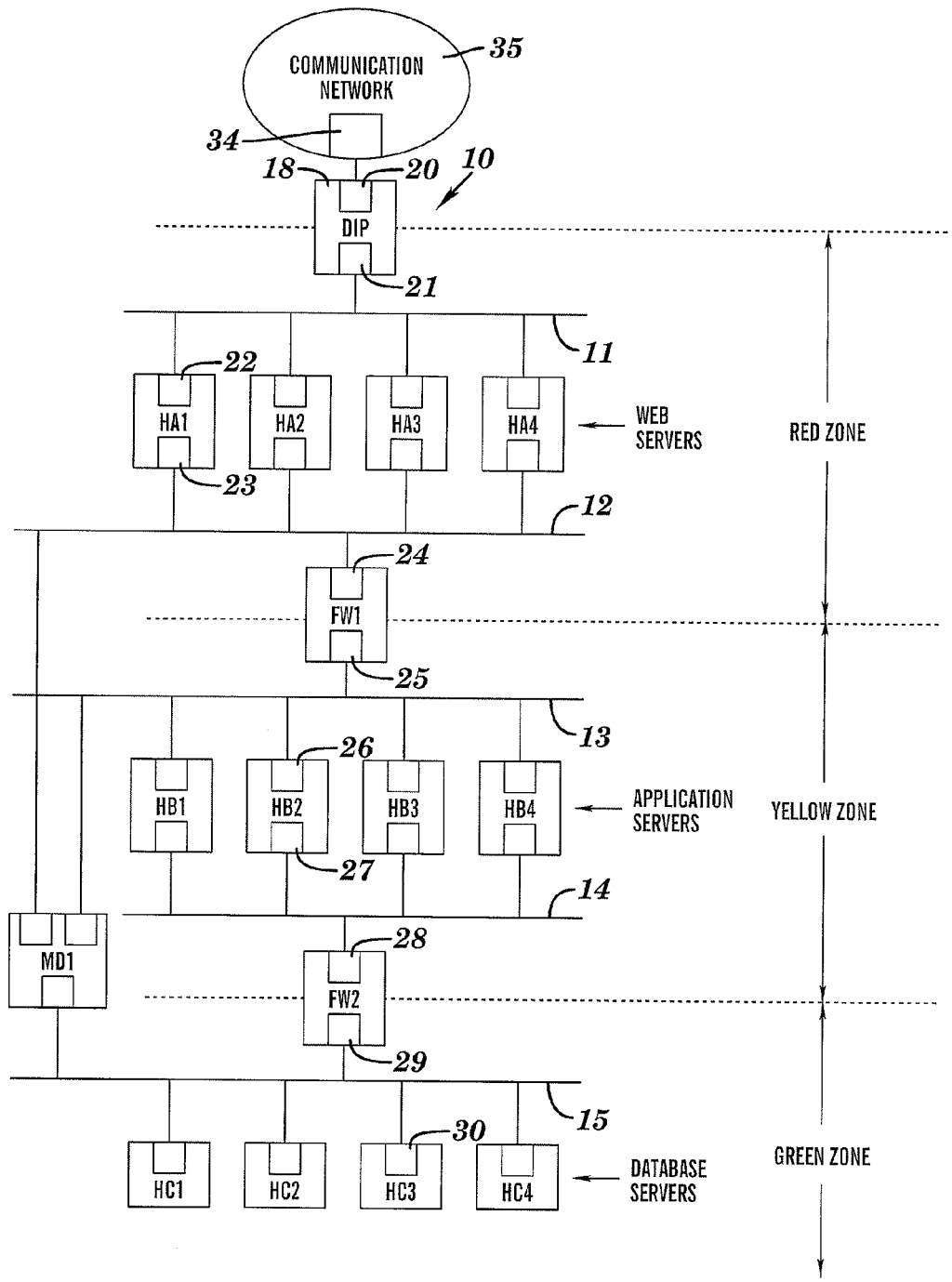
FIG. 33 depicts FIG. 32 with an additional host, namely a management node, in accordance with embodiments of the present invention.

FIG. 33 depicts FIG. 32 with an additional host, namely a management node MD1 which is a non-firewall host, in accordance with embodiments of the present invention. In FIG. 33, both FW1 and FW2 are cross-zone connected firewalls. Assume that the DIP 18 is a firewall. FW1 is a cross-zone connected firewall, because FW1 is connected to the communication network 35 by a continuous path that includes only one firewall (e.g., the path through HA1 and the DIP 18), and FW1 is also connected to the communication network 35 by a continuous path that includes two firewalls (e.g., the path through HB1, FW2, MD1, HA1, and the DIP 18). FW2 is a cross-zone connected firewall, because FW2 is connected to the communication network 35 by a continuous path that includes only one firewall (e.g., the path through MD1, HA1, and the DIP 18), and FW2 is also connected to the communication network 35 by a continuous path that includes two firewalls (e.g., the path through HB1, FW1, HA1, and the DIP 18).

With a cross-zone connection and an associated cross-zone connected firewall, it is possible for data traffic between the two security zones to bypass the firewall separating the zones and avoid inspection. In FIG. 33, for example, data traffic between the RED ZONE and the YELLOW ZONE can bypass the firewall FW1 by flowing through the management node MD1 host.

4.3 Isolated Network Segments

If there is no continuous path connecting a host to the communication network 35, then such a host is called an "isolated host". A firewall that is an isolated host, and thus not connected to the communication network 35, is called an "isolated firewall". All network segments to which an isolated host is connected are called "isolated network segments". Thus, there is no continuous path connecting an isolated network segment to the communication network 35.

Figure 34:
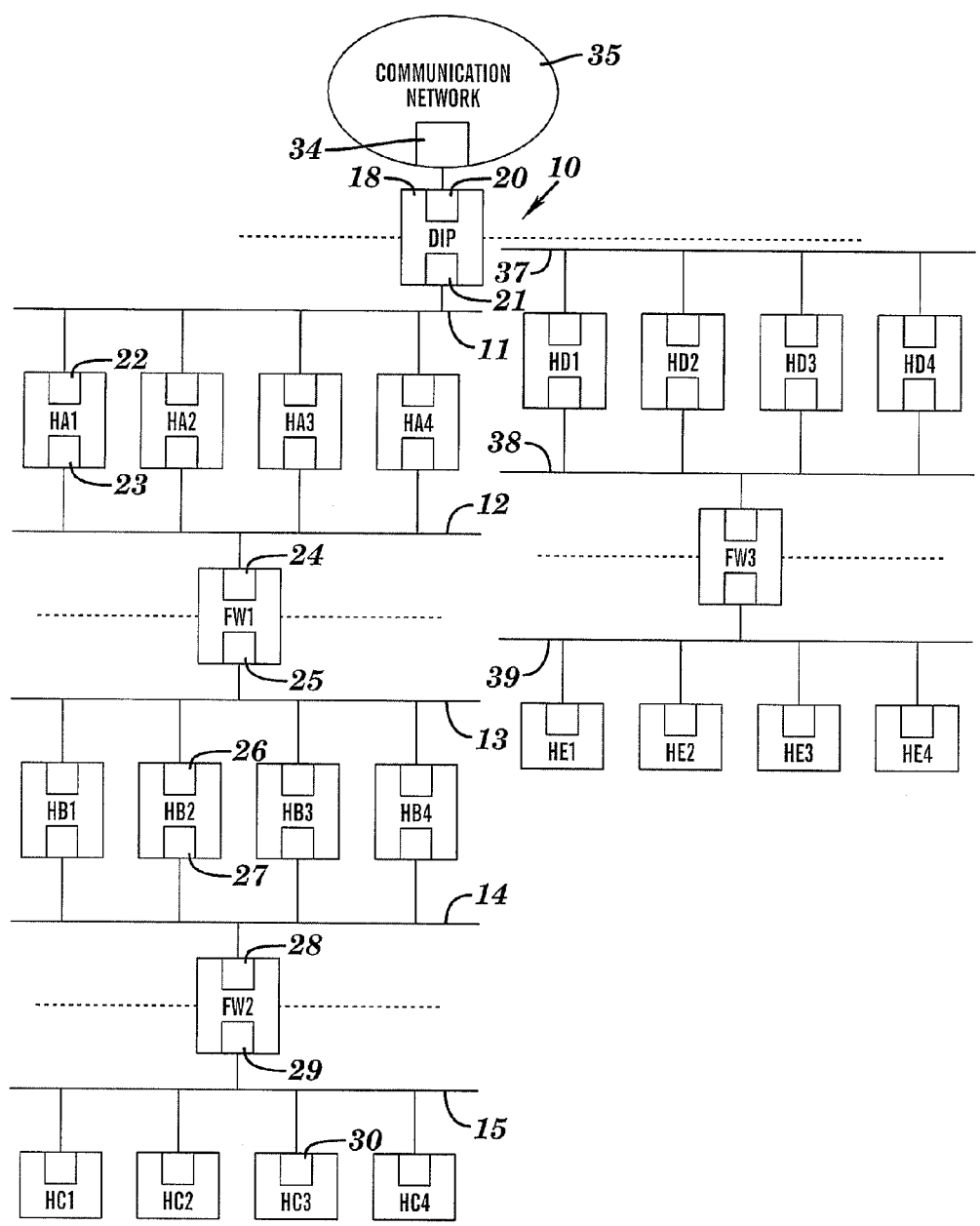
FIG. 34 depicts FIG. 32 with additional hosts and additional network segments, in accordance with embodiments of the present invention.

FIG. 34 depicts FIG. 32 with additional hosts and additional network segments 37-39, in accordance with embodiments of the present invention. The additional hosts include firewall FW3 and non-firewall hosts HD1, HD2, HD3, HD4, HE1, HE2, HE3, and HE4. Each additional host in FIG. 34 is an isolated host, because there is no continuous path connecting each additional host to the communication network 35. Thus, the firewall FW3 is an isolated firewall.

The additional hosts are attached to the additional network segments 37-39 as shown. Thus, each network segment of network segments 37-39 is an isolated network segment.

4.4 Algorithm for Determining a Firewall Connectivity Indication

The present invention discloses an algorithm for determining a firewall connectivity indication pertaining to the existence or non-existence of cross-zone connections and isolated network segments. The algorithm analyzes a host network for the existence or non-existence of malconnected firewalls. A "malconnected firewall" is defined as a an isolated firewall or a cross-zone connected firewall.

Figure 35:
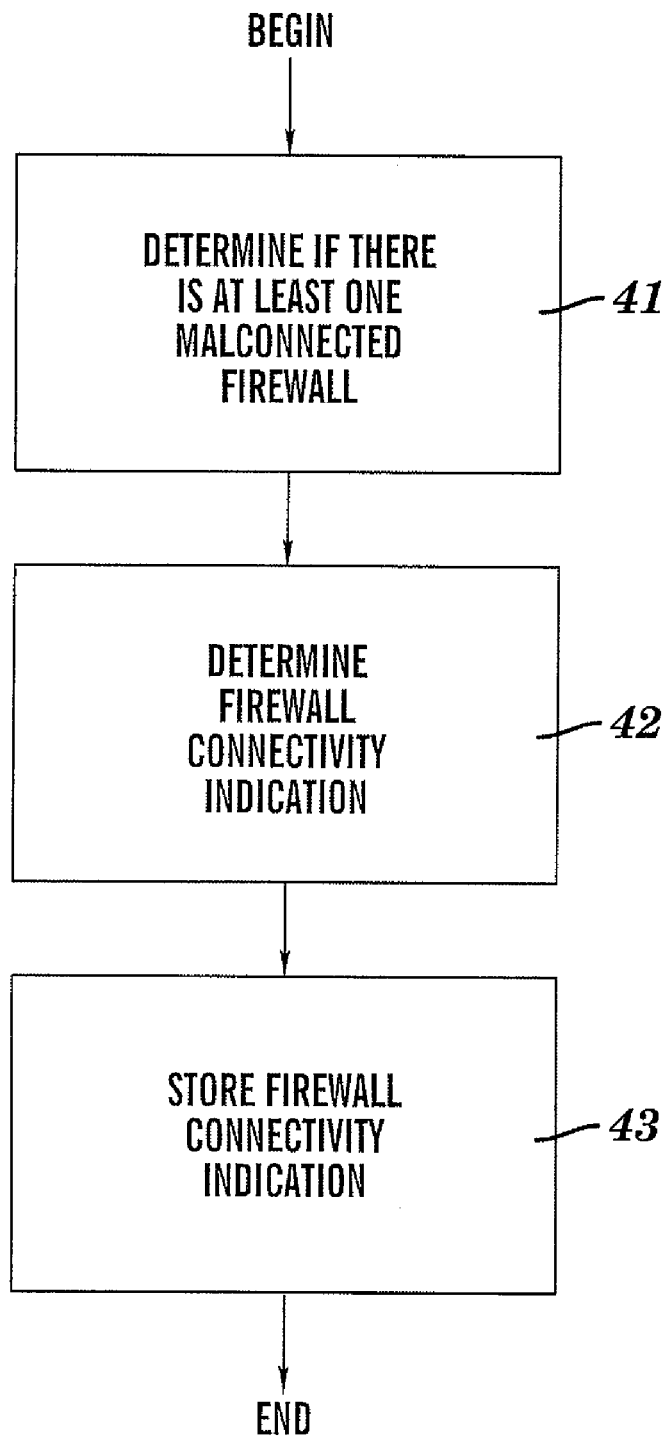
FIG. 35 is a flow chart depicting a method for determining a firewall connectivity indication for a host network of an IT structure of an IT system, in accordance with embodiments of the present invention.

FIG. 35 is a flow chart depicting a method for determining a firewall connectivity indication for a host network of an IT structure of an IT system, in accordance with embodiments of the present invention. The host network comprises a plurality of hosts including at least one server and at least one firewall. The hosts are configured to be interconnected within the host network via interfaces comprised by the hosts. Each server is a hardware server having at least one interface. Each firewall is a hardware firewall having at least two interfaces. The host network is connected to at least one interface of a communication network. The flow chart of FIG. 35 comprises steps 41-43.

Step 41 determines whether the at least one firewall comprises at least one malconnected firewall, wherein a malconnected firewall is an isolated firewall or a cross-zone connected firewall. An isolated firewall is a firewall that is not connected to the communication network. A cross-zone connected firewall is a firewall that is connected to the communication network by a first continuous path and a second continuous path such that the first and second continuous paths do not each comprise a same number of firewalls.

Step 42 determines the firewall connectivity indication from said determining whether the at least one firewall comprises at least one malconnected firewall. The firewall connectivity indication indicates that the host network comprises at least one malconnected firewall or that the host network does not comprise at least one malconnected firewall.

Figure 20:
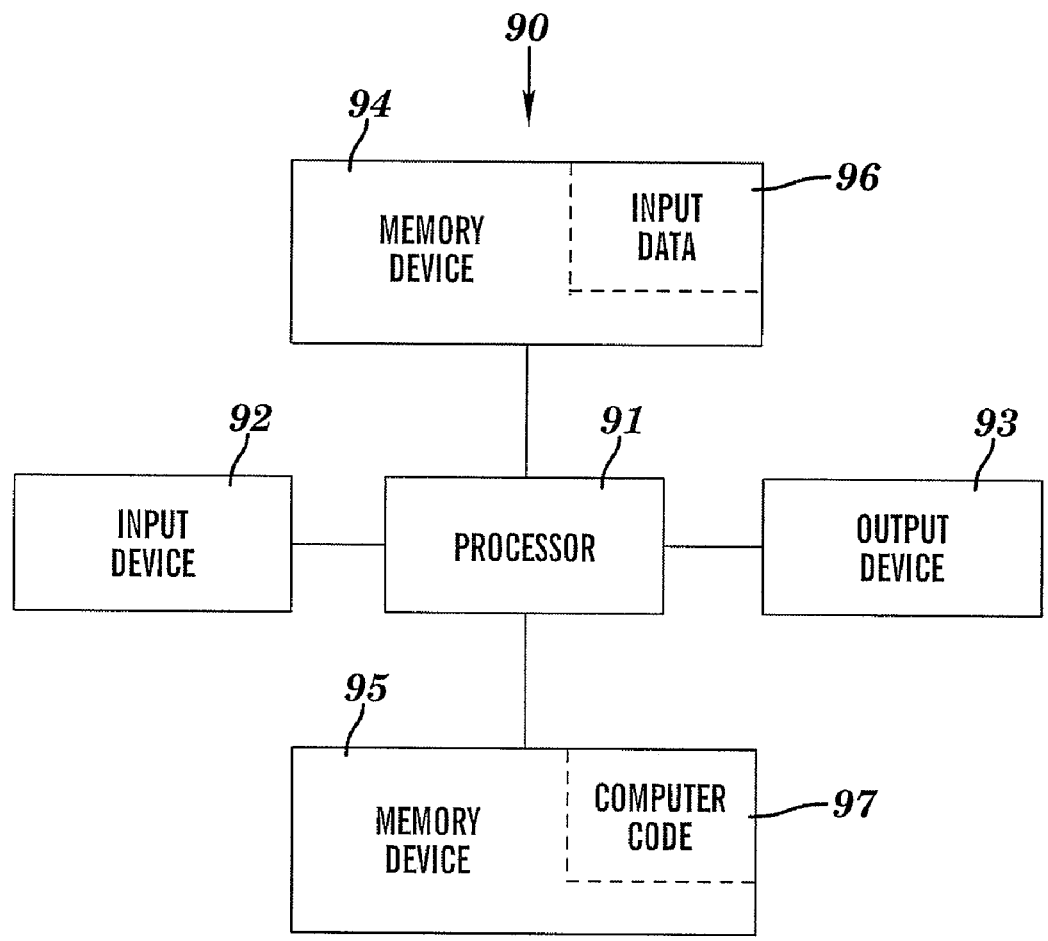
FIG. 20 illustrates a computer system used for implementing verification of correctness of networking aspects of an IT system, in accordance with embodiments of the present invention.

Step 43 stores the firewall connectivity indication in a computer-readable storage medium of a computer system (e.g., the computer system 90 of FIG. 20).

In one embodiment pertaining to step 42, said determining whether the at least one firewall comprises at least one malconnected firewall comprises: determining that the at least one firewall does not comprise an isolated firewall followed by determining whether the at least one firewall comprises a cross-zone connected firewall.

In one embodiment pertaining to step 42, said determining whether the at least one firewall comprises at least one malconnected firewall comprises: executing an algorithm which determines concurrently whether the at least one firewall comprises an isolated firewall and whether the at least firewall comprises at least one cross-zone connected firewall.

In one embodiment pertaining to step 42, said determining whether the at least one firewall comprises at least one malconnected firewall comprises determining for each firewall whether each firewall is a malconnected firewall.

In one embodiment pertaining to step 42, said determining whether the at least one firewall comprises at least one malconnected firewall comprises determining for each firewall whether each firewall is a malconnected firewall. Said determining whether the at least one firewall comprises at least one malconnected firewall may comprise identifying at least one cross-zone connected firewall comprised by the at least one firewall.

In one embodiment pertaining to step 42, said determining whether the at least one firewall comprises at least one malconnected firewall comprises determining for each firewall whether each firewall is a malconnected firewall. Said determining whether the at least one firewall comprises at least one malconnected firewall may comprise identifying at least one isolated firewall comprised by the at least one firewall.

Figure 36:
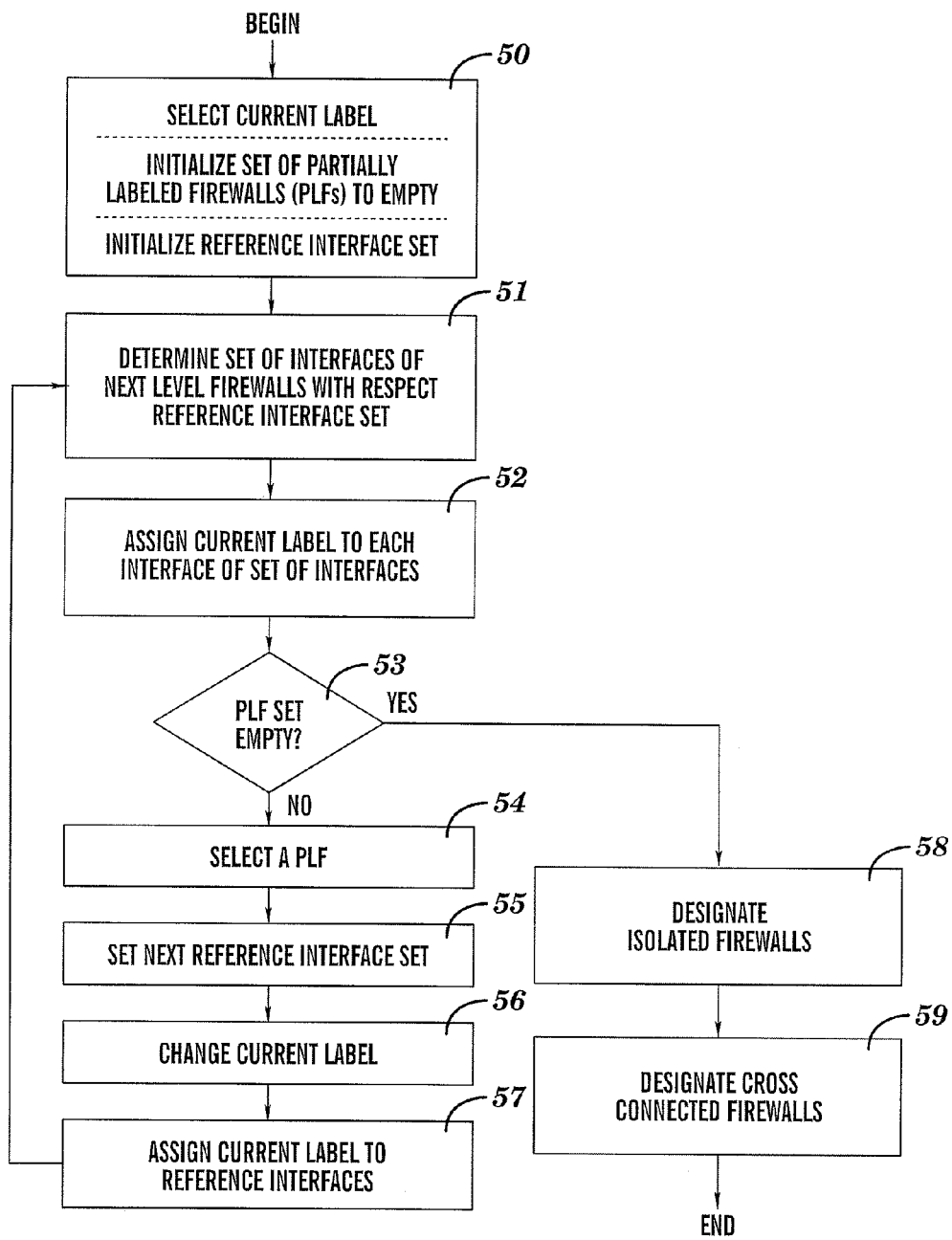
FIG. 36 is a flow chart describing an embodiment for implementing a step of FIG. 35 that determines for each firewall whether said each firewall is a malconnected firewall, in accordance with embodiments of the present invention.

In one embodiment pertaining to step 42, said determining whether the at least one firewall comprises at least one malconnected firewall comprises determining for each firewall whether each firewall is a malconnected firewall, which may be implemented according to the algorithm of FIG. 36, described infra.

FIG. 36 is a flow chart describing an embodiment for implementing step 42 of FIG. 35 for determining for each firewall whether said each firewall is a malconnected firewall, in accordance with embodiments of the present invention. The flow chart of FIG. 36 comprises steps 50-59. Concrete examples illustrating usage of the algorithm of FIG. 36 are presented infra in Section 4.6.

Step 50 performs an initialization comprising: selecting a current label from an ordered sequence of different labels, setting a set of partially labeled firewalls to an empty set; and setting a set of reference interfaces to the at least one interface of the communication network.

Labels in the ordered sequence of different labels will be selectively assigned to interfaces of hosts in steps 52 and 57 as described infra. The ordered sequence of different labels may comprise integers (e.g., the ordered sequence 1, 2, 3, . . . ), letters (e.g., the ordered sequence A, B, C . . . ), ASCII characters, astrological symbols, etc. Any list of symbols, words, etc. may be used as the ordered sequence of different labels. As an example, the ordered list may be color numbers (e.g., positive integers) representing different colors (e.g., red, yellow, green, etc.). In representing the host network graphically, the interfaces may be "painted" with the different colors, or otherwise labeled, as will be described infra.

A "partially labeled firewall" (PLF) is a firewall having at least one interface labeled and one or more interfaces unlabeled. Reference interfaces are host interfaces from which paths lead to next level firewalls with respect to firewalls sequenced along paths of the host network (see FIGS. 31-34).

Steps 51-57 execute one iteration of a loop of iterations over partially labeled firewalls (PLFs). Each interface of each firewall is unlabeled upon initiation of execution of the loop.

Step 51 determines a set of interfaces that includes each unlabeled interface of next level firewalls (i.e., of each firewall that is connected to at least one reference interface of the set of reference interfaces) via at least one continuous path that does not include any firewall of the host network.

Step 52 assigns the current label to each interface of the set of interfaces, resulting in the set of partially labeled firewalls (PLFs) being updated in accordance with said assigning the current label. Each firewall having one or more interfaces so assigned with the current label is: (1) a totally labeled firewall after performance of step 52 if all interfaces of said each firewall are labeled; or (2) a partially labeled firewall (PLF) after performance of step 52 if at least one but not all interfaces of said each firewall are unlabeled. The set of PLFs is updated accordingly.

Step 53 ascertains whether the set of partially labeled firewalls is empty. If step 53 ascertains that the set of partially labeled firewalls is empty then the loop is exited and steps 58 and 59 are next performed; otherwise step 54 (within the loop) is next performed.

Step 54 selects a next partially labeled firewall (PLF) from the set of partially labeled firewalls. If there is more than one firewall in the set of partially labeled firewalls, then the firewall may be selected randomly or in any other manner such as the first or last firewall from a list containing the set of partially labeled firewalls.

Step 55 sets the set of reference interfaces as consisting of all unlabeled interfaces in the next partially labeled firewall selected in step 54.

Step 56 changes the current label to be the next label immediately after the current label in the ordered sequence of different labels.

Step 57 assigns the current label (from step 56) to each firewall interface of the set of reference interfaces (from step 55).

After step 57 is performed, the current iteration is exited by looping back to step 51 to initiate performing the next iteration for the next set of reference interfaces determined in step 55.

After the loop is exited by satisfying the test in step 53 of the set of partially labeled firewalls being empty, step 58 designates isolated firewalls (if any) and step 59 designates cross-zone connected firewalls (if any)

Step 58 designates each firewall having no labeled interface as an isolated firewall.

Step 59 designates each firewall comprising an interface with an assigned label as not being a cross-zone connected firewall if each interface of said each firewall has an assigned label and the labels assigned to the interfaces of said each firewall consist of two labels appearing consecutively in the ordered sequence of different labels. Otherwise each firewall comprising an interface with an assigned label is designated as being a cross-zone connected firewall.

For example, if the labels in the ordered sequence of different labels are consecutive color numbers represented as consecutive integers, then any two labels appearing consecutively in the ordered sequence of different labels will have the characteristic of differing by the integer 1.

After steps 58 and 59 are performed, the method ends.

Figure 37:
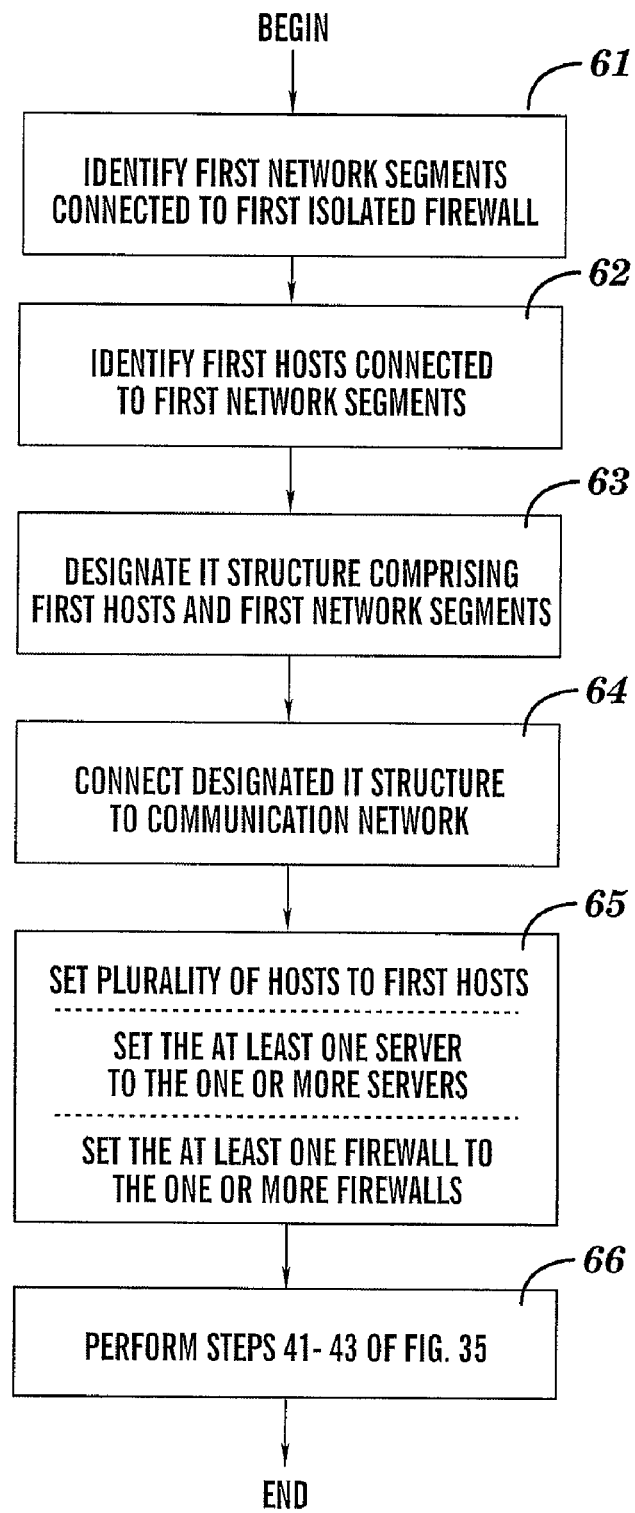
FIG. 37 is a flow chart depicting post-processing after the method of FIG. 35 determines that the host network comprises a first isolated firewall, in accordance with embodiments of the present invention.

FIG. 37 is a flow chart depicting post-processing after the method of FIG. 35 determines that the host network comprises a first isolated firewall, in accordance with embodiments of the present invention. The flow chart of FIG. 37 comprises steps 61-66.

Step 61 identifies first network segments as consisting of all network segments of the host network to which the first isolated firewall is connected.

Step 62 identifies first hosts as consisting of all hosts of the host network which are connected to the first network segments identified in step 61, wherein the first hosts comprise one or more firewalls of the at least one firewall and one or more servers of the at least one server.

Step 63 designates an IT structure that comprises the first network segments and the first hosts.

Step 64 connects the designated IT structure to the communication network at an interface of a host of the first hosts.

Step 65 performs setting steps comprising setting the plurality of hosts to the first hosts, setting the at least one server to the one or more servers, and setting the at least one firewall to the one or more firewalls.

Step 66 performs steps 41-43 of FIG. 35, namely: performing said determining whether the at least one firewall comprises at least one malconnected firewall (step 41), said determining the firewall connectivity indication (step 42), and said storing the firewall connectivity indication (step 43).

4.5 Algorithm For Determining Isolated Network Segments

The present invention discloses an algorithm for determining isolated network segments.

Figure 38:
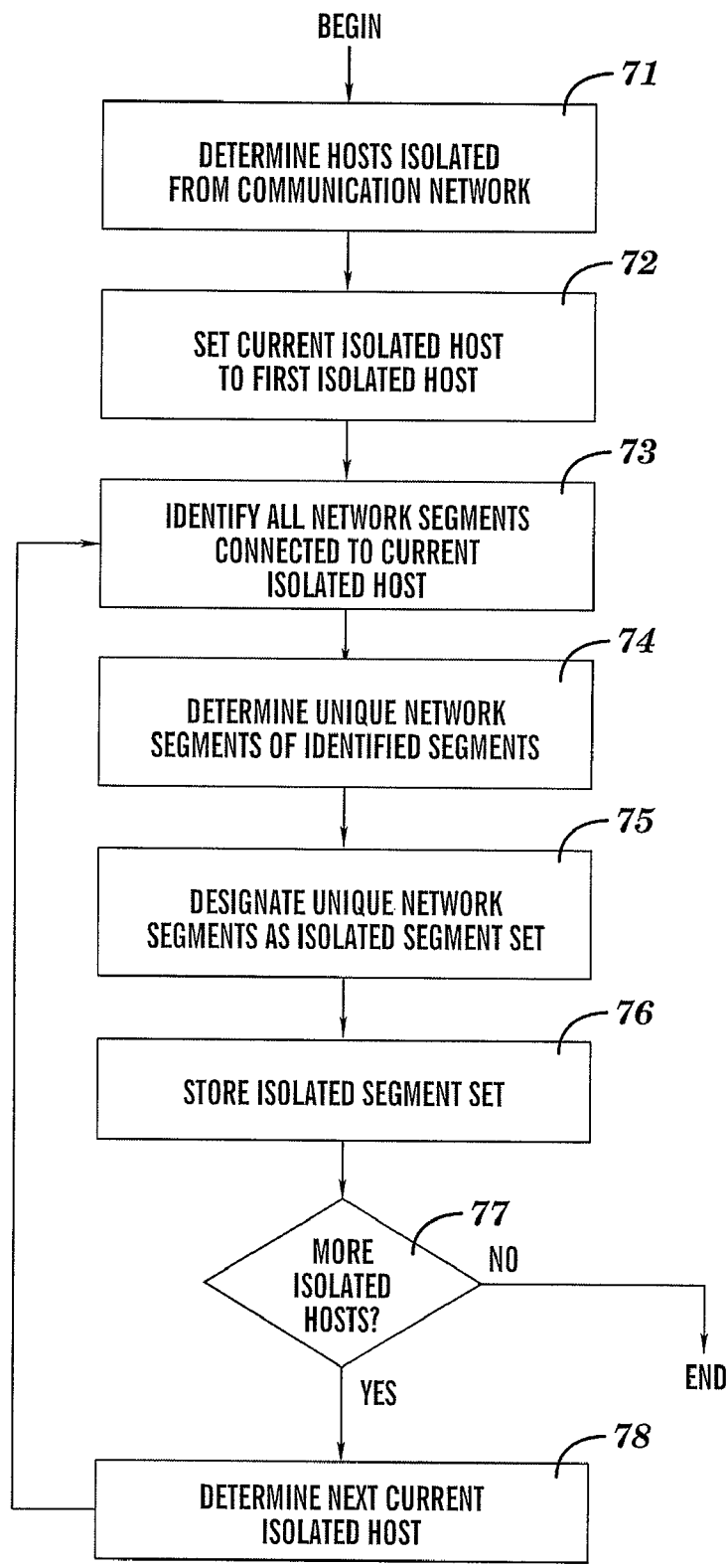
FIG. 38 is a flow chart depicting a method for determining whether one or more isolated network segments exit within a host network comprised by an IT structure of an IT system, in accordance with embodiments of the present invention.

FIG. 38 is a flow chart depicting a method for determining whether one or more isolated network segments exit within a host network comprised by an IT structure of an IT system, in accordance with embodiments of the present invention. The host network comprises a plurality of hosts. The hosts are configured to be interconnected within the host network via interfaces comprised by the hosts. Each host has at least one interface. The host network is configured to be connected to at least one interface of a communication network. The flow chart of FIG. 38 comprises steps 71-78.

Step 71 determines that at least one host of the plurality of hosts is isolated from the communication network, including determining for each host whether the host is isolated from the communication network Step 72 sets a current isolated host to the first isolated host determined in step 71.

Steps 73-78 execute one iteration of a loop of iterations over isolated hosts, each iteration being specific to the current isolated host, which is dynamically updated in step 78.

Step 73 identifies all network segments connected the current isolated host

Step 74 determines the unique network segments identified in step 73.

Step 75 designates the unique network segments as a set of isolated network segments.

Step 76 stores the set of isolated network segments in a computer readable storage medium of a computer system (e.g., the computer system 90 of FIG. 20).

Step 77 ascertains whether there are any remaining isolated hosts (from step 71) not yet processed in the loop of steps 73-78. If step 77 ascertains that there are no remaining isolated hosts processed then the loop is exited and the method ends; otherwise step 78 (within the loop) is next performed.

Step 78 determines the next current isolated host by selecting an isolated host from the remaining isolated hosts yet to be processed. The next current isolated host may be selected by any selection method such as being selected randomly or by being selected as a next sequential isolated host from an ordered set of isolated hosts determined in step 71.

After step 78 is performed, the current iteration is exited by looping back to step 73 to initiate performing the next iteration of the loop using the next current isolated host determined in step 78.

Figure 39:
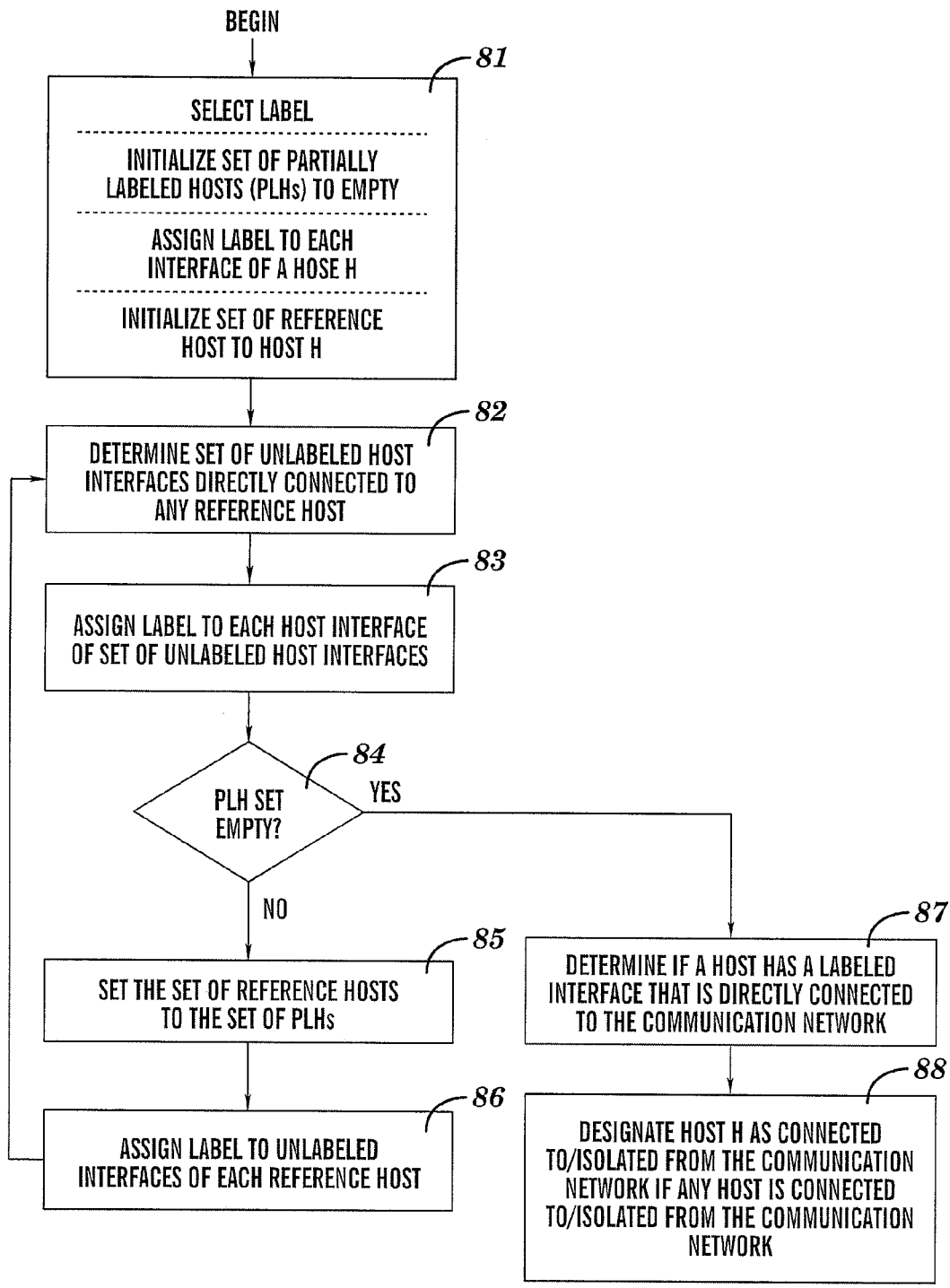
FIG. 39 is a flow chart describing an embodiment for implementing a step 71 of FIG. 37 that determines for each host represented as a host H whether the host H is isolated from the communication network, in accordance with embodiments of the present invention.

FIG. 39 is a flow chart describing an embodiment for implementing step 71 of FIG. 37 for determining for each host represented as a host H whether the host H is isolated from the communication network, in accordance with embodiments of the present invention. The flow chart of FIG. 39 comprises steps 81-88. Concrete examples illustrating usage of algorithm of FIG. 39 are presented infra in Section 4.7.

Step 81 performs an initialization comprising: selecting a label, setting a set of partially labeled hosts to an empty set, assigning the label to each interface of the host H, and setting a set of reference hosts as being the host H.

A label may be an integer (e.g., 1, 2, 3, . . . ), a letter (e.g., A, B, C . . . ), an ASCII character, an astrological symbol, etc. Any symbol, word, etc. may be used as the label. As an example, the label may be a color number (e.g., positive integer) representing any color (e.g., red, yellow, green, black, etc.). In representing the host network graphically, the interfaces may be "painted" with the selected label or color as will be described infra.

In the algorithm of FIG. 39, step 81 depicts selection of the label independently for each host processed. In one embodiment, the label is alternatively selected prior to the initialization step 81 and is a same label used for each host processed by the algorithm of FIG. 39.

A "partially labeled host" (PLH) is a host having at least one interface labeled and one or more interfaces unlabeled.

Steps 82-87 execute one iteration of a loop of iterations over sets of reference hosts. Each interface of each host is unlabeled upon initiation of execution of the loop.

Step 82 determines a set of host interfaces that includes each unlabeled interface of each host that is directly connected to any reference host.

Step 83 assigns the label to each host interface of the set of host interfaces, resulting in the set of partially labeled hosts (PLHs) being updated in accordance with said assigning the label. Each host having one or more interfaces so assigned with the label is: (1) a totally labeled host after performance of step 83 if all interfaces of said each host are labeled; or (2) a partially labeled host (PLH) after performance of step 83 if at least one but not all interfaces of said each host are unlabeled. The set of PLHs is updated accordingly.

Step 84 ascertains whether the set of partially labeled hosts is empty. If step 84 ascertains that the set of partially labeled hosts is not empty then step 85 is next executed; otherwise the loop is exited and steps 88 and 89 are next executed.

Step 85 sets the set of reference hosts as consisting of the set of next partially labeled hosts.

Step 86 assigns the label to each unlabeled interface of each reference host of the set of reference hosts determined in step 85.

After step 86 is performed, the current iteration is exited by looping back to step 82 to initiate performing the next iteration for the next set of reference hosts determined in step 85.

After the loop is exited by satisfying the test in step 84 of the set of partially labeled hosts being empty, step 87 determines if any host has a labeled interface that is directly connected to the communication network.

Step 88 designates host H as being connected to the communication network if step 87 has determined that said any host having a labeled interface that is directly connected to the communication network exists; otherwise step 88 designates host H as being isolated from the communication network.

After steps 87 and 88 are performed, the method ends.

4.6 Examples Using Algorithm for Determining a Firewall Connectivity Indication

This section presents examples using the algorithm of FIG. 36 described in Section 4.4 for determining a firewall connectivity indication. In these examples, there are no isolated hosts and the labels in the ordered sequence of different labels are consecutive color numbers represented as positive integers (i.e., the set 1, 2, 3, . . . ), so that any two labels appearing consecutively in the ordered sequence of different labels have the characteristic of differing by the integer 1.

Section 4.6.1 presents an example in which the host network has no cross-connected firewalls wherein the DIP is a firewall.

Section 4.6.2 presents an example in which the host network has no cross-connected firewalls wherein the DIP is a non-firewall host.

Section 4.6.3 presents an example in which the host network has cross-connected firewalls, wherein the interfaces of each cross-connected firewall each have a same assigned label as a result of executing the algorithm.

Section 4.6.4 presents an example in which the host network has a cross-connected firewall, wherein the interfaces of the cross-connected firewall do not appear consecutively in the ordered sequence of different labels as a result of executing the algorithm.

4.6.1 Example with No Cross-Connected Firewalls (DIP is a Firewall)

FIGS. 40A-40D (collectively "FIG. 40") depict an example in which the host network has no cross-connected firewalls wherein the DIP is a firewall, in accordance with embodiments of the present invention.

Figure 40A:
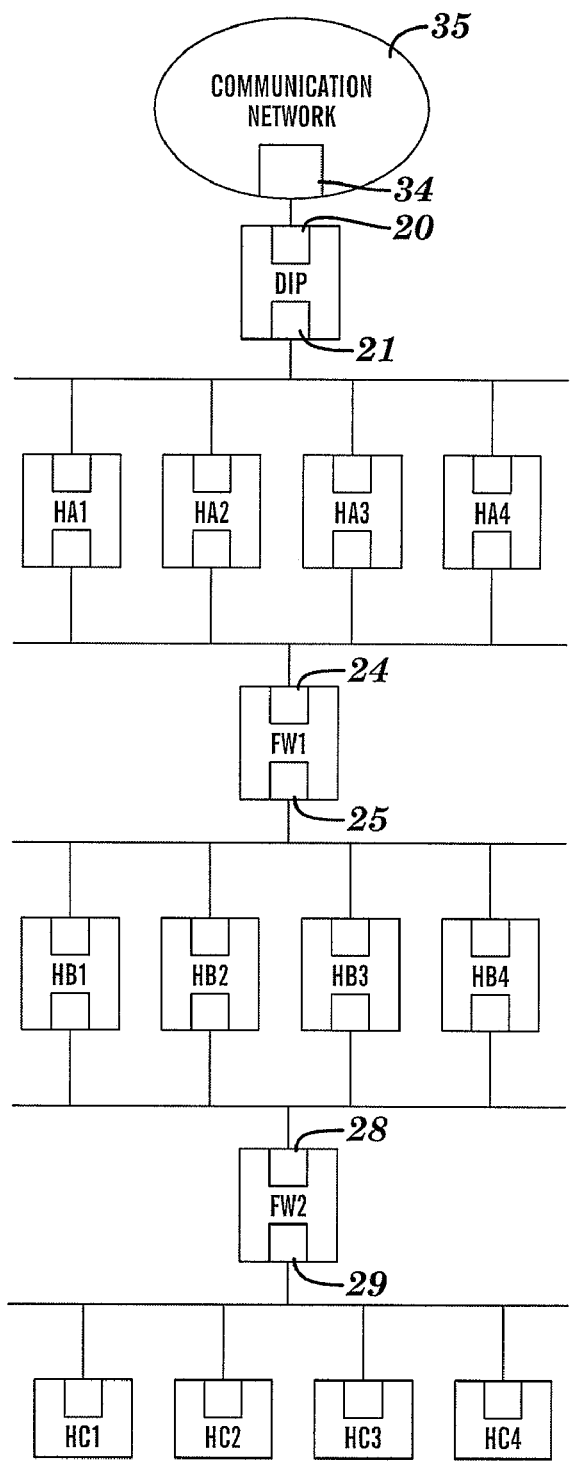
FIGS. 40A-40D depict an example in which the host network has no cross-connected firewalls wherein the DIP is a firewall, in accordance with embodiments of the present invention.
Figure 40B:
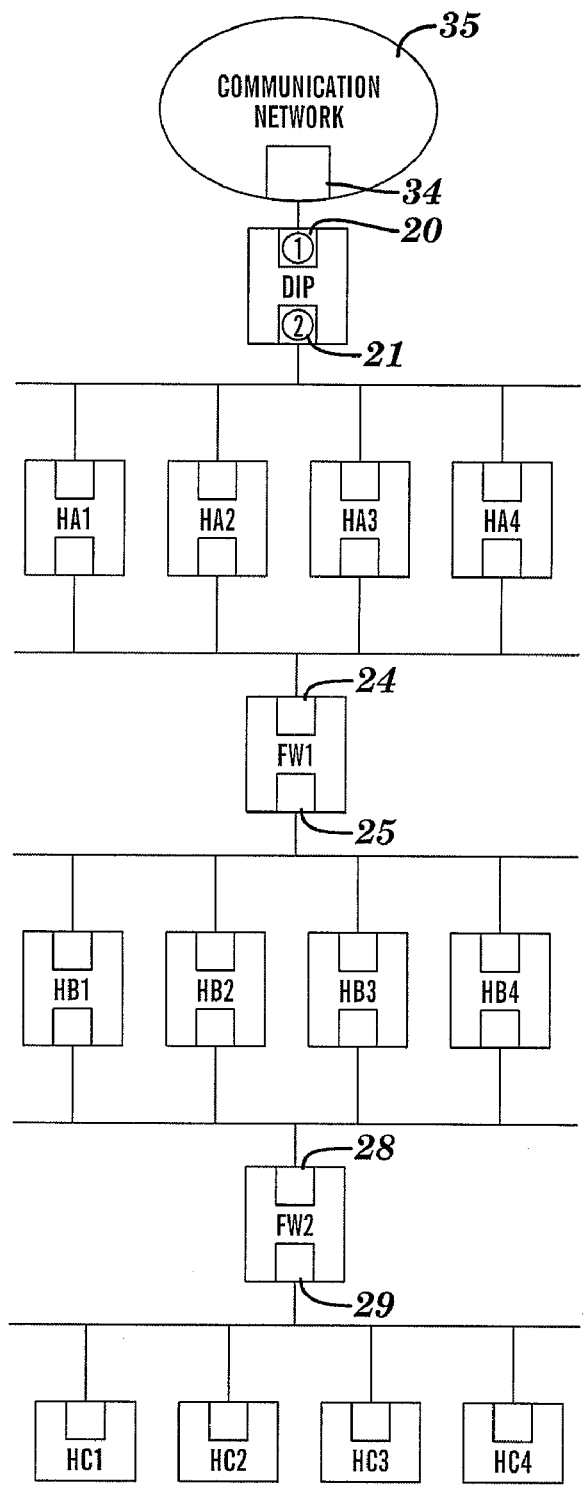
Figure 40C:
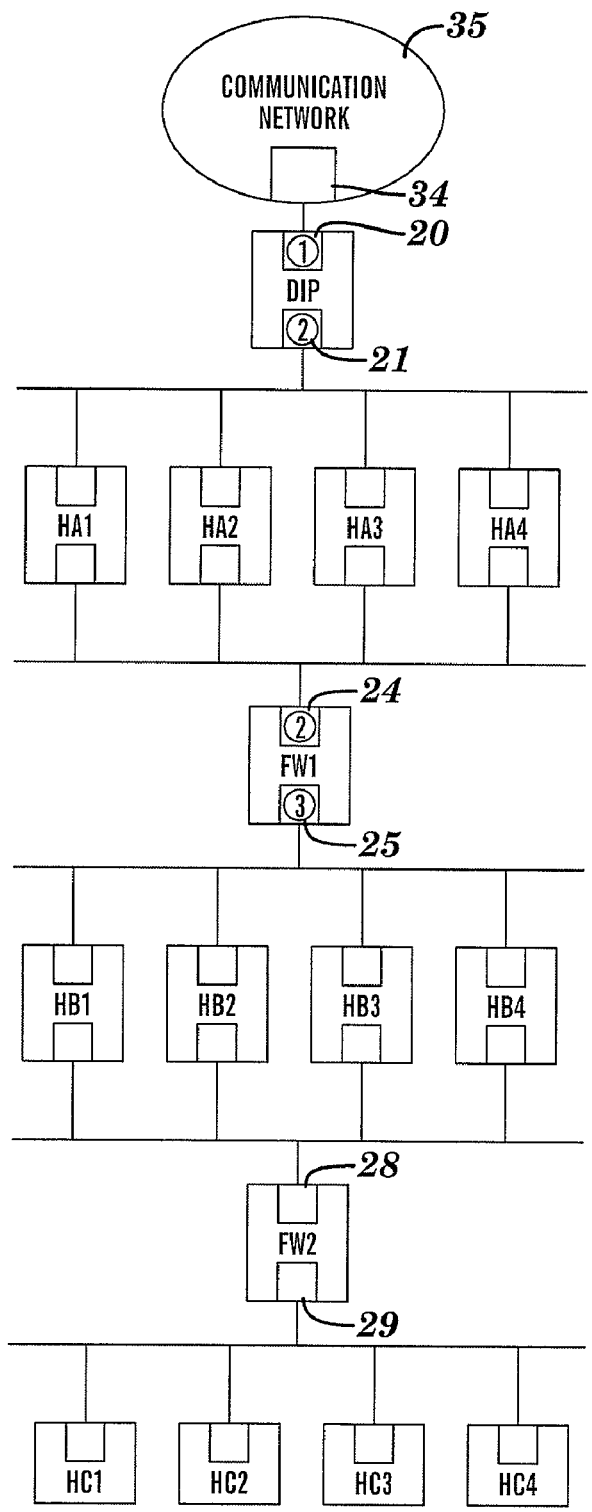
Figure 40D:
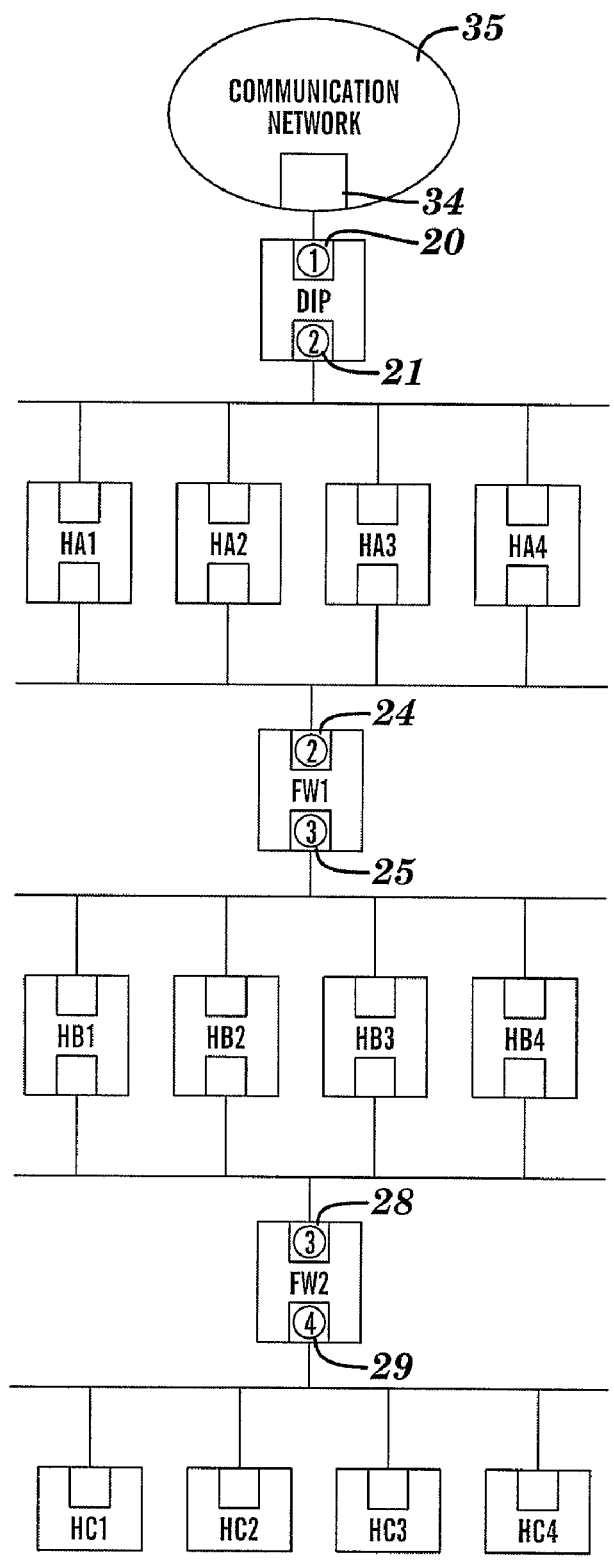

FIG. 40A depicts the IT structure 10 of FIG. 31, wherein the DIP is a firewall, and wherein all firewall interfaces (20-21, 24-25, 28-29) are initially unlabeled. FIGS. 40B-40D depict successive iterations of the loop of FIG. 36 in which firewall interfaces are labeled with positive integers beginning with integer 1 in the successive iterations. The labels may represent color numbers and each label in FIGS. 40B-40D is depicted as a positive integer within a circle. The initialization step 50 of FIG. 36 occurs for the IT structure in FIG. 40A, wherein the current label of 1 is selected from the ordered sequence of different labels, the set of partially labeled firewalls is set to an empty set, and a reference interface is set to the interface 34 of the communication network 35.

FIG. 40B depicts the result of executing the first iteration of the loop of FIG. 36. From the reference interface 34, step 51 of FIG. 36 determines a set of interfaces consisting of the unlabeled interface 20 of the next level firewall (DIP) reachable by a continuous path from the reference interface 34 such that the continuous path does not include any firewall of the host network. Step 52 of FIG. 36 assigns the current label of 1 (shown as 1 within a circle) to the interface 20 in the set of interfaces established in step 51. The set of partially labeled firewalls (PLFs) is updated to consist of the DIP firewall in accordance with the assigning of the current label 1 to the interface 20 of the DIP firewall, which resulted in the DIP being the only partially labeled firewall. Step 53 of FIG. 36 ascertains that the set of partially labeled firewalls is not empty. Step 54 of FIG. 36 selects the next partially labeled firewall (DIP) from the set of partially labeled firewalls. Step 55 of FIG. 36 sets the set of reference interfaces as consisting of the unlabeled interface 21 in the selected partially labeled firewall (DIP). Step 56 of FIG. 36 changes the current label to be the next label (2) immediately after the current label (1) in the ordered sequence of different labels. Step 57 of FIG. 36 assigns the current label 2 to the DIP firewall interface 21 of the set of reference interfaces. Then the first iteration ends. The first iteration has labeled interfaces 20 and 21 of the firewall DIP, respectively.

FIG. 40C depicts the result of executing the second iteration of the loop of FIG. 36. The second iteration starts with the IT structure of FIG. 40B which exists at the end of the first iteration. From the reference interface 21, step 51 of FIG. 36 determines a set of interfaces consisting of the unlabeled interface 24 of the next level firewall FW1 reachable by a continuous path from the reference interface 21 such that the continuous path does not include any firewall of the host network. Step 52 of FIG. 36 assigns the current label of 2 to the interface 24 in the set of interfaces established in step 51. The set of partially labeled firewalls (PLFs) is updated to consist of FW1 in accordance with the assigning of the current label 2 to the interface 24 of the firewall FW1 which resulted in FW1 being the only partially labeled firewall. Step 53 of FIG. 36 ascertains that the set of partially labeled firewalls is not empty. Step 54 of FIG. 36 selects the next partially labeled firewall FW1 from the set of partially labeled firewalls. Step 55 of FIG. 36 sets the set of reference interfaces as consisting of the unlabeled interface 25 in the selected partially labeled firewall FW1. Step 56 of FIG. 36 changes the current label to be the next label (3) immediately after the current label (2) in the ordered sequence of different labels. Step 57 of FIG. 36 assigns the current label 3 to the FW1 firewall interface 25 of the set of reference interfaces. Then the second iteration ends. The second iteration has labeled interfaces 24 and 25 of the firewall FW1, respectively.

FIG. 40D depicts the result of executing the third iteration of the loop of FIG. 36. The third iteration starts with the IT structure of FIG. 40C which exists at the end of the second iteration. From the reference interface 25, step 51 of FIG. 36 determines a set of interfaces consisting of the unlabeled interface 28 of the next level firewall FW2 reachable by a continuous path from the reference interface 25 such that the continuous path does not include any firewall of the host network. Step 52 of FIG. 36 assigns the current label of 3 to the interface 28 in the set of interfaces established in step 51. The set of partially labeled firewalls (PLFs) is updated to consist of FW2 in accordance with the assigning of the current label 3 to the interface 28 of the firewall FW2, which resulted in FW2 being the only partially labeled firewall. Step 53 of FIG. 36 ascertains that the set of partially labeled firewalls is not empty. Step 54 of FIG. 36 selects the next partially labeled firewall FW2 from the set of partially labeled firewalls. Step 55 of FIG. 36 sets the set of reference interfaces as consisting of the unlabeled interface 29 in the selected partially labeled firewall FW2. Step 56 of FIG. 36 changes the current label to be the next label (4) immediately after the current label (3) in the ordered sequence of different labels. Step 57 of FIG. 36 assigns the current label 4 to the FW2 firewall interface 29 of the set of reference interfaces. Then the third iteration ends. The third iteration has labeled interfaces 28 and 29 of the firewall FW2, respectively.

In the fourth iteration of the loop, step 51 of FIG. 36 determines a set of interfaces that is empty, since there are no next level firewalls reachable by a continuous path from the reference interface 29 such that the continuous path does not include any firewall of the host network. Step 52 of FIG. 36 does not assign the current label, since the set of interfaces is empty, which results in the set of partially labeled firewalls (PLFs) being updated to consist of the empty set of interfaces. Step 53 of FIG. 36 ascertains that the set of partially labeled firewalls is empty, which terminates the loop. Step 58 of FIG. 36 examines the firewalls (DIP, FW1, FW2) in FIG. 40D and concludes that there are no isolated firewalls since all firewalls in FIG. 40D are labeled. Step 59 of FIG. 36 designates each firewall (DIP, FW1, FW2) in FIG. 40D as not being a cross-zone connected firewall, since each interface of each firewall has an assigned label and the labels assigned to the interfaces of each firewall consist of two labels appearing consecutively in the ordered sequence of different labels (i.e., the two labels in the interfaces of each firewall are positive integers differing by 1).

4.6.2 Example with No Cross-Connected Firewalls (Dip is a Non-Firewall Host)

Figure 41A:
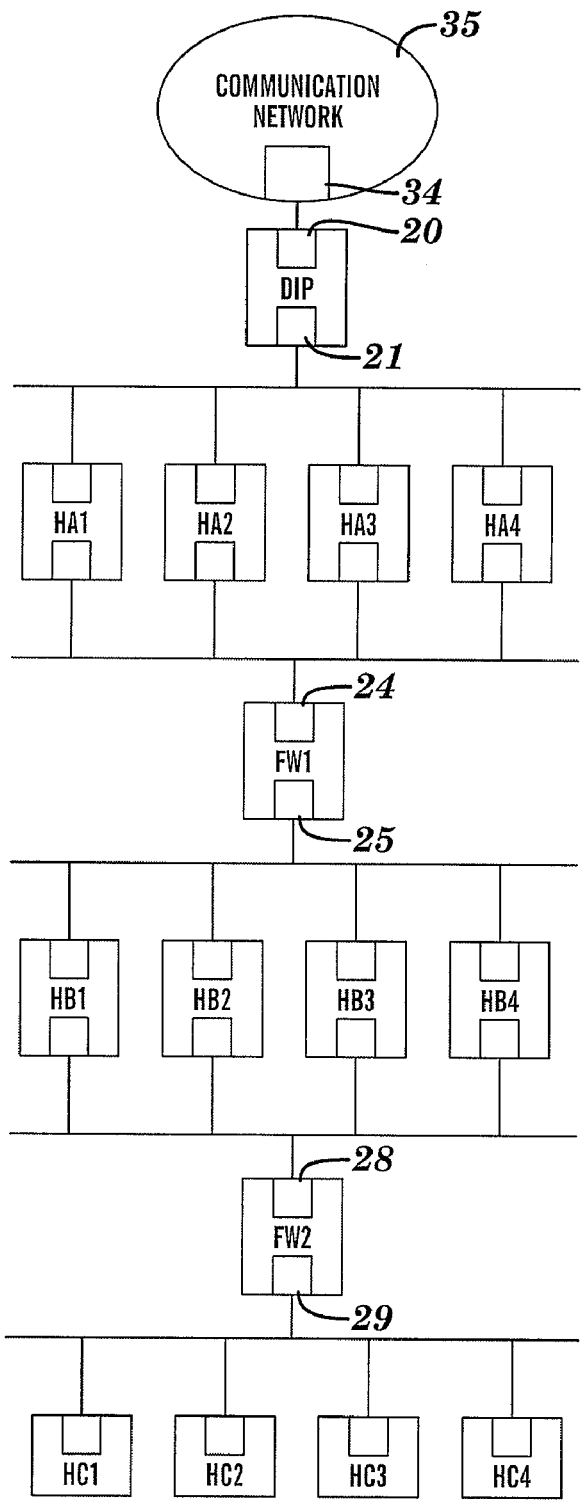
FIGS. 41A-41C depict an example in which the host network has no cross-connected firewalls wherein the DIP is a non-firewall host, in accordance with embodiments of the present invention.
Figure 41B:
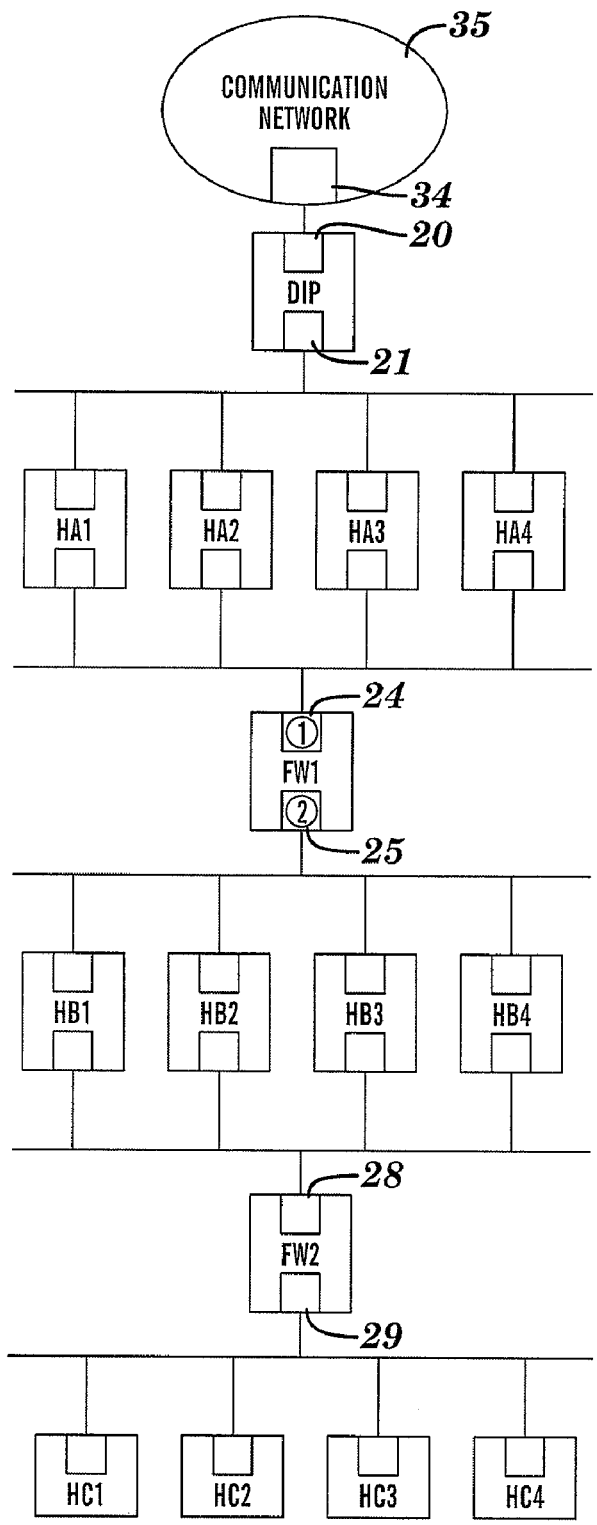
Figure 41C:
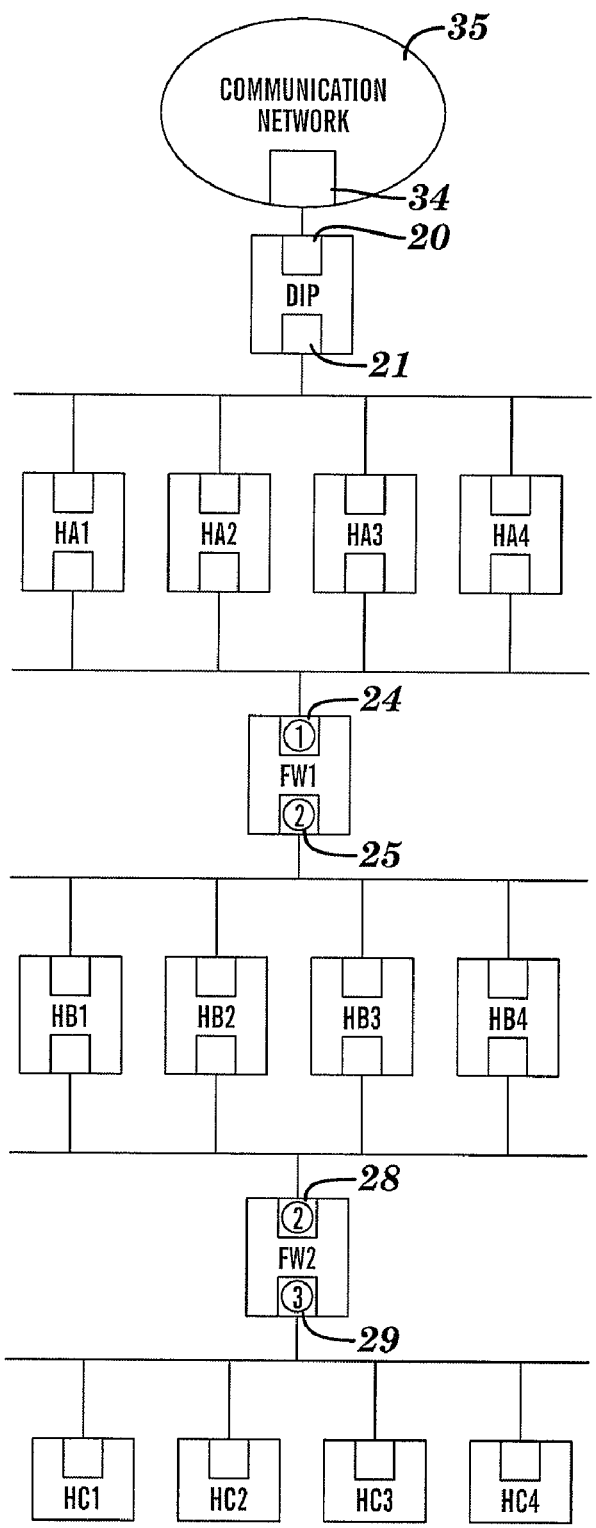

FIGS. 41A-41C (collectively "FIG. 41") depict an example in which the host network has no cross-connected firewalls wherein the DIP is a non-firewall host, in accordance with embodiments of the present invention.

FIG. 41A depicts the IT structure 10 of FIG. 31, wherein the DIP is a non-firewall host, and wherein all firewall interfaces (24-25, 28-29) are initially unlabeled. FIGS. 41B-41C depict successive iterations of the loop of FIG. 36 in which firewall interfaces are labeled with positive integers beginning with integer 1 in the successive iterations. The labels may represent color numbers and each label in FIGS. 41B-41E is depicted as a positive integer within a circle. The initialization step 50 of FIG. 36 occurs for the IT structure in FIG. 41A, wherein the current label of 1 is selected from the ordered sequence of different labels, the set of partially labeled firewalls is set to an empty set, and the reference interface is set to the interface 34 of the communication network 35.

FIG. 41B depicts the result of executing the first iteration of the loop of FIG. 36. From the reference interface 34, step 51 of FIG. 36 determines a set of interfaces consisting of the unlabeled interface 20 of the next level firewall FW1 reachable by a continuous path from the reference interface 34 such that the continuous path does not include any firewall of the host network. Step 52 of FIG. 36 assigns the current label of 1 (shown as 1 within a circle) to the interface 24 in the set of interfaces established in step 51. The set of partially labeled firewalls (PLFs) is updated to consist of the firewall FW1 in accordance with the assigning of the current label 1 to the interface 24 of the firewall FW1, which resulted in the firewall FW1 being the only partially labeled firewall. Step 53 of FIG. 36 ascertains that the set of partially labeled firewalls is not empty. Step 54 of FIG. 36 selects the next partially labeled firewall FW1 from the set of partially labeled firewalls. Step 55 of FIG. 36 sets the set of reference interfaces as consisting of the unlabeled interface 25 in the selected partially labeled firewall FW1. Step 56 of FIG. 36 changes the current label to be the next label (2) immediately after the current label (1) in the ordered sequence of different labels. Step 57 of FIG. 36 assigns the current label 2 to the FW1 firewall interface 25 of the set of reference interfaces. Then the first iteration ends. The first iteration has labeled interfaces 24 and 25 of the firewall FW1, respectively.

FIG. 41C depicts the result of executing the second iteration of the loop of FIG. 36. The second iteration starts with the IT structure of FIG. 41B which exists at the end of the first iteration. From the reference interface 25, step 51 of FIG. 36 determines a set of interfaces consisting of the unlabeled interface 28 of the next level firewall FW2 reachable by a continuous path from the reference interface 25 such that the continuous path does not include any firewall of the host network. Step 52 of FIG. 36 assigns the current label of 2 to the interface 28 in the set of interfaces established in step 51. The set of partially labeled firewalls (PLFs) is updated to consist of FW2 in accordance with the assigning of the current label 2 to the interface 28 of the firewall FW2, which resulted in FW2 being the only partially labeled firewall. Step 53 of FIG. 36 ascertains that the set of partially labeled firewalls is not empty. Step 54 of FIG. 36 selects the next partially labeled firewall FW2 from the set of partially labeled firewalls. Step 55 of FIG. 36 sets the set of reference interfaces as consisting of the unlabeled interface 29 in the selected partially labeled firewall FW2. Step 56 of FIG. 36 changes the current label to be the next label (3) immediately after the current label (2) in the ordered sequence of different labels. Step 57 of FIG. 36 assigns the current label 3 to the FW2 firewall interface 29 of the set of reference interfaces. Then the second iteration ends. The second iteration has labeled interfaces 28 and 29 of the firewall FW2, respectively.

In the third iteration of the loop, step 51 of FIG. 36 determines a set of interfaces that is empty, since there are no next level firewalls reachable by a continuous path from the reference interface 29 such that the continuous path does not include any firewall of the host network. Step 52 of FIG. 36 does not assign the current label, since the set of interfaces is empty, which results in the set of partially labeled firewalls (PLFs) being updated to consist of the empty set of interfaces. Step 53 of FIG. 36 ascertains that the set of partially labeled firewalls is empty, which terminates the loop. Step 58 of FIG. 36 examines the firewalls (DIP, FW1, FW2) in FIG. 41C and concludes that there are no isolated firewalls since all firewalls in FIG. 41C are labeled. Step 59 of FIG. 36 designates each firewall (DIP, FW1, FW2) in FIG. 41C as not being a cross-zone connected firewall, since each interface of each firewall has an assigned label and the labels assigned to the interfaces of each firewall consist of two labels appearing consecutively in the ordered sequence of different labels (i.e., the two labels in the interfaces of each firewall are positive integers differing by 1).

Figure 42A:
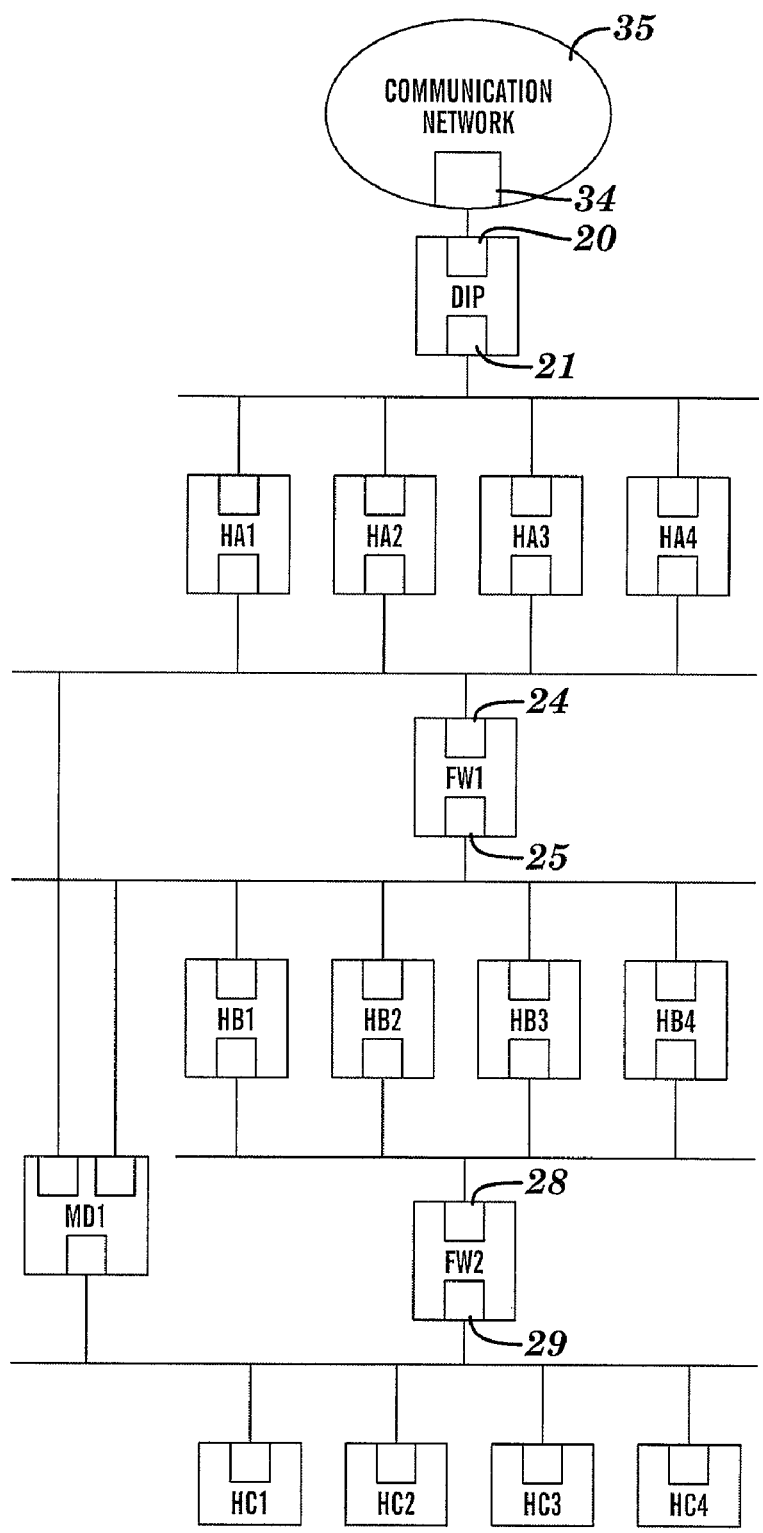
FIGS. 42A-42C depict an example in which the host network has cross-connected firewalls whose interfaces will have the same label after the algorithm of FIG. 36 is performed, in accordance with embodiments of the present invention.
Figure 42B:
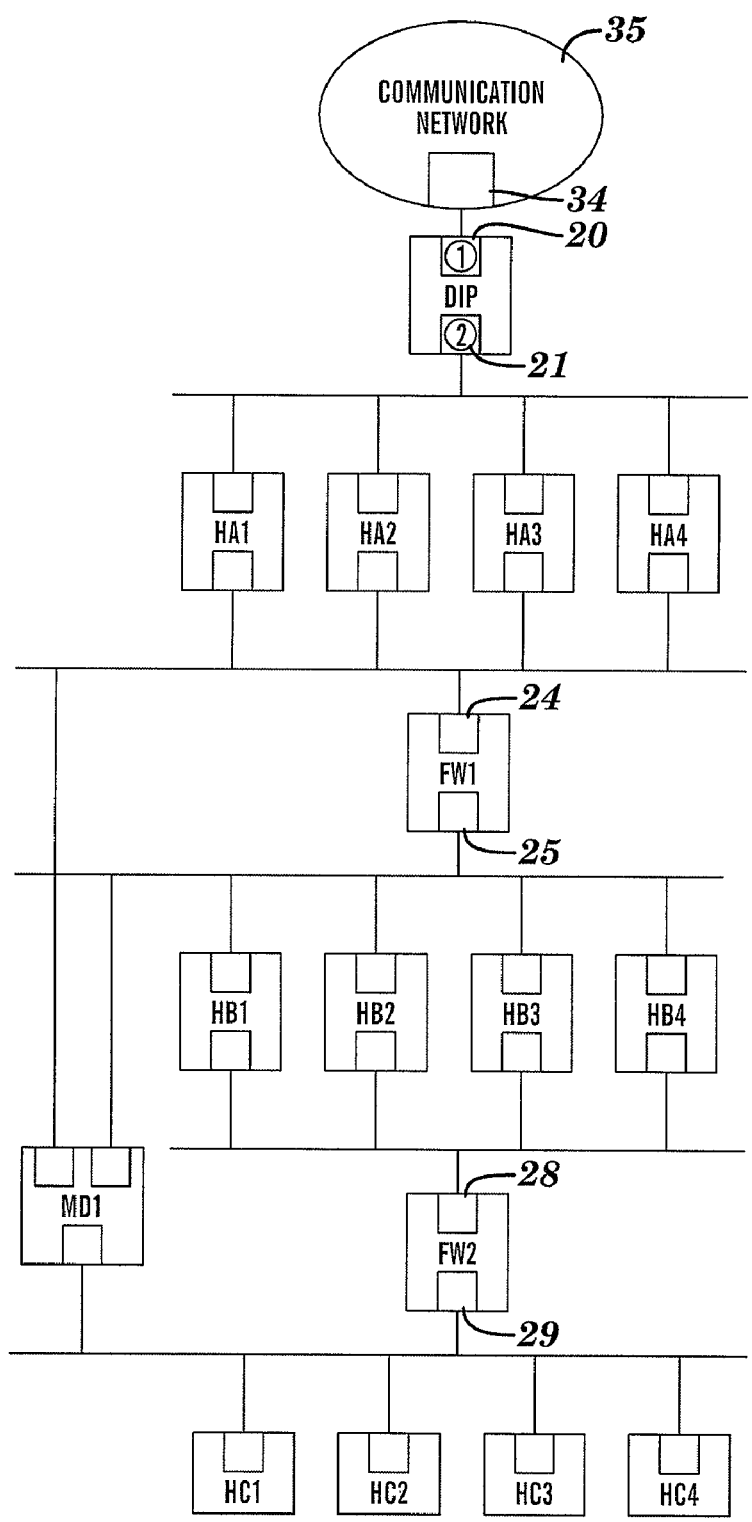
Figure 42C:
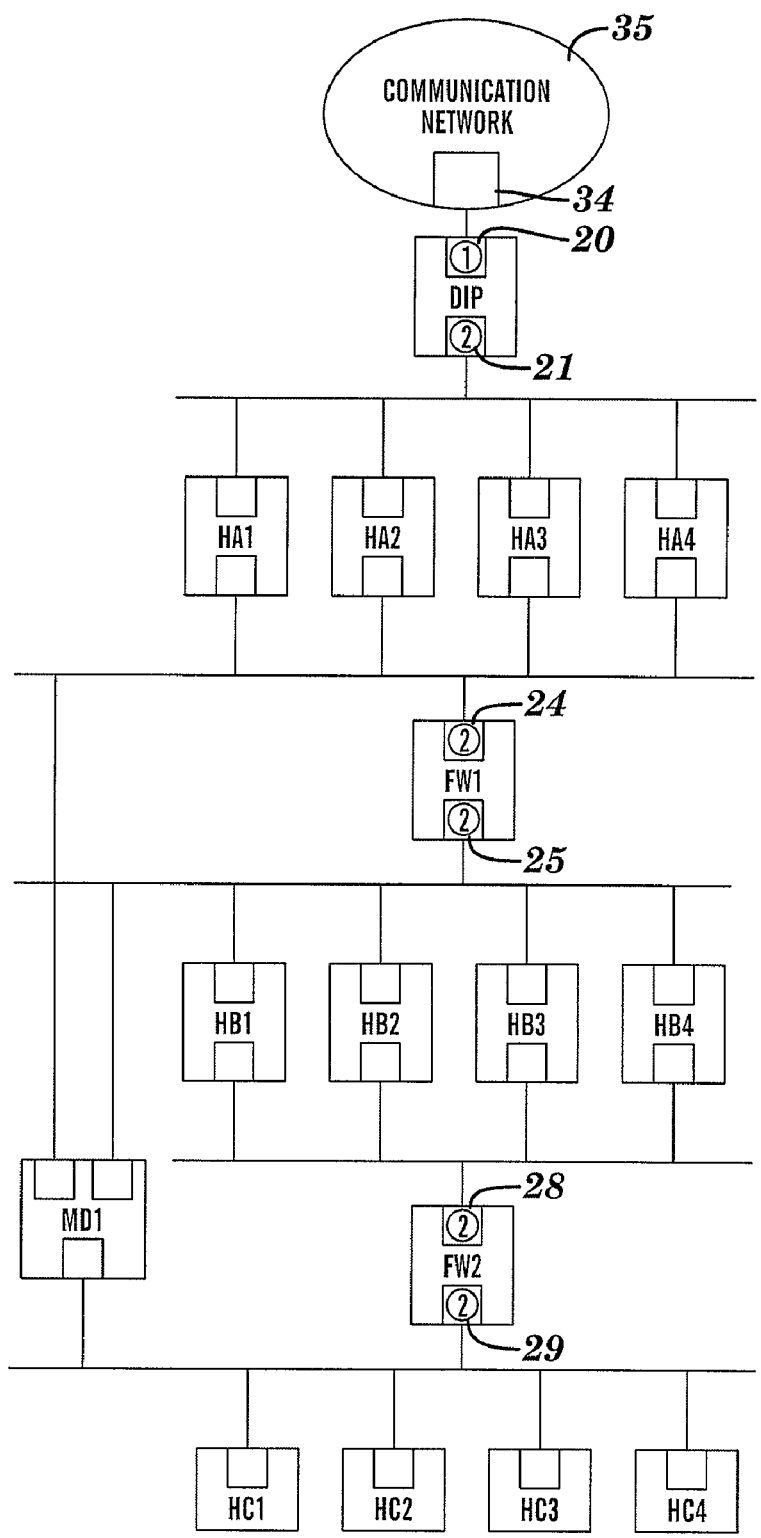

4.6.3. Example with Cross-Connected Firewalls Whose Interfaces have the Same Label FIGS. 42A-42C (collectively "FIG. 42") depict an example in which the host network has cross-connected firewalls whose interfaces will have the same label after the algorithm of FIG. 36 is performed, in accordance with embodiments of the present invention. In FIGS. 42A-42C, the DIP is a firewall.

FIG. 42A depicts the IT structure 10 of FIG. 33, wherein the DIP is a firewall, wherein MD1 is a non-firewall host, and wherein all firewall interfaces (20-21, 24-25, 28-29) are initially unlabeled. FIGS. 42B-42C depict successive iterations of the loop of FIG. 36 in which firewall interfaces are labeled with positive integers beginning with integer 1 in the successive iterations. The labels may represent color numbers and each label in FIGS. 40B-40D is depicted as a positive integer within a circle. The initialization step 50 of FIG. 36 occurs for the IT structure in FIG. 42A, wherein the current label of 1 is selected from the ordered sequence of different labels, the set of partially labeled firewalls is set to an empty set, and the reference interface is set to the interface 34 of the communication network 35.

FIG. 42B depicts the result of executing the first iteration of the loop of FIG. 36. From the reference interface 34, step 51 of FIG. 36 determines a set of interfaces consisting of the unlabeled interface 20 of the next level firewall (DIP) reachable by a continuous path from the reference interface 34 such that the continuous path does not include any firewall of the host network. Step 52 of FIG. 36 assigns the current label of 1 (shown as 1 within a circle) to the interface 20 in the set of interfaces established in step 51. The set of partially labeled firewalls (PLFs) is updated to consist of the DIP firewall in accordance with the assigning of the current label 1 to the interface 20 of the DIP firewall, which resulted in the DIP being the only partially labeled firewall. Step 53 of FIG. 36 ascertains that the set of partially labeled firewalls is not empty. Step 54 of FIG. 36 selects the next partially labeled firewall (DIP) from the set of partially labeled firewalls. Step 55 of FIG. 36 sets the set of reference interfaces as consisting of the unlabeled interface 21 in the selected partially labeled firewall of the DIP. Step 56 of FIG. 36 changes the current label to be the next label (2) immediately after the current label (1) in the ordered sequence of different labels. Step 57 of FIG. 36 assigns the current label 2 to the DIP firewall interface 21 of the set of reference interfaces. Then the first iteration ends. The first iteration has labeled interfaces 20 and 21 of the firewall DIP, respectively.

FIG. 42C depicts the result of executing the second iteration of the loop of FIG. 36. The second iteration starts with the IT structure of FIG. 42B which exists at the end of the first iteration. From the reference interface 21, step 51 of FIG. 36 determines a set of interfaces consisting of the unlabeled interfaces 24-25 and 28-29 of the next level firewalls FW1 and FW2, respectively, reachable by a continuous path from the reference interface 21 such that the continuous path does not include any firewall of the host network. Noting that the host MD1 is not a firewall, the path segments through host MD1 enable the existence of continuous paths from the reference interface 21 to the interfaces 24-25 and 28-29 of the firewalls FW1 and FW2, respectively, such that these continuous path do not include any firewall of the host network. Step 52 of FIG. 36 assigns the current label of 2 to the interfaces 24-25 and 28-29 in the set of interfaces established in step 51. The set of partially labeled firewalls (PLFs) is updated to consist of an empty set, since all interfaces of all firewalls (DIP, FW1, FW2) are labeled. Step 53 of FIG. 36 ascertains that the set of partially labeled firewalls is empty, which terminates the loop. Step 58 of FIG. 36 examines the firewalls (DIP, FW1, FW2) in FIG. 42C and concludes that there are no isolated firewalls since all firewalls in FIG. 42C are labeled. Step 59 of FIG. 36 designates the DIP firewall as not being a cross-zone connected firewall, since each interface of the DIP firewall has an assigned label and the labels assigned to the interfaces of the DIP firewall consist of two labels appearing consecutively in the ordered sequence of different labels (i.e., the two labels of 1 and 2 in the interfaces of the DIP firewall are positive integers differing by 1). Step 59 of FIG. 36 designates firewall FW1 in FIG. 42C each as being a cross-zone connected firewall, since each interface of firewall FW1 has an assigned label and the labels assigned to the interfaces of firewall FW1 consist of a same label 2. Step 59 of FIG. 36 designates firewall FW2 in FIG. 42C each as being a cross-zone connected firewall, since each interface of firewall FW2 has an assigned label and the labels assigned to the interfaces of firewall FW2 consist of a same label 2.

4.6.4. Example with Cross-Connected Firewalls Whose Interfaces have Non-Sequential Labels FIGS. 43A-43E (collectively "FIG. 43") depict an example in which the host network has a cross-connected firewall whose interfaces will have non-sequential labels after the algorithm of FIG. 36 is performed, in accordance with embodiments of the present invention. In FIGS. 43A-43E, the DIP is a firewall.

Figure 43A:
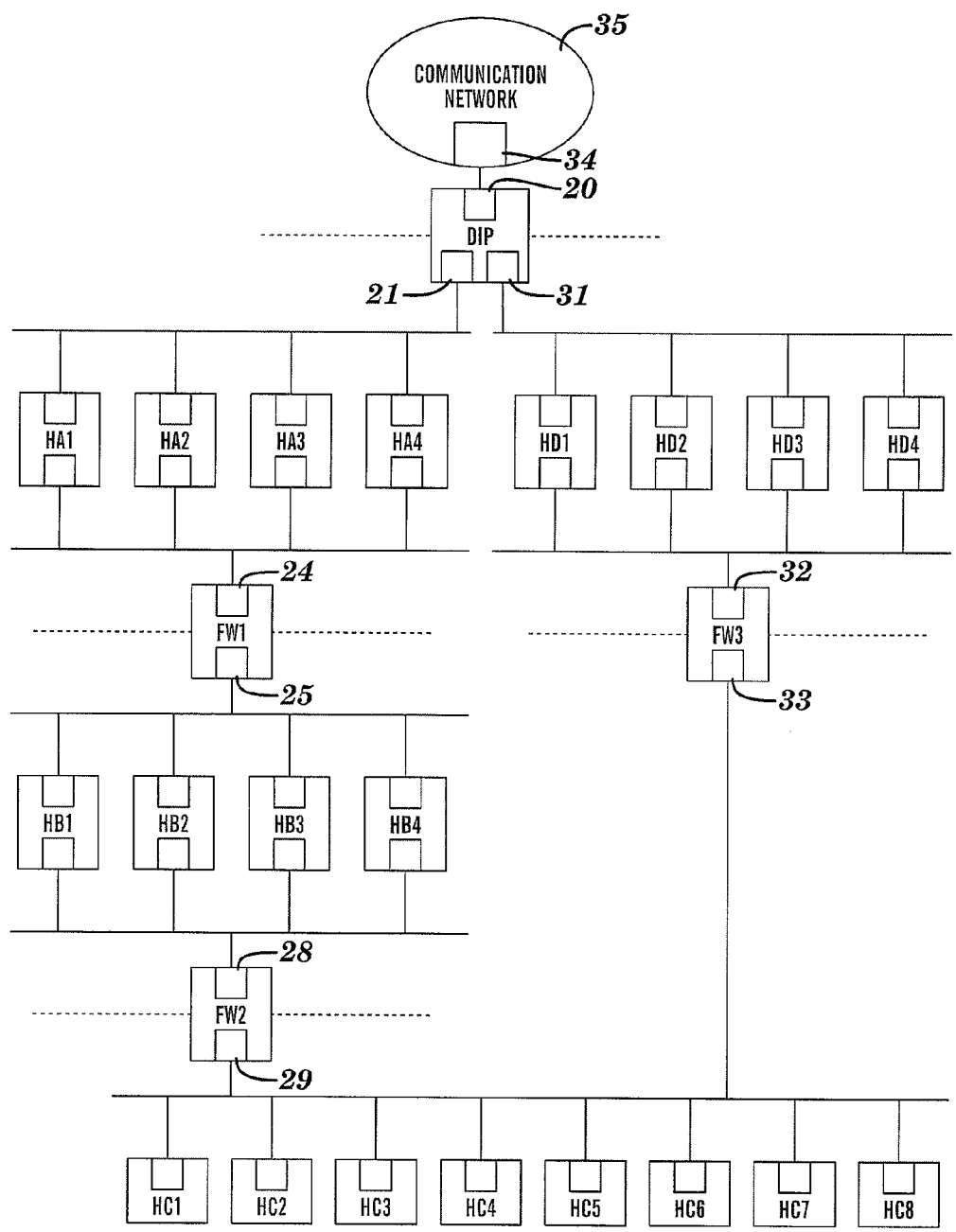
FIGS. 43A-43E depict an example in which the host network has cross-connected firewalls whose interfaces will have non-sequential labels after the algorithm of FIG. 36 is performed, in accordance with embodiments of the present invention.

FIG. 43A depicts a modification the IT structure 10 of FIG. 31, wherein the DIP is a firewall. The IT structure in FIG. 43 comprises a host network that includes devices, network segments and network interfaces. As in FIG. 31, the devices of FIG. 43 are hardware devices and may comprise, inter alia, servers, computers, routers and firewalls. The hosts in FIG. 43 are firewalls FW1, FW2, and FW3, and non-firewall hosts (e.g., servers). The non-firewall hosts comprise HA1, HA2, HA3, HA4, HB1, HB2, HB3, HB4, HC1, HC2, HC3, HC4, HC5, HC6, HC7, HC8, HD1, HD2, HD3, and HD4. The host network further comprises the DIP which is a host that is directly connected to the communication network 35 (e.g., the Internet). The DIP is a firewall in the embodiments of FIGS. 43A-43E, but in general may be a non-firewall host as indicated supra. In FIG. 43A, all firewall interfaces (20-21, 31, 24-25, 28-29, 32-33) are initially unlabeled.

Figure 43B:
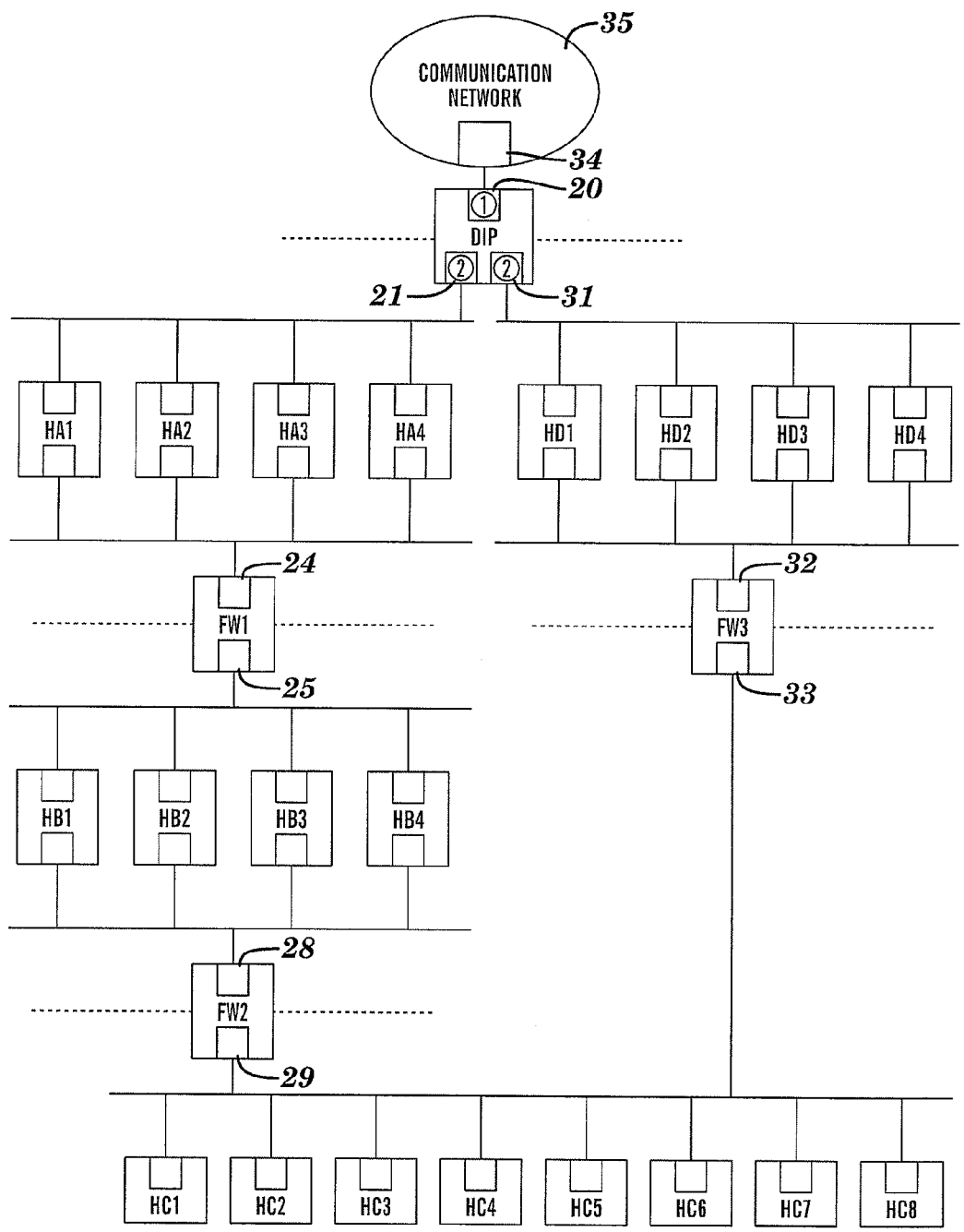
Figure 43C:
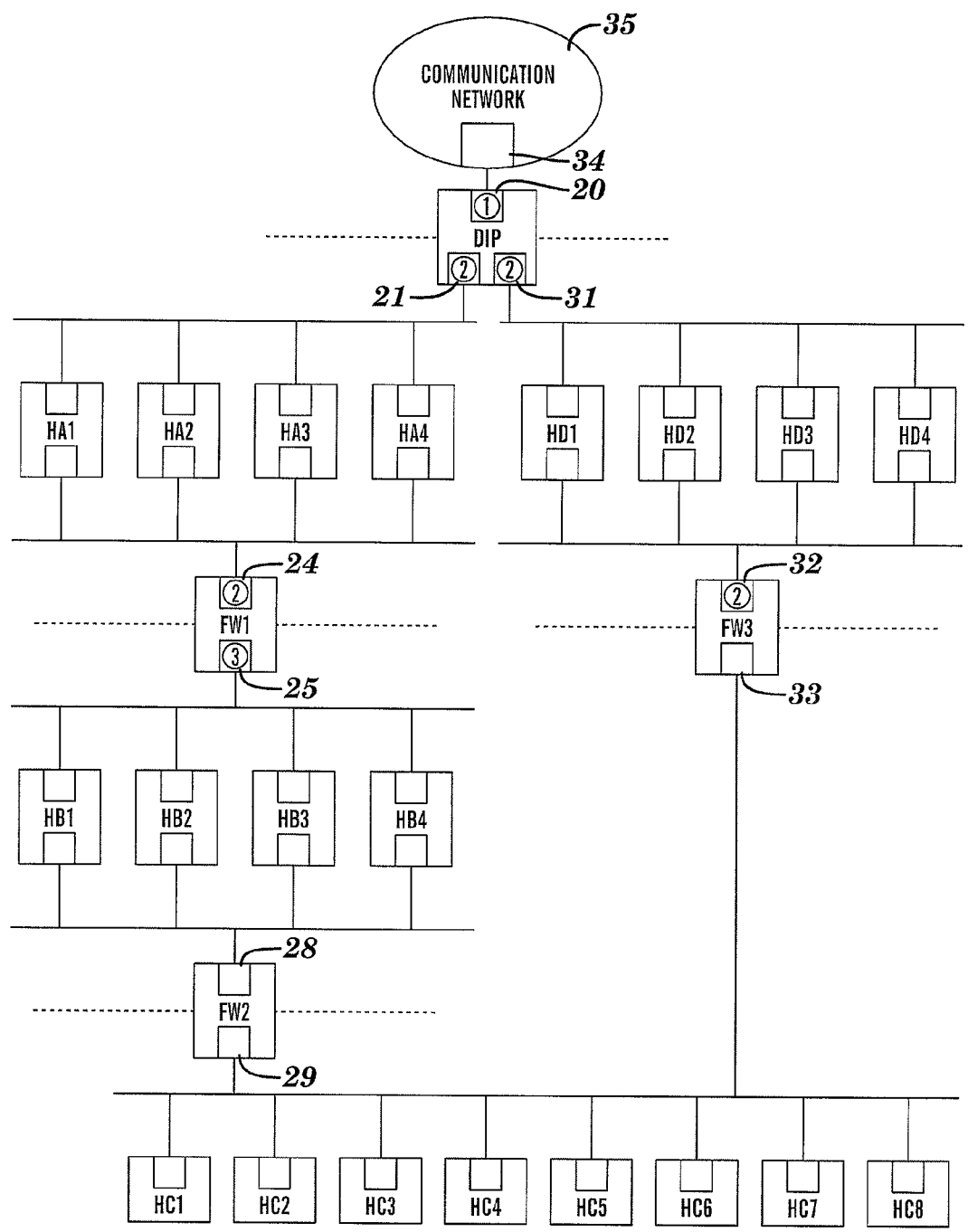
Figure 43D:
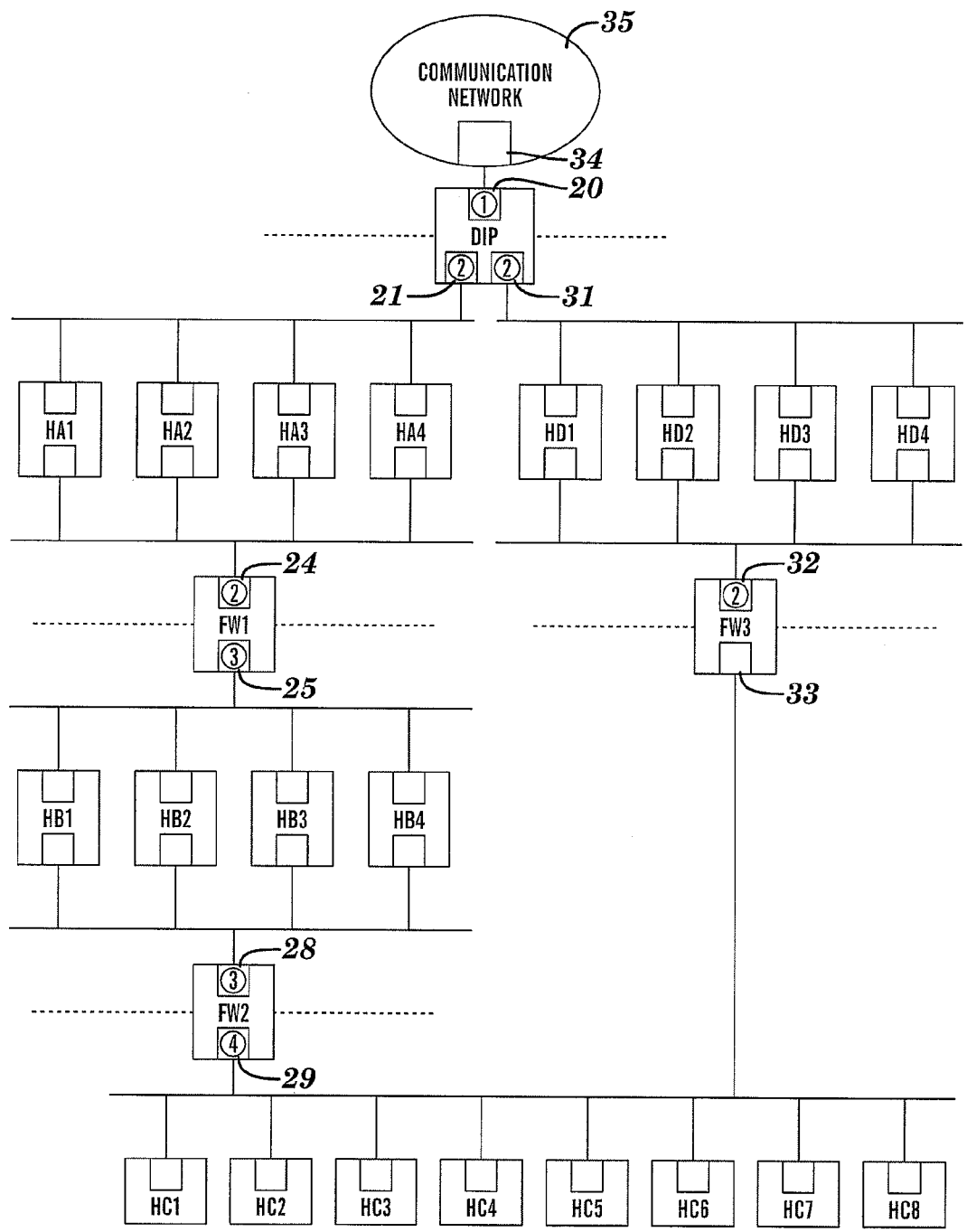

FIGS. 43B-43E depict successive iterations of the loop of FIG. 36 in which firewall interfaces are labeled with positive integers beginning with integer 1 in the successive iterations. The labels may represent color numbers and each label in FIGS. 43B-43D is depicted as a positive integer within a circle. The initialization step 50 of FIG. 36 occurs for the IT structure in FIG. 43A, wherein the current label of 1 is selected from the ordered sequence of different labels, the set of partially labeled firewalls is set to an empty set, and the reference interface is set to the interface 34 of the communication network 35.

FIG. 43B depicts the result of executing the first iteration of the loop of FIG. 36. From the reference interface 34, step 51 of FIG. 36 determines a set of interfaces consisting of the unlabeled interface 20 of the next level firewall (DIP) reachable by a continuous path from the reference interface 34 such that the continuous path does not include any firewall of the host network. Step 52 of FIG. 36 assigns the current label of 1 (shown as 1 within a circle) to the interface 20 in the set of interfaces established in step 51. The set of partially labeled firewalls (PLFs) is updated to consist of the DIP firewall in accordance with the assigning of the current label 1 to the interface 20 of the DIP firewall, which resulted in the DIP being the only partially labeled firewall. Step 53 of FIG. 36 ascertains that the set of partially labeled firewalls is not empty. Step 54 of FIG. 36 selects the next partially labeled firewall (DIP) from the set of partially labeled firewalls. Step 55 of FIG. 36 sets the set of reference interfaces as consisting of the unlabeled interfaces 21 and 31 in the selected partially labeled firewall of the DIP. Step 56 of FIG. 36 changes the current label to be the next label (2) immediately after the current label (1) in the ordered sequence of different labels. Step 57 of FIG. 36 assigns the current label 2 to the DIP firewall interfaces 21 and 31 of the set of reference interfaces. Then the first iteration ends. The first iteration has labeled interfaces 20, 21, and 31 of the firewall DIP, respectively.

FIG. 43C depicts the result of executing the second iteration of the loop of FIG. 36. The second iteration starts with the IT structure of FIG. 43B which exists at the end of the first iteration. From the reference interfaces 21 and 31, step 51 of FIG. 36 determines a set of interfaces consisting of the unlabeled interfaces 24 and 32 of the next level firewalls FW1 and FW3, respectively, each reachable by a continuous path from the reference interface 21 or 31 such that the continuous path does not include any firewall of the host network. Step 52 of FIG. 36 assigns the current label of 2 to the interfaces 24 and 32 in the set of interfaces established in step 51. The set of partially labeled firewalls (PLFs) is updated to consist of FW1 and FW3 in accordance with the assigning of the current label 2 to the interface 24 of the firewall FW1 and the interface 32 of the firewall F3, which resulted in FW1 and FW3 being the only partially labeled firewalls. Step 53 of FIG. 36 ascertains that the set of partially labeled firewalls is not empty. Step 54 of FIG. 36 selects the next partially labeled firewall FW1 from the set of partially labeled firewalls. Step 54 of FIG. 36 could have alternatively selected the next partially labeled firewall FW3 from the set of partially labeled firewalls but did not do so. Step 55 of FIG. 36 sets the set of reference interfaces as consisting of the unlabeled interface 25 in the selected partially labeled firewall FW1. Step 56 of FIG. 36 changes the current label to be the next label (3) immediately after the current label (2) in the ordered sequence of different labels. Step 57 of FIG. 36 assigns the current label 3 to the FW1 firewall interface 25 of the set of reference interfaces. Then the second iteration ends. The second iteration has labeled interfaces 24-25 of the firewall FW1 and interface 32 of the firewall FW3.

FIG. 43D depicts the result of executing the third iteration of the loop of FIG. 36. The third iteration starts with the IT structure of FIG. 43C which exists at the end of the second iteration. From the reference interface 25, step 51 of FIG. 36 determines a set of interfaces consisting of the unlabeled interface 28 of the next level firewall FW2 reachable by a continuous path from the reference interface 25 such that the continuous path does not include any firewall of the host network. Step 52 of FIG. 36 assigns the current label of 3 to the interface 28 in the set of interfaces established in step 51. The set of partially labeled firewalls (PLFs) is updated to consist of FW2 and FW3 in accordance with the assigning of the current label 3 to the interface 28 of the firewall FW2, which resulted in FW2 and FW3 being the only partially labeled firewalls. Step 53 of FIG. 36 ascertains that the set of partially labeled firewalls is not empty. Step 54 of FIG. 36 selects the next partially labeled firewall FW2 from the set of partially labeled firewalls. Step 55 of FIG. 36 sets the set of reference interfaces as consisting of the unlabeled interface 29 in the selected partially labeled firewall FW2. Step 56 of FIG. 36 changes the current label to be the next label (4) immediately after the current label (3) in the ordered sequence of different labels. Step 57 of FIG. 36 assigns the current label 4 to the FW2 firewall interface 29 of the set of reference interfaces. Then the third iteration ends. The third iteration has labeled interfaces 28 and 29 of the firewall FW2, respectively.

Figure 43E:
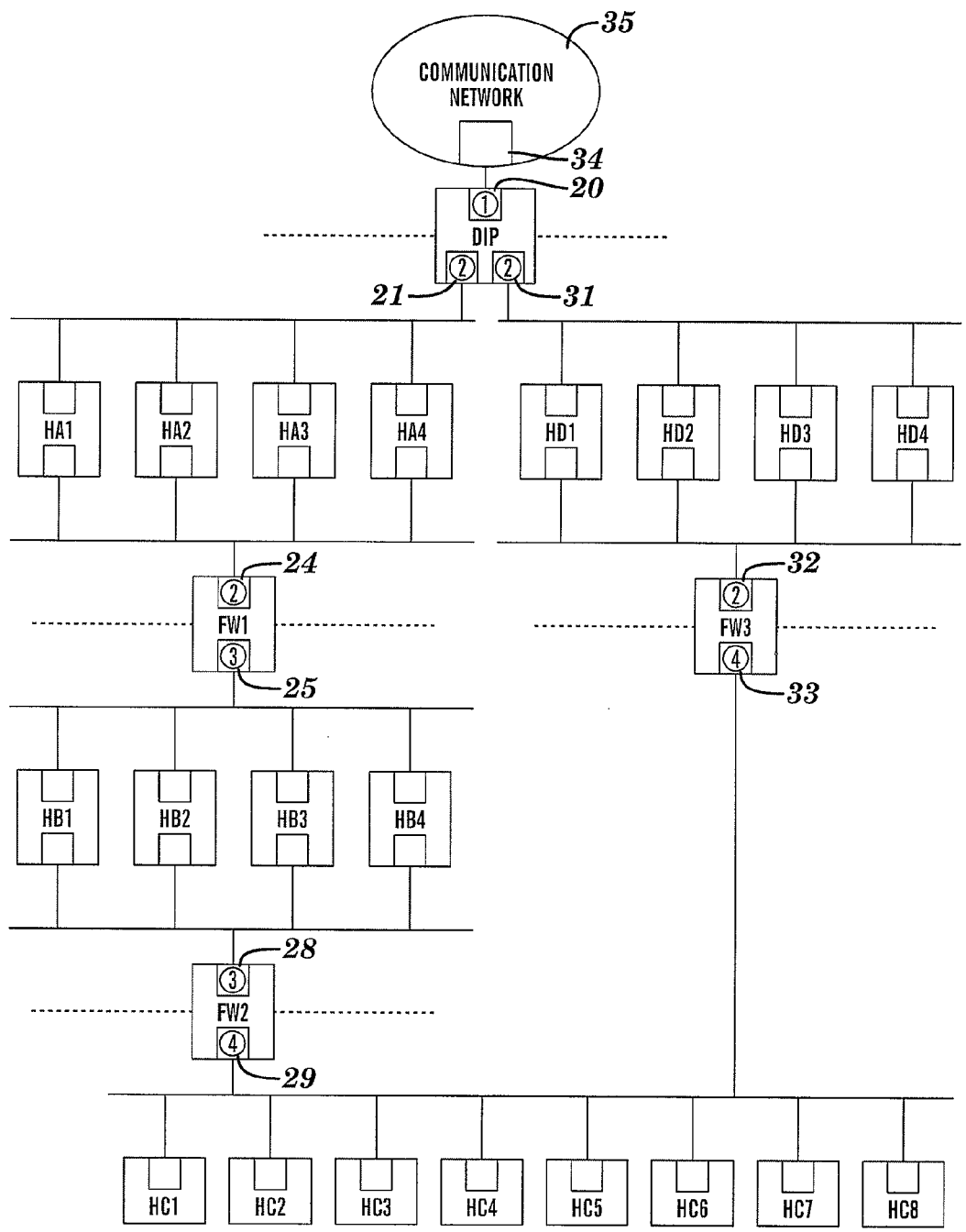

FIG. 43E depicts the result of executing the fourth iteration of the loop of FIG. 36. The fourth iteration starts with the IT structure of FIG. 43D which exists at the end of the third iteration. From the reference interface 29, step 51 of FIG. 36 determines a set of interfaces consisting of the unlabeled interface 33 of the next level firewall FW3 reachable by a continuous path from the reference interface 29 such that the continuous path does not include any firewall of the host network. Step 52 of FIG. 36 assigns the current label of 4 to the interface 33 in the set of interfaces established in step 51. The set of partially labeled firewalls (PLFs) is updated to consist of an empty set, since all interfaces of all firewalls (DIP, FW1, FW2, FW3) are labeled. Step 53 of FIG. 36 ascertains that the set of partially labeled firewalls is empty, which terminates the loop. Step 58 of FIG. 36 examines the firewalls (DIP, FW1, FW2, FW3) in FIG. 43E and concludes that there are no isolated firewalls since all firewalls in FIG. 43E are labeled. Step 59 of FIG. 36 designates the DIP firewall, the firewall FW1, and the firewall FW2 as not being cross-zone connected firewalls, since each interface of the DIP firewall, the firewall FW1, and the firewall FW2 has an assigned label and the labels assigned to the interfaces of each of the preceding firewalls appear consecutively in the ordered sequence of different labels (i.e., the two labels of 1 and 2 in the interfaces of the DIP firewall, the two labels of 2 and 3 in the interfaces of the firewall FW1, and the two labels of 3 and 4 in the interfaces of the firewall FW1 are positive integers differing by 1). Step 59 of FIG. 36 designates firewall FW3 in FIG. 43E each as being a cross-zone connected firewall, since each interface of firewall FW3 has an assigned label and the labels assigned to the interfaces of firewall FW3 consist of labels which do not appear consecutively in the ordered sequence of different labels (i.e., the two labels of 2 and 4 in the interfaces of the firewall FW3 are positive integers differing by 2 rather than by 1).

4.7 Examples Using Algorithm for Determining if a Given Host is an Isolated Host This section presents examples using the algorithm of FIG. 39 described in Section 4.5 for determining whether a given host is an isolated host. In each example a host H of the host network is selected and the algorithm of FIG. 39 is employed to determine whether the host H is connected to or isolated from the communication network Section 4.7.1 presents an example in which the host H is connected to the communication network.

Section 4.7.2 presents an example in which the host H is isolated from the communication network.

4.7.1 Example with Selected Host Connected to the Communication Network

FIGS. 44A-44H (collectively "FIG. 44") depict an example using the algorithm of FIG. 39, as described in Section 4.5, for determining whether a given host is an isolated host, in accordance with embodiments of the present invention. The given host is the host HB4 which is denoted as host H in FIG. 39.

Figure 44A:
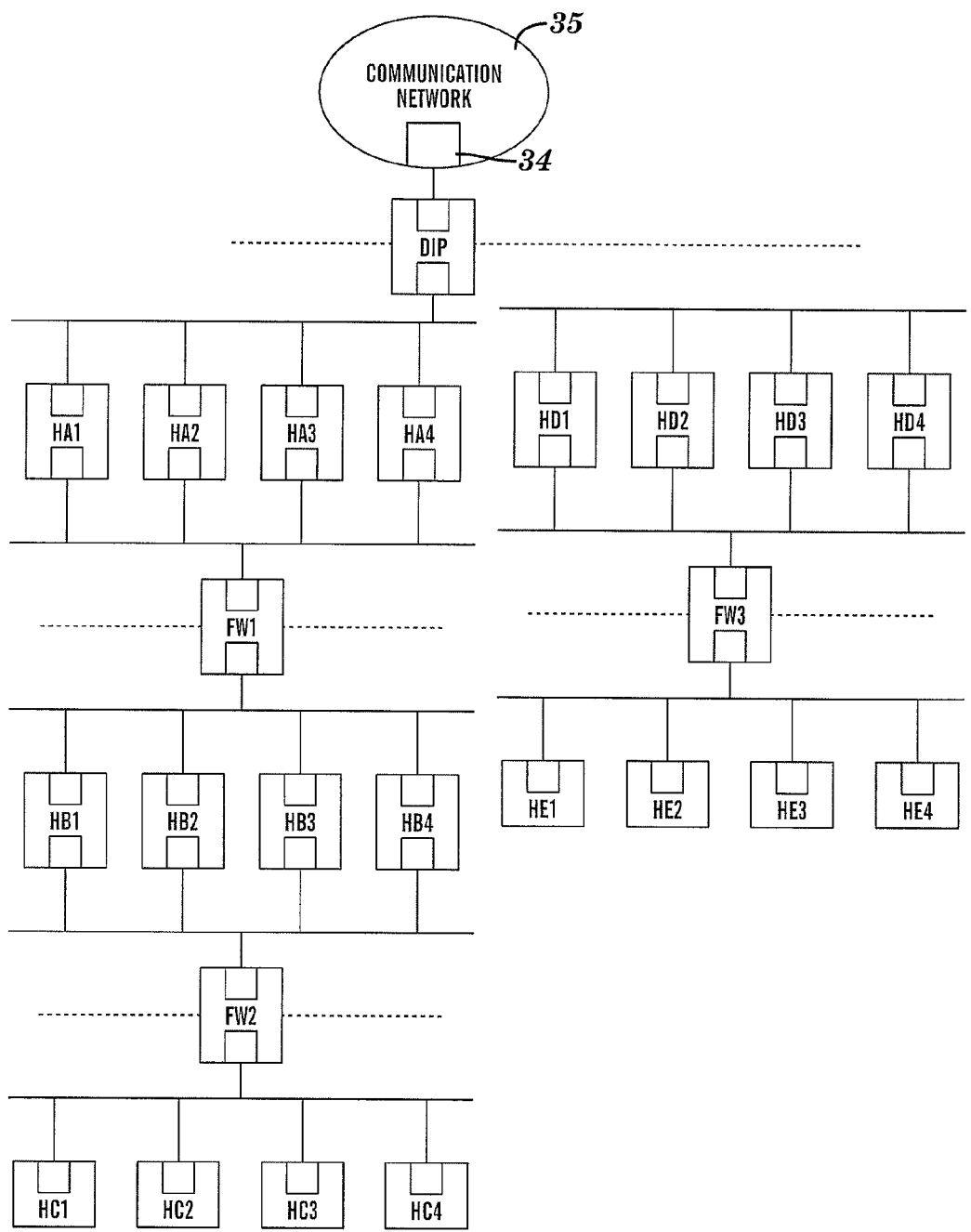
FIGS. 44A-44H and 45A-45F depict examples using the algorithm of FIG. 39 for determining whether a given host is an isolated host, in accordance with embodiments of the present invention.

FIG. 44A depicts the IT structure of FIG. 34, wherein all host interfaces are initially unlabeled. FIGS. 44B-44H depict the initialization steps and the successive iterations of the loop of FIG. 39 in which host interfaces are labeled with a selected label in the successive iterations. The label may be any label described supra and each labeled interface is depicted in this example as a painted interface that is painted with a color or shading.

Figure 44B:
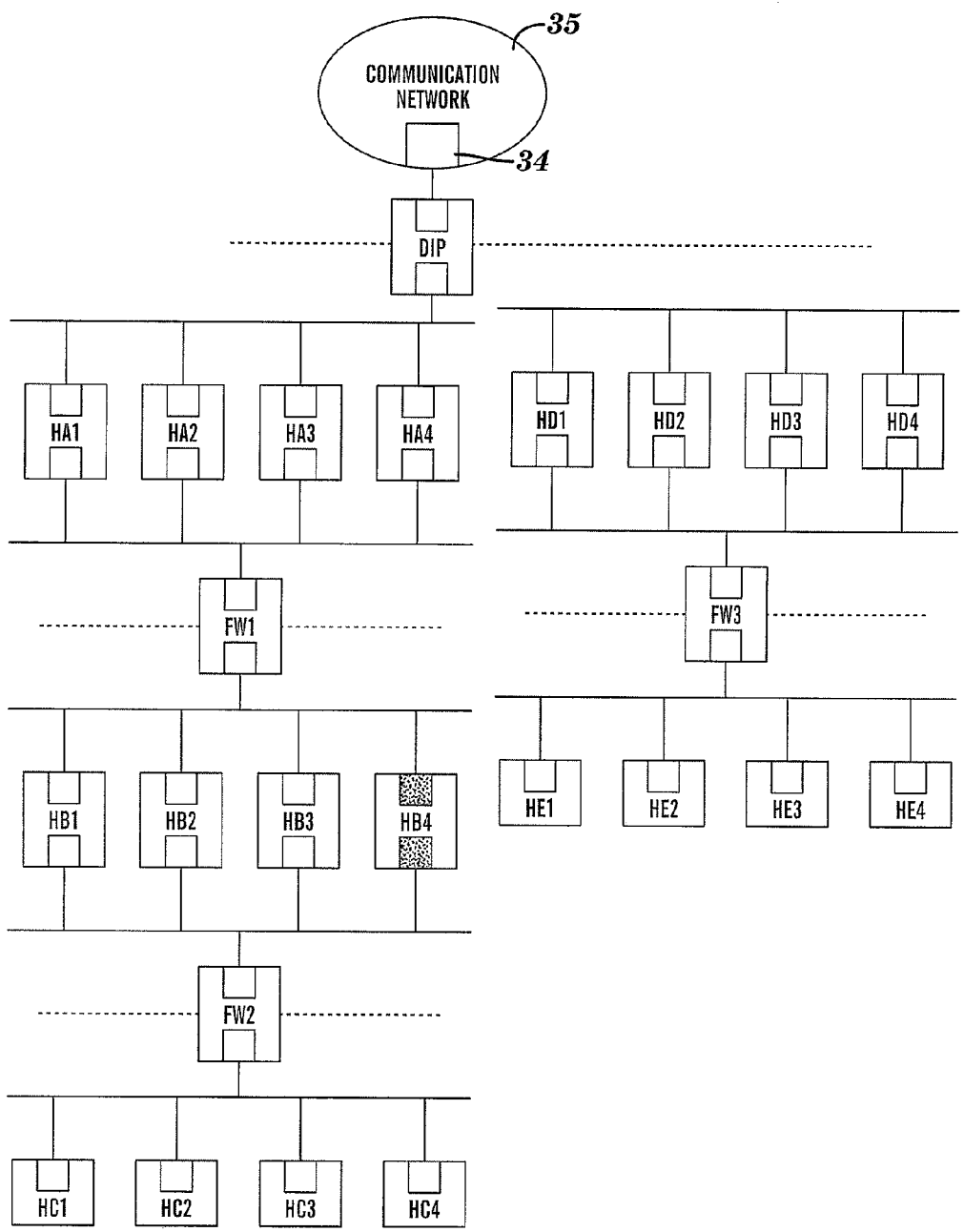

FIG. 44B depicts the result of performing the initialization step 81 of FIG. 39 in which the label is selected as a paint color or shading, the set of partially labeled hosts is set to an empty set, the label is assigned to each interface (i.e., the interface is painted) of the given host HB4, and a set of reference hosts is set to the host HB4.

Figure 44C:
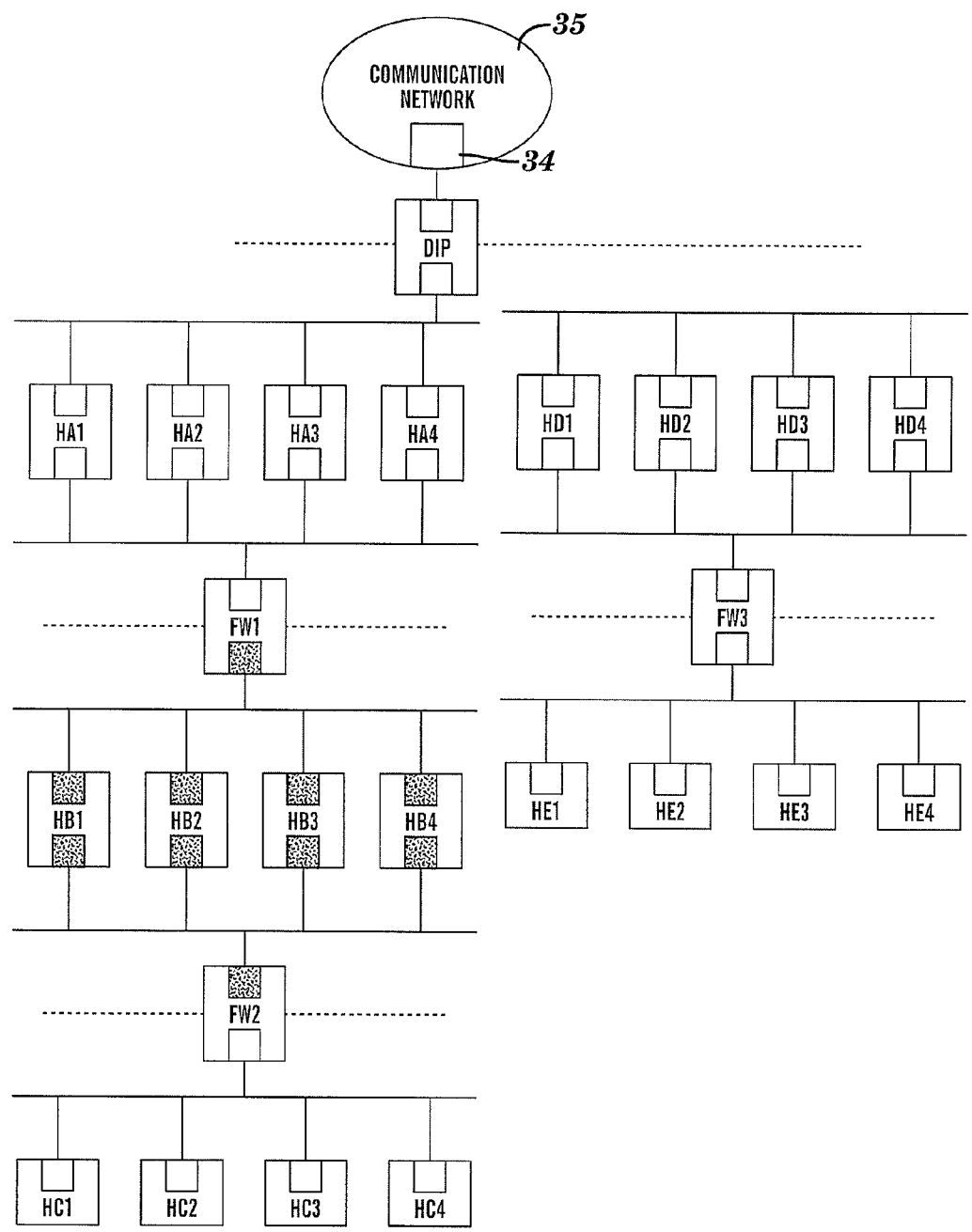
Figure 44D:
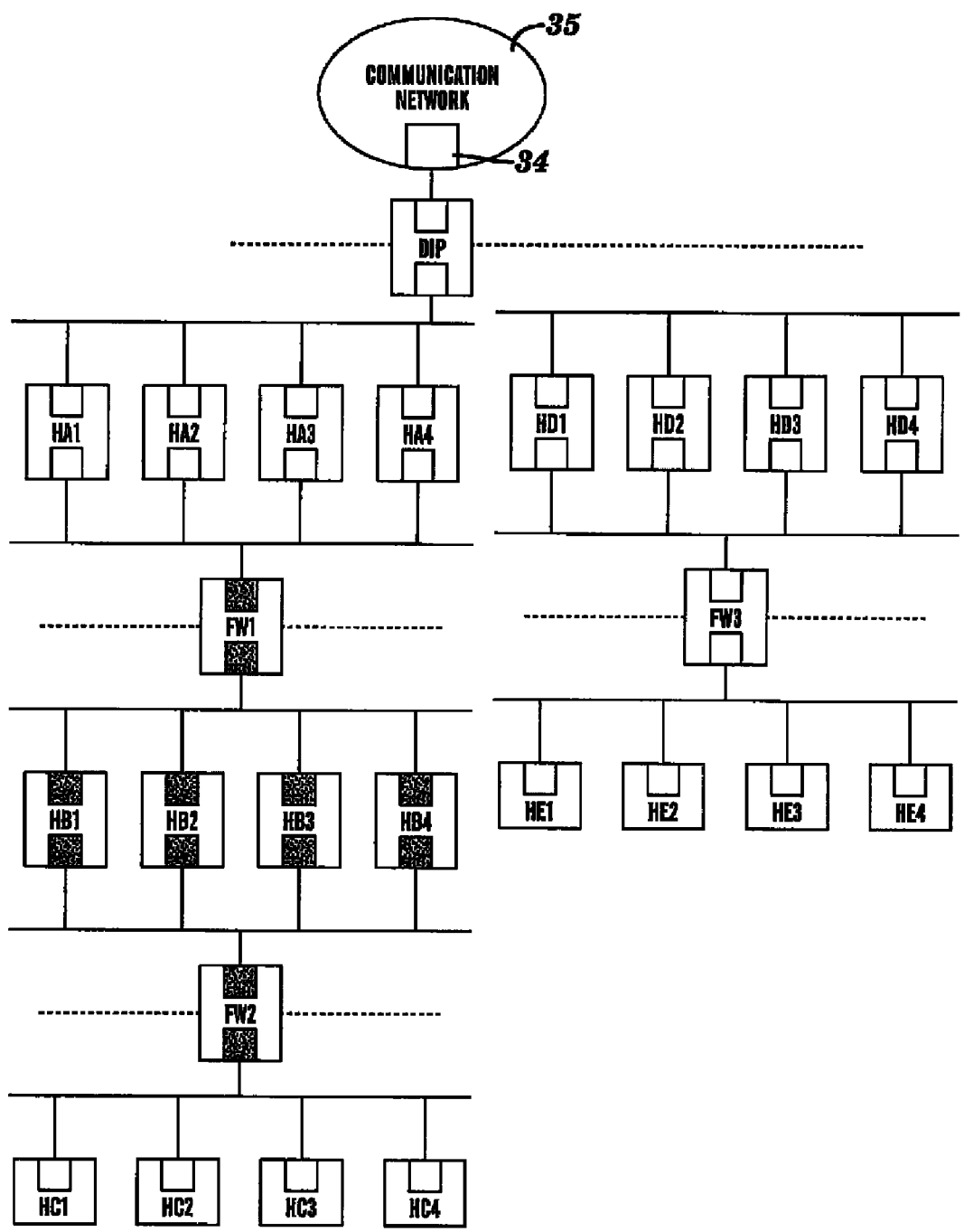

FIGS. 44C and 44D depict the result of executing the first iteration of the loop of FIG. 39. Step 82 of FIG. 39 determines a set of host interfaces that includes each unlabeled interface of each host that is directly connected to the reference host HB4. The set of host interfaces includes all interfaces of hosts HB1, HB2, and HB3, and the one interface of FW1 and FW2 that is directly connected to HB4. Step 83 of FIG. 39 assigns the label to each host interface of the set of host interfaces, which results in painting all interfaces of hosts HB1, HB2, and HB3, and the one interface of FW1 and FW2 that is directly connected to HB4 (as shown in FIG. 44C), and which further results in the set of partially labeled hosts (PLHs) being updated to consist of the hosts FW1 and FW2. Step 84 of FIG. 39 ascertains that the set of partially labeled hosts is not empty. Step 85 of FIG. 39 sets the set of reference hosts as consisting of the set of next partially labeled hosts; i.e., FW1 and FW2. Step 86 assigns the label to each unlabeled interface of each reference host FW1 and FW2, resulting in all interfaces of the reference hosts FW1 and FW2 being assigned a label (i.e., painted as shown in FIG. 44D). Then the first iteration ends.

Figure 44E:
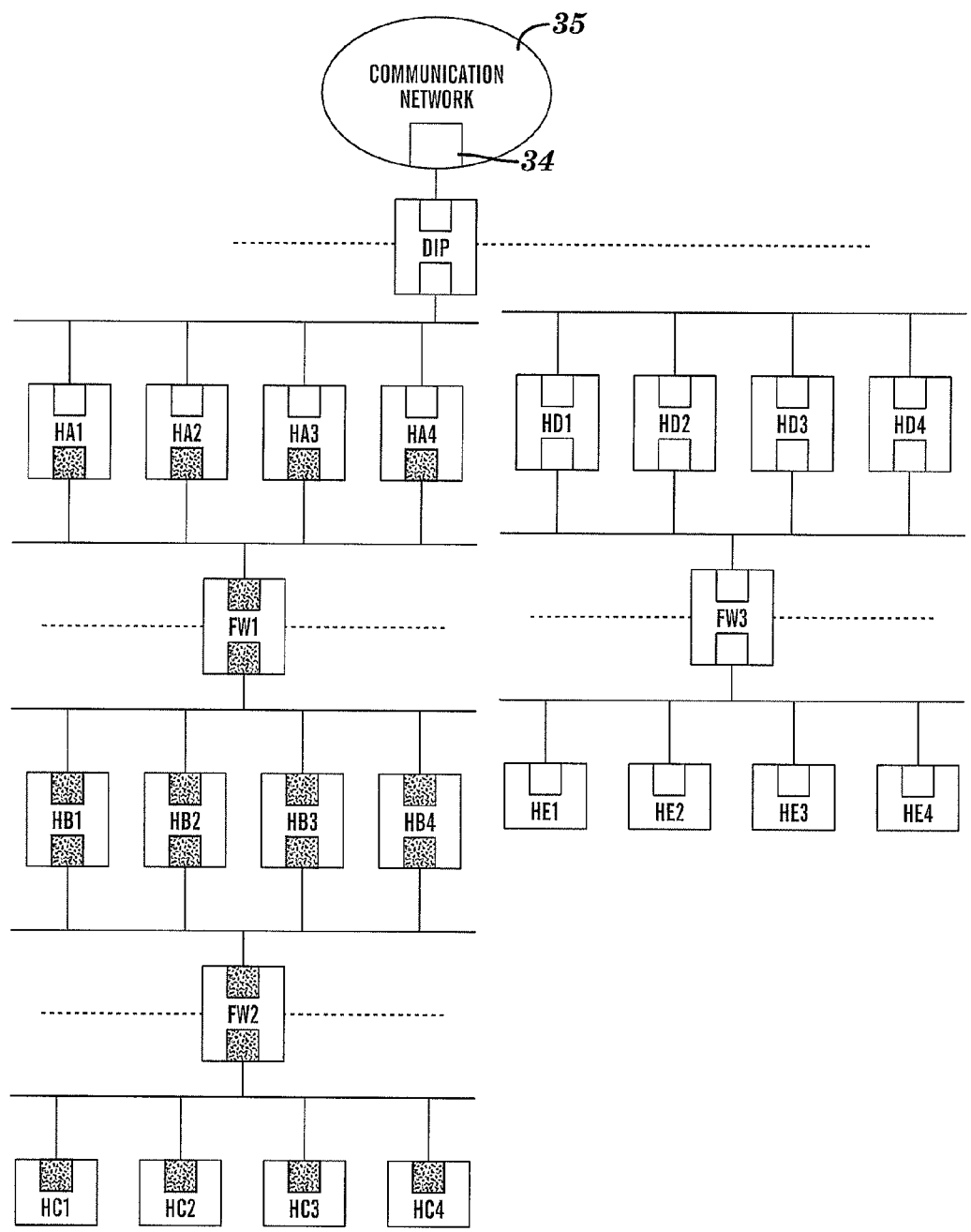
Figure 44F:
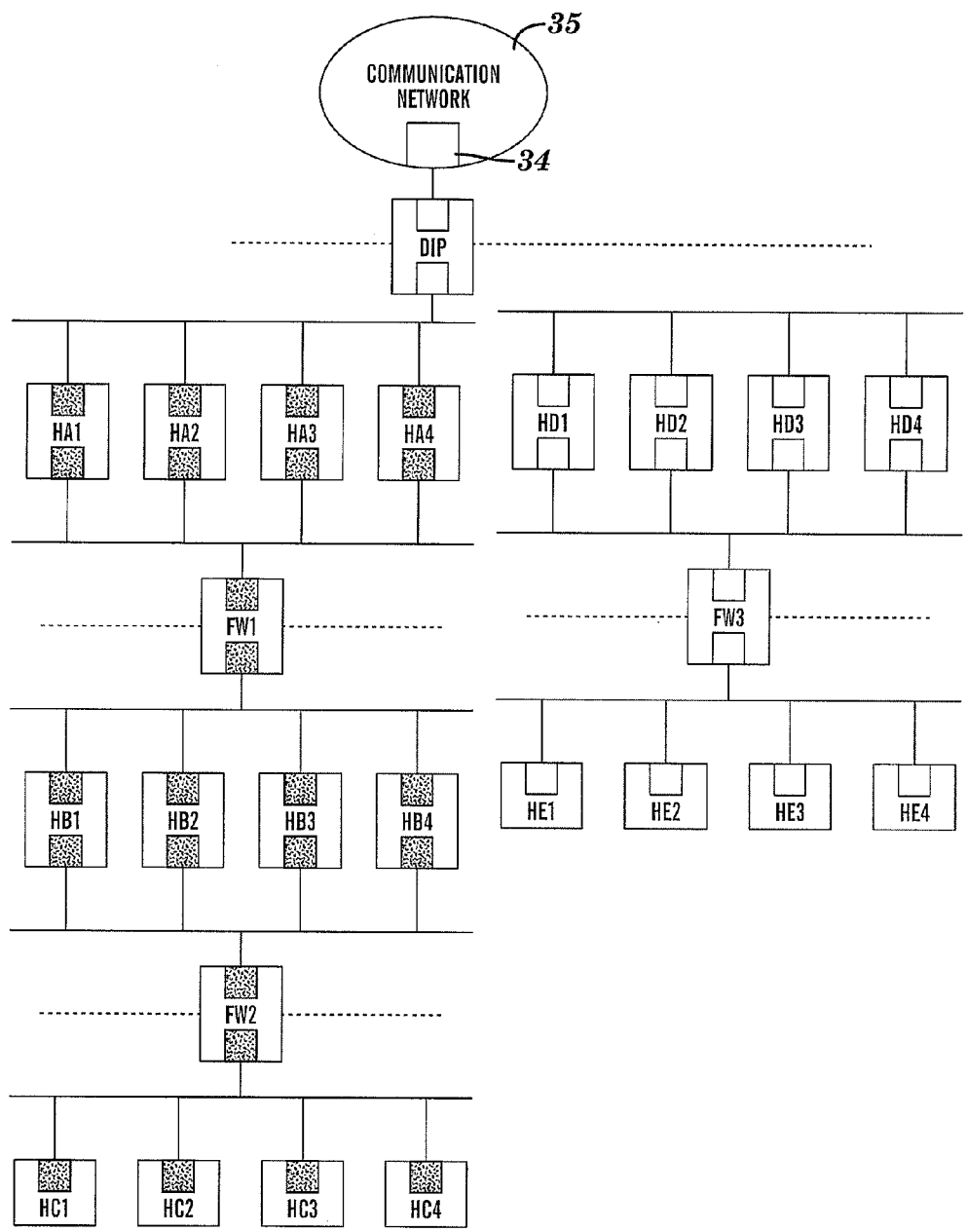

FIGS. 44E and 44F depict the result of executing the second iteration of the loop of FIG. 39. Step 82 of FIG. 39 determines a set of host interfaces that includes each unlabeled interface of each host that is directly connected to the reference hosts FW1 and FW2. The set of host interfaces includes those interfaces of hosts HA1, HA2, HA3, and HA4 which are directly connected to FW1, and all interfaces of hosts HC1, HC2, HC3, and HC4 which are directly connected to FW2. Step 83 of FIG. 39 assigns the label to each host interface of the set of host interfaces, which results in painting those interfaces of hosts HA1, HA2, HA3, HA4 which are directly connected to FW1, and all interfaces of hosts HC1, HC2, HC3, and HC4 which are directly connected to FW2, (as shown in FIG. 44E), and which further results in the set of partially labeled hosts (PLHs) being updated to consist of the hosts HA1, HA2, HA3, and HA4. Step 84 of FIG. 39 ascertains that the set of partially labeled hosts is not empty. Step 85 of FIG. 39 sets the set of reference hosts as consisting of the set of next partially labeled hosts; i.e., HA1, HA2, HA3, and HA4. Step 86 assigns the label to each unlabeled interface of each reference host HA1, HA2, HA3, and HA4, resulting in all interfaces of the reference hosts HA1, HA2, HA3, and HA4 being assigned a label (i.e., painted as shown in FIG. 44F). Then the second iteration ends.

Figure 44G:
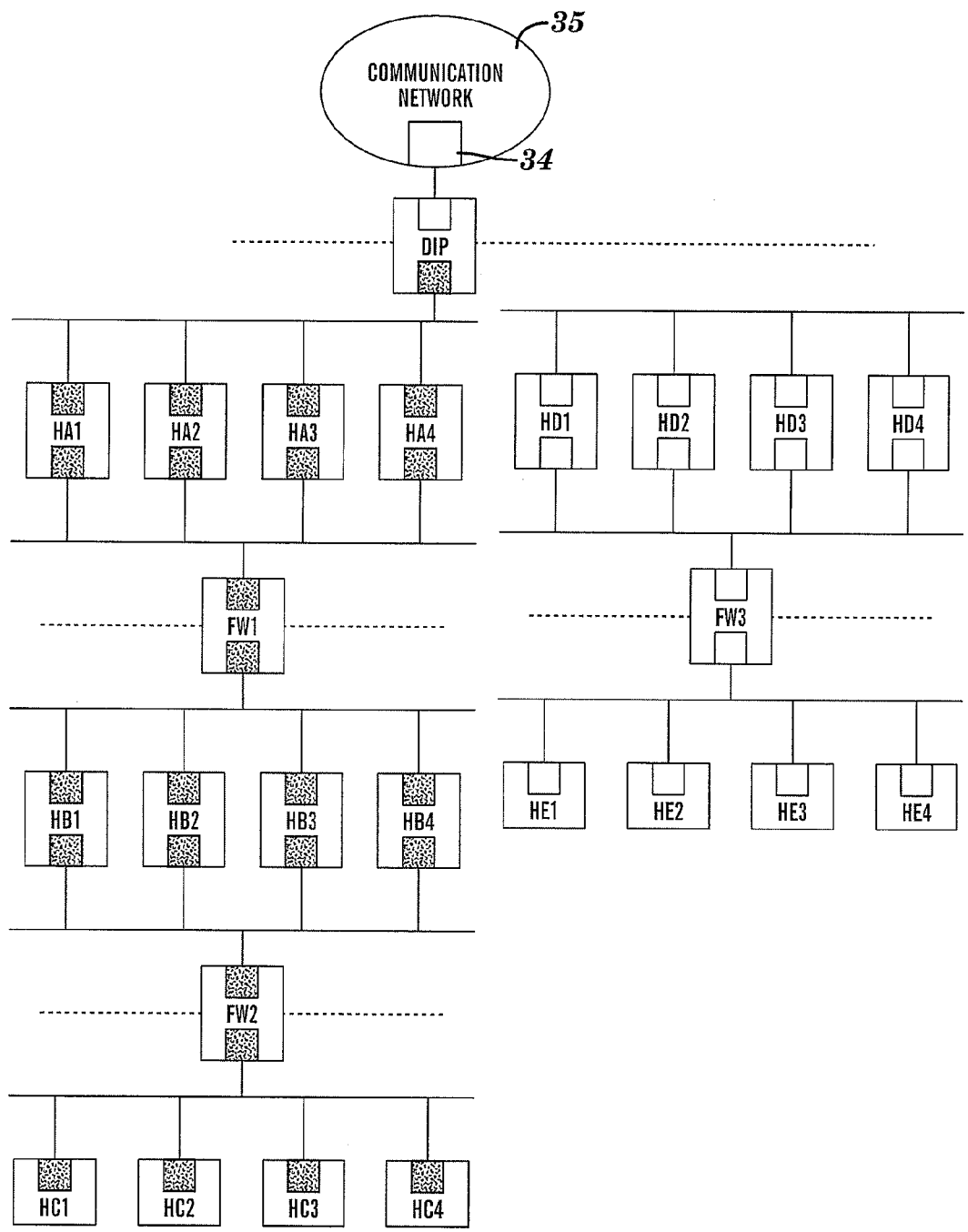
Figure 44H:
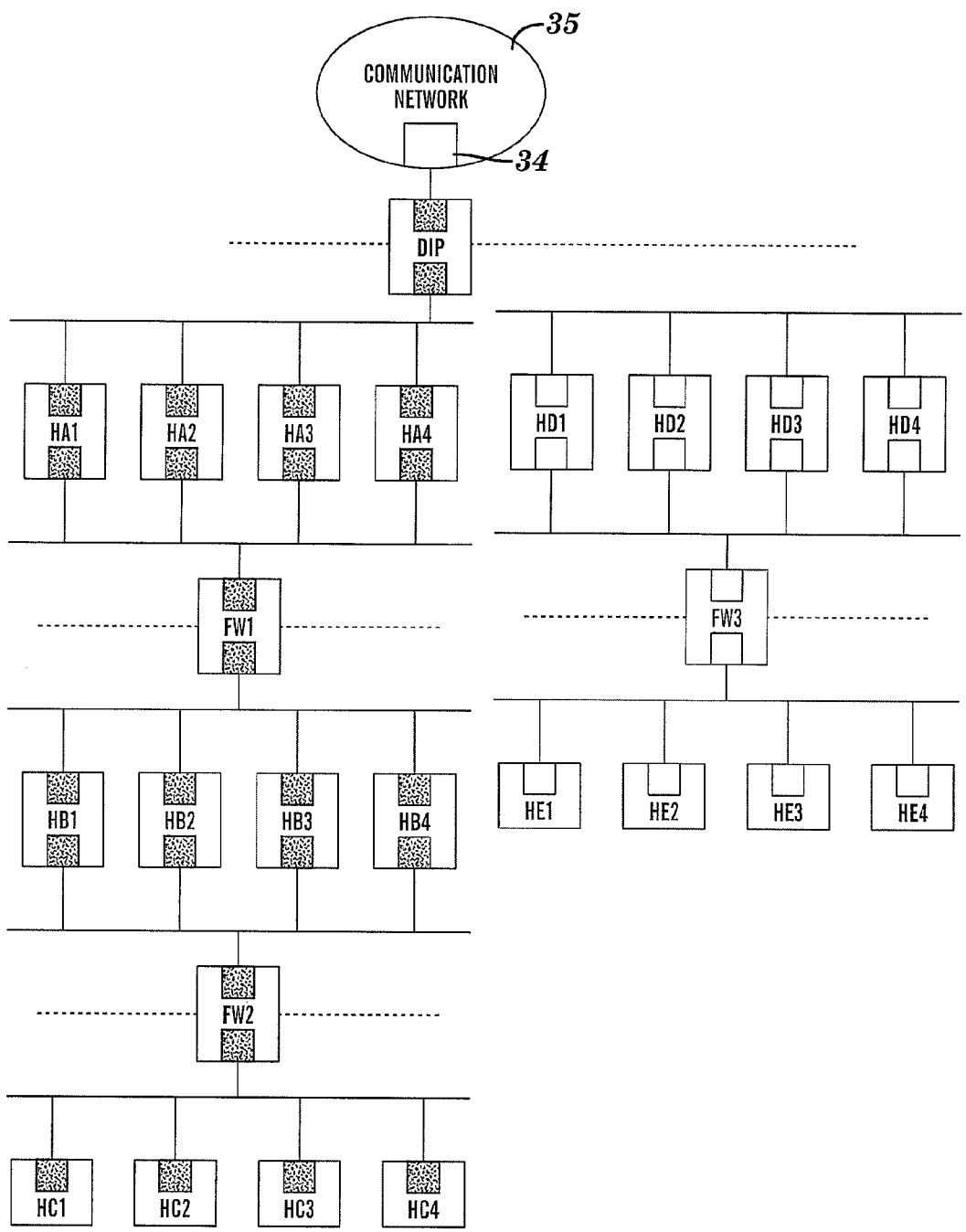

FIGS. 44G and 44H depict the result of executing the third iteration of the loop of FIG. 39. Step 82 of FIG. 39 determines a set of host interfaces that includes each unlabeled interface of each host that is directly connected to the reference hosts HA1, HA2, HA3, and HA4. The set of host interfaces includes the one interface of the DIP that is directly connected to HA1, HA2, HA3, or HA4. Step 83 of FIG. 39 assigns the label to each host interface of the set of host interfaces, which results in painting the one interface of the DIP that is directly connected to HA1, HA2, HA3, or HA4 (as shown in FIG. 44G), and which further results in the set of partially labeled hosts (PLHs) being updated to consist of the DIP. Step 84 of FIG. 39 ascertains that the set of partially labeled hosts is not empty. Step 85 of FIG. 39 sets the set of reference hosts as consisting of the set of next partially labeled hosts; i.e., the DIP. Step 86 assigns the label to the unlabeled interface of the reference host (i.e., the DIP), resulting in all interfaces of the reference host (I.e., the DIP) being assigned a label (i.e., painted as shown FIG. 44H). Then the third iteration ends.

In the fourth iteration of the loop, step 82 of FIG. 39 determines a set of host interfaces that includes each unlabeled interface of each host that is directly connected to the reference host (i.e., the DIP). The set of host interfaces is empty since there are no unlabeled interfaces directly connected to the DIP. Step 83 of FIG. 39 does not assign the label, since the set of host interfaces is empty, which results in the set of partially labeled hosts (PLHs) being updated to consist of the empty set of host interfaces. Step 84 of FIG. 39 ascertains that the set of partially labeled hosts is empty, which terminates the loop. Step 87 of FIG. 39 determines that the DIP has an interface that is connected to the communication network 35, resulting in step 88 of FIG. 39 designating the given host HB4 as being connected to the communication network 35.

4.7.2 Example with Select Host Isolated from the Communication Network

FIGS. 45A-45F (collectively "FIG. 45") depict an example using the algorithm of FIG. 39, as described in Section 4.5, for determining whether a given host is an isolated host, in accordance with embodiments of the present invention. The given host is the host HE4 which is denoted as host H in FIG. 39.

Figure 45A:
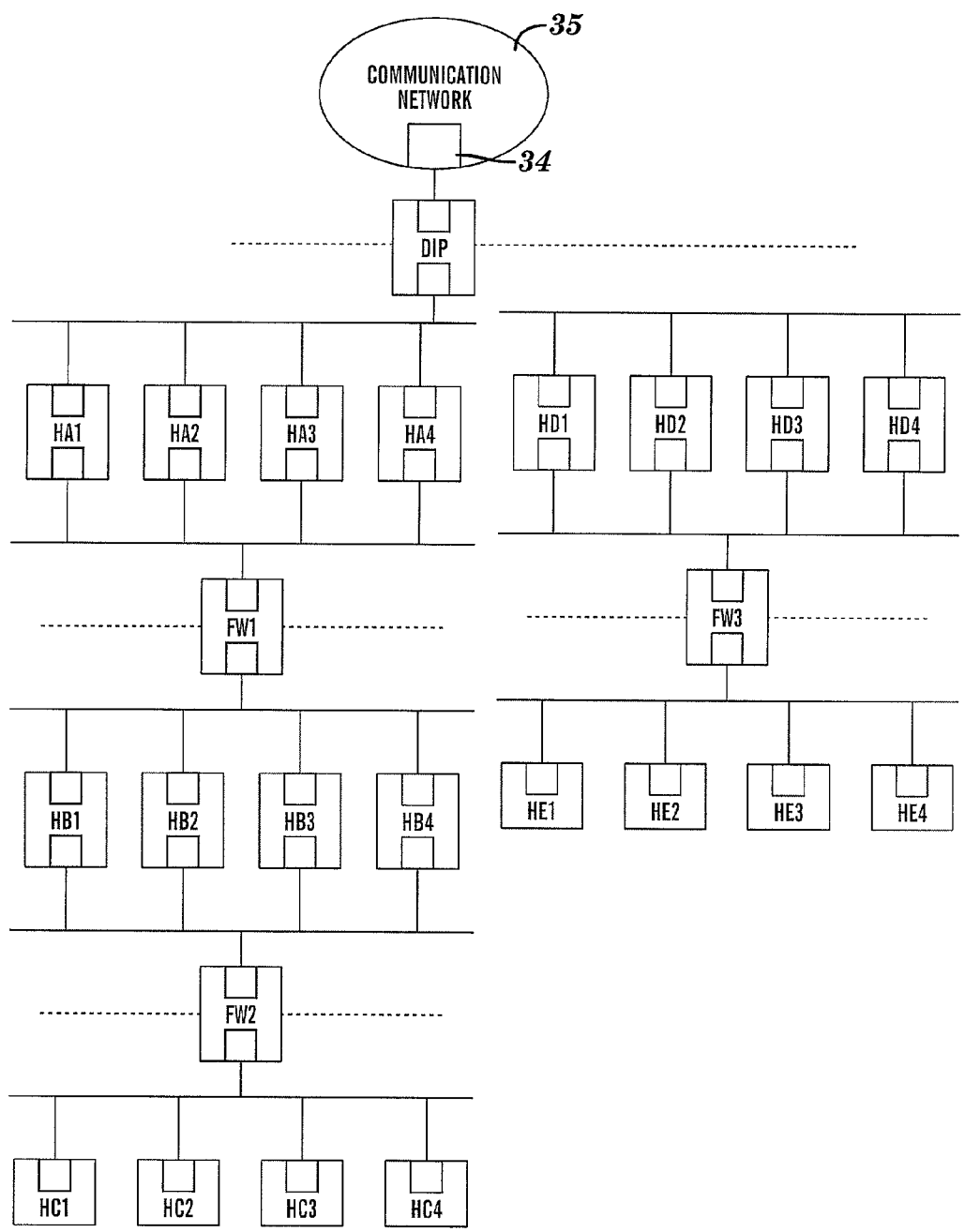

FIG. 45A depicts the IT structure of FIG. 34, wherein all host interfaces are initially unlabeled. FIGS. 45B-45F depict the initialization steps and the successive iterations of the loop of FIG. 39 in which host interfaces are labeled with a selected label in the successive iterations. The label may be any label described supra and each labeled interface is depicted in this example as a painted interface that is painted with a color or shading.

Figure 45B:
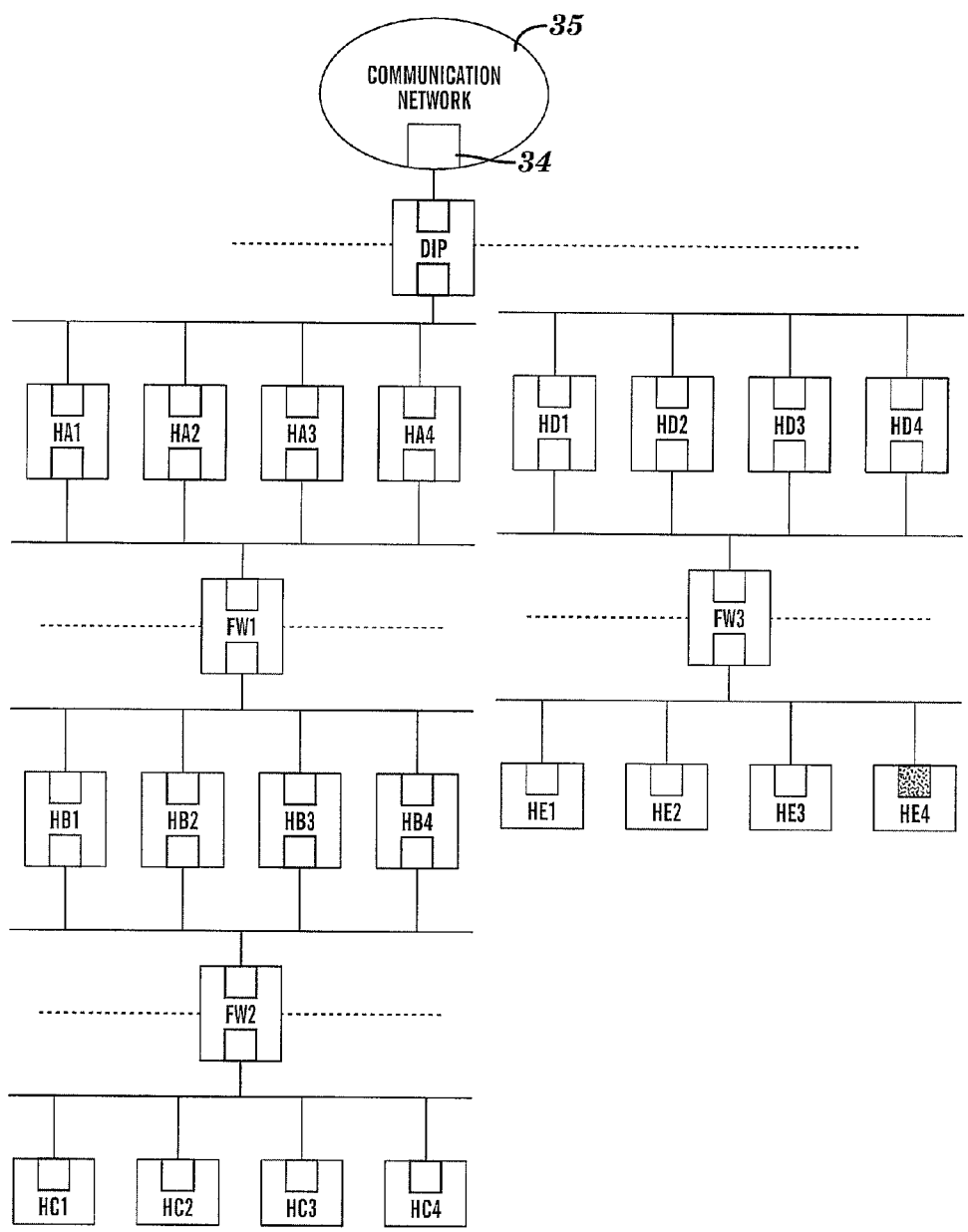

FIG. 45B depicts the result of performing the initialization step 81 of FIG. 39 in which the label is selected as a paint color or shading, the set of partially labeled hosts is set to an empty set, the label is assigned to each interface (i.e., the interface is painted) of the given host HE4, and a set of reference hosts is set to the host HE4.

Figure 45C:
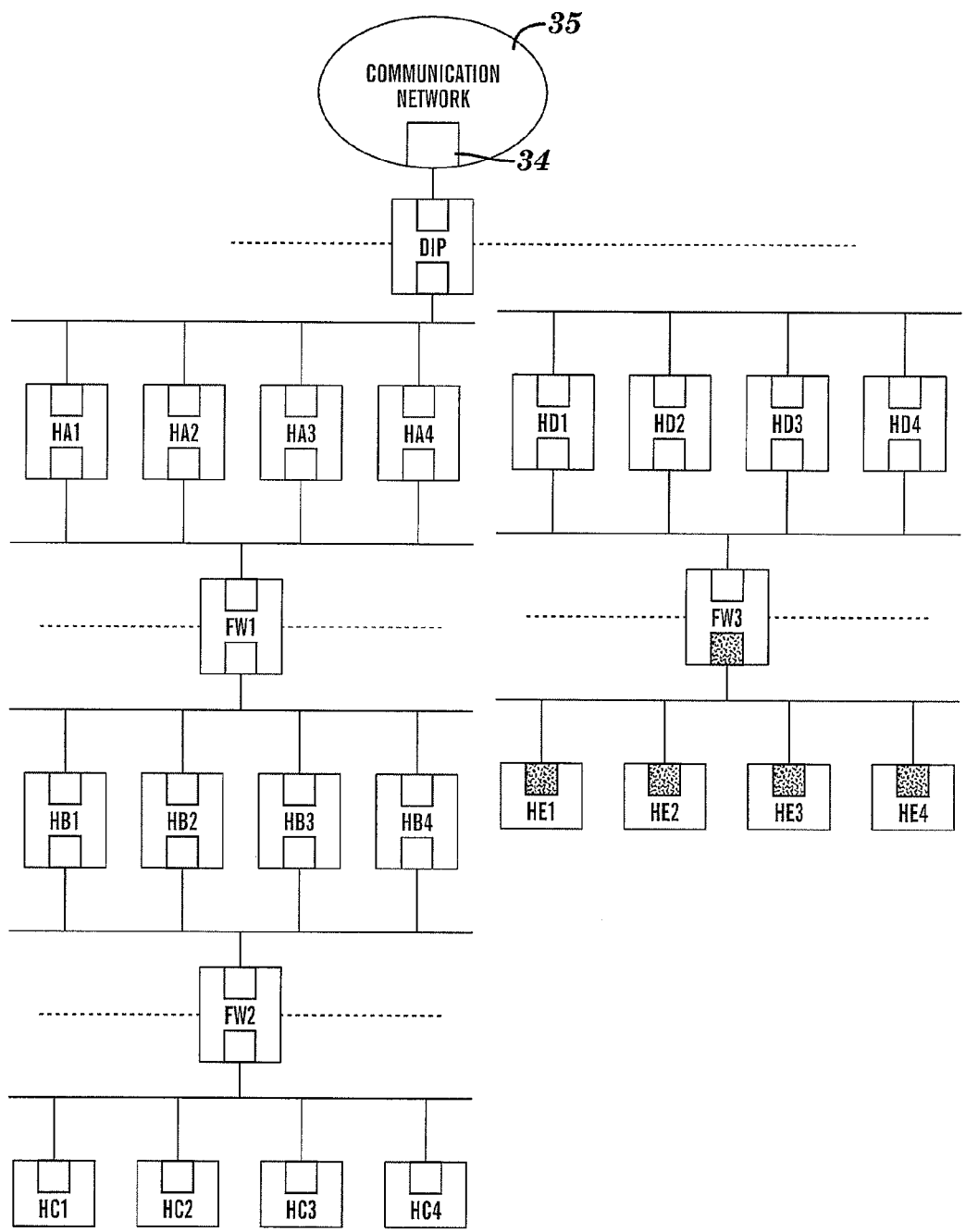
Figure 45D:
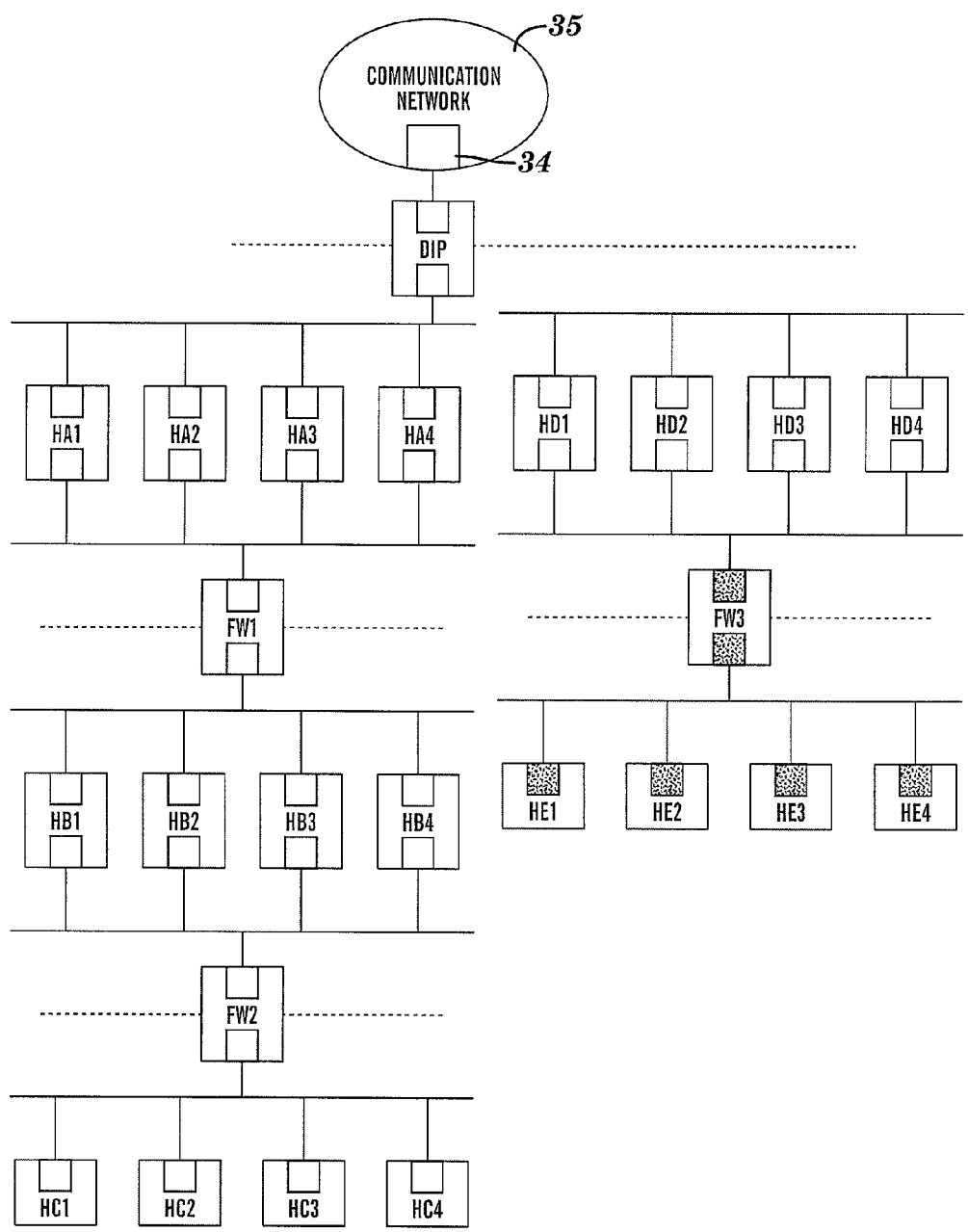

FIGS. 45C and 45D depict the result of executing the first iteration of the loop of FIG. 39. Step 82 of FIG. 39 determines a set of host interfaces that includes each unlabeled interface of each host that is directly connected to the reference host HE4. The set of host interfaces includes all interfaces of hosts HE1, HE2, and HE3, and the one interface of FW3 that is directly connected to HE4. Step 83 of FIG. 39 assigns the label to each host interface of the set of host interfaces, which results in painting all interfaces of hosts HE1, HE2, and HE3, and the one interface of FW3 that is directly connected to HE4 (as shown in FIG. 45C), and which further results in the set of partially labeled hosts (PLHs) being updated to consist of the host FW3. Step 84 of FIG. 39 ascertains that the set of partially labeled hosts is not empty. Step 85 of FIG. 39 sets the set of reference hosts as consisting of the set of next partially labeled hosts; i.e., FW3. Step 86 assigns the label to each unlabeled interface of the reference host FW3, resulting in all interfaces of the reference hosts FW3 being assigned a label (i.e., painted as shown in FIG. 45D). Then the first iteration ends.

Figure 45E:
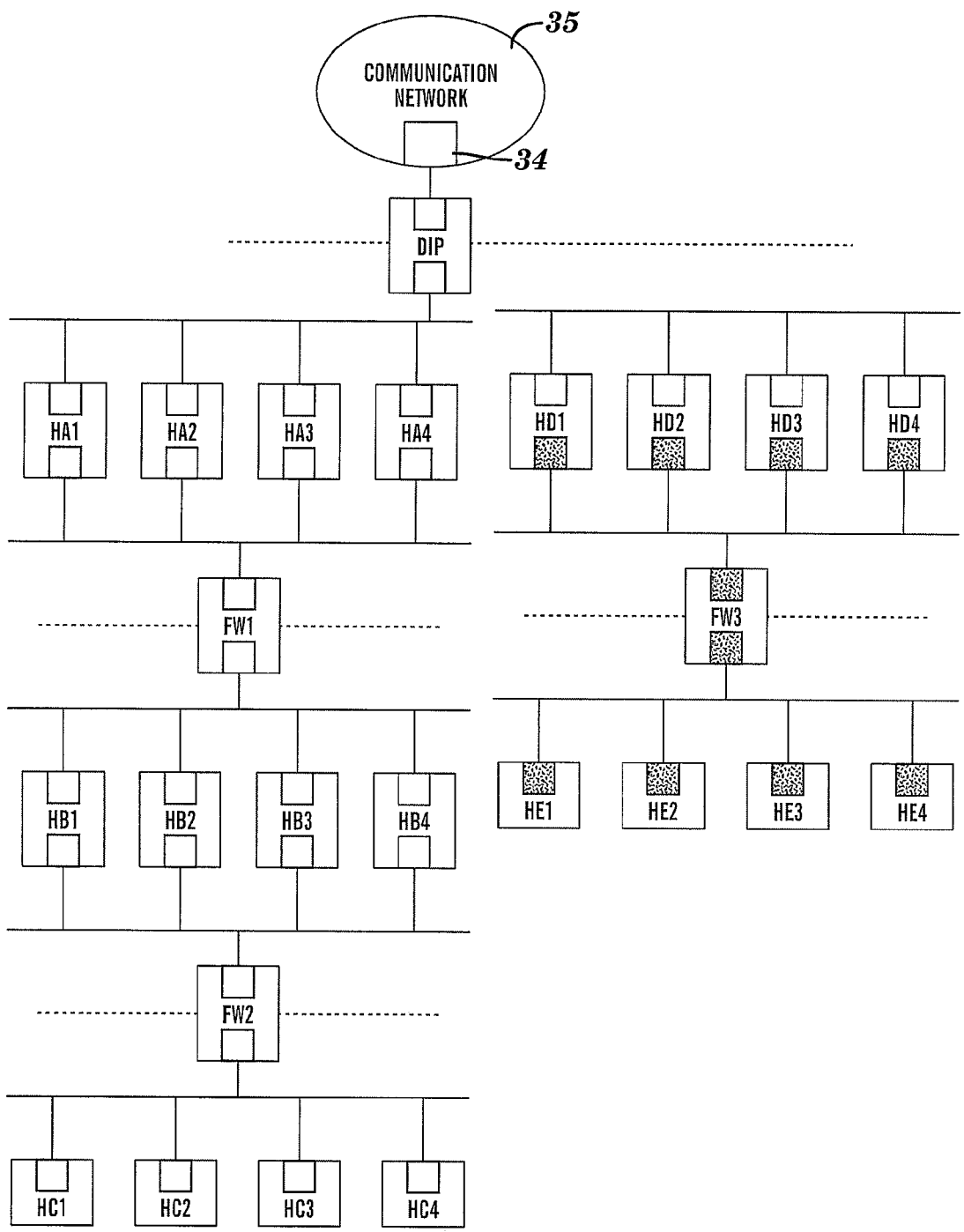
Figure 45F:
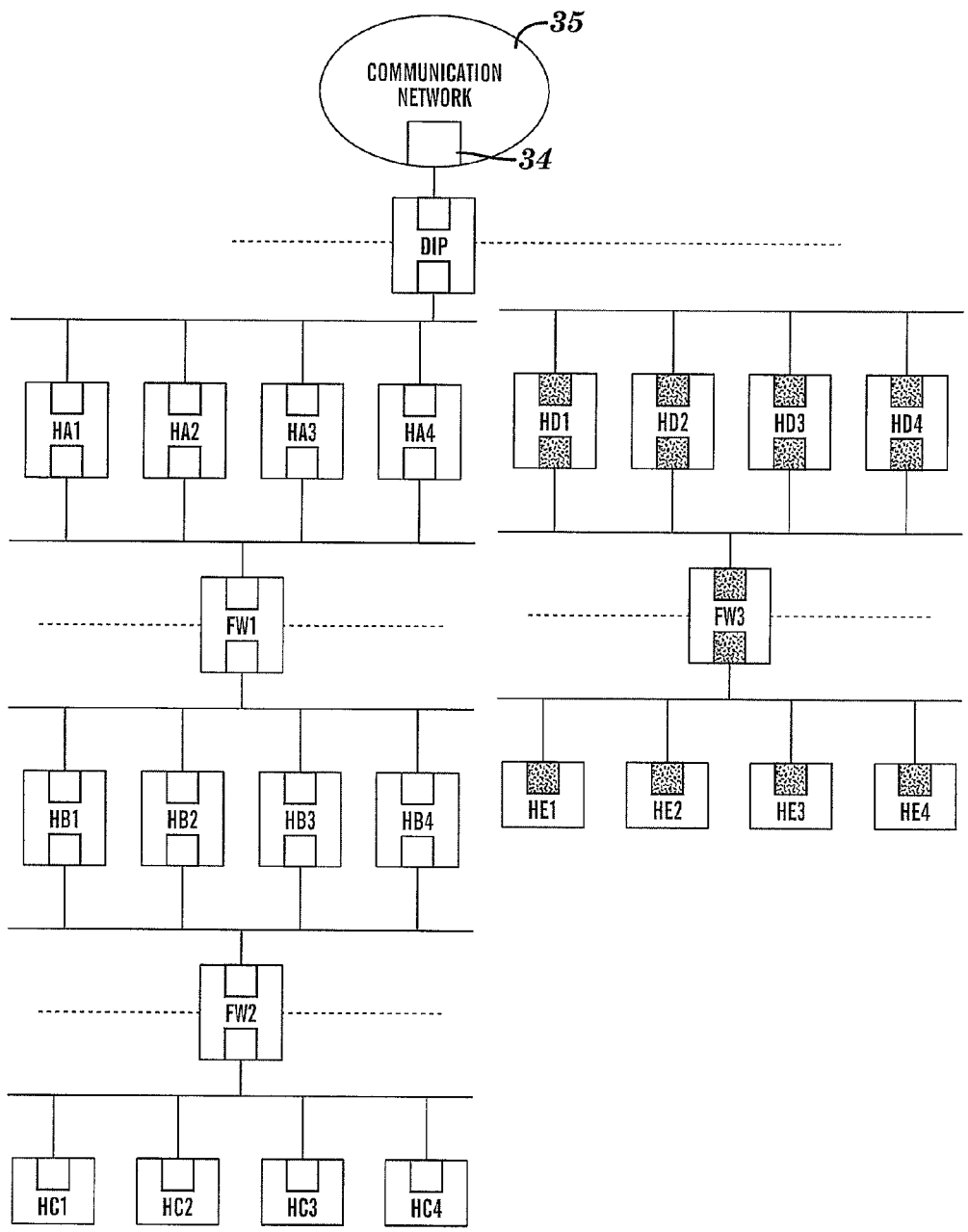

FIGS. 45E and 45F depict the result of executing the second iteration of the loop of FIG. 39. Step 82 of FIG. 39 determines a set of host interfaces that includes each unlabeled interface of each host that is directly connected to the reference host FW3. The set of host interfaces includes all unlabeled interfaces of hosts HD1, HD2, HD3, and HD4 which are directly connected to the reference host FW3. Step 83 of FIG. 39 assigns the label to each host interface of the set of host interfaces, which results in painting all unlabeled interfaces of hosts HD1, HD2, HD3, and HD4 which are directly connected to the reference host FW3 (as shown in FIG. 45E), and which further results in the set of partially labeled hosts (PLHs) being updated to consist of the hosts HD1, HD2, HD3, and HD4. Step 84 of FIG. 39 ascertains that the set of partially labeled hosts is not empty. Step 85 of FIG. 39 sets the set of reference hosts as consisting of the set of next partially labeled hosts; i.e., HD1, HD2, HD3, and HD4. Step 86 assigns the label to each unlabeled interface of each reference host HD1, HD2, HD3, and HD4, resulting in all interfaces of the reference hosts HD1, HD2, HD3, and HD4 being assigned a label (i.e., painted as shown in FIG. 44F). Then the second iteration ends.

In the third iteration of the loop, step 82 of FIG. 39 determines a set of host interfaces that includes each unlabeled interface of each host that is directly connected to the reference hosts HD1, HD2, HD3, and HD4. The set of host interfaces is empty since there are no unlabeled interfaces directly connected to HD1, HD2, HD3, and HD4. Step 83 of FIG. 39 does not assign the label, since the set of host interfaces is empty, which results in the set of partially labeled hosts (PLHs) being updated to consist of the empty set of host interfaces. Step 84 of FIG. 39 ascertains that the set of partially labeled hosts is empty, which terminates the loop. Step 87 of FIG. 39 determines that there is no host having a labeled interface that is connected to the communication network 35, resulting in step 88 of FIG. 39 designating the given host HE4 as being isolated from the communication network 35.

4.8 Graphical Display of Host Network

With respect to the algorithm for determining a firewall connectivity indication, the host network depicted in any of the Figures of FIGS. 40-44 may be displayed graphically on a display device of a computer system (e.g., the computer system 90 described infra in conjunction with FIG. 20), wherein the plurality of hosts are shown as interconnected at their respective interfaces, wherein each unlabeled interface of each host is displayed as unlabeled, and wherein each labeled interface of each host is displayed as labeled with in accordance with its respective assigned label.

Figure 46:
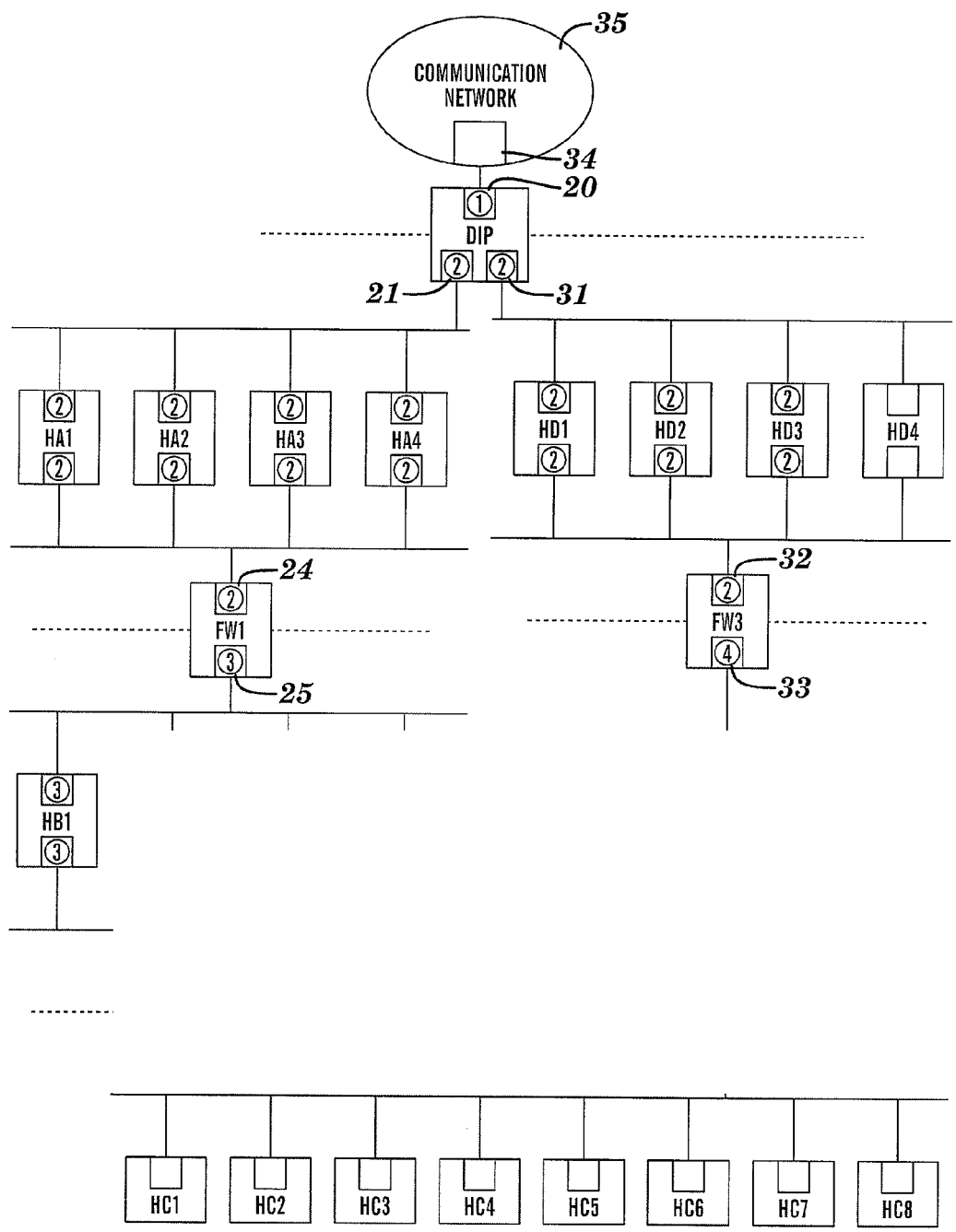
FIG. 46 depicts a graphical display of FIG. 43E such that labels assigned to interfaces of non-firewall hosts are displayed, in accordance with embodiments of the present invention.

In one embodiment pertaining to the algorithm for determining a firewall connectivity indication, the graphical display of the host network may further comprise labeling non-firewall hosts. For example, the set of interfaces determined in step 51 of FIG. 36 may further include each unlabeled interface of each server in each continuous path of the at least one continuous path. Noting that step 52 of FIG. 36 assigns the current label to each interface in the set of interfaces, the graphical display may include displaying each such labeled interface in the set of interfaces. As an example, FIG. 46 depicts a graphical display of FIG. 43E such that labels assigned to interfaces of non-firewall hosts are displayed in addition to what is displayed in FIG. 43E, in accordance with embodiments of the present invention. The interfaces of the non-firewall hosts HA1, HA2, HA3, HA4, HD1, HD2, HD3, HD4 are displayed with the label 2. The interfaces of the non-firewall hosts HB1, HB2, HB3, HB4 are displayed with the label 3. If the different labels of the ordered set of different labels are color numbers, then each labeled interface of each host is graphically displayed as colored with a color uniquely associated with the color number corresponding to its respective assigned label.

Figure 47:
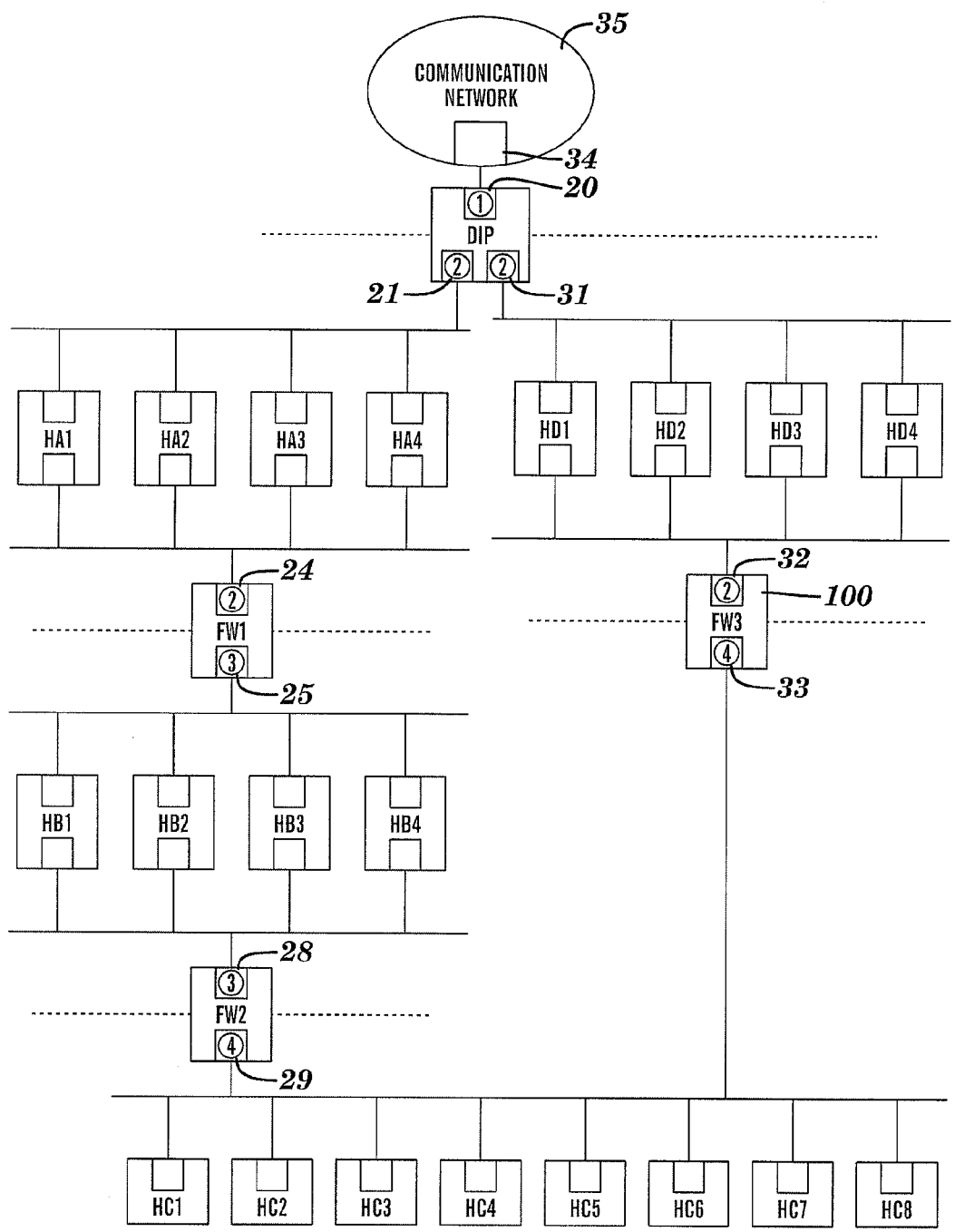
FIG. 47 depicts a graphical display of FIG. 43E such that a cross-connected firewall has a visual attribute, in accordance with embodiments of the present invention.

In one embodiment pertaining to the algorithm for determining a firewall connectivity indication, the graphical display of the host network may further comprise display of a visual attribute at each firewall designated as being a cross-zone connected firewall. As an example, FIG. 47 depicts a graphical display of FIG. 43E such that the cross-connected firewall FW3 has a visual attribute 100, in accordance with embodiments of the present invention. The visual attribute 100 distinguishes the cross-connected firewall FW3 from all other firewalls being displayed 3. The visual attribute may comprise blinking, coloring, shading, geometrical shaping of FW3, etc. Note that the non-firewall hosts of FIG. 46 and the visual attribute 100 of FIG. 47 may be displayed together in one display.

With respect to the algorithm for determining whether a given host is an isolated host, the host network depicted in any of the Figures of FIGS. 45-46 may be displayed graphically on a display device of a computer system (e.g., the computer system 90 described infra in conjunction with FIG. 20), wherein the plurality of hosts are shown as interconnected at their respective interfaces, wherein each unlabeled interface of each host is displayed as unlabeled, and wherein each labeled interface of each host is displayed as labeled with in accordance with its assigned label. In one embodiment the label may be, inter alia, a color.

5.0 Computer System

FIG. 20 illustrates a computer system 90 used for implementing an IT Entity Model and associated processes, for visualizing configurations relating to IT structures, and for implementing verification of correctness of networking aspects of an IT system, including any subset of the algorithms and methods described herein, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for implementing an IT Entity Model and associated processes, for visualizing configurations relating to IT structures, and for implementing verification of correctness of networking aspects of an IT system. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 20) may be used as a computer readable storage medium (or a program storage device) having a computer readable program embodied therein and/or having other data stored therein, wherein the computer readable program comprises the computer code 97. Generally, a computer program product (or, alternatively, an article of manufacture) of the computer system 90 may comprise said computer readable storage device.

Any of the components of the present invention could be deployed, managed, serviced, etc. by a service provider who offers to implement an IT Entity Model and associated processes, implement visualizing configurations relating to IT structures, and/or implement verification of correctness of networking aspects of an IT system. Thus the present invention discloses a process for deploying or integrating computing infrastructure, comprising integrating computer-readable code into the computer system 90, wherein the code in combination with the computer system 90 is capable of performing a method for implementing an IT Entity Model and associated processes, for visualizing configurations relating to IT structures, and for implementing verification of correctness of networking aspects of an IT system.

In another embodiment, the invention provides a business method that performs the process steps of the invention on a subscription, advertising, and/or fee basis. That is, a service provider, such as a Solution Integrator, could offer to implement an IT Entity Model and associated processes, implement visualizing configurations relating to IT structures, and/or implement verification of correctness of networking aspects of an IT system. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 20 shows the computer system 90 as a particular configuration of hardware and software, any configuration of hardware and software, as would be known to a person of ordinary skill in the art, may be utilized for the purposes stated supra in conjunction with the particular computer system 90 of FIG. 20. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for determining a firewall connectivity indication for a host network of an Information Technology (IT) structure of an IT system, said host network comprising a plurality of hosts including at least one server and at least one firewall, said hosts configured to be interconnected within the host network via interfaces comprised by said hosts, each server being a hardware server having at least one interface, each firewall being a hardware firewall having at least two interfaces, said host network connected to at least one interface of a communication network, said method comprising:

determining whether the at least one firewall comprises at least one malconnected firewall, wherein a malconnected firewall is an isolated firewall or a cross-zone connected firewall, wherein an isolated firewall is a firewall that is not connected to the communication network, and wherein a cross-zone connected firewall is a firewall that is connected to the communication network by a first continuous path and a second continuous path such that the first and second continuous paths do not each comprise a same number of firewalls; and determining the firewall connectivity indication from said determining whether the at least one firewall comprises at least one malconnected firewall, wherein the firewall connectivity indication indicates that the host network comprises at least one malconnected firewall or that the host network does not comprise at least one malconnected firewall;

wherein said determining whether the at least one firewall comprises at least one malconnected firewall comprises determining for each firewall whether each firewall is a malconnected firewall;

wherein said determining for each firewall whether said each firewall is a malconnected firewall comprises:

performing an initialization comprising selecting a current label from an ordered sequence of different labels, setting a set of partially labeled firewalls to an empty set; and setting a set of reference interfaces to the at least one interface of the communication network;

after said performing the initialization, executing a loop comprising executing at least one iteration of the loop, wherein each interface of each firewall is unlabeled upon initiation of said executing the loop, and wherein each iteration comprises:

determining a set of interfaces that includes each unlabeled interface of each firewall that is connected to at least one reference interface of the set of reference interfaces via at least one continuous path that does not include any firewall of the host network, after said determining the set of interfaces, assigning the current label to each interface of the set of interfaces, resulting in the set of partially labeled firewalls being updated in accordance with said assigning the current label, and after said assigning the current label, ascertaining whether the set of partially labeled firewalls is empty;

if said ascertaining ascertains that the set of partially labeled firewalls is not empty then selecting a next partially labeled firewall from the set of partially labeled firewalls, setting the set of reference interfaces as consisting of all unlabeled interfaces in the next partially labeled firewall, changing the current label to be the next label immediately after the current label in the ordered sequence of graded labels, assigning the current label to each firewall interface of the set of reference interfaces after said setting the set of reference interfaces and after said changing the current label, and exiting the iteration to perform the next iteration by looping back to said determining a set of interfaces;

if said ascertaining ascertains that the set of partially labeled firewalls is empty then exiting the loop and after said exiting the loop: designating each firewall having no labeled interface as an isolated firewall, designating each firewall comprising an interface with an assigned label as not being a cross-zone connected firewall if each interface of said each firewall has an assigned label and the labels assigned to the interfaces of said each firewall consist of two labels appearing consecutively in the ordered sequence of different labels, and otherwise designating each firewall comprising an interface with an assigned label as being a cross-zone connected firewall; and storing the firewall connectivity indication in a computer readable storage medium of a computer system.

2. The method of claim 1, wherein said determining whether the at least one firewall comprises at least one mal-connected firewall comprises:
determining that the at least one firewall does not comprise an isolated firewall followed by determining whether the at least one firewall comprises a cross-zone connected firewall.

3. The method of claim 1, wherein said determining whether the at least one firewall comprises at least one mal-connected firewall comprises:
executing an algorithm which determines concurrently whether the at least one firewall comprises an isolated firewall and whether the at least one cross-zone connected firewall.

4. The method of claim 1, wherein said determining whether the at least one firewall comprises at least one mal-connected firewall comprises identifying at least one cross-zone connected firewall comprised by the at least one firewall.

5. The method of claim 1, wherein said determining whether the at least one firewall comprises at least one mal-connected firewall comprises identifying at least one isolated firewall comprised by the at least one firewall.

6. The method of claim 1, wherein the method comprises in each iteration after said assigning the current label to each firewall interface of the set of reference interfaces:
graphically displaying, on a display device of the computer system, the plurality of hosts being interconnected at their respective interfaces, including displaying each unlabeled interface of each host as unlabeled and displaying each labeled interface of each host as labeled with in accordance with its respective assigned label.

7. The method of claim 6, wherein the determined set of interfaces further includes each unlabeled interface of each server in each continuous path of the at least one continuous path wherein the different labels of the ordered set of different labels are color numbers, and wherein said displaying each labeled interface of each host comprises displaying each labeled interface of each host as colored with a color uniquely associated with the color number corresponding to its respective assigned label.

8. The method of claim 6, wherein said graphically displaying further comprises displaying a visual attribute at each firewall designated as being a cross-zone connected firewall.

9. The method of claim 1, wherein the firewall connectivity indication indicates that the host network comprises a first isolated firewall, and wherein the method further comprises after said storing the firewall connectivity indication:
identifying first network segments as consisting of all network segments of the host network to which the first isolated firewall is connected;
identifying first hosts as consisting of all hosts of the host network which are connected to the first network segments, wherein the first hosts comprise one or more firewalls of the at least one firewall and one or more servers of the at least one server;
designating an IT structure that comprises the first network segments and the first hosts;
connecting the designated IT structure to the communication network at an interface of a host of the first hosts; and
following said connecting the designated IT structure to the communication network:
performing setting steps comprising setting said plurality of hosts to the first hosts, setting the at least one server to the one or more servers, and setting the at least one firewall to the one or more firewalls; and
after said performing the setting steps, performing said determining whether the at least one firewall comprises at least one malconnected firewall, said determining the firewall connectivity indication, and said storing the firewall connectivity indication.

10. The method of claim 1, wherein communication network is the Internet.

11. A computer program product, comprising a computer readable storage device having a computer readable program code embodied therein, said computer readable program code configured to perform the method of claim 1 upon being executed by a processor of a computer system.

12. A computer system comprising a processor and a computer readable memory unit coupled to the processor, said memory unit containing computer readable program code configured to be executed by the processor to perform the method of claim 1.

13. A process for supporting computer infrastructure, said process comprising providing at least one support service for at least one of creating, integrating, hosting, maintaining, and deploying computer-readable code in a computing system, wherein the code in combination with the computing system is configured to perform a method for determining a firewall connectivity indication for a host network of an Information Technology (IT) structure of an IT system, said host network comprising a plurality of hosts including at least one server and at least one firewall, said hosts configured to be interconnected within the host network via interfaces comprised by said hosts, each server being a hardware server having at least one interface, each firewall being a hardware firewall having at least two interfaces, said host network connected to at least one interface of a communication network, said method comprising:
determining whether the at least one firewall comprises at least one malconnected firewall, wherein a malconnected firewall is an isolated firewall or a cross-zone connected firewall, wherein an isolated firewall is a firewall that is not connected to the communication network, and wherein a cross-zone connected firewall is a firewall that is connected to the communication network by a first continuous path and a second continuous path such that the first and second continuous paths do not each comprise a same number of firewalls; and
determining the firewall connectivity indication from said determining whether the at least one firewall comprises at least one malconnected firewall, wherein the firewall connectivity indication indicates that the host network comprises at least one malconnected firewall or that the host network does not comprise at least one malconnected firewall;

wherein said determining whether the at least one firewall comprises at least one malconnected firewall comprises determining for each firewall whether each firewall is a malconnected firewall;

wherein said determining for each firewall whether said each firewall is a malconnected firewall comprises:

performing an initialization comprising selecting a current label from an ordered sequence of different labels, setting a set of partially labeled firewalls to an empty set; and setting a set of reference interfaces to the at least one interface of the communication network;

after said performing the initialization, executing a loop comprising executing at least one iteration of the loop, wherein each interface of each firewall is unlabeled upon initiation of said executing the loop, and wherein each iteration comprises:

determining a set of interfaces that includes each unlabeled interface of each firewall that is connected to at least one reference interface of the set of reference interfaces via at least one continuous path that does not include any firewall of the host network, after said determining the set of interfaces, assigning the current label to each interface of the set of interfaces, resulting in the set of partially labeled firewalls being updated in accordance with said assigning the current label, and after said assigning the current label, ascertaining whether the set of partially labeled firewalls is empty;

if said ascertaining ascertains that the set of partially labeled firewalls is not empty then selecting a next partially labeled firewall from the set of partially labeled firewalls, setting the set of reference interfaces as consisting of all unlabeled interfaces in the next partially labeled firewall, changing the current label to be the next label immediately after the current label in the ordered sequence of graded labels, assigning the current label to each firewall interface of the set of reference interfaces after said setting the set of reference interfaces and after said changing the current label, and exiting the iteration to perform the next iteration by looping back to said determining a set of interfaces;

if said ascertaining ascertains that the set of partially labeled firewalls is empty then exiting the loop and after said exiting the loop: designating each firewall having no labeled interface as an isolated firewall, designating each firewall comprising an interface with an assigned label as not being a cross-zone connected firewall if each interface of said each firewall has an assigned label and the labels assigned to the interfaces of said each firewall consist of two labels appearing consecutively in the ordered sequence of different labels, and otherwise designating each firewall comprising an interface with an assigned label as being a cross-zone connected firewall; and storing the firewall connectivity indication in a computer readable storage medium of a computer system.

14. The process of claim 13, wherein said determining whether the at least one firewall comprises at least one malconnected firewall comprises:

determining that the at least one firewall does not comprise an isolated firewall followed by determining whether the at least one firewall comprises a cross-zone connected firewall.

15. The process of claim 13, wherein said determining whether the at least one firewall comprises at least one malconnected firewall comprises:

executing an algorithm which determines concurrently whether the at least one firewall comprises an isolated firewall and whether the at least one cross-zone connected firewall.

16. The process of claim 13, wherein said determining whether the at least one firewall comprises at least one malconnected firewall comprises identifying at least one cross-zone connected firewall comprised by the at least one firewall.

17. The process of claim 13, wherein said determining whether the at least one firewall comprises at least one malconnected firewall comprises identifying at least one isolated firewall comprised by the at least one firewall.

18. The process of claim 13, wherein the method comprises in each iteration after said assigning the current label to each firewall interface of the set of reference interfaces:

graphically displaying, on a display device of the computer system, the plurality of hosts being interconnected at their respective interfaces, including displaying each unlabeled interface of each host as unlabeled and displaying each labeled interface of each host as labeled with in accordance with its respective assigned label.

19. The process of claim 18, wherein the determined set of interfaces further includes each unlabeled interface of each server in each continuous path of the at least one continuous path wherein the different labels of the ordered set of different labels are color numbers, and wherein said displaying each labeled interface of each host comprises displaying each labeled interface of each host as colored with a color uniquely associated with the color number corresponding to its respective assigned label.

20. The process of claim 18, wherein said graphically displaying further comprises displaying a visual attribute at each firewall designated as being a cross-zone connected firewall.

21. The process of claim 13, wherein the firewall connectivity indication indicates that the host network comprises a first isolated firewall, and wherein the method further comprises after said storing the firewall connectivity indication:

identifying first network segments as consisting of all network segments of the host network to which the first isolated firewall is connected;

identifying first hosts as consisting of all hosts of the host network which are connected to the first network segments, wherein the first hosts comprise one or more firewalls of the at least one firewall and one or more servers of the at least one server;

designating an IT structure that comprises the first network segments and the first hosts;

connecting the designated IT structure to the communication network at an interface of a host of the first hosts; and following said connecting the designated IT structure to the communication network:

performing setting steps comprising setting said plurality of hosts to the first hosts, setting the at least one server to the one or more servers, and setting the at least one firewall to the one or more firewalls; and after said performing the setting steps, performing said determining whether the at least one firewall comprises at least one malconnected firewall, said determining the firewall connectivity indication, and said storing the firewall connectivity indication.

22. A computer program product, comprising a computer readable storage device having a computer readable program code embodied therein, said computer readable program code configured to perform the process of claim 13 upon being executed by a processor of a computer system.

23. A computer system comprising a processor and a computer readable memory unit coupled to the processor, said memory unit containing computer readable program code configured to be executed by the processor to perform the process of claim 13.

24. A method, said method comprising:
  determining that at least one host of a plurality of hosts is isolated from a communication network, including determining for each host whether each host is isolated from the communication network, wherein a host network comprises the plurality of hosts, wherein an Information Technology (IT) structure of an IT system comprises the host network, wherein the hosts are interconnected within the host network via interfaces comprised by the hosts, wherein each host comprises at least one interface, and wherein the host network is connected to at least one interface of the communication network;
  for each host determined to be isolated from the communication network: identifying all network segments of the host network to which said each host is connected, determining the unique network segments of the identified network segments, designating the unique network segments as a set of isolated network segments; and storing the set of isolated network segments in a computer readable storage medium of a computer system;
  selecting a label, wherein said each host is represented as a host H, wherein said determining for the host H whether the host H is isolated from the communication network comprises:
    performing an initialization comprising setting a set of partially labeled hosts to an empty set, assigning the label to each interface of the host H, and setting a set of reference hosts to the host H;
    after said performing the initialization, executing a loop comprising executing at least one iteration of the loop, wherein each interface of each host other than the host H is unlabeled upon initiation of said executing the loop, and wherein each iteration comprises:
      determining a set of host interfaces that includes each unlabeled interface of each host that is directly connected to any reference host of the set of reference hosts,
      after said determining the set of host interfaces, assigning the label to each host interface of the set of host interfaces, resulting in the set of partially labeled hosts being updated in accordance with said assigning the label, and
      after said assigning the label to each host interface, ascertaining whether the set of partially labeled hosts is empty;
        if said ascertaining ascertains that the set of partially labeled hosts is not empty then setting the set of reference hosts to the set of the next partially labeled hosts, followed by assigning the label to each unlabeled interface of each reference host, and followed by exiting the iteration to perform the next iteration by looping back to said determining a set of host interfaces;
        if said ascertaining ascertains that the set of partially labeled hosts is empty then exiting the loop and after said exiting the loop, determining whether the plurality of hosts comprises a host having an interface to which the label is assigned and which is directly connected to the communication network;
          if said determining determines that the plurality of hosts comprises the connected host then designating the host H as being connected to the communication network;
          if said determining determines that the plurality of hosts does not comprise the connected host then designating the host H as being isolated from the communication network.

25. The method of claim 24, wherein each host of the plurality of hosts is a hardware device.

26. The method of claim 25, wherein the plurality of hosts include at least one server and at least one firewall, wherein each server is a hardware server having at least one interface, and wherein each firewall is a hardware firewall having at least two interfaces.

27. The method of claim 24, wherein said determining determines that the plurality of hosts comprises the connected host.

28. The method of claim 24, wherein said determining determines that the plurality of hosts does not comprise the connected host.

29. The method of claim 24, wherein the method comprises in each iteration after said assigning the label to each host interface:
  graphically displaying, on a display device of the computer system, the plurality of hosts being interconnected at their respective interfaces, including displaying each unlabeled interface of each host as unlabeled and displaying each labeled interface of each host as labeled in accordance with its assigned label.

30. The method of claim 29, wherein the label is a color, and wherein said displaying each labeled interface of each host comprises displaying each labeled interface of each host as colored with said color.

31. A computer program product, comprising a computer readable storage device having a computer readable program code embodied therein, said computer readable program code configured to perform the method of claim 24 upon being executed by a processor of a computer system.

32. A computer system comprising a processor and a computer readable memory unit coupled to the processor, said memory unit containing computer readable program code configured to be executed by the processor to perform the method of claim 24.

* * * * *